(12) United States Patent
Isono et al.

(10) Patent No.: US 9,242,888 B2
(45) Date of Patent: Jan. 26, 2016

(54) MANUFACTURING METHOD OF GLASS BLANK FOR MAGNETIC DISK, MANUFACTURING METHOD OF GLASS SUBSTRATE FOR MAGNETIC DISK, GLASS BLANK FOR MAGNETIC DISK, GLASS SUBSTRATE FOR MAGNETIC DISK, AND MAGNETIC DISK

(71) Applicants: Hideki Isono, Kofu (JP); Hidekazu Tanino, Akishima (JP); Akira Murakami, Akiruno (JP); Takashi Sato, Inagi (JP); Masamune Sato, Kodaira (JP)

(72) Inventors: Hideki Isono, Kofu (JP); Hidekazu Tanino, Akishima (JP); Akira Murakami, Akiruno (JP); Takashi Sato, Inagi (JP); Masamune Sato, Kodaira (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 13/864,386

(22) Filed: Apr. 17, 2013

(65) Prior Publication Data

US 2013/0316194 A1  Nov. 28, 2013

Related U.S. Application Data

(63) Continuation-in-part of application No. PCT/JP2012/002766, filed on Apr. 20, 2012.

(60) Provisional application No. 61/635,486, filed on Apr. 19, 2012.

(30) Foreign Application Priority Data

Apr. 21, 2011 (JP) .................................. 2011-095522
Apr. 27, 2011 (JP) .................................. 2011-100221

(51) Int. Cl.
  G11B 5/84     (2006.01)
  C03B 11/05    (2006.01)
  (Continued)

(52) U.S. Cl.
  CPC ............... *C03B 11/05* (2013.01); *C03B 11/088* (2013.01); *C03B 11/122* (2013.01);
  (Continued)

(58) Field of Classification Search
  CPC .... C03B 11/05; C03B 11/088; C03B 11/125; C03B 23/0013; G11B 5/735
  USPC .......... 65/61, 66, 64, 65.3, 29.16, 29.18, 102, 65/106, 29.19; 428/141, 64.4, 848.9, 432; 501/54; 264/2.5
  See application file for complete search history.

(56) References Cited

U.S. PATENT DOCUMENTS 4,372,774 A * 2/1983 Cross et al. ...................... 65/114
6,141,991 A * 11/2000 Fujimoto et al. ............. 65/29.19
(Continued)

FOREIGN PATENT DOCUMENTS

JP  01-133948  *  5/1989  .............. C03B 11/00
JP  05-013096 B     2/1993
(Continued)

OTHER PUBLICATIONS

Olympus (JP 06-171959) translation, Jun. 1994.*
(Continued)

*Primary Examiner* — Kevin Bernatz
(74) *Attorney, Agent, or Firm* — Global IP Counselors, LLP

(57) ABSTRACT

To provide a method for manufacturing a glass blank for magnetic disk and a method for manufacturing a glass substrate for magnetic disk, which are capable of producing a glass blank for magnetic disk having a good surface waviness by press forming, and a method for manufacturing a glass substrate for magnetic disk. A method for manufacturing a glass blank for magnetic disk, which includes a forming process of press-forming a lump of molten glass using a pair of dies, wherein in the forming process, press forming is performed using thermally equalizing means for reducing a difference in temperature in the press forming surface of the die during pressing of the molten glass.

22 Claims, 73 Drawing Sheets

(51) Int. Cl.
   *G11B 5/735* (2006.01)
   *C03C 19/00* (2006.01)
   *C03B 11/08* (2006.01)
   *C03B 11/12* (2006.01)

(52) U.S. Cl.
   CPC .............. *C03B 11/125* (2013.01); *C03C 19/00* (2013.01); *G11B 5/735* (2013.01); *G11B 5/8404* (2013.01); *C03B 2215/07* (2013.01); *C03B 2215/70* (2013.01); *C03C 2204/08* (2013.01)

(56) References Cited

U.S. PATENT DOCUMENTS

| | | | | |
|---|---|---|---|---|
| 6,442,975 | B1* | 9/2002 | Murakami et al. | 65/61 |
| 8,567,216 | B2* | 10/2013 | Isono | 65/66 |
| 8,733,129 | B2* | 5/2014 | Eda et al. | 65/62 |
| 8,800,320 | B2* | 8/2014 | Isono et al. | 65/90 |
| 8,806,893 | B2* | 8/2014 | Isono et al. | 65/66 |
| 8,806,895 | B2* | 8/2014 | Eda et al. | 65/133 |
| 8,844,320 | B2* | 9/2014 | Isono et al. | 65/102 |
| 8,973,404 | B2* | 3/2015 | Eda et al. | 65/66 |
| 9,085,479 | B2* | 7/2015 | Eda | G11B 5/8404 1/1 |
| 2002/0009602 | A1* | 1/2002 | Kitayama et al. | 428/64.4 |
| 2002/0054979 | A1* | 5/2002 | Taniguchi | 428/141 |
| 2003/0121286 | A1* | 7/2003 | Takagi et al. | 65/64 |
| 2003/0164004 | A1* | 9/2003 | Hirota et al. | 65/29.16 |
| 2005/0204777 | A1 | 9/2005 | Mori et al. | |
| 2005/0272589 | A1* | 12/2005 | Shimizu | 501/54 |
| 2006/0090512 | A1* | 5/2006 | Fujimoto et al. | 65/29.19 |
| 2010/0071416 | A1* | 3/2010 | Kawai | 65/61 |
| 2010/0107695 | A1 | 5/2010 | Nozaki | |
| 2011/0304064 | A1* | 12/2011 | Taguchi et al. | 264/2.5 |
| 2014/0033768 | A1* | 2/2014 | Isono et al. | 65/90 |
| 2014/0050912 | A1* | 2/2014 | Isono et al. | 428/220 |
| 2014/0060117 | A1* | 3/2014 | Isono et al. | 65/97 |
| 2014/0065446 | A1* | 3/2014 | Isono et al. | 428/846.9 |

FOREIGN PATENT DOCUMENTS

| | | | |
|---|---|---|---|
| JP | 06-171959 | * 6/1994 | ............ C03B 11/00 |
| JP | 08-109030 A | 4/1996 | |
| JP | 09-255344 A | 9/1997 | |
| JP | 11-255521 A | 9/1999 | |
| JP | 2002-121051 A | 4/2002 | |
| JP | 2005-263574 A | 9/2005 | |
| JP | 2008-287779 A | 11/2008 | |
| JP | 4380379 B | 10/2009 | |
| JP | 2009-269762 A | 11/2009 | |
| JP | 2010-105874 A | 5/2010 | |
| WO | 2009096085 | * 8/2009 | ............ C03B 23/025 |

OTHER PUBLICATIONS

Canon (JP 01-133948) translation, May 1989.*
International Search Report of corresponding International Application No. PCT/JP2012/002766, dated on Jul. 3, 2012.

* cited by examiner

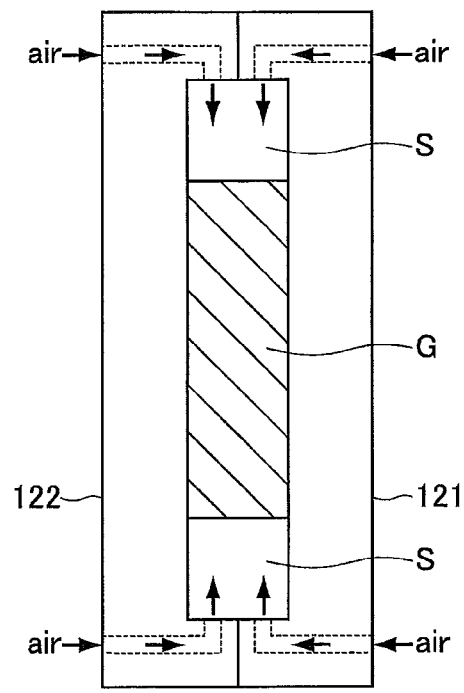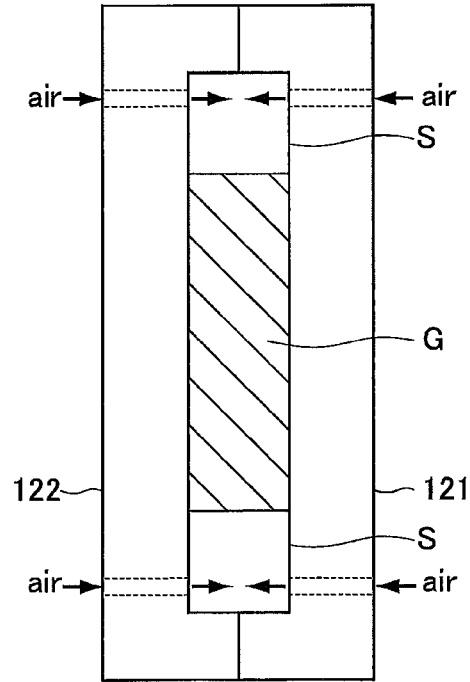
FIG.27

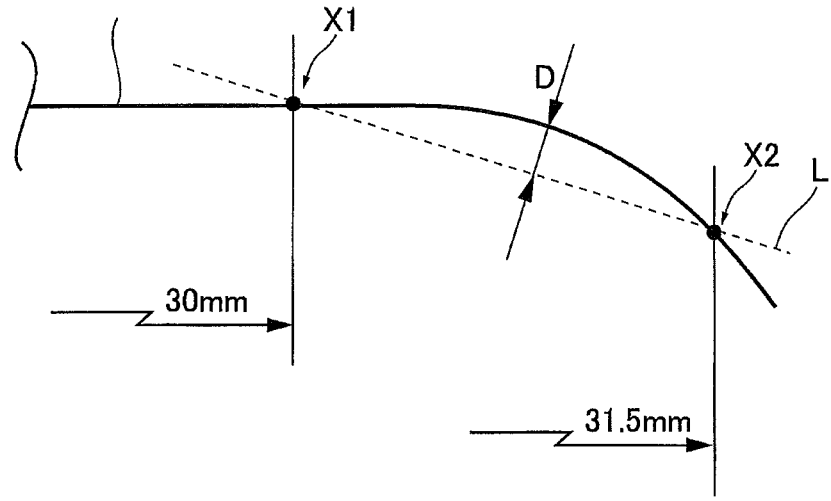
ROLL-OFF SHAPE
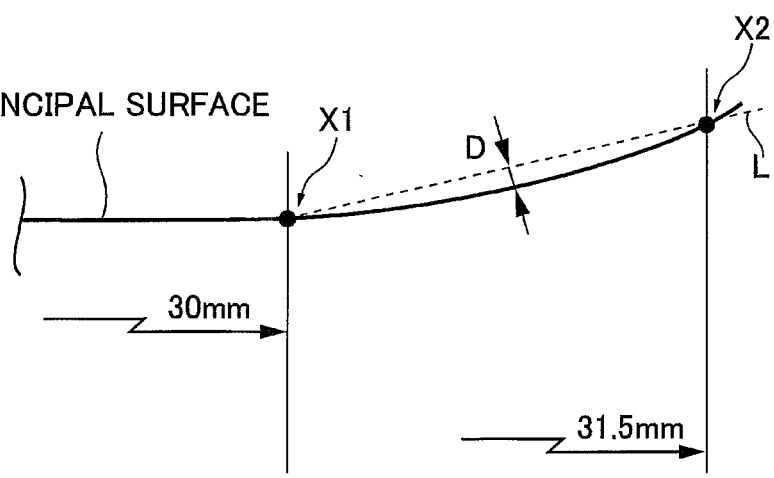
SKI-JUMP SHAPE
FIG.73

MANUFACTURING METHOD OF GLASS BLANK FOR MAGNETIC DISK, MANUFACTURING METHOD OF GLASS SUBSTRATE FOR MAGNETIC DISK, GLASS BLANK FOR MAGNETIC DISK, GLASS SUBSTRATE FOR MAGNETIC DISK, AND MAGNETIC DISK

CROSS-REFERENCE TO RELATED APPLICATIONS

This application claims priority to U.S. Provisional Application No. 61/635,486 filed on Apr. 19, 2012, and International Application No. PCT/JP2012/002766 filed on Apr. 20, 2012, the entirety of which is hereby incorporated by reference in its entirety.

BACKGROUND OF THE INVENTION

1. Field of the Invention

The present invention relates to a method for manufacturing a glass blank for magnetic disk, a method for manufacturing a glass substrate for magnetic disk, a glass blank for magnetic disk, a glass substrate for magnetic disk and a magnetic disk.

2. Description of the Related Art

Recently, a hard disk device (HDD) is incorporated in a personal computer or a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for magnetic disk because the glass substrate hardly plastically deformed as compared to a metallic substrate (aluminum substrate) and the like.

The magnetic head includes, for example, a magnetic resistance effect element, but such a magnetic head may cause a thermal asperity trouble as its specific trouble. The thermal asperity trouble is a trouble in which when a magnetic head passes over a micro-irregularly-shaped surface of a magnetic disk while floating and flying, a magnetic resistance effect element is heated by adiabatic compression or contact of air, causing a read error. Thus, for avoiding the thermal asperity trouble, the glass substrate for magnetic disk is prepared such that surface properties, such as the surface roughness and flatness, of the principal face of the glass substrate are at a satisfactory level.

As a conventional method for manufacturing a sheet glass (glass blank), a vertical direct press method is known. This press method is a method in which a lump of molten glass is fed onto a lower die, and the lump of molten glass (molten glass lump) is press-formed using an upper die (Japanese Patent Laid-open Publication No. 1999-255521) Furthermore, there is known a horizontal direct press method for sandwiching a falling molten glass in the horizontal direction to press-form the same (Japanese Patent Publication No. 4380379, FIG. 4 etc).

As a conventional method for manufacturing a glass substrate for magnetic disk, a method is known in which a glass blank formed by press-forming a molten glass lump is subjected to annealing treatment. The annealing treatment is a treatment for releasing a strain (internal strain) generated within a glass blank by holding the press-formed glass blank for a predetermined time period at a temperature which is no lower than a strain point and no higher than a glass transition point (Tg) (Japanese Patent Laid-open Publication No. 2008-287779). The strain point is a temperature at which the internal strain of glass disappears in several hours, and at which the viscosity of glass is about $10^{14.5}$ dPa·s.

SUMMARY OF THE INVENTION

However, the known vertical direct press method has the problem that the surface waviness of a glass blank prepared is bad. The reason for this is as follows.

In the vertical direct press method, when press forming of a molten glass lump is started, an upper die and a lower die come into contact with each other, so that the molten glass lump is cooled to be solidified. At this time, heat of the molten glass lump is easily confined at the central portion of the press forming surface of each of the upper die and the lower die due to the existence of the molten glass around the central portion. On the other hand, heat of the molten glass lump is easily diffused at the circumferential edge portion of the press forming surface of each of the upper die and the lower die for the reason that an area of the press forming surface which comes into contact with the molten glass is relatively large compared to the central portion thereof, and for the reason that some outer edge portions of dies do not come into contact with the molten glass when the outer shape of the molten glass is not restricted, and therefore a difference in temperature in the press forming surface is increased during press forming. Accordingly, an uneven heat deformation (thermal expansion) is generated in the press forming surface during press forming so that the glass blank prepared has an increase in surface waviness of the principal face as the heat deformation of the press forming surface is shape-transferred. Therefore, the surface waviness of the glass blank is deteriorated. The known horizontal direct press method has also similar problems described above.

For performing annealing treatment efficiently, a large-scale annealing treatment apparatus is required. Further, when the annealing treatment is performed, a state in which the temperature of a glass blank is set at around a strain point should be maintained for about 15 minutes. A treatment time of about 3 to 12 hours is required including treatment for elevating the temperature to the strain point and treatment for slow cooling from the strain point. Accordingly, when a glass substrate for magnetic disk is manufactured by performing the annealing treatment, large-scale equipment and much time are required, so that manufacture costs of the glass substrate for magnetic disk are increased. Therefore, it is preferred that the annealing treatment is not performed wherever possible.

When a glass blank with an internal strain generated during press forming is subjected to the annealing treatment, the internal strain of the glass blank is released, but the glass blank is deformed as the internal strain is released, so that the flatness of the glass blank is deteriorated. For example, when a glass blank is press-formed so that the flatness is 4 μm or less is subjected to annealing treatment, the flatness of the glass blank after annealing treatment may be larger than 4 μm if the internal strain remains in the glass blank during press forming. In this case, it is required to perform a grinding process to ensure that the flatness of the glass blank is 4 μm or less.

In heat assisted magnetic recording (HAMR) for which studies have been conducted in recent years as a magnetic recording technique for increasing storage density of the magnetic disk, a magnetic layer composed of a ferromagnetic alloy having a L10 ordered structure is formed on the principal face of a glass substrate. Here, for forming the L10 ordered structure, film forming treatment under a high-temperature environment and/or annealing treatment after the film forming treatment are required. The temperature at this time may be a high temperature close to the strain point of glass. At this time, if the internal strain remains in the glass blank as a base of the glass substrate, the internal strain of the glass substrate is released under a high-temperature environment, but the flatness of the glass substrate is deteriorated as in the case of the annealing treatment described above, so that substrate performance cannot meet requirements in some cases.

Therefore, the glass substrate for magnetic disk, which is used in heat assisted magnetic recording, is preferably one that is manufactured based on a glass blank in which the internal strain is small or does not remain.

The first object of the present invention is to provide a method for manufacturing a glass blank for magnetic disk, which is capable of producing a glass blank for magnetic disk having a good surface waviness by press forming, and a method for manufacturing a glass substrate for magnetic disk.

The second object of the present invention is to provide a method for manufacturing a glass blank for magnetic disk and a method for manufacturing a glass substrate for magnetic disk, which are capable of reducing an internal strain without performing annealing treatment, and a glass blank for magnetic disk, a glass substrate for magnetic disk and a magnetic disk.

From the viewpoint described above, the first viewpoint of the present invention is a method for manufacturing a glass blank for magnetic disk, which includes a forming process of press-forming a lump of molten glass using a pair of dies to obtain a sheet glass material, wherein in the forming process, a difference in temperature in a press forming surface of the die is controlled (adjusted) so that the surface waviness of the sheet glass material is equal to 30 nm or less.

The second viewpoint of the present invention is a method for manufacturing a glass blank for magnetic disk, which includes a forming process of press-forming a lump of molten glass using a pair of dies to form a sheet glass material, wherein in the forming process, press forming is performed using thermally equalizing means for reducing a difference in temperature in the press forming surface of the die during pressing of the molten glass.

"Difference in temperature in the press forming surface" means a difference in temperature between a central portion and circumferential edge portion of a die, for example.

In the method for manufacturing a glass blank for magnetic disk, preferably the thermally equalizing means may reduce a difference in temperature in the press forming surface by heat-exhausting and/or heating the press forming surface.

In the method for manufacturing a glass blank for magnetic disk, the thermally equalizing means may be a heat sink.

In the method for manufacturing a glass blank for magnetic disk, the heat sink may be provided on at least a part of the surface opposite to the press forming surface.

In the method for manufacturing a glass blank for magnetic disk, the heat sink may be provided so that amount of heat exhausted from a central portion of the molten glass is larger than that from the circumferential edge portion of the molten glass during the press forming.

In the method for manufacturing a glass blank for magnetic disk, in the forming process, the falling lump of molten glass may be press-formed using the pair of dies from a direction orthogonal to the falling direction.

In the method for manufacturing a glass blank for magnetic disk, in the forming process, press forming may be performed so that the temperature of the press forming surface of the pair of dies is substantially the same.

In the method for manufacturing a glass blank for magnetic disk, the thermal expansion coefficient at 100° C. to 300° C. of a glass blank obtained after press forming may be in a range of 30 to $100 \times 10^{-7} (K^{-1})$.

In the method for manufacturing a glass blank for magnetic disk, surface roughness of the press forming surface of the die is substantially uniform throughout the surface.

The third viewpoint of the present invention may be a method for manufacturing a glass substrate for magnetic disk, wherein a glass blank for magnetic disk may be subjected to polishing processing having machining allowance of 50 μm or less to manufacture a glass substrate for magnetic disk, the glass blank being manufactured with the above-described method for manufacturing a glass blank for magnetic disk.

The fourth viewpoint of the present invention is a method for manufacturing a glass substrate for magnetic disk, wherein a glass substrate for magnetic disk may be manufactured using a glass blank for magnetic disk, which is obtained by the above-described method for manufacturing a glass blank for magnetic disk.

With reference to the second object of the present invention, the present inventors have intensively conducted studies, and resultantly devised a novel press forming method. That is, in a method for manufacturing a glass blank according to this embodiment, a horizontal direct press method is employed in which a falling molten glass lump is press-formed using a pair of dies (press forming dies) arranged so as to face each other in a direction (horizontal direction) orthogonal to the falling direction of the molten glass lump. In the horizontal direct press method, unlike the conventional vertical direct press method, the molten glass lump is not temporarily retained in contact with a member having a temperature lower than that of the molten glass lump in the period during which it is press-formed. Thus, at the time point immediately before press forming is started, the viscosity distribution of the interior of the molten glass lump becomes very wide during press forming in the vertical direct press method. In short, in the conventional vertical direct press method, there is a difference between a period during which an upper die contacts a lump of molten glass and a period during which a lower die contacts a lump of molten glass, since the upper die goes downwardly to press the molten glass lump after the molten glass lump contacts the lower die. As a result, the lower part of the molten glass lump which contacts the lower die in advance is cooled and becomes high in viscosity. On the other hand, at the time of pressing, the upper part of the molten glass lump is not cooled, and therefore the viscosity of the upper part is low. Consequently, it is difficult to uniformly thinly draw the molten glass lump. Furthermore, due to the same reason described above, a difference in temperature occurs between the upper and lower dies when pressing, and the flatness of a glass blank obtained after pressing is then deteriorated. In contrast, in the horizontal direct press method, there is no difference or extremely small difference between time when a right die contacts a lump of molten glass and time when left die contacts the lump of molten glass, and the molten glass lump is pressed with its viscosity being uniform. Accordingly, in the horizontal direct press method, it is extremely easy to uniformly thinly draw the molten glass lump to be press-formed as compared to the vertical direct press method. Consequently, as compared to the case where a glass blank is prepared using the vertical direct press method, it is extremely easy to drastically suppress deterioration of the flatness when a glass blank is prepared using the horizontal direct press method.

In addition, the present inventors have arrived at the following findings.

As described above, the flatness of a glass blank prepared is improved by using a horizontal direct press method using a pair of dies. Here, even when the horizontal direct press method is used, heat of a molten glass lump is easily confined in a central portion of the press forming surface of a die during press forming, so that molten glass present at the central portion is hardly cooled. On the other hand, heat of the molten glass lump is easily diffused at a circumferential edge portion of the press forming surface of the die during press forming, so that the molten glass present at the circumferential edge portion is easily cooled. That is, it is presumed that the molten glass is solidified along a direction from the circumferential edge portion to the central portion of the press forming surface. In this way, an internal strain (in-plane strain) by a residual stress extending in the direction from the circumferential edge portion to the central portion of the press forming surface is generated in the press-formed glass blank. If in-plane strain is generated, the flatness may be deteriorated because the strain is released when a heating treatment is performed until temperature of the glass blank rises to a glass transition point (Tg) or nearly a strain point in the post-process.

The present inventors have found that when cooling rate of the molten glass is controlled so that a difference in temperature on a surface of a molten glass (e.g. between the circumferential edge portion and the central portion of the surface of the molten glass) during press forming is reduced, the area on the surface of the molten glass can be solidified almost at the same time without causing an internal strain.

The fifth viewpoint of the present invention may be a method for manufacturing a glass blank for magnetic disk, which includes a forming process of press-forming a lump of molten glass using a pair of dies to obtain a sheet glass material, wherein in the forming process, press forming is performed while temperature of the molten glass is controlled so that cooling rate of the molten glass is −10° C./second or less during the period of time in the molten glass is cooled from a glass transition point (Tg) to a strain point.

It is noted that when temperature reduction is 10° C. per second, for example, it is referred to as "−10° C./second". In addition, "cooling rate is −10° C./second or less" means that temperature reduction is lower than 10° C. per second.

The sixth viewpoint of the present invention may be a method for manufacturing a glass blank for magnetic disk, which includes a forming process of press-forming a lump of molten glass using a pair of dies to obtain a sheet glass material, wherein in the forming process, press forming is performed while cooling rate of the molten glass is controlled during the period of time in the molten glass is cooled from a glass transition point to a strain point so as to reduce in-plane strain generated when the molten glass lump is solidified into a sheet glass blank.

The seventh viewpoint of the present invention may be a method for manufacturing a glass blank for magnetic disk, which includes a forming process of press-forming a lump of molten glass using a pair of dies to obtain a sheet glass blank, wherein in the forming process, press forming is performed while cooling rate of the molten glass is controlled so that a difference in temperature on a surface of the molten glass during pressing of the molten glass is reduced.

In the method for manufacturing a glass blank for magnetic disk, preferably press forming may be performed while the cooling rate of the molten glass is controlled so that a difference in temperature on a surface of the molten glass is reduced during the period of time in which the pair of dies close and separate.

In the method for manufacturing a glass blank for magnetic disk, in the forming process, press forming may be performed while the cooling rate of the molten glass is controlled so that a difference in temperature on a surface of the molten glass is reduced during the period of time in which the temperature of the molten glass moves from a glass transition point (Tg) to a strain point during the pressing of the molten glass.

In the method for manufacturing a glass blank for magnetic disk, in the forming process, the falling lump of molten glass may be press-formed using the pair of dies from a direction orthogonal to the falling direction.

In the method for manufacturing a glass blank for magnetic disk, in the forming process, press forming may be performed while temperature of a press forming surface of the die during pressing of the molten glass is kept substantially uniform.

In the method for manufacturing a glass blank for magnetic disk, in the forming process, press forming may be performed so that temperature of a press forming surface of the pair of dies is substantially identical.

In the method for manufacturing a glass blank for magnetic disk, the temperature of the pair of dies is kept lower than the glass transition point (Tg) of the molten glass during the period of time in which the glass blank is separated from the die after contacting the die.

In the method for manufacturing a glass blank for magnetic disk, the forming process may be performed using a molten glass having a glass transition point (Tg) of 600° C. or higher.

The eighth viewpoint of the present invention may be a method for manufacturing a glass blank for magnetic disk, which includes a forming process of press-forming a lump of molten glass using a pair of dies to obtain a sheet glass material, wherein in the forming process, press forming is performed while temperature of the molten glass is controlled so that surface waviness of the sheet glass material is 30 nm or less and the cooling rate is −10° C./second or less during the period of time in which the temperature of the molten glass is cooled from a glass transition point to a strain point The ninth viewpoint of the present invention may be a method for manufacturing a glass substrate for magnetic disk, wherein a glass substrate for magnetic disk may be manufactured without performing annealing treatment using a glass blank for magnetic disk, the glass blank being obtained with the above-described method for manufacturing a glass blank for magnetic disk.

The tenth viewpoint of the present invention may be a glass substrate for magnetic disk, which is obtained with the above-described method for manufacturing a glass substrate for magnetic disk, wherein the glass transition point (Tg) is 600° C. or higher.

The eleventh viewpoint of the present invention may be a magnetic disk, which is manufactured using the glass substrate for magnetic disk which is obtained with the above-described method for manufacturing a glass substrate for magnetic disk.

BRIEF DESCRIPTION OF THE DRAWINGS

FIG. 27 is a view illustrating a method for supplying a gas to a space formed by closing of the die in press forming of the embodiment.

FIG. 73 is a view for conceptually explaining a method for calculating a dub-off value of the shape of the end portion of the glass substrate.

DESCRIPTION OF THE PREFERRED EMBODIMENTS

First Embodiment

A method for manufacturing a glass blank for magnetic disk and a method for manufacturing a glass substrate for magnetic disk according to this embodiment will be described in detail below.

[Glass Substrate for Magnetic Disk]

Figure 1:
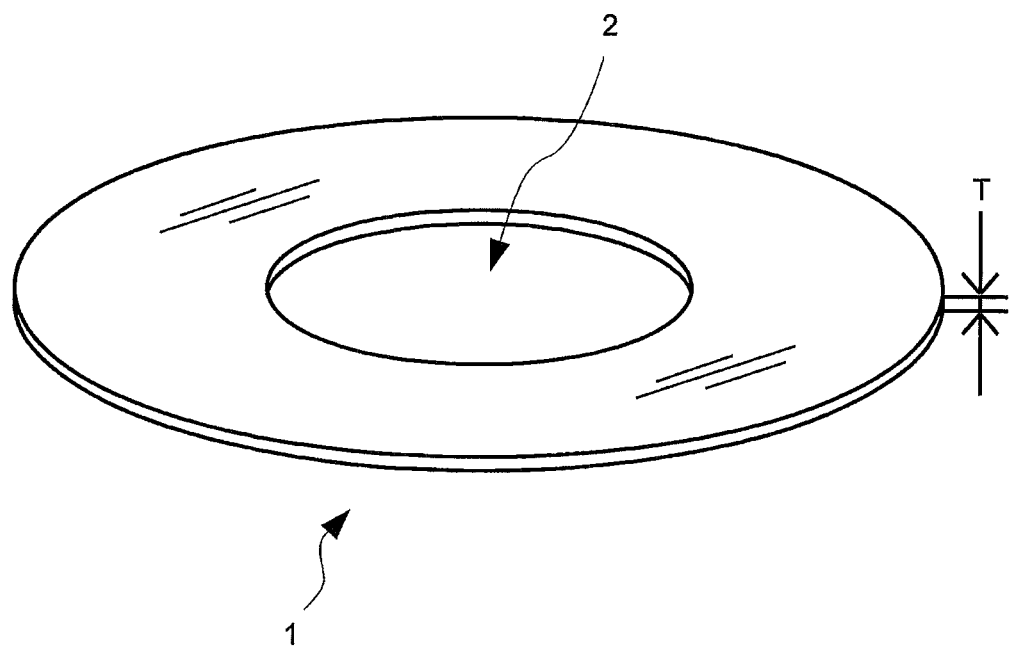
FIG. 1 is a perspective view illustrating an external shape of a glass substrate for magnetic disk of an embodiment.

As illustrated in FIG. 1, a glass substrate for magnetic disk 1 in this embodiment is a donut-shaped thin glass substrate. The size of the glass substrate for magnetic disk is not limited but for example, a glass substrate for magnetic disk having a nominal diameter of 2.5 inches is suitable. In the case of the glass substrate for magnetic disk having a nominal diameter of 2.5 inches, for example, the outer diameter is 65 mm, the diameter of a central hole 2 is 20 mm, and the thickness T is 0.6 to 1.0 mm. The flatness of the principal face of the glass substrate for magnetic disk of the embodiment is, for example, 4 μm or less, and the surface roughness (arithmetic mean roughness Ra) of the principal face is, for example, 0.2 nm or less. It is to be noted that the flatness required for a substrate for magnetic disk as a final product is, for example, 4 μm or less.

Aluminosilicate glass, soda-lime glass, borosilicate glass or the like can be used as a material of the glass substrate for magnetic disk in this embodiment. Particularly, the amorphous aluminosilicate glass can be suitably used in that chemically strengthening can be performed, and a glass substrate for magnetic disk excellent in flatness of the principal face and strength of the substrate can be prepared.

The composition of the glass substrate for magnetic disk of this embodiment is not limited, but the glass substrate of this embodiment is preferably made of amorphous aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol %.

In order to decrease in-plane strain in pressing, a glass transition point (Tg) of glass is preferably 600° C. or higher, more preferably 650° C. or higher. This is because a period of time changing from molten state to solid state (around the glass transition point Tg) is shorter and the cooling rate tends to be higher as the glass transition point (Tg) becomes higher, and "difference in temperature on a surface of a die" affects the glass largely. Thus, the manufacturing method of the present embodiment is particularly preferred when such the glass is used.

Furthermore, in the glass substrate in the present embodiment, the thermal expansion coefficient of glass is preferably $50\times10^{-7}(K^{-1})$ or more, more preferably $80\times10^{-7}(K^{-1})$ or more. The glass is easily deformed and warp of the glass tends to occur due to the temperature change as the thermal expansion coefficient is higher. Therefore, the method in the present embodiment that reduces in-plane strain is preferably applied to a glass of high thermal expansion coefficient rather than low thermal expansion coefficient.

In the present embodiment (as well as the first embodiment), press forming can be performed to any glass having a wide range of viscosity since horizontal pressing is applied, and glass having high viscosity is particularly preferable. This is because the glass is pressed in the middle of falling down in vertical direction, and circularity of the glass having relatively high viscosity becomes better. Specifically, the viscosity may be preferably 500 poises or more. Glass having the viscosity of 2000 poises or more is not preferable for the reason that the glass becomes difficult to be thinned.

[Method for Manufacturing Glass Substrate for Magnetic Disk of Embodiment]

Figure 2:
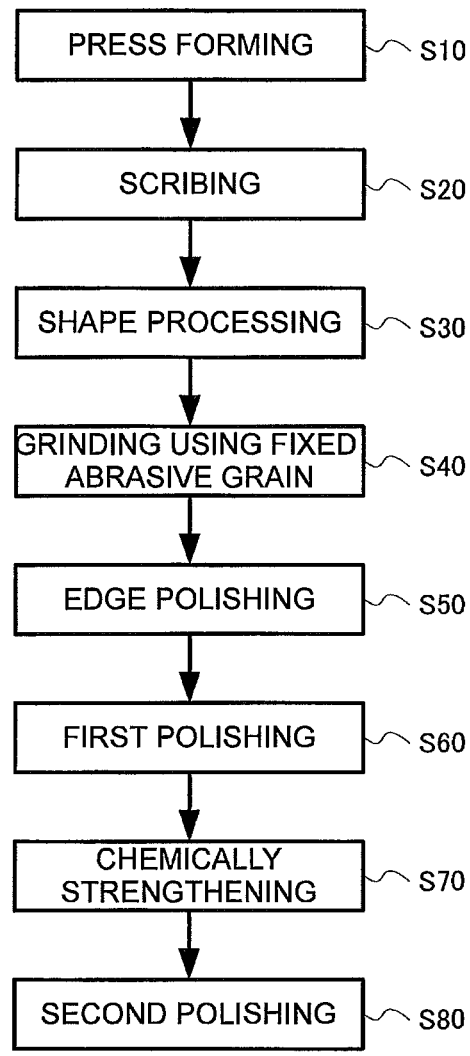
FIG. 2 is a view illustrating a flow of one embodiment of a method for manufacturing the glass substrate for magnetic disk of the embodiment.

Next, a flow of a method for manufacturing a glass substrate for magnetic disk will be described with reference to FIG. 2. FIG. 2 is a view illustrating a flow of one embodiment of a method for manufacturing a glass substrate for magnetic disk.

As illustrated in FIG. 2, in the method for manufacturing a glass substrate for magnetic disk in this embodiment, first a disk-shaped glass blank is prepared by press forming (Step S10). Next, the formed glass blank is scribed to prepare a donut-shaped glass substrate (Step S20). Next, the scribed glass substrate is subjected to shape processing (chamfering processing) (Step S30). Next, the glass substrate is subjected to grinding using a fixed abrasive grain (Step S40). Next, edge polishing of the glass substrate is performed (Step S50). Next, the principal face of the glass substrate is subjected to first polishing (Step S60). Next, the glass substrate, after first polishing, is subjected to chemically strengthening (Step S70). Next, the chemically strengthened glass substrate is subjected to second polishing (Step S80). The glass substrate for magnetic disk is obtained through the above processes.

Each process will be described in detail below.

(a) Press Forming Process (Step S10)

Figure 3:
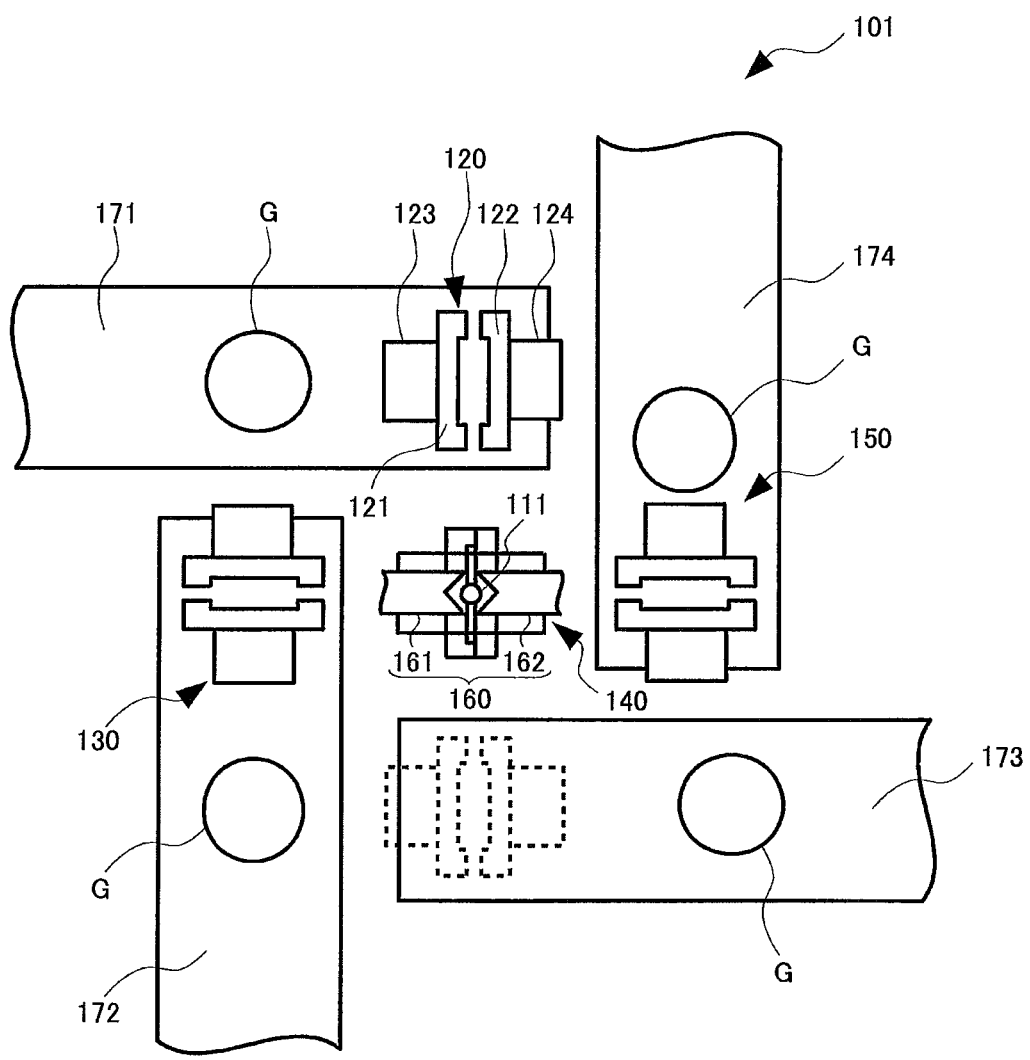
FIG. 3 is a plan view of an apparatus used in press forming of the embodiment.

First, the press forming process will be described with reference to FIG. 3. FIG. 3 is a plan view of an apparatus used in press forming. As illustrated in FIG. 3, an apparatus 101 includes four sets of press units 120, 130, 140 and 150, a cutting unit 160 and a cutting blade 165 (not illustrated in FIG. 2). The cutting unit 160 is provided on a path of a molten glass that flows out from a molten glass outflow port 111. In the apparatus 101, a lump of molten glass (hereinafter, also referred to as a gob) cut by the cutting unit 160 is caused to fall down, and the lump is pressed from both sides of the falling path of the lump while the lump is sandwiched between surfaces of a pair of dies facing each other, thereby forming the glass blank.

Figure 4:
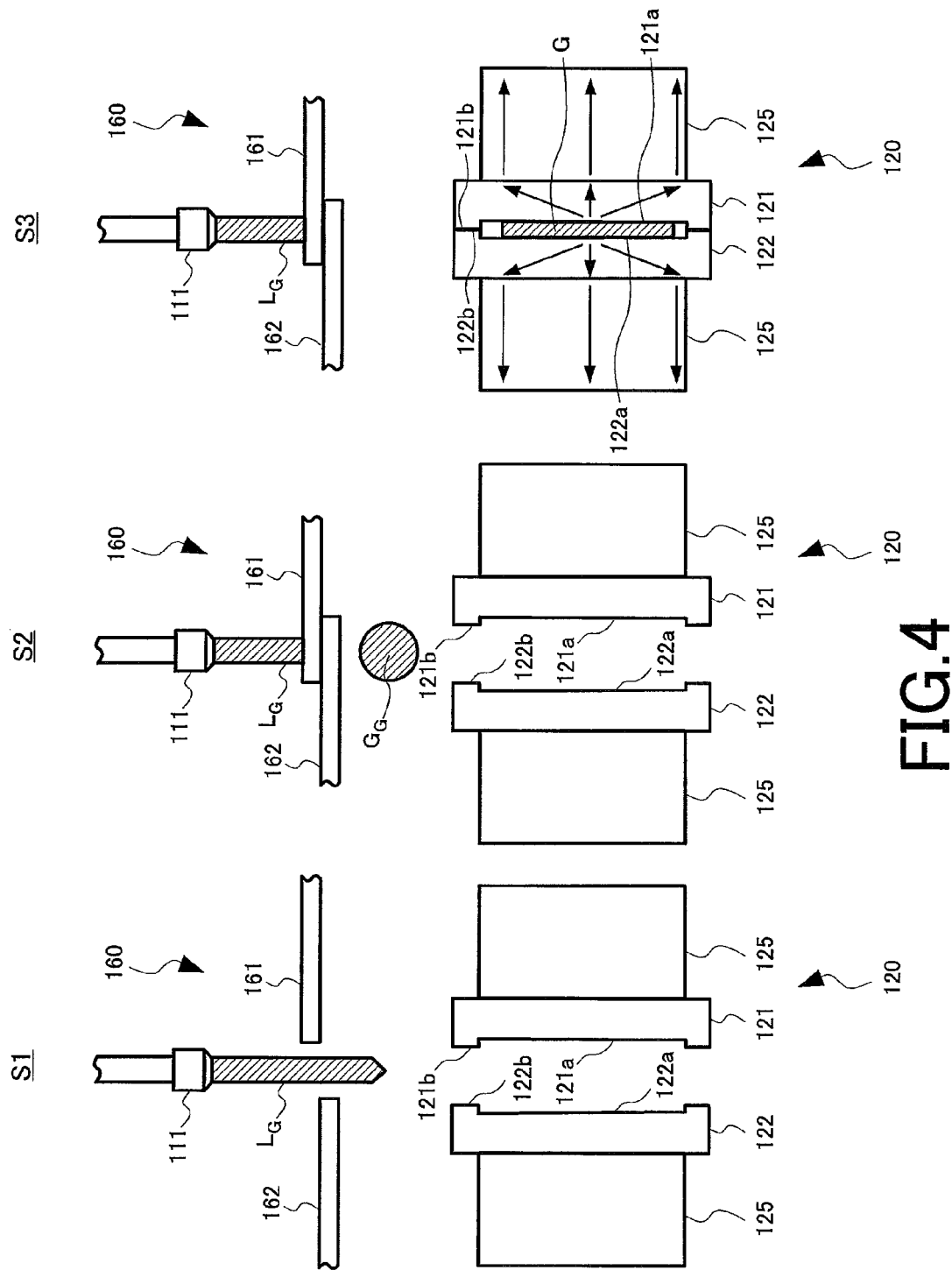
FIG. 4 is a view illustrating an example of press forming of the embodiment.

Specifically, as illustrated in FIG. 4, in the apparatus 101, the four sets of press units 120, 130, 140, and 150 are provided at intervals of 90 degrees around the molten glass outflow port 111.

Each of the press units 120, 130, 140, and 150 is driven by a moving mechanism (not illustrated) so as to be able to proceed and retreat with respect to the molten glass outflow port 111. That is, each of the press units 120, 130, 140, and 150 can be moved between a catch position and a retreat position. The catch position (position in which the press unit 140 is drawn by a solid line in FIG. 3) is located immediately below the molten glass outflow port 111. The retreat position (positions in which the press units 120, 130, and 150 are drawn by solid lines and a position in which the press unit 140 is drawn by a broken line in FIG. 3) is located away from the molten glass outflow port 111.

The cutting unit 160 is provided on a path of the molten glass between the catch position (position in which the gob is captured by the press unit) and the molten glass outflow port 111. The cutting unit 160 forms the lump of molten glass by cutting a proper quantity of the molten glass flowing out from the molten glass outflow port 111. The cutting unit 160 includes a pair of cutting blades 161 and 162. The cutting blades 161 and 162 are driven so as to intersect each other on the path of the molten glass at constant timing. When the cutting blades 161 and 162 intersect each other, the molten glass is cut to obtain the gob. The obtained gob falls down toward the catch position.

The press unit 120 includes a first die 121, a second die 122, a first driving unit 123, a second driving unit 124 and a thermally equalizing unit 125. Each of the first die 121 and the second die 122 is a plate-shaped member including a surface (press forming surface) used to perform the press forming for the gob. The press forming surface may be a disk shape, for example. The first die 121 and the second die 122 are disposed such that normal directions of the surfaces become substantially horizontal, and such that the surfaces become parallel to each other. The first die 121 and the second die 122 are only required to have a press forming surface, and the shapes of the first and second dies 121, 122 are not limited to the plate shape. The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other, for example, a mechanism in which an air cylinder or a solenoid and a coil spring are combined.

The thermally equalizing unit 125 reduces a difference in temperature within the press forming surface by making heat transfer easy in the press forming surface of each of first and second dies 121 and 122 during press forming of the gob. The thermally equalizing unit 125 is a heat sink, for example, which is one example of thermally equalizing means. The thermally equalizing unit 125 is provided so as to contact entire surfaces opposite to the press forming surfaces of first and second dies 121 and 122. Preferably the thermally equalizing unit 125 is formed with material having heat conductivity higher than that of each of first and second dies 121 and 122. For example, when first and second dies 121 and 122 are formed of an ultrahard alloy (e.g. VM40), the thermally equalizing unit 125 may be formed of copper, a copper alloy, aluminum, an aluminum alloy or the like. Since the thermally equalizing unit 125 has a heat conductivity higher than that of each of first and second dies 121 and 122, heat from first and second dies 121 and 122 can be efficiently discharged to outside. The heat conductivity of the ultrahard alloy (VM40) is 71 (W/m·K), and the heat conductivity of copper is 400 (W/m·K). The member that forms the temperature controlling unit 125 may be appropriately selected according to the heat conductivity, hardness, thickness and dimension, etc. of the metal forming first and second dies 121 and 122. First and second dies 121 and 122 are required to have strength capable of sustaining press, and therefore preferably they are not integrated with the thermally equalizing unit 125.

A heat exhausting mechanism including, for example, a path of a liquid, a gas or the like having a cooling effect, or a heating mechanism such as a heater may be configured as thermally equalizing means for reducing a difference in temperature of the inner circumferential surface of the die (the inner circumferential surface of the cylindrical die).

Because the structures of the press units 130, 140, and 150 are similar to that of the press unit 120, the descriptions of the press units 130, 140, and 150 are omitted.

After each press unit moves to the catch position, the falling gob is sandwiched between the first die and the second die by driving the first driving unit and the second driving unit, and the gob is formed into a predetermined thickness while rapidly cooled, thereby preparing a circular glass blank G. The load (pressing pressure) is preferably set 2000-3000 kgf. With the load in the range above, short time pressing becomes possible with sufficient acceleration, and therefore glass having suitable thickness for a glass blank for a magnetic disk can be formed regardless of the composition of glass material. Next, after the press unit moves to the retreat position, the first die and the second die are separated to cause the formed glass blank G to fall down. A first conveyer 171, a second conveyer 172, a third conveyer 173, and a fourth conveyer 174 are provided below the retreat positions of the press units 120, 130, 140, and 150, respectively. Each of the first to fourth conveyers 171 to 174 receive the glass blank G falling down from the corresponding press unit, and the conveyer conveys the glass blank G to an apparatus (not illustrated) of the next process.

The apparatus 101 is configured such that the press units 120, 130, 140, and 150 sequentially move to the catch position and move to the retreat position while the gob is sandwiched, so that the glass blank G can continuously be formed without waiting for the cooling of the glass blank G in each press unit.

S1 to S3 of FIG. 4 more specifically illustrates press forming performed by the apparatus 101. S1 of FIG. 4 is a view illustrating the state before the gob is made, S2 of FIG. 4 is a view illustrating the state in which the gob is made by the cutting unit 160, and S3 of FIG. 4 is a view illustrating the state in which the glass blank G is formed by pressing the gob.

As illustrated in S1 of FIG. 4, a molten glass material $L_G$ continuously flows out from the molten glass outflow port 111. At this point, the cutting unit 160 is driven at predetermined timing to cut the molten glass material $L_G$ using the cutting blades 161 and 162 (S2 of FIG. 4). Therefore, the cut molten glass becomes a substantially spherical gob $G_G$ due to a surface tension thereof. Adjustment of the outflow quantity per time of the molten glass material $L_G$ and the driving interval of the cutting unit 160 may be appropriately performed according to a volume determined by the target size and thickness of the glass blank G.

The made gob $G_G$ falls down toward a gap between the first die 121 and second die 122 of the press unit 120. At this point, the first driving unit 123 and the second driving unit 124 (see FIG. 4) are driven such that the first die 121 and the second die 122 come close to each other at the timing the gob $G_G$ enters the gap between the first die 121 and the second die 122. Therefore, as illustrated in S3 of FIG. 4, the gob $G_G$ is captured (caught) between the first die 121 and the second die 122. An inner circumferential surface 121a (press forming surface) of the first die 121 and an inner circumferential surface 122a (press forming surface) of the second die 122 come close to each other with a micro gap, and the gob $G_G$ sandwiched between the inner circumferential surface 121a of the first die 121 and the inner circumferential surface 122a of the second die 122 is formed into a thin-plate shape. A projection 121b and a projection 122b are provided in the first inner circumferential surface 121a of the first die 121 and the second inner circumferential surface 122a of the second die 122, respectively, in order to keep the gap between the inner circumferential surface 121a of the first die 121 and the inner circumferential surface 122a of the second die 122 constant. That is, the projection 121b and the projection 122b abut against each other, whereby the gap between the inner circumferential surface 121a of the first die 121 and the inner circumferential surface 122a of the second die 122 is kept constant, so that a plate-shaped space is generated. Here, as illustrated in S3 of FIG. 4, heat transferred to central portions of inner circumferential surfaces 121a and 122a from the gob $G_G$ is discharged to outside through the thermally equalizing unit 125 in accordance with a flow of heat illustrated by the arrow in the figure. Press forming is performed using a pair of dies 121 and 122 in the press forming process in press forming in this embodiment, and the outer shape of the glass blank is not restricted by the shape of the die. That is, as illustrated in S3 of FIG. 4, the gob stretched by closed dies does not reach projections 121b and 122b.

A temperature control mechanism (not illustrated) is provided in each of the first die 121 and second die 122, and temperatures at the first die 121 and second die 122 is retained sufficiently lower than the glass transition point Tg of the molten glass $L_G$. The temperature control mechanism may be configured as thermally equalizing means.

It is not necessary to attach a mold release material to the first die 121 and the second die 122 in the press forming process.

The surface waviness of the glass blank obtained after press forming becomes better as a difference in temperature between the central portion and the circumferential edge portion of each of the inner circumferential surface 121a of the first die 121 and the inner circumferential surface 122a of the second die 122 (difference in temperature in the press forming surface) at the time of press-forming the gob $G_G$ decreases. Particularly, it is preferable to decrease the difference in temperature by efficiently discharging heat from the gob $G_G$, which is easily confined in the central portion of each of inner circumferential surfaces 121a and 122a, to outside. This is because when a difference in temperature of each of the interior of the inner circumferential surface 121a of the first die 121 and the interior of the inner circumferential surface 122a of the second die 122 at the time of press forming is decreased, there is no difference in deformation degree of inner circumferential surfaces 121a and 122a between the central portion and the circumferential edge portion in inner circumferential surfaces 121a and 122a, and therefore generation of an uneven heat deformation in inner circumferential surfaces 121a and 122a can be prevented, so that a glass blank having a good surface waviness can be prepared.

Thus, by reducing a difference in temperature within each of inner circumferential surfaces 121a and 122a during pressing of the glass blank using the thermally equalizing unit 125, a surface waviness required for the glass substrate for magnetic disk can be achieved. For example, when the surface waviness required for the glass substrate for magnetic disk is 10 nm, it is preferable to perform press forming while a difference in temperature between the central portion and the circumferential edge portion of each of inner circumferential surfaces 121a and 122a is kept at 1° C. or less. The glass blank prepared has the best surface waviness when a difference in temperature between the central portion and the circumferential edge portion is 0° C., but the difference in temperature may be appropriately determined according to the surface waviness required for the glass substrate for magnetic disk.

The difference in temperature of the interior of the inner circumferential surface is a difference in temperature which is the largest of differences in temperature between the central portion and each circumferential edge portion as measured using a thermocouple at a point which is located 1 mm from the front face of inner circumferential surface of the die to the inside of the die and corresponds to each of the central portion and a plurality of circumferential edge portions of the inner circumferential surface (e.g. a point corresponding to the central position of a glass blank having a diameter of 75 mm and upper and lower and left and right four positions on the circumference of a circle centered on the aforementioned point and having a radius of about 30 mm). The temperature is measured at the timing of releasing of the first die 121 and the second die 122 after press forming.

A difference in temperature between a pair of dies can be determined from the following viewpoint according to a flatness required for the glass substrate for magnetic disk.

Since glass substrate for magnetic disk of this embodiment is incorporated while being pivotally supported by a metallic spindle having a high thermal expansion coefficient within a hard disk as a magnetic disk that is a final product, the thermal expansion coefficient of the glass substrate for magnetic disk is preferably as high as that of the spindle. Therefore, the composition of the glass substrate for magnetic disk is defined so that the glass substrate for magnetic disk has a high thermal coefficient. The thermal expansion coefficient of the glass substrate for magnetic disk is, for example, in a range of 30 to $100 \times 10^{-7} (K^{-1})$, preferably in a range of 50 to $100 \times 10^{-7} (K^{-1})$. The thermal expansion coefficient is a value calculated using the linear expansion coefficients of the glass substrate for magnetic disk at temperatures of 100° C. and 300° C. A thermal expansion coefficient of, for example, less than $30 \times 10^{-7} (K^{-1})$ or more than $100 \times 10^{-7}$ is not preferable because a difference in thermal expansion coefficient between the glass substrate and the spindle is increased. From the point of view, temperature conditions at the circumference of the principal face of the glass blank are made uniform in the press forming process when a glass substrate for magnetic disk having a high thermal expansion coefficient is prepared. As one example, it is preferable to perform temperature control so that the temperatures of the inner circumferential surface 121a of the first die 121 and the inner circumferential surface 122a of the second die 122 become substantially identical. When temperature control is performed so that the temperatures become identical, for example, a difference in temperature is preferably 5° C. or less. The difference in temperature is more preferably 3° C. or less, especially preferably 1° C. or less.

The difference in temperature between dies is a difference in temperature as measured using a thermocouple at a point which is located 1 mm from each of the front faces of the inner circumferential surface 121$a$ of the first die 121 and the inner circumferential surface 122$a$ of the second die 122 to the inside of the die and at which the inner circumferential surface 121$a$ and the inner circumferential surface 122$a$ face each other (e.g. a point corresponding to the central position of the glass blank and central points of the inner circumferential surface 121$a$ and the inner circumferential surface 122$a$).

A time until the gob $G_G$ is completely confined between the first die 121 and the second die 122 after the gob $G_G$ comes into contact with the inner circumferential surface 121$a$ of the first die 121 or the inner circumferential surface 122$a$ of the second die 122, is as extremely short as 0.1 second or less (about 0.06 second) in the apparatus 101. Therefore, the gob $G_G$ is formed into the substantially disk shape by spreading along the inner circumferential surface 121$a$ of the first die 121 and the inner circumferential surface 122$a$ of the second die 122 within an extremely short time, and the gob $G_G$ is rapidly cooled and solidified in the form of amorphous glass. In this way, the glass blank G is prepared. The size of the glass blank G formed in this embodiment is, depending on the size of a desired glass substrate for magnetic disk, for example about 20 to 200 mm in diameter.

In the press forming method of this embodiment, the glass blank G is formed in a manner such that the inner circumferential surface 121$a$ of the first die 121 and the inner circumferential surface 122$a$ of the second die 122 are shape-transferred, and therefore preferably the flatness and the smoothness of each of the inner circumferential surfaces of a pair of dies are made comparable to those of a desired glass substrate for magnetic disk. In this case, necessity to subject the glass blank G to a surface processing process, i.e. a grinding and polishing process after press forming may be eliminated. That is, the glass blank G formed in the press forming method of this embodiment may have a thickness identical to the target thickness of the glass substrate for magnetic disk that is finally obtained. For example, the glass blank G is a disk-shaped sheet having a thickness of 0.2 to 1.1 mm. The surface roughness of each of the inner circumferential surface 121$a$ and the inner circumferential surface 122$a$ is substantially uniform throughout the surface, and preferably adjusted to 0.0005 to 0.05 μm so that the arithmetic mean roughness Ra of the glass blank G is 0.001 to 0.1 μm. The surface roughness of the glass blank G is uniform throughout the surface because surface properties of the inner circumferential surface 121$a$ and the inner circumferential surface 122$a$ are shape-transferred to the glass blank G.

If the surface roughness differs throughout the surface of the die, a place of changing the roughness may prevent glass from uniformly drawing in pressing, which causes a defect such as a linear scar.

After the first die 121 and the second die 122 are closed, the press unit 120 quickly moves to the retreat position, instead the press unit 130 moves to the catch position, and the press unit 130 performs the pressing to the gob $G_G$.

After the press unit 120 moves to the retreat position, the first die 121 and the second die 122 are kept closed until the glass blank G is sufficiently cooled (at least until the glass blank G has a temperature below a yield point). Then, the first driving unit 123 and the second driving unit 124 are driven to separate the first die 121 and the second die 122, the glass blank G falls down from the press unit 120, and the conveyer 171 located below the press unit 120 receives the glass blank G (see FIG. 3).

In the example illustrated in FIG. 4, the substantially spherical gob $G_G$ is formed by cutting the flowing-out molten glass $L_G$ using the cutting blades 161 and 162. However, when viscosity of the molten glass material $L_G$ is small with respect to a volume of the gob $G_G$ to be cut, the glass does not become the substantially spherical shape only by cutting the molten glass $L_G$, and the gob is not formed. In such cases, a gob forming die is used to form the gob.

Figure 53:
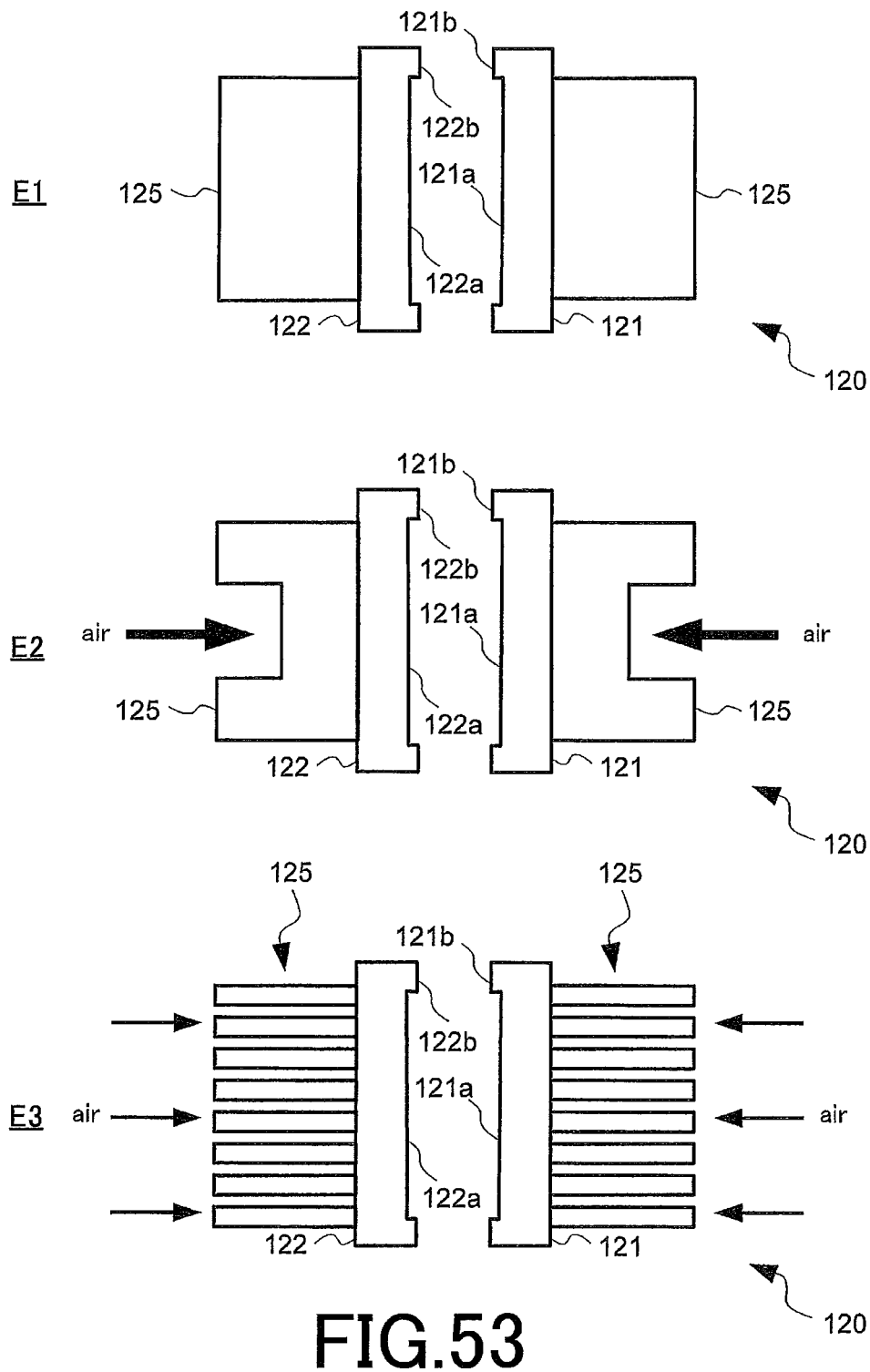
FIG. 53 is a view illustrating an example of a heat exhausting unit used in press forming of the embodiment.

S1 to S3 of FIG. 53 are views illustrating a modification of the embodiment of FIG. 4. The gob forming die is used in the modification. S1 of FIG. 5 is a view illustrating the state before the gob is made, S2 of FIG. 5 is a view illustrating the state in which the gob $G_G$ is made by the cutting unit 160 and a gob forming die 180, and S3 of FIG. 5 is a view illustrating the state in which the press forming is performed to the gob $G_G$ to make the glass blank G.

Figure 5:
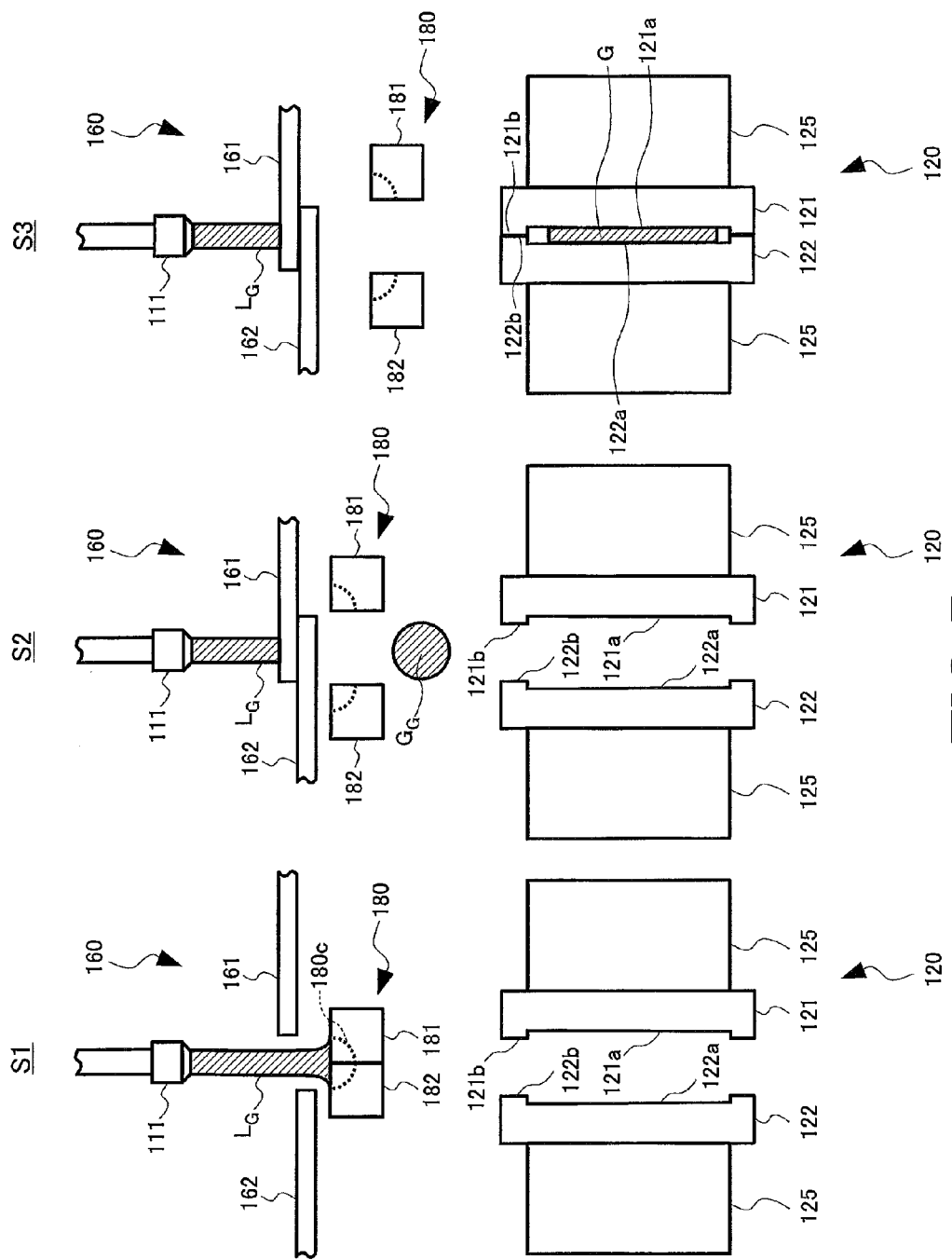
FIG. 5 is a view illustrating a modification of press forming of the embodiment using a gob forming die.

As illustrated in S1 of FIG. 5, the path of the molten glass $L_G$ to the press unit 120 is closed by closing the blocks 181 and 182, and the lump of the molten glass $L_G$ cut with the cutting unit 160 is received by a recess 180C formed by the block 181 and 182. Then, as illustrated in S2 of FIG. 5, the molten glass $L_G$ that becomes the spherical shape in the recess 180C falls down toward the press unit 120 at one time by opening the blocks 181 and 182. When falling down toward the press unit 120, the gob $G_G$ becomes the spherical shape by the surface tension of the molten glass $L_G$. As illustrated in S3 of FIG. 5, during the fall of the gob $G_G$, the spherical gob $G_G$ is sandwiched between the first die 121 and the second die 122 to perform the press forming, thereby preparing the disk-shaped glass blank G.

Figure 6:
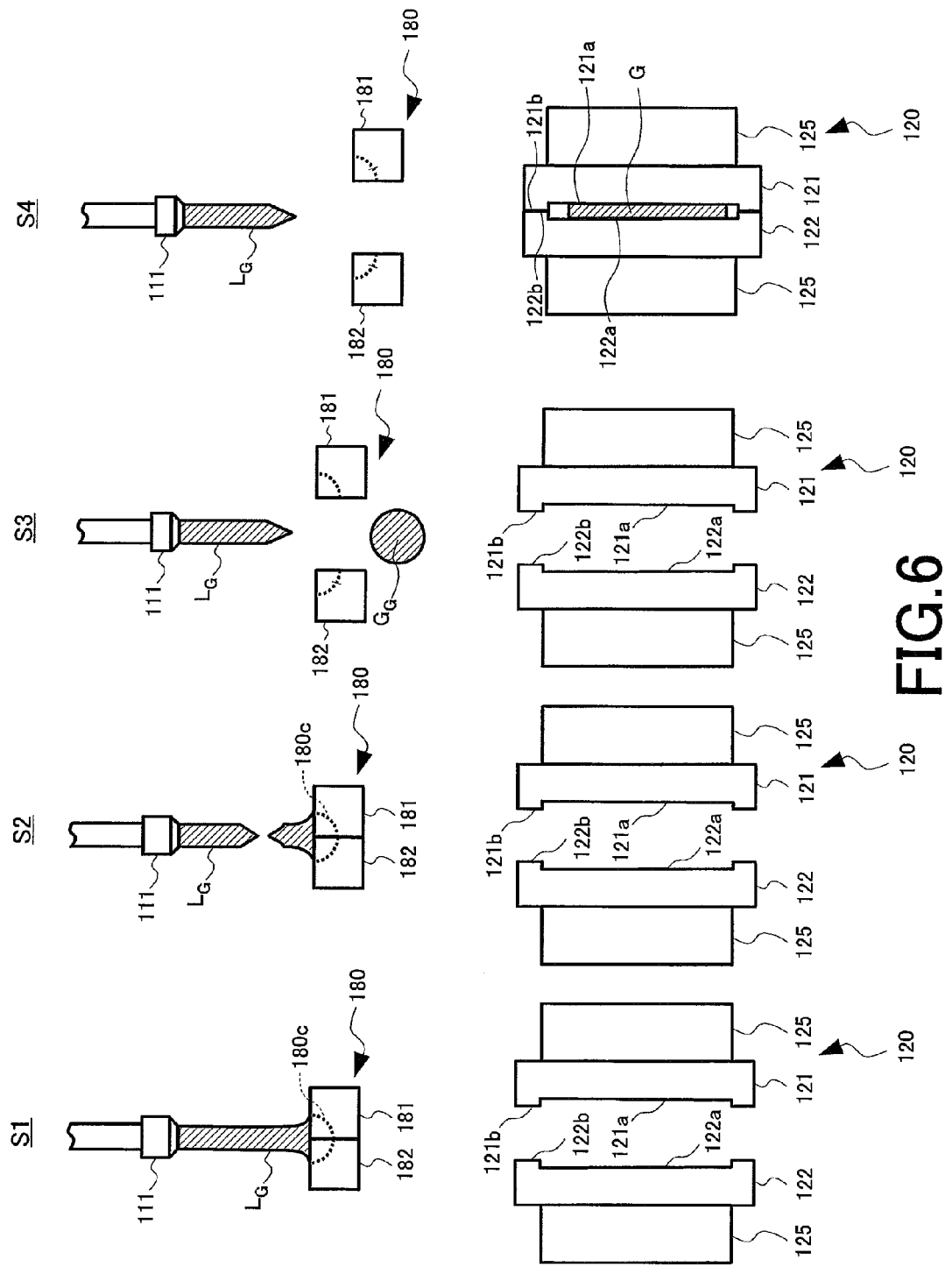
FIG. 6 is a view illustrating a modification of press forming of the embodiment in which a cutting unit is not used.

Alternatively, as illustrated in S1 to S4 of FIG. 6, in the apparatus 101, instead of using the cutting unit 160 illustrated in S1 to S3 of FIG. 5, a moving mechanism that moves the gob forming die 180 in an upstream direction or a downstream direction along the path of the molten glass $L_G$ may be used. S1 to S4 of FIG. 6 are views illustrating a modification in which the gob forming die 180 is used. S1 and S2 of FIG. 6 are views illustrating the state before the gob $G_G$ is made, S3 of FIG. 6 is a view illustrating the state in which the gob $G_G$ is made by the gob forming die 180, and S4 of FIG. 6 is a view illustrating the state in which the gob $G_G$ is subjected to press forming to make the glass blank G.

As illustrated in S1 of FIG. 6, the recess 180C formed by the block 181 and 182 receives the molten glass $L_G$ flowing out from the molten glass outflow port 111. As illustrated in S2 of FIG. 6, the blocks 181 and 182 are quickly moved onto the downstream side of the flow of the molten glass $L_G$ at predetermined timing. In this way, the molten glass $L_G$ is cut. Then, as illustrated in S3 of FIG. 6, the blocks 181 and 182 are separated at predetermined timing. Therefore, the molten glass $L_G$ retained by the blocks 181 and 182 falls down at one time, and the gob $G_G$ becomes the spherical shape by the surface tension of the molten glass $L_G$. As illustrated in S4 of FIG. 6, during the fall of the gob $G_G$, the spherical gob $G_G$ is sandwiched between the first die 121 and the second die 122 to perform the press forming, thereby preparing the disk-shaped glass blank G.

Figure 7:
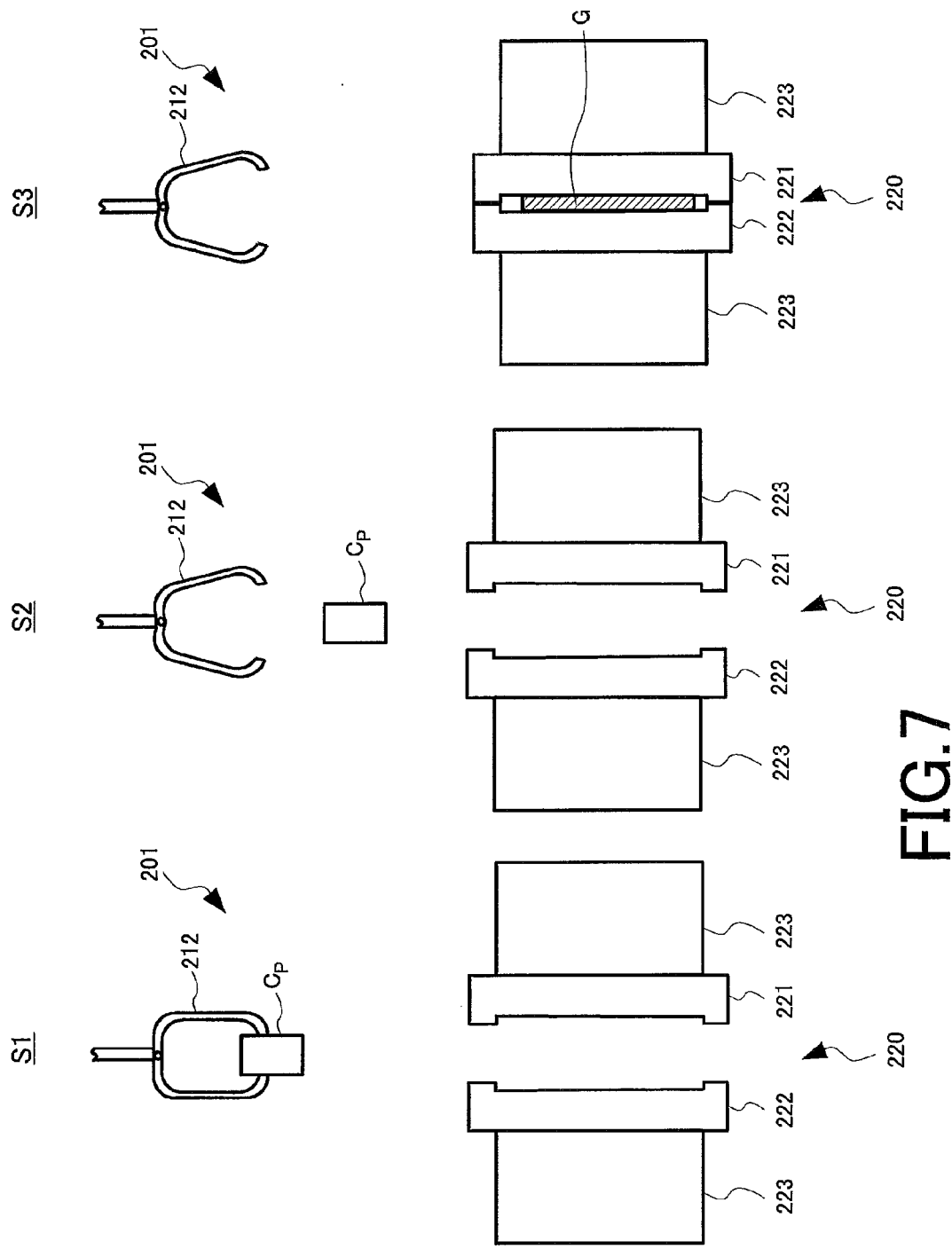
FIG. 7 is a view illustrating a modification of press forming of the embodiment using an optical glass heated by a softening furnace.

S1 to S3 of FIG. 7 are views illustrating another modification in which, instead of the gob $G_G$, a lump $C_P$ of the optical glass heated by a softening furnace (not illustrated) is caused to fall down and the press forming is performed to the lump $C_P$ while the lump $C_P$ is sandwiched from both sides between dies 221 and 222 during the fall of the lump $C_P$. S1 of FIG. 7 is a view illustrating the state before the lump of the heated optical glass is formed, S2 of FIG. 7 is a view illustrating the state in which the lump of the optical glass falls down, and S3 of FIG. 7 is a view illustrating the state in which the press forming is performed to the lump of the optical glass to make the glass blank G.

As illustrated in S1 of FIG. 7, in an apparatus 201, a glass material grasping mechanism 212 conveys the lump $C_P$ of the optical glass to a position above a press unit 220. As illustrated in S2 of FIG. 7, the glass material grasping mechanism 212 releases the lump $C_P$ of the optical glass to cause the lump $C_P$ of the optical glass to fall down. As illustrated in S3 of FIG. 7, during the fall of the lump $C_P$ of the optical glass, the lump $C_P$ is sandwiched between the first die 221 and the second die 222 to perform the press forming, thereby preparing the disk-shaped glass blank G. Because the first die 221 and the second die 222 have the same configuration and action as those of the first die 121 and second die 122 illustrated in FIG. 5, the descriptions are omitted.

Figure 8:
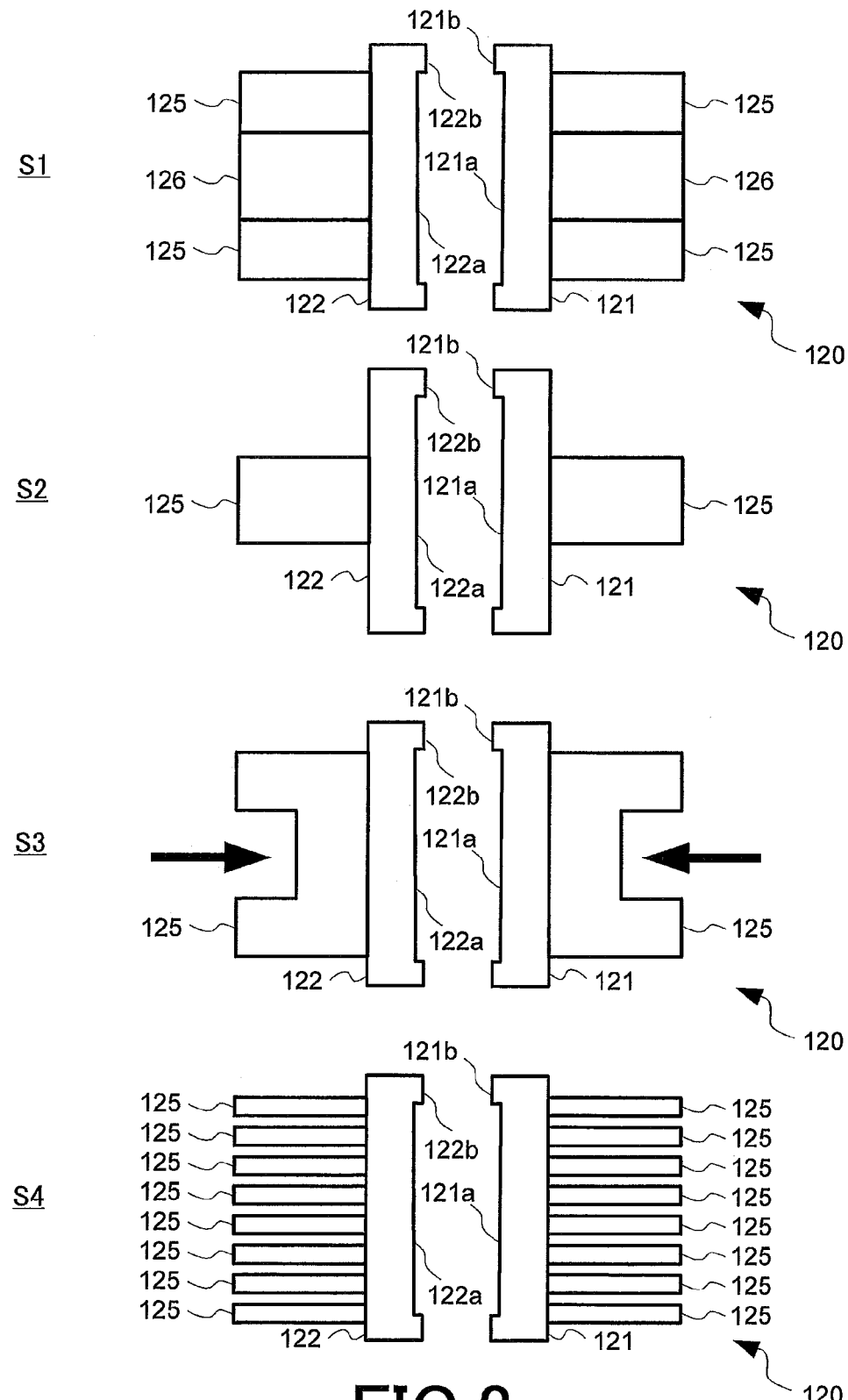
FIG. 8 is a view illustrating a modification of thermally equalizing or heat exhausting means used in press forming of the embodiment.

S1 to S3 of FIG. 8 are views illustrating a modification of the embodiment of FIG. 4. In this modification, various forms of thermally equalizing units 125 are used. S1 of FIG. 8 is a view illustrating a state in which a second thermally equalizing unit 126 each having a thermal expansion coefficient higher than that of the thermally equalizing unit 125 is provided between thermally equalizing units 125 provided at the circumferential edge portions of surfaces opposite to the inner circumferential surface 121a of the first die 121 and the inner circumferential surface 122a of the second die 122, respectively. S2 of FIG. 8 is a view illustrating a state in which thermally equalizing units 125 are provided only at the central portions of the surfaces opposite to the inner circumferential surface 121a of the first die 121 and the inner circumferential surface 122a of the second die 122. S3 of FIG. 8 is a view illustrating a state in which recessed portions extending toward the central portions of the surfaces opposite to the inner circumferential surface 121a of the first die 121 and the inner circumferential surface 122a of the second die 122 are provided in thermally equalizing units 125.

Examples are illustrated in S1 to S3 of FIG. 8 in which molten glass is pressed in the substantially center of each of the inner circumferential surface 121a and the inner circumferential surface 122a. In the case where the position of the molten glass in the middle of pressing is shifted from the central portion of each inner circumferential surface, set positions of the thermally equalizing portion 125 in S2 of FIG. 8 and the recessed portion in S3 of FIG. 8 may be adjusted depending on the shift level.

As illustrated in S1 of FIG. 8, the second thermally equalizing unit 126 is provided at the central portion of each of the surfaces opposite to the circumferential surface 121a of the first die 121 and the inner circumferential surface 122a of the second die 122. For example, when the thermally equalizing unit 125 is made of aluminum or an aluminum alloy, copper, a copper alloy or the like is used as a material of the second thermally equalizing unit 126. By using the second thermally equalizing unit 126, heat confined in the central portions of inner circumferential surfaces 121a and 122a during press forming is discharged to outside through the second thermally equalizing unit 126 having heat conduction efficiency higher than that of the thermally equalizing unit 125. Heat transferred to the circumferential edge portions of inner circumferential surfaces 121a and 122a from the gob $G_G$ is discharged to outside through the thermally equalizing unit 125. In this way, a difference in temperature of the interior the inner circumferential surface during press forming can be reduced.

When temperature thermally equalizing units 125 are provided only at the central portions of the surfaces opposite to inner circumferential surfaces 121a and 122a as illustrated in S2 of FIG. 8, heat confined in the central portions of inner circumferential surfaces 121a and 122a during press forming is discharged to outside through the thermally equalizing unit 125. In this way, a difference in temperature of the interior of each of inner circumferential surfaces 121a and 122a during press forming can be reduced. The second thermally equalizing unit 126 may be provided in place of the thermally equalizing unit 125.

Further, when a recessed portion extending toward the central portion of the surface opposite to each of inner circumferential surfaces 121a and 122a is provided in the thermally equalizing unit 125 as illustrated in S3 of FIG. 8, the recessed portion may be cooled using, for example, a liquid, a gas and/or the like having a cooling effect. In this case, the central portions of inner circumferential surfaces 121a and 122a are rapidly cooled, whereby a difference in temperature of the interior of the inner circumferential surface during press forming can be reduced. The thermally equalizing unit 125 may be formed so that the central portion of the surface opposite to each of inner circumferential surfaces 121a and 122a can be directly cooled using, for example, a liquid, a gas or the like having a cooling effect.

As illustrated in S4 of FIG. 8, a plurality of thermally equalizing units 125 may be provided on the rear surface of each of first and second dies 121 and 122. The plurality of thermally equalizing units 125 may be heat sinks. In this case, as compared to the case where one thermally equalizing unit 125 is provided, the contact area of the thermally equalizing unit to outside can be increased, and therefore heat transferred to inner circumferential surfaces 121a and 122a from the gob $G_G$ can be efficiently discharged to outside.

(b) Scribing Process (Step S20)

Next, the scribing process will be described. After the press forming process, the formed glass blank G is subjected to scribing in the scribing process.

As used herein, the scribing means that two concentric (inside concentric and outside concentric) cutting lines (linear scratches) are provided in the surface of the glass blank G with a scriber made of a super alloy or diamond particles in order to obtain the donut-shape (ring-shape) of the formed glass blank G having a predetermined size. The glass blank G scribed into two-concentric-circle shape is partially heated, and a portion outside the outside concentric circle and a portion inside the inside concentric circle are removed by a difference in thermal expansion of the glass blank G. In this way, a donut-shaped glass substrate is obtained.

A donut-shaped glass substrate can also be obtained by forming a circular hole in the glass blank using a core drill or the like.

(c) Shape Processing Process (Step S30)

Next, the shape processing process will be described. The shape processing process includes chamfering processing of the end portion of the glass substrate (chamfering of outer circumferential end portion and inner circumferential end portion) after the scribing process. Chamfering processing is shape processing in which the outer circumferential end portion and inner circumferential end portion of the glass substrate after the scribing process is chamfered between a principal face and a side wall portion perpendicular to the principal face using a diamond abrasive grain. The chamfering angle is, for example, 40 to 50 degrees with respect to the principal face.

(d) Grinding Process Using Fixed Abrasive Grain (Step S40)

In the grinding process using a fixed abrasive grain, the principal face of the glass substrate after the shape processing process is subjected to grinding processing (machining) using a double faces grinding apparatus including a planet gear mechanism. For example, the grinding has the machining allowance of several micrometers to about 100 micrometers (Total machining allowance of both principal faces; the same applies hereinafter.) The double faces grinding apparatus includes a pair of upper and lower surface plates (upper surface plate and lower surface plate), and a glass substrate is held between the upper surface plate and the lower surface plate. By moving one or both of the upper surface plate and the lower surface plate, the glass substrate and each surface plate are relatively moved, whereby both principal faces of the glass substrate can be ground.

In the press forming process of this embodiment, a glass blank having an extremely high flatness can be prepared, and therefore the grinding process may be omitted. Before the grinding process, a lapping process may be performed using a double faces grinding apparatus similar to the apparatus used in the grinding process and an alumina loose abrasive grain.

(e) Edge Polishing Process (Step S50)

Next, edge polishing of the glass substrate after the grinding process is performed.

In edge polishing, the inner circumferential end face and outer circumferential end face of the glass substrate are subjected to mirror surface finishing by brush polishing. At this point, slurry that includes fine particles such as cerium oxide as the loose abrasive grain is used. By performing edge polishing, an impairment such as contamination by deposition of dust or the like, damage or a flaw is eliminated, whereby occurrence of a thermal asperity and deposition of ions of sodium, potassium and the like which may cause corrosion can be prevented.

(f) First Polishing Process (Step S60)

Next, the principal face of the glass substrate after the edge polishing process is subjected to first polishing. For example, first polishing has the machining allowance of several micrometers to about 50 micrometers. First polishing is intended to remove the flaw left on the principal face after the grinding using the fixed abrasive grain, the deformation and the micro-surface irregularity (micro-waviness and roughness). In the first polishing process, polishing is performed while a polishing solution is fed using a double polishing apparatus having a structure similar to that of the apparatus used in the grinding process. A polishing agent contained in the polishing solution is, for example, a cerium oxide abrasive grain or a zirconia abrasive grain.

In the first polishing process, polishing is performed so as to have a surface roughness (Ra) of 0.5 nm or less and a micro-waviness (MV-Rq) of 0.5 nm or less for the principal face of the glass substrate. The micro-waviness may be represented by a RMS (Rq) value calculated as a roughness at a wavelength bandwidth of 100 to 500 μm in a region of 14.0 to 31.5 mm radius in the whole of the principal face, and can be measured using, for example, Model-4224 manufactured by Polytec Inc.

The surface roughness is represented by an arithmetic mean roughness Ra defined in JIS B0601:2001 and, for example, can be measured with a roughness measuring machine SV-3100 manufactured by Mitutoyo Corporation and calculated by a method defined in JIS B0633:2001 when the roughness is no less than 0.006 μm and no more than 200 μm. When as a result, the roughness is 0.03 μm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 512×512 pixels in a measurement area of 1 μm×1 μm square can be used.

(g) Chemically Strengthening Process (Step S70)

Next, the glass substrate after the first polishing process is chemically strengthened.

For example, a mixed solution of potassium nitride (60% by weight) and sodium sulfate (40% by weight) can be used as a chemically strengthening solution. In the chemically strengthening process, a chemically strengthening solution is heated to, for example, 300° C. to 400° C., a washed glass substrate is preheated to, for example, 200° C. to 300° C., and the glass substrate is then dipped in the chemically strengthening solution for, for example, 3 to 4 hours.

When the glass substrate is dipped in the chemically strengthening solution, the lithium ion and the sodium ion in the surface layer of the glass substrate are replaced, respectively, with the sodium ion and the potassium ion which have relatively large ion radiuses in the chemically strengthening solution, so that a compressive stress layer is formed on the surface layer portion, thereby strengthening the glass substrate. The glass substrate subjected to the chemically strengthening treatment is washed. For example, the glass substrate is washed with sulfuric acid, and then washed with pure water or the like.

(h) Second Polishing Process (Step S80)

Next, the glass substrate after chemically strengthening process is subjected to second polishing. Second polishing has the machining allowance of about 1 μm. Specifically, the machining allowance in the range of 0.5-2 μm is preferred. If the machining allowance is lower than the range, the surface roughness may not be decreased sufficiently. On the other hand, if the machining allowance is higher than the range, the deterioration (such as roll-off) of the edge shape may be caused. Second polishing is intended at the mirror surface polishing of the principal face. In second polishing, for example, the polishing apparatus used in first polishing is used. At this point, the second polishing differs from the first polishing in the following points: the kind and particle size of the loose abrasive grain, and hardness of the resin polisher.

For example, the slurry of the turbid fine particles such as colloidal silica (particle size: diameter of about 10 to 50 nm) is used as the loose abrasive grain used in the second polishing.

The polished glass substrate is washed with a neutral detergent, pore water, IPA or the like to obtain a glass substrate for magnetic disk.

It is not necessarily essential to perform the second polishing process, but it is preferable to perform the second polishing process because the level of the surface irregularity of the principal face of the glass substrate can be further improved. By performing the second polishing process, the principal face can be made to have a roughness (Ra) of 0.2 nm or less, more preferably 0.1 nm or less and a micro-waviness (MW-Rq) of 0.3 nm or less, more preferably 0.1 nm or less.

As described above, the method for manufacturing a glass blank for magnetic disk in this embodiment includes a press forming process of press-forming a lump of molten glass using a pair of dies. Therefore, when the surface roughness of the inner circumferential surfaces of a pair of dies is set at a good level (e.g. surface roughness required for the glass substrate for magnetic disk), the surface roughness of the glass blank can be kept at a good level because the surface roughness of the inner circumferential surface of the die is shape-transferred as the surface roughness of the glass blank. In the press forming step, press forming may be performed using thermally equalizing means for reducing a difference in temperature in the press forming surface of the die during pressing of the molten glass. Therefore, the glass blank obtained in the press forming process of this embodiment does not require a process of machining the principal face because the flatness and surface waviness of the principal face of the glass blank can be kept at a level required for the glass substrate for magnetic disk. The glass substrate shape-processed into a predetermined shape based on the glass blank is subjected to chemically strengthening, but the flatness of the glass substrate is not deteriorated by chemically strengthening in this embodiment. Therefore, the glass substrate for magnetic disk which is finally obtained is thin, and has a high mechanical strength, and a flatness and surface waviness better than was previously possible.

[Magnetic Disk]

The glass substrate for magnetic disk is prepared through the processes described above. A magnetic disk is obtained in the following manner using the above-described glass substrate for magnetic disk.

The magnetic disk has, for example, a configuration in which on the principal face of the glass substrate, at least an adhesive layer, an underlying layer, a magnetic layer (magnetic recording layer), a protective layer and a lubricant layer are stacked in this order from the side closest to the principal face.

For example, the substrate is introduced into an evacuated deposition apparatus, and the adhesive layer, the underlying layer and the magnetic layer are sequentially deposited in an Ar atmosphere by a DC magnetron sputtering method. For example CrTi may be used as the adhesive layer, and for example CrRu may be used as the underlying layer. For example a CoPt-based alloy may be used as the magnetic layer. Also, a CoPt-based alloy or FePt-based alloy having a $L_{10}$ ordered structure may be deposited to form a magnetic layer for heat assisted magnetic recording. After the deposition described above, the protective layer is deposited using $C_2H_4$ by, for example, a CVD method, and subsequently nitriding treatment is performed to introduce nitrogen to the surface, whereby a magnetic recording medium can be formed. Thereafter, the lubricant layer can be formed by applying, for example, PFPE (perfluoropolyether) onto the protective layer by a dip coating method.

Second Embodiment

A method for manufacturing a glass blank for magnetic disk and a method for manufacturing a glass substrate for magnetic disk according to this embodiment will be described in detail below. The glass substrate for magnetic disk in this embodiment is the same as the glass substrate for magnetic disk in the first embodiment. In the below description, only different parts from the method for manufacturing a glass blank for magnetic disk and the method for manufacturing a glass substrate for magnetic disk in the first embodiment are explained, and the other repeated explanation may be omitted. In this embodiment, a member 125 indicated as "a thermally equalizing unit" in the first embodiment is indicated as "a temperature controlling unit" for the sake of convenience.

In the glass substrate of this embodiment, amorphous aluminosilicate glass can be also preferably used as described in the first embodiment.

In this embodiment, molten glass is press-formed with a press unit 120 provided with a temperature controlling unit 125 having the same configuration as the thermally equalizing unit 125 in the first embodiment. The press unit 120 has the same configuration as in the first embodiment except for indicating a thermally equalizing unit 125 in the first embodiment as a temperature controlling unit 125. In this embodiment, the temperature controlling unit 125 is one example of temperature controlling means for reducing a difference in temperature within the press forming surface of the die. Like the thermally equalizing unit 125, the temperature controlling unit 125 may be formed of copper, a copper alloy, aluminum, an aluminum alloy or the like, and may be formed of silver, extra super duralumin or the like.

Press forming in this embodiment will be described below with reference again to S1 to S3 of FIG. 4 which are described above.

As illustrated in S1 of FIG. 4, a molten glass material $L_G$ continuously flows out from the molten glass outflow port 111. At this point, the cutting unit 160 is driven at predetermined timing to cut the molten glass material $L_G$ using the cutting blades 161 and 162 (S2 of FIG. 4). Therefore, the cut molten glass becomes a substantially spherical gob $G_G$ due to a surface tension thereof. Adjustment of the outflow quantity per time of the molten glass material $L_G$ and the driving interval of the cutting unit 160 may be appropriately performed according to a volume determined by the target size and thickness of the glass blank G.

The made gob $G_G$ falls down toward a gap between the first die 121 and second die 122 of the press unit 120. At this point, the first driving unit 123 and the second driving unit 124 (see FIG. 4) are driven such that the first die 121 and the second die 122 come close to each other at the timing the gob $G_G$ enters the gap between the first die 121 and the second die 122. Therefore, as illustrated in S3 of FIG. 4, the gob $G_G$ is captured (caught) between the first die 121 and the second die 122. An inner circumferential surface 121a (press forming surface) of the first die 121 and an inner circumferential surface 122a (press forming surface) of the second die 122 come close to each other with a micro gap, and the gob $G_G$ sandwiched between the inner circumferential surface 121a of the first die 121 and the inner circumferential surface 122a of the second die 122 is formed into a thin-plate shape. A projection 121b and a projection 122b are provided in the first inner circumferential surface 121a of the first die 121 and the second inner circumferential surface 122a of the second die 122, respectively, in order to keep the gap between the inner circumferential surface 121a of the first die 121 and the inner circumferential surface 122a of the second die 122 constant. That is, the projection 121b and the projection 122b abut against each other, whereby the gap between the inner circumferential surface 121a of the first die 121 and the inner circumferential surface 122a of the second die 122 is kept constant, so that a plate-shaped space is generated.

Press forming is performed using a pair of dies 121 and 122 in the press forming process in press forming in this embodiment, and the outer shape of the glass blank is not restricted by the shape of the die. That is, as illustrated in S3 of FIG. 4, the gob stretched by closed dies does not reach projections 121b and 122b.

As illustrated in S3 of FIG. 4, heat transferred to central portions of inner circumferential surfaces 121a and 122a from the gob. G is discharged to outside through the temperature controlling unit 125 in accordance with a flow of heat illustrated by the arrow in the figure.

A temperature control mechanism (not illustrated) is provided in each of the first die 121 and second die 122, and temperatures at the first die 121 and second die 122 is retained lower than the glass transition point $T_G$ of the molten glass $L_G$. The temperature control mechanism controls the cooling rate of the gob $G_G$ sandwiched between the inner circumferential surface 121a of the first die 121 and the inner circumferential surface 122a of the second die 122 so that a difference in temperature on a surface of the gob $G_G$ (e.g. between the circumferential edge portion and the central portion of the surface of the gob $G_G$) is reduced. In the control, the cooling rate of the gob $G_G$ is increased or reduced. Therefore, the temperature control mechanism may have a cooling mechanism including, for example, a path of a liquid, a gas or the like having a cooling effect, or a heating mechanism such as a heater. The temperature controlling unit 125 may be configured as the temperature control mechanism. Since the cooling rate of the gob $G_G$ is controlled, necessity of the annealing treatment of the glass blank can be eliminated. For example, generation of the in-plane strain can be prevented by lowering the cooling rate. The reasons for this are as follows. In short, heat conductivity of glass is generally lower than that of metal, so that the heat is difficult to transfer internally in glass. When transfer speed of heat of glass to the dies is lowered, time for transferring the heat uniformly internally in the glass can be spared, and thus difference in temperature in the interior of the glass becomes small, so that the deformation cannot occur easily. One example of control of the cooling rate of the gob $G_G$ will be described later.

Further, it is not necessary to attach a mold release material to the first die 121 and the second die 122 in the press forming process, since the press forming can be finished in an extremely short time, and the wide surface of the dies can cool the glass quickly such that the die is not over heated, and therefore the glass and the die are not fused to each other.

It is preferable that the temperature of the inner circumferential surface of the die at the time of press-forming the gob $G_G$ is substantially uniform because the glass blank obtained after press forming has a good flatness. Particularly, it is preferable to decrease a difference in temperature of the inner circumferential surface (press forming surface) by efficiently discharging heat from the gob $G_G$, which is easily confined in the central portion of each of inner circumferential surfaces 121a and 122a, to outside. This is because when a difference in temperature of the inner circumferential surface of the die during press forming is decreased, the temperature of the central portion and the temperature of the circumferential edge portion of the inner circumferential surface are almost identical, so that the central portion and the circumferential edge portion of the gob $G_G$ can be solidified almost at the same time.

Since the temperature of the central portion and the temperature of the circumferential edge portion of the inner circumferential surface are almost identical, an internal strain (in-plane strain) by a compressive stress directing from the circumferential edge portion to the central portion of the press forming surface can be prevented from being generated in the press-formed glass blank.

Thus, by reducing a difference in temperature of the inner circumferential surface of the die during pressing of the glass blank using the temperature controlling unit 125, flatness required for the glass substrate for magnetic disk can be achieved, and the central portion and the circumferential edge portion of the gob $G_G$ can be solidified at the same time, thereby preventing in-plane strain. For example, if the flatness required for the glass substrate for magnetic disk is 4 μm, press forming is performed while the temperature of the inner circumferential surface is kept substantially uniform, e.g. a difference in temperature between the central portion and the circumferential edge portion is kept at 10° C. or less. Generation of the in-plane strain of the glass blank is best prevented when a difference in temperature between the central portion and the circumferential edge portion is 0° C., but the difference in temperature may be appropriately determined according to the size of the glass blank G formed, the composition of the glass, and so on.

The difference in temperature of the inner circumferential surface is a difference in temperature which is the largest of differences in temperature between the central portion and each circumferential edge portion as measured using a thermocouple at a point which is located 1 mm from the front face of inner circumferential surface of the die to the inside of the die and corresponds to each of the central portion and a plurality of circumferential edge portions of the inner circumferential surface (e.g. a point corresponding to the central position of a glass blank having a diameter of 75 mm and upper and lower and left and right four positions on the circumference of a circle centered on the aforementioned point and having a radius of about 30 mm).

In this embodiment, the central portion and the circumferential edge portion of the surface of the gob $G_G$ can be solidified almost at the same time because press forming is performed while the cooling rate of the molten glass is controlled so that a difference in temperature on the surface of the gob $G_G$ is reduced. Therefore, it is not necessary to provide the temperature controlling unit 125.

The same configurations as illustrated in FIG. 5 to FIG. 8 may be also applied to the present embodiment.

Figure 9:
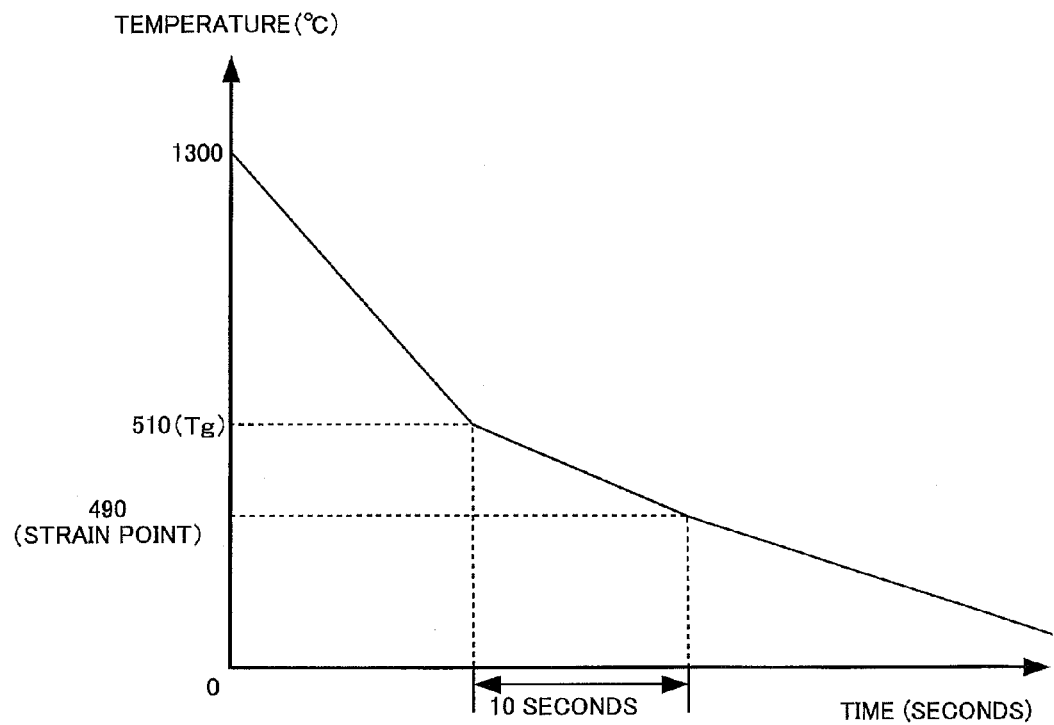
FIG. 9 is a view illustrating a time course of the temperature of a gob in press forming of the embodiment.

Next, control of the cooling rate of the gob $G_G$ will be described with reference to FIG. 9. FIG. 9 is a view illustrating a time course of the temperature of a gob in press forming of the embodiment. If the cooling rate of the gob $G_G$ sandwiched between the inner circumferential surface 121a of the first die 121 and the inner circumferential surface 122a of the second die 122 is too high, a difference in temperature is generated on the surface of the gob $G_G$. This is because the following reasons. In short, heat conductivity of glass is generally lower than that of metal, and thus heat is difficult to transfer internally in glass. Further, when transfer speed of heat of glass to the dies is made too high, time for transferring the heat uniformly internally in the glass cannot be spared. At this time, shrinkage associated with cooling precedes at the circumferential edge portion of the surface of the gob $G_G$, and therefore an internal strain (in-plane strain) by a residual stress extending from the circumferential edge portion toward the central portion of the surface of the gob $G_G$ is generated in the glass blank formed by press forming of the gob $G_G$. Thus, in this embodiment, the cooling rate is controlled by the temperature control mechanism in the period during which the temperature of the gob $G_G$ during press forming falls from a glass transition point (Tg) to a strain point. In the example illustrated in FIG. 9, when a glass blank having a diameter of 75 mm and a thickness of 0.9 mm is manufactured, the cooling rate of the gob $G_G$ is controlled to a moderate cooling rate of about −8 to −2° C. in the period during which the temperature of the gob $G_G$ falls from the glass transition point (Tg) to the strain point. In this case, a difference in temperature on the surface of the gob $G_G$ is reduced, so that the size of the strain generated in the glass blank can be decreased.

The temperature of the gob $G_G$ may be measured using a thermocouple at a point which is located 1 mm from each of the front faces of the inner circumferential surface 121a of the first die 121 and the inner circumferential surface 122a of the second die 122 to the inside of the die and at which the inner circumferential surface 121a and the inner circumferential surface 122a face each other (e.g. a point corresponding to the central position of the glass blank and central points of the inner circumferential surface 121a and the inner circumferential surface 122a).

The time course of the temperature of the gob illustrated in FIG. 9 is intended for explaining one example of control of the cooling rate of the gob $G_G$, and the cooling rate of the gob $G_G$ may be appropriately controlled according to the composition of the glass and the size of the glass blank formed.

In this way, press forming is performed while the cooling rate of the molten glass is controlled so that a difference in temperature on the surface of the gob $G_G$ during pressing of the molten glass is reduced. Then, the molten glass can be solidified without generating an in-plane strain. Therefore, the annealing treatment for releasing the internal strain generated in the glass blank can be omitted.

Processes after the scribing process may be the same as in the first embodiment.

As described above, the method for manufacturing a glass blank for magnetic disk and a glass substrate for magnetic disk in this embodiment includes a press forming process of press-forming a lump of molten glass using a pair of dies. Therefore, when the surface roughness of the inner circumferential surfaces of a pair of dies is set at a good level (e.g. surface roughness required for the glass substrate for magnetic disk), the surface roughness of the glass blank can be kept at a good level because the surface roughness of the inner circumferential surface of the die is shape-transferred as the surface roughness of the glass blank. In the press forming process, press forming may be performed while the cooling rate of the molten glass is controlled. Here, it is even better to control such that difference in temperature on the surface of the molten glass is reduced. Therefore, the glass blank obtained in the press forming process of this embodiment can be manufactured without necessity of a process of machining the principal face because the surface roughness and flatness of the principal face of the glass blank can be kept at a level required for the glass substrate for magnetic disk. The glass substrate shape-processed into a predetermined shape based on the glass blank is subjected to chemically strengthening, but the flatness of the glass substrate is not deteriorated by chemically strengthening in this embodiment. Therefore, the glass substrate for magnetic disk which is finally obtained is thin, and has a high mechanical strength, and flatness higher than was previously possible.

In this embodiment, the molten glass can be solidified without causing an in-plane strain by controlling the cooling rate of the molten glass so that a difference in temperature on the surface of the molten glass. Accordingly, in this embodiment, a glass blank for magnetic disk and a glass substrate for magnetic disk, the internal strain of which is reduced, can be manufactured without performing annealing treatment.

EXAMPLES

The present invention will be further described below by way of Examples. However, the present invention is not limited to aspects described in Examples.

First Example

Preparation of Molten Glass

Raw materials were weighed so as to obtain a glass having the following composition, and mixed to obtain a mixed raw material. This raw material was put in a melting vessel, heated, melted, clarified and stirred to prepare a homogeneous molten glass free from foam and an unmelted substance. Foam and an unmelted substance, deposition of crystals, and contaminants such as a refractory material and platinum forming the melting vessel were not observed in the glass obtained.

[Composition of Glass]

Amorphous aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol %.

The above-described molten glass was provided, and a glass blank having a diameter of 75 mm and a thickness of 0.9 mm was prepared using a press forming method of the present invention (method using the apparatus in FIGS. 3 and 4). The temperature of a molten glass material $L_G$ discharged from a molten glass outflow port 111 is 1300° C., and the viscosity of the molten glass material $L_G$ at this time is 700 poises. The surface roughness (arithmetic mean roughness Ra) of the inner circumferential surfaces of a first die and a second die throughout the surface was 0.01 μm to 1 μm, specifically 0.1 μm. Further, the first die and the second die are formed of an ultrahard alloy (e.g. VM40). Copper was used as a thermally equalizing unit.

The molten glass material $L_G$ discharged from a molten glass outflow port 111 is cut by a cutting unit 160, so that a gob $G_G$ having a thickness of about 20 mm is formed. The gob $G_G$ was pressed under a load of 3000 kgf by a press unit until the gob $G_G$ had a temperature equal to or lower than the glass transition point (Tg) of the molten glass material (about 3 seconds), so that a glass blank having a diameter of 75 mm was formed.

The difference in temperature in the inner circumferential surface of the die during pressing is a difference in temperature which is the largest of differences in temperature between the central portion and each circumferential edge portion as measured using a thermocouple at a point which is located 1 mm from the front face of inner circumferential surface of the die to the inside of the die and corresponds to each of the central portion and a plurality of circumferential edge portions of the inner circumferential surface (specifically, a point corresponding to the central position of a glass blank having a diameter of 75 mm and upper and lower and left and right four positions on the circumference of a circle centered on the aforementioned point and having a radius of about 30 mm). In Example, the difference in temperature which was the largest of differences in temperature between the central portion and circumferential edge portions was determined as a difference in temperature between the central portion and the circumferential edge portion in the inner circumferential surface of the die.

In this Example, when a flatness required for the glass substrate for magnetic disk was 4 μm, a difference in temperature between the first die and the second die was set at 10° C. in each press unit for achieving this flatness. Specifically, the temperature of the first die was set at 420° C., and the temperature of the second die was set at 411 to 429° C.

[Evaluation of Glass Blank Prepared in Example]

For the plate-shaped glass blank having a diameter of about 75 mm, which had been prepared in Example, the flatness and the surface roughness (arithmetic mean roughness Ra) were measured.

Here, the surface waviness was defined as a PV value (Peak-Valley value: maximum elevation difference) when the principal surface (entire surface) of the glass blank was measured in a component having wavelength of 5 mm or less in surface property. The surface waviness can be measured using, for example, OPTIFLAT manufactured by Phase Shift Technology, Inc., which is a white light interference microscope-type surface shape measuring apparatus. It should be noted that data of the surface waviness which cannot be correctly measured due to low reflection rate of light such as a part vicinity of the edge portion needs to be eliminated. In such a case, the measurement area may be a circle of 65 mm in diameter, for example. The surface waviness may also be calculated by cutting a waviness having a wavelength longer than 5 mm with the cutoff value set at 5 mm using a different measuring apparatus. Evaluation criteria for the surface waviness illustrated in Table 1 are as follows.

If the surface waviness of the glass blank is more than 30 nm in the following criteria, it is necessary to reduce the surface waviness to 30 nm or less by performing a grinding process. A glass blank having a surface waviness of more than 10 nm and no more than 30 nm is preferable because the grinding process can be omitted, but the glass blank is inferior in productivity to a glass blank having a surface waviness of 10 nm or less because the machining allowance in a polishing process should be increased for stabilization of quality. A glass blank having a surface waviness of 10 nm or less is most preferable because the grinding process can be omitted, and also the machining allowance in the polishing process can be decreased.

Very good: Surface waviness is no more than 10 nm.

Good: Surface waviness is more than 10 nm and no more than 30 nm.

Poor: Surface waviness is more than 30 nm.

The surface roughness is represented by an arithmetic mean roughness Ra defined in JIS B0601:2001 and, for example, can be measured with a roughness measuring machine SV-3100 manufactured by Mitutoyo Corporation and calculated by a method defined in JIS B0633:2001 when the roughness is no less than 0.006 μm and no more than 200 μm. When as a result, the roughness is 0.03 μm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 256×256 pixels in a measurement area of 10 μm×10 μm square was used. As a result, the surface roughness of the glass blank was 0.5 μm or less in all examples. This is because regardless of the temperature of the die, the inner circumferential surfaces of the first die and the second die are shape-transferred to the glass blank, so that the surface roughness of the glass blank is comparable to the surface roughness of the inner circumferential surfaces of the first die and the second die. When the arithmetical mean roughness Ra is 0.1 μm or less, target surface properties of the glass substrate for magnetic disk can be obtained by omitting the grinding process to the principal face and performing the polishing process directly.

TABLE 1

| | Thickness dimensions of die and thermally equalizing unit | Difference in temperature between central portion and circumferential edge portion of inner circumferential surface of die | Surface waviness | Evaluation of surface waviness |
|---|---|---|---|---|
| Comparative Example | Die: 8 mm Thermally equalizing unit: None | 20° C. | 38 nm | Poor |
| Example 1 | Die: 8 mm Thermally equalizing unit: 8 mm | 9° C. | 21 nm | Good |
| Example 2 | Die: 8 mm Thermally equalizing unit: 26 mm | 1° C. or less | 9 nm | Very good |

It is apparent from Table 1 that a glass blank having a good surface waviness is prepared by reducing a difference in temperature between the central portion and the circumferential edge portion of the inner circumferential surface of a pair of dies. Particularly, when the thickness dimension of the thermally equalizing unit was increased relative to the thickness dimension of the die, a glass blank having the best surface waviness was obtained. The inner circumferential surfaces of the first die and the second die were shape-transferred to the glass blank, and therefore the surface roughness of the glass blank in each example was almost identical to the surface roughness of the inner circumferential surfaces of the first die and the second die.

[Preparation of Glass Substrate for Magnetic Disk in Example]

Using the glass blanks of Comparative Example and Examples 1 and 2 described above, processes of Steps S20 (scribing), S30 (shape processing), S50 (edge polishing), S60 (first polishing), S70 (chemically strengthening) and S80 (second polishing) illustrated in FIG. 2 were sequentially performed to prepare glass substrates for magnetic disk, respectively. That is, the glass substrate for magnetic disk was prepared without performing the process of grinding the principal face for improving the flatness.

In preparation of the glass substrate for magnetic disk, the processes of first polishing and second polishing were performed under the following conditions.

First polishing process: polishing was performed using cerium oxide (average particle size: 1 to 2 μm in diameter) and a hard urethane pad. Machining allowance was 10 μm.

Second polishing process: polishing was performed using colloidal silica (average particle size: 0.1 μm in diameter) and a soft urethane pad. Machining allowance was 1 μm.

Next, recording layers were deposited on the glass substrates for magnetic disk, which had been prepared based on the glass blanks of Comparative Example and Examples 1 and 2, to prepare magnetic disks (Comparative Example A, Example 1A and Example 2A, respectively). The prepared magnetic disk had a nominal 2.5 inch size (an inner diameter of 20 mm, an outer diameter of 65 mm and a thickness of 0.8 mm).

Deposition of recording layer on the glass substrate for magnetic disk was performed in the following manner. First, an adhesive layer, a soft magnetic layer, a pre-underlying layer, an underlying layer, a principal recording layer, and an auxiliary recording layer, a protective layer and a lubricant layer were sequentially deposited in an Ar atmosphere by a DC magnetron sputtering method using an evacuated deposition apparatus. The Ar gas pressure at the time of deposition was 0.6 Pa unless otherwise specified. As the adhesive layer, Cr-50Ti was deposited in a thickness of 10 nm. As the soft magnetic layer, layers of 92Co-3Ta-5Zr were each deposited in a thickness of 20 nm with a Ru layer of 0.7 nm interposed therebetween. As the pre-underlying layer, Ni-5W was deposited in a thickness of 8 nm. As the underlying layer, Ru was deposited in a thickness of 10 nm at 0.6 Pa, and Ru was deposited thereon in a thickness of 10 nm at 5 Pa. As the principal recording layer, 90(72Co-10Cr-18Pt)-5($SiO_2$)-5 ($TiO_2$) was deposited in a thickness of 15 nm at 3 Pa. As the auxiliary recording layer, 62Co-18Cr-15Pt-5B was deposited in a thickness of 6 nm. As the protective layer, a layer was deposited in a thickness of 4 nm using $C_2H_4$ by a CVD method, and the surface layer was subjected to nitriding treatment. As the lubricant layer, a layer was formed in a thickness of 1 nm using PFPE by a dip coating method.

[Evaluation of Magnetic Disk of Examples]

For the magnetic disks of Comparative Example and Examples 1 and 2, a touch-down test (DFH touch-down test) of a DFH (Dynamic Fly height) head element portion was conducted using an HDF tester (Head/Disk Flyability Tester) manufactured by Kubota Comps Corporation. In this test, the element portion is gradually protruded by a DFH mechanism, and contact thereof with the surface of magnetic disk is detected with an AE (Acoustic Emission) sensor to thereby evaluate a protrusion amount when the head element portion comes into contact with the surface of the magnetic disk. As the head, a DFH head for 320 GB/P magnetic disks (2.5 inch size) was used. A flying height when the element portion is not protruded is 10 nm. That is, for example, the head flying height is 2 nm when the protrusion amount is 8 nm. Other conditions were set as described below.

Evaluation radius: 22 mm
Rotation number of magnetic disk: 5400 rpm
Temperature: 25° C.
Humidity: 60%

Results of the DFH touch-down test are illustrated in Table 2. In Table 2, evaluations were made as described below according to the protrusion amount of the head element portion. It is preferable to have a protrusion amount of 8 nm or more for achieving a recording density of 320 GB/P.

Good: Protrusion amount≥8 nm
Poor: Protrusion amount<8 nm

TABLE 2

|  | Evaluation of protrusion amount |
| --- | --- |
| Comparative Example | Poor |
| Example 1A | Good |
| Example 2A | Good |

As evident from Table 2, the protrusion amount of the DFH head could be sufficiently increased even though the grinding process was omitted for Examples 1A and 2A. That is, for Examples 1A and 2A, setting the difference in temperature within the surface of the die being set to 10° C. or less, it could be confirmed that a glass substrate for magnetic disk, which has a good flatness and surface roughness and allows a good DFH touch test result to be obtained when the glass substrate is formed into a medium can be manufactured even though the grinding process is omitted.

Upon comparing Examples 1A and 2A in more detail, the protrusion amount of Example 2A only can be 8.5 nm or more. This is estimated that the surface waviness of the glass blank is much smaller, so that the glass substrate for magnetic disk has small surface waviness.

Second Example

Preparation of Molten Glass

Raw materials were weighed so as to obtain a glass having the following composition, and mixed to obtain a mixed raw material. This raw material was put in a melting vessel, heated, melted, clarified and stirred to prepare a homogeneous molten glass free from foam and an unmelted substance. Foam and an unmelted substance, deposition of crystals, and contaminants such as a refractory material and platinum forming the melting vessel were not observed in the glass obtained.

[Composition of Glass]

First Glass

Amorphous aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol % (hereinafter, referred to as a first glass composition). The second glass as a glass for preparing a glass blank, glass substrate and magnetic disk for a heat assisted magnetic recording system had the following composition.

Second Glass

Amorphous aluminosilicate glass having a composition including 50 to 75% of $SiO_2$, 0 to 5% of $Al_2O_3$, 0 to 3% of $Li_2O$, 0 to 5% of ZnO, 3 to 15% in total of $Na_2O$ and $K_2O$, 14 to 35% in total of MgO, CaO, SrO, and BaO and 2 to 9% in total of $ZrO_2$, $TiO_2$, $La_2O_3$, $Y_2O_3$, $Yb_2O_3$, $Ta_2O_5$. $Nb_2O_5$ and $HfO_2$ in an oxide-based conversion indicated in mol % (hereinafter, referred to as a second glass composition)

Further, the first glass composition was configured so that the thermal expansion coefficient of the glass substrate for magnetic disk at a temperature of 100 to 300° C. was $98 \times 10^{-7} (K^{-1})$. The second glass composition was configured so that the thermal expansion coefficient of the glass substrate for magnetic disk at a temperature of 100 to 300° C. was $80 \times 10^{-7} (K^{-1})$. When the thermal expansion coefficient is $50 \times 10^{-7} (K^{-1})$ or less, the internal strain generated in the glass blank after press forming tends to be small, and therefore the degree of deterioration of the flatness is low after a rapid heating treatment described later is performed. When the thermal expansion coefficient is less than $30 \times 10^{-7}$ ($K^{-1}$), the thermal expansion coefficient of the glass is smaller than that of a spindle in a hard disk device. This is not preferable because during operations of the hard disk device, the magnetic disk and the spindle may strongly fit together to break the magnetic disk.

When the glass blank, glass substrate and magnetic disk for a heat assisted magnetic recording system are prepared, it is preferable to compose the glass so as to have a glass transition point (Tg) of 600° C. or higher. This is because a period of time changing from molten state to solid state (around the glass transition point Tg) is shorter and the cooling rate tends to be higher as the glass transition point (Tg) becomes higher. Therefore, with such glass composition, it is generally difficult to control internal strain of the glass. When using such glass, the manufacturing method of the present embodiment is particularly preferred. In view of the above, the glass transition point (Tg) in Examples 4B to 6B was 670° C.

Further, the thermal expansion coefficient in each Example was in the range of 50 to $100 \times 10^{-7} (K^{-1})$.

The above-described molten glass was provided, and a glass blank having a diameter of 75 mm and a thickness of 0.9 mm was prepared using a press forming method of the present invention (method using the apparatus in FIGS. 3 and 4). The temperature of a molten glass material $L_G$ discharged from a molten glass outflow port 111 is 1300° C., and the viscosity of the molten glass material $L_G$ at this time is 700 poises. The surface roughness (arithmetic mean roughness Ra) of the inner circumferential surfaces of a first die and a second die was 0.1 μm to 1 μm. Further, the first die and the second die are formed of an ultrahard alloy (e.g. VM40) in a thickness of 10 mm.

Copper in a thickness of 20 mm was used as a temperature controlling unit. In this case, a difference in temperature of the inner circumferential surface of the die is 10° C. or less. The difference in temperature of the inner circumferential surface is a difference in temperature which is the largest of differences in temperature between the central portion and each circumferential edge portion as measured using a thermocouple at a point which is located 1 mm from the front face of inner circumferential surface of the die to the inside of the die and corresponds to each of the central portion and a plurality of circumferential edge portions of the inner circumferential surface (e.g. a point corresponding to the central position of a glass blank having a diameter of 75 mm and upper and lower and left and right four positions on the circumference of a circle centered on the aforementioned point and having a radius of about 30 mm).

The molten glass material $L_G$ discharged from a molten glass outflow port 111 is cut by a cutting unit 160, so that a gob $G_G$ having a thickness of about 20 mm is formed. The gob $G_G$ was pressed by a press unit under a load of 3000 kgf until the gob had a temperature equal to or lower than the strain point of the molten glass material (about 5 seconds), so that a glass blank having a diameter of 75 mm was formed.

In this Example, the temperature of the first die was set to the strain point −20° C., and the temperature of the second die was set to the temperature of the first die ±10° C. (strain point −10 to −30° C.). The reason why the minimum temperature of the die was set to the strain point −30° C. is that when pressing is performed at a too low temperature, the glass may be broken during pressing.

In this Example, it is preferable, that the cooling rate of the molten glass material during press forming is arbitrarily controlled in a range of −8 to −2° C./second in the period during which the temperature of the molten glass moves from the glass transition point (Tg) to the strain point. This cooling rate is determined by measuring a temperature for 60 seconds including time before starting pressing and after the die is released at a point which is located 1 mm from the front face of the inner circumferential surface of the die to the inside of the die, and by calculating ratio of a temperature change to the measurement time, specifically, a temperature change within a time period from the detected temperature of the glass transition point (Tg) to the detected temperature of the strain point. In the present invention, the detected temperature described above and the temperature of the glass blank is the same.

Examples and Comparative Examples

Comparative Example 1B

In Comparative Example 1B illustrated in Table 3, a glass blank was prepared using a molten glass having a first glass composition. The molten glass had a glass transition point (Tg) of 510° C. and a strain point of 490° C. The cooling rate of a molten glass material was controlled to −12° C./second.

Comparative Example 2B

In Comparative Example 2B illustrated in Table 3, a glass blank was prepared using a molten glass having a first glass composition. The cooling rate of a molten glass material was controlled to −16° C./second.

Example 1B

In Example 1B illustrated in Table 3, a glass blank was prepared using a molten glass having a first glass composition. The cooling rate of a molten glass material was controlled to −2° C./second.

Example 2B

In Example 2B illustrated in Table 3, a glass blank was prepared using a molten glass having a first glass composition. The cooling rate of a molten glass material was controlled to −4° C./second.

Example 3B

In Example 3B illustrated in Table 3, a glass blank was prepared using a molten glass having a first glass composition. The cooling rate of a molten glass material was controlled to −8° C./second.

Example 4B

In Example 4B illustrated in Table 3, a glass blank was prepared using a molten glass having a second glass composition. The cooling rate of a molten glass material was controlled to −2° C./second.

Example 5B

In Example 5B illustrated in Table 3, a glass blank was prepared using a molten glass having a second glass composition. The cooling rate of a molten glass material was controlled to −4° C./second.

Example 6B

In Example 6B illustrated in Table 3, a glass blank was prepared using a molten glass having a second glass composition. The cooling rate of a molten glass material was controlled to −8° C./second.

The cooling rate from the temperature of the glass transition point (Tg) to the temperature of the strain point was controlled by covering the press unit with a thermal insulator and adjusting the thickness or material of the thermal insulator.

[Evaluation of Glass Blank Prepared in Example]

First, the flatness of the glass blank having a diameter of 75 mm, which had been prepared in Example, was measured. Next, the glass blank was subjected to a rapid heating treatment to elevate the temperature from room temperature to Tg for 20 seconds, retained for 10 seconds, and then gradually cooled for 10 minutes until the glass blank reached room temperature. Thereafter, the flatness and surface roughness (arithmetic mean roughness Ra) were measured, and an amount of change in flatness before and after the rapid heating treatment was determined. This rapid heating treatment is intended for a deposition treatment in the heat assisted magnetic recording system.

The flatness can be defined as a difference on the normal axis between the lowest position (trough) and the highest position (crest) on the principal plane of the glass blank when viewed from a fixed height on the normal axis from the horizontal plane with the glass blank placed on the horizontal plane. The flatness was measured using, for example, Flatness Tester FT-900 manufactured by NIDEK CO., LTD. Evaluation criteria for the flatness illustrated in Table 3 are as follows. It is preferred that the flatness of the glass blank is 8.0 µm or less in the following criteria because the flatness can be improved to a level of 4 µm or less, which is a target flatness of the glass substrate for magnetic disk. It is preferred that the flatness of the glass blank is 4.0 µm or less because the target flatness of the glass substrate for magnetic disk can be achieved even if the grinding process is omitted.

The surface roughness is represented by an arithmetic mean roughness Ra defined in JIS B0601:2001 and, for example, can be measured with a roughness measuring machine SV-3100 manufactured by Mitutoyo Corporation and calculated by a method defined in JIS B0633:2001 when the roughness is no less than 0.006 µm and no more than 200 µm. When as a result, the roughness is 0.03 µm or less, for example, the roughness can be measured with a scanning probe microscope (atomic force microscope; AFM) nanoscope manufactured by Veeco Japan Inc. and can be calculated by a method defined in JIS R1683:2007. In the present application, an arithmetic mean roughness Ra as measured in a resolution of 256×256 pixels in a measurement area of 10 µm×10 µm square was used. As a result, the surface roughness of the glass blank was 0.5 µm or less in all examples. This is because regardless of the temperature of the die, the inner circumferential surfaces of the first die and the second die are shape-transferred to the glass blank, so that the surface roughness of the glass blank is comparable to the surface roughness of the inner circumferential surfaces of the first die and the second die. When the arithmetical mean roughness Ra is 0.1 µm or less, target surface properties of the glass substrate for magnetic disk can be obtained by omitting the grinding process to the principal face and performing the polishing process directly.

It was found from Table 3 that a glass blank having a good flatness is obtained by controlling the cooling rate of the molten glass when the glass blank is press-formed. This indicates that a glass blank, the internal strain of which was reduced, was prepared by press forming. Particularly, when the rate of cooling of the molten glass from the glass transition point to the strain point was controlled to −8 to −2° C./second, a glass blank having a good flatness before and after heating was obtained. That is, when the decrease of the temperature was 10° C./second or less, the amount of change in flatness was controlled to 1 µm or less. Further, when the cooling rate was controlled to −2° C./second, a glass blank having the best amount of change in flatness before and after heating was obtained.

Furthermore, as is apparent from comparing Examples 2B, 3B and Example 5B, and 6B, when the cooling rate was the same, the amount of change in flatness before and after heating was smaller when the glass transition point (Tg) was 670° C. The reason for this is not clear; however, it is presumed that the thermal expansion coefficient of the second glass was lower. As described above, by using the glass blank described above, a glass substrate for magnetic disk and a magnetic disk, the internal strain of which is reduced, can be obtained without performing the annealing treatment.

As a result that the evaluation was carried out under the same condition as in Example 3B except for using glass having glass transition point (Tg) of 600° C. (Strain point: 590° C., thermal expansion coefficient: $85 \times 10^{-7} (K^{-1})$) and glass having glass transition point (Tg) of 650° C. (Strain point: 640° C., thermal expansion coefficient: $81 \times 10^{-7} (K^{-1})$), the amount of change in flatness before and after heating was 0.7 µm and 0.6 µm, respectively. Consequently, when the amount of change before and after heating was compared, the amount of change was smaller and better in order of (1) 670° C., 650° C., (2) 600° C., (3) 510° C. of glass transition point (Tg).

Third Example

Because the above described the first example and the second example can control the temperature within the press forming surface at the time of press forming by use of same members (thermally equalizing unit 125, temperature controlling unit 125), a glass blank can be prepared in such a manner that the first, example and the second example are combined. Specifically, with reference to Examples 1B to 6B, when a difference in temperature between the central portion and the circumferential edge portion of the press forming surface at the time of releasing the glass blank from the die

TABLE 3

|  | Glass transition point (Tg) | Strain point | Cooling rate | Flatness before heating | Flatness after heating | Amount of change in flatness before and after heating |
| --- | --- | --- | --- | --- | --- | --- |
| Comparative example 1 | 510° C. | 490° C. | −12° C./second | 3.8 µm | 8.8 µm | 5.0 µm |
| Comparative example 2 | 510° C. | 490° C. | −16° C./second | 4.0 µm | 14.1 µm | 10.1 µm |
| Example 1 | 510° C. | 490° C. | −2° C./second | 3.8 µm | 3.9 µm | 0.1 µm |
| Example 2 | 510° C. | 490° C. | −4° C./second | 2.8 µm | 3.2 µm | 0.4 µm |
| Example 3 | 510° C. | 490° C. | −8° C./second | 3.1 µm | 3.9 µm | 0.8 µm |
| Example 4 | 670° C. | 660° C. | −2° C./second | 3.5 µm | 3.6 µm | 0.1 µm |
| Example 5 | 670° C. | 660° C. | −4° C./second | 3.1 µm | 3.4 µm | 0.3 µm |
| Example 6 | 670° C. | 660° C. | −8° C./second | 2.9 µm | 3.5 µm | 0.6 µm | was measured, the difference was within the range of 4-6° C., which meant that the difference was 10° C. or less in each case. Furthermore, the surface waviness was 15-19 nm. The amount of change in flatness before and after heating was not changed. That is, a glass blank could be prepared which is good in surface waviness and amount of change in flatness before and after heating. This is because the cooling rate was controlled to eliminate the strain in the plane at the central portion and the circumferential edge portion of the molten glass over the time from starting of contact to releasing from the die, and was controlled to have less difference in temperature in the both portions at the time of releasing from the die, in spite that a difference in temperature in the central portion and the circumferential edge portion of the molten glass was generated immediately after the molten glass came into contact with the press forming surface.

The embodiments of the present invention have been described in detail, but the method for manufacturing a glass blank for magnetic disk, the method for manufacturing a glass substrate for magnetic disk, the glass blank for magnetic disk, the glass substrate for magnetic disk and the magnetic disk according to the present invention are not limited to the aforementioned embodiments, and it is needless to say that various modifications and changes may be made without departing from the spirit of the present invention.

<First Additional Disclosure>

Recently, a hard disk device (HDD) is incorporated in a personal computer or a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for magnetic disk because the glass substrate hardly plastically deformed as compared to a metallic substrate (aluminum substrate) and the like.

The magnetic head includes, for example, a magnetic resistance effect element, but such a magnetic head may cause a thermal asperity trouble as its specific trouble. The thermal asperity trouble is a trouble in which when a magnetic head passes over a micro-irregularly-shaped surface of a magnetic disk while floating and flying, a magnetic resistance effect element is heated by adiabatic compression or contact of air, causing a read error. Thus, for avoiding the thermal asperity trouble, the glass substrate for magnetic disk is prepared such that surface properties, such as the surface roughness and flatness, of the principal face of the glass substrate are at a satisfactory level.

As a conventional method for manufacturing a sheet glass (glass blank), a vertical direct press method is known. This press method is a method in which a lump of molten glass is fed onto a lower die, and the lump of molten glass (molten glass lump) is press-formed using an upper die (Japanese Patent Laid-open Publication No. 2009-269762, FIG. 4, etc.). The vertical direct press method requires a work gripping device for gripping a glass blank obtained after pressing and taking out the glass blank from a die.

The known vertical direct press method has the problem that the flatness (shape accuracy) of a glass blank prepared is poor. The reason for this is as follows.

In the vertical direct press method, immediately after a molten glass lump is placed on a lower die, only a contact surface with the lower die and a part close to the contact surface, of the molten glass lump, are rapidly cooled to be solidified. Since glass has low heat conductivity, an upper part of the molten glass lump (a part which comes into contact with an upper die) remains at a high temperature while the molten glass lump is in contact with the lower die. Thereafter, the upper part comes into contact with the upper die, and is thereby rapidly cooled to be solidified. Therefore, in the case of the vertical direct press method, there is a gap in timing at which the molten glass lump is cooled to be solidified between the lower side and the upper side of the molten glass lump during a process in which the molten glass lump is formed into a glass blank. As a result, the molten glass lump is warped in a concave way, so that the flatness of the glass blank is increased (deteriorated). The gap in timing cannot be drastically suppressed in light of the press system of the vertical direct press method.

In the vertical direct press method, a mold release material ((mold) release agent) such as, for example, BN (boron nitride) should be attached to the die beforehand in order to prevent a situation in which the molten glass lump is stuck to the lower die and cannot be removed, but when such a mold release material remains attached on the glass blank, the surface roughness cannot be decreased. Preferably the temperatures of the upper die and the lower die are made identical wherever possible for preparing a glass blank having good flatness, but when the mold release material is attached on the lower die, the heat conductivity of the lower die is deteriorated, and therefore it is difficult to uniformly cool both surfaces of the glass blank in a press forming process. Therefore, the glass blank prepared by the vertical direct press method absolutely requires removal processes by polishing/grinding and so on in subsequent processes in order to improve the flatness and remove the mold release material sticking to the surface of the glass blank.

Further, the vertical direct press method requires a work gripping device for gripping a glass blank obtained after pressing and taking out the glass blank from a die as described above, but when the glass blank on the die is gripped after pressing, the work gripping device may come into contact with the glass blank or die surface to damage the glass blank or die surface.

An object of the invention of the first additional disclosure is to provide a method for manufacturing a glass blank for magnetic disk, by which a glass blank for magnetic disk having a good flatness is obtained by press forming, and a method for manufacturing a glass substrate for magnetic disk.

In view of the above-described problems, the present inventors have intensively conducted studies, and resultantly devised a novel press forming method. That is, in a method for manufacturing a glass blank according to this embodiment, a horizontal direct press method is employed in which a falling molten glass lump is press-formed using a pair of dies (press forming die) arranged so as to face each other in a direction (horizontal direction) orthogonal to the falling direction of the molten glass lump. In the horizontal direct press method, unlike the conventional vertical direct press method, the molten glass lump is not temporarily retained in contact with a member having a temperature lower than that of the molten glass lump over a period of time until it is press-formed. Thus, at the time point immediately before press forming is started, the viscosity distribution of the interior of the molten glass lump becomes very wide during press forming in the vertical direct press method, whereas the viscosity distribution of the molten glass lump is kept even in the horizontal direct press of this embodiment. Accordingly, in the horizontal direct press method, it is extremely easy to uniformly thinly draw the molten glass lump to be press-formed as compared to the vertical direct press method. Consequently, as compared to the case where a glass blank is prepared using the vertical direct press method, it is extremely easy to drastically suppress deterioration of the flatness when a glass blank is prepared using the horizontal direct press method.

Meanwhile, in the horizontal direct press method, press forming is performed using a pair of dies arranged so as to face each other in a direction orthogonal to the falling direction of the molten glass lump, and therefore after the dies are opened, the press-formed glass blank falls down vertically due to its gravity in most cases. Thus, a work gripping device for taking out the glass blank from the die is not required, and therefore unlike the vertical direct press method, the glass blank or die is not damaged when the glass blank is taken out from the die.

However, the present inventors performed a large number of press forming operations using the devised horizontal direct press method described above, and resultantly found the fact that even after dies are opened, the glass blank is stuck to one of a pair of dies arranged in a horizontal direction. Since the sticking force of the glass blank to the die is not strong, a method was contemplated in which after the die is opened, air is discharged from the interior of the die toward the press forming surface (i.e. in the horizontal direction), and the glass blank is detached from the die by means of the discharge force. This method was capable of detaching the glass blank from the die, but had the problem that the flatness of the glass blank is deteriorated when the glass blank is mass-produced. The reason for this is as follows. That is, which of a pair of dies the glass blank is stuck to is unknown unless the dies are opened. Thus, discharge of air in the horizontal direction must be performed for both the dies. Consequently, the degree of cooling of the die by discharge of air varies, between the die to which the glass blank is stuck and the die to which the glass blank is not stuck, so that the next molten glass lump is pressed while there is a large difference in temperature between the dies. When press forming is performed while there is a large difference in temperature between the dies, the cooling process varies between one surface and the other surface of the glass blank which is press-formed, so that a deformation is generated, resulting in deterioration of the flatness.

As described above, when a factor of increasing a difference in temperature between dies exists between press forming of a molten glass and press forming of the next molten glass, the flatness of a glass blank prepared based on the next molten glass is deteriorated. The present inventors devised, on the basis of the above-described findings, a method in which the flatness of a glass blank is not deteriorated even when a factor of increasing a difference in temperature between dies exists between press forming of a molten glass and press forming of the next molten glass. This method includes reducing a difference in temperature between portions of a pair of dies, which contact a molten glass, by bringing the aforementioned portions and a thermally equalizing material into surface contact with each other over a period of time until a new molten glass is caused to fall down for press forming after a glass blank stuck to one of the dies is taken out from the die after the dies are opened. According to this method, even when treatment which causes a factor of increasing a difference in temperature between dies, such as, for example, treatment for detaching a glass blank from a die as described above. The temperatures of a pair of dies can be equalized in a short time at the time when the next molten glass is press-formed, so that glass blanks having a good flatness can be continuously obtained when molten glasses are continuously press-formed (i.e. in the mass production process).

From the viewpoint described above, the present invention may be a method for manufacturing a glass blank for magnetic disk, which includes a forming process of forming a plate-shaped glass blank by press-forming a falling molten glass in a direction orthogonal to the falling direction using a pair of dies, wherein the forming process includes a thermally equalizing process for reducing a difference in temperature between the pair of dies over a period of time until a new molten glass is press-formed after the dies are opened.

In the method for manufacturing a glass blank for magnetic disk, the thermally equalizing process may be a process of bringing a thermally equalizing material into contact with at least one of the pair of dies.

In the method for manufacturing a glass blank for magnetic disk, in the forming process, preferably press forming may be performed so that the temperature of a portion of the die, which contacts the molten glass, is substantially identical between the pair of dies.

In the method for manufacturing a glass blank for magnetic disk, the temperature of the pair of dies may be kept lower than the glass transition point (Tg) of the molten glass over a period of time until the glass blank is separated from the die after contacting the die.

In the method for manufacturing a glass blank for magnetic disk, press forming may be performed without attaching a mold release material to the die.

In a method for manufacturing a glass substrate for magnetic disk according to the present invention, a glass blank for magnetic disk is subjected to polishing processing having a machining allowance of 50 μm or less to manufacture a glass substrate for magnetic disk, the glass blank being manufactured with the above-described method for manufacturing a glass blank for magnetic disk.

In a method for manufacturing a glass substrate for magnetic disk according to the present invention, a glass substrate for magnetic disk may be manufactured using a glass blank for magnetic disk, the glass blank being obtained by the above-described method for manufacturing a glass blank for magnetic disk.

According to the present invention, a glass blank for magnetic disk, which has a good flatness, is obtained by press forming, and when the glass blank is taken out from a die, the glass blank or die is not damaged.

[Explanation of Embodiment in First Additional Disclosure]

A method for manufacturing a glass blank for magnetic disk and a method for manufacturing a glass substrate for magnetic disk in this embodiment will be described in detail below.

[Glass Substrate for Magnetic Disk]

Figure 10:
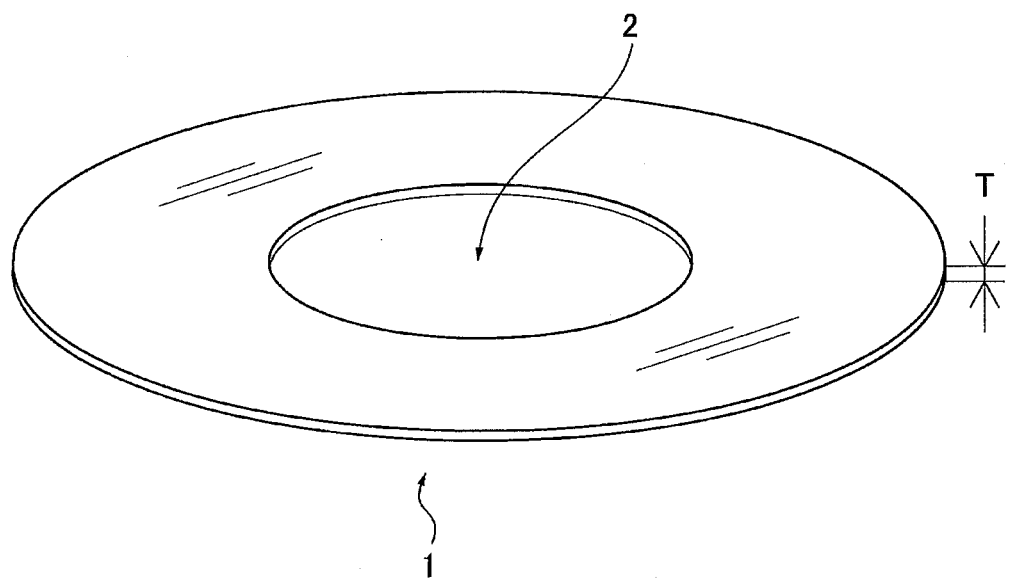
FIG. 10 is a perspective view illustrating an external shape of a glass substrate for magnetic disk of an embodiment.

As illustrated in FIG. 10, a glass substrate for magnetic disk 1 in this embodiment is a donut-shaped thin glass substrate. The size of the glass substrate for magnetic disk is not limited but for example, a glass substrate for magnetic disk having a nominal diameter of 2.5 inches is suitable. In the case of the glass substrate for magnetic disk having a nominal diameter of 2.5 inches, for example, the outer diameter is 65 mm, the diameter of a central hole 2 is 20 mm, and the thickness T is 0.6 to 1.0 mm. The flatness of the principal face of the glass substrate for magnetic disk of the embodiment is, for example, 4 μm or less, and the surface roughness (arithmetic mean roughness Ra) of the principal face is, for example, 0.2 nm or less. It is to be noted that the flatness required for a substrate for magnetic disk as a final product is, for example, 4 μm or less.

Aluminosilicate glass, soda-lime glass, borosilicate glass or the like can be used as a material of the glass substrate for magnetic disk in this embodiment. Particularly, the aluminosilicate glass can be suitably used in that chemically strengthening can be performed, and a glass substrate for magnetic disk excellent in flatness of the principal face and strength of the substrate can be prepared.

The composition of the glass substrate for magnetic disk of this embodiment is not limited, but the glass substrate of this embodiment is preferably made of aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol %.

[Method for Manufacturing Glass Substrate for Magnetic Disk of Embodiment]

Figure 11:
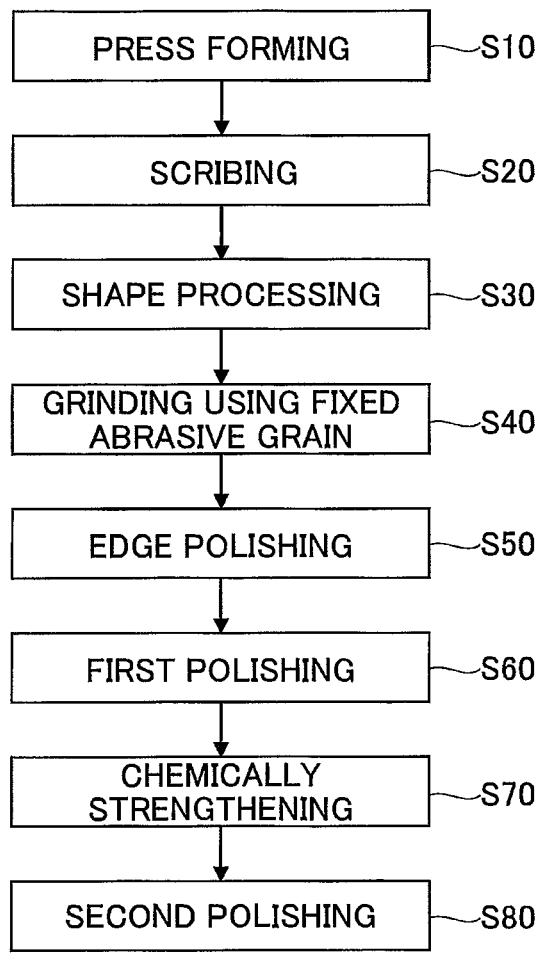
FIG. 11 is a view illustrating a flow of one embodiment of a method for manufacturing the glass substrate for magnetic disk of the embodiment.

Next, a flow of a method for manufacturing a glass substrate for magnetic disk will be described with reference to FIG. 11. FIG. 11 is a view illustrating a flow of one embodiment of a method for manufacturing a glass substrate for magnetic disk.

As illustrated in FIG. 11, in the method for manufacturing a glass substrate for magnetic disk in this embodiment, first a disk-shaped glass blank is prepared by press forming (Step S10). Next, the formed glass blank is scribed to prepare a donut-shaped glass substrate (Step S20). Next, the scribed glass substrate is subjected to shape processing (chamfering processing) (Step S30).

Next, the glass substrate is subjected to grinding using a fixed abrasive grain (Step S40). Next, edge polishing of the glass substrate is performed (Step S50). Next, the principal face of the glass substrate is subjected to first polishing (Step S60). Next, the glass substrate, after first polishing, is subjected to chemically strengthening (Step S70). Next, the chemically strengthened glass substrate is subjected to second polishing (Step S80). The glass substrate for magnetic disk is obtained through the above processes.

Each process will be described in detail below.

(a) Press Forming Process (Step S10)

Figure 12:
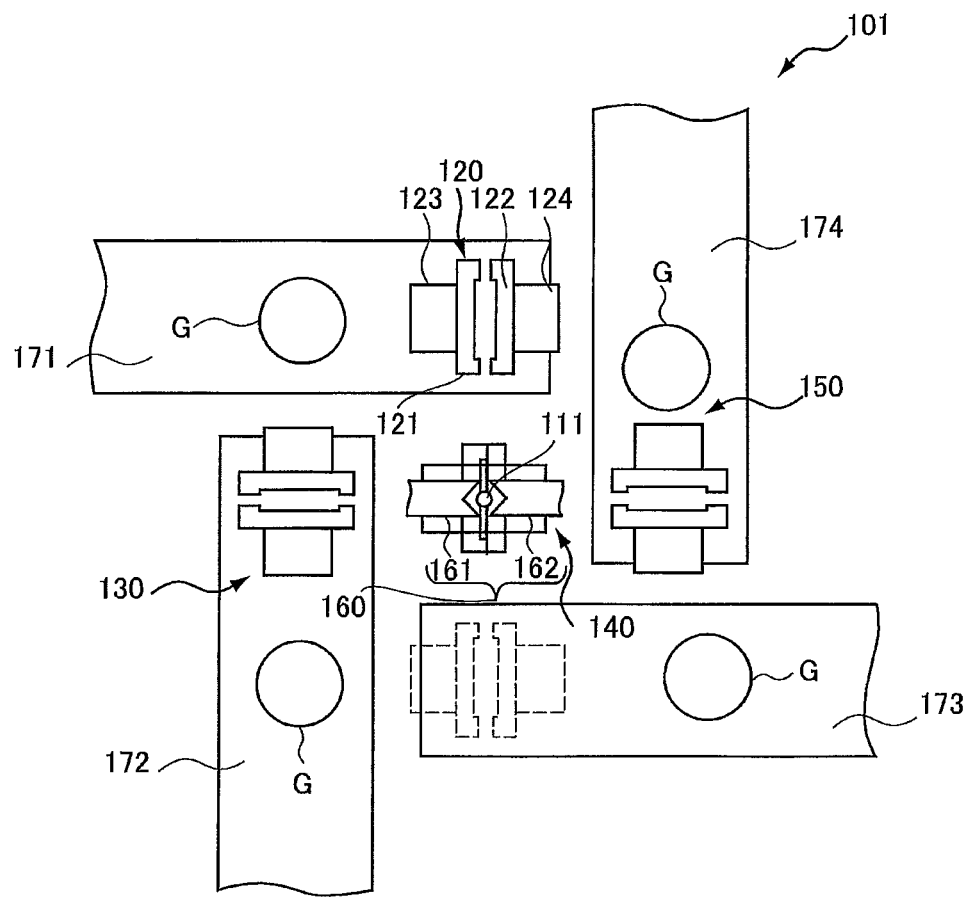
FIG. 12 is a plan view of an apparatus used in press forming of the embodiment.

First, the press forming process will be described with reference to FIG. 12. FIG. 12 is a plan view of an apparatus used in press forming. As illustrated in FIG. 12, an apparatus 101 includes four sets of press units 120, 130, 140 and 150, a cutting unit 160 and a cutting blade 165 (not illustrated in FIG. 11). The cutting unit 160 is provided on a path of a molten glass that flows out from a molten glass outflow, port 111. In the apparatus 101, a lump of molten glass (hereinafter, also referred to as a gob) cut by the cutting unit 160 is caused to fall down, and the lump is pressed from both sides of the falling path of the lump while the lump is sandwiched between surfaces of a pair of dies facing each other, thereby forming the glass blank.

Figure 13:
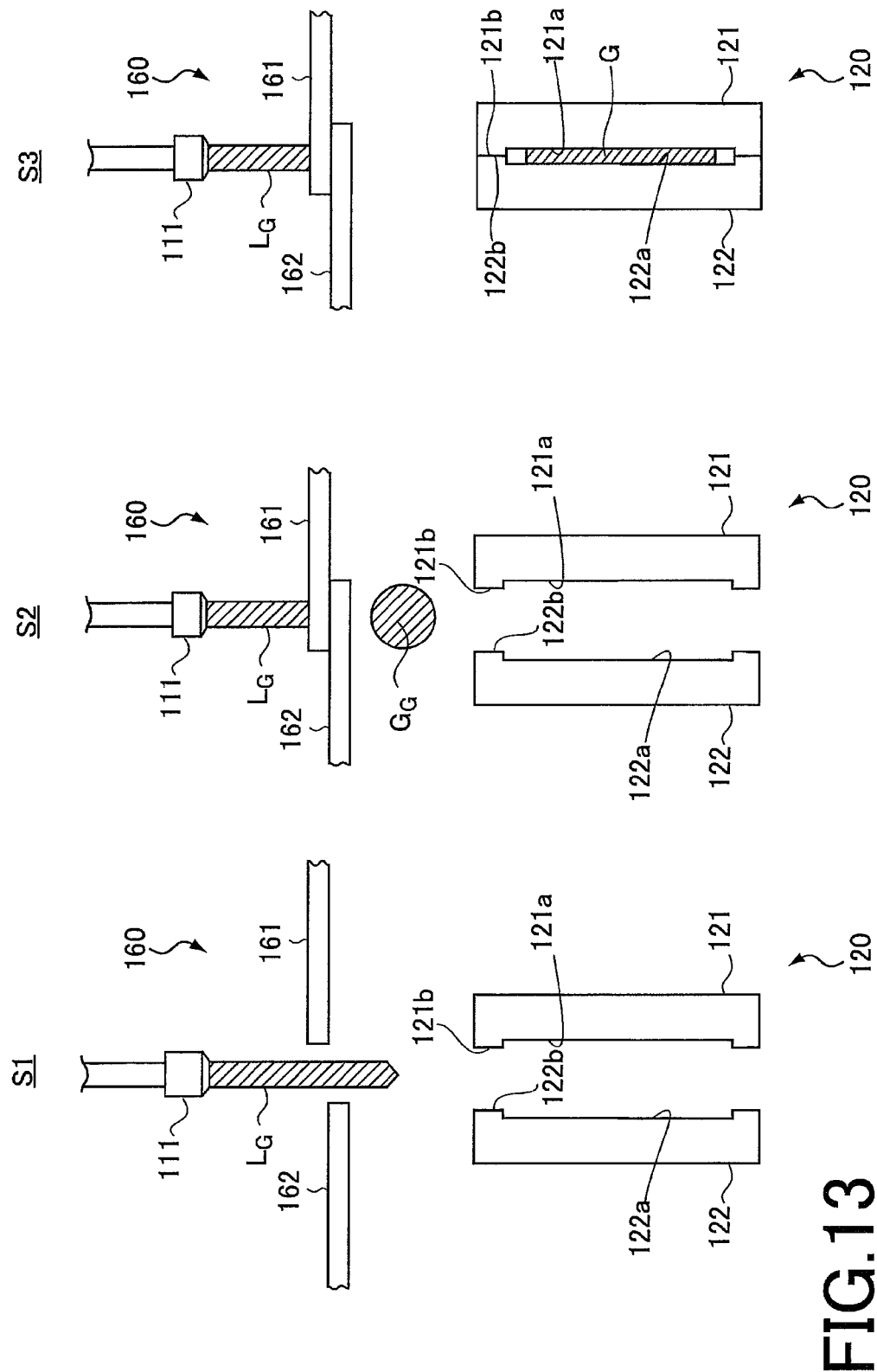
FIG. 13 is a view explaining one example of press forming performed by the apparatus illustrated in FIG. 12.

Specifically, as illustrated in FIG. 13, in the apparatus 101, the four sets of press units 120, 130, 140, and 150 are provided at intervals of 90 degrees around the molten glass outflow port 111.

Each of the press units 120, 130, 140, and 150 is driven by a moving mechanism (not illustrated) so as to be able to proceed and retreat with respect to the molten glass outflow port 111. That is, each of the press units 120, 130, 140, and 150 can be moved between a catch position and a retreat position. The catch position (position in which the press unit 140 is drawn by a solid line in FIG. 12) is located immediately below the molten glass outflow port 111. The retreat position (positions in which the press units 120, 130, and 150 are drawn by solid lines and a position in which the press unit 140 is drawn by a broken line in FIG. 12) is located away from the molten glass outflow port 111.

The cutting unit 160 is provided on a path of the molten glass between the catch position (position in which the gob is captured by the press unit) and the molten glass outflow port 111. The cutting unit 160 forms the lump of molten glass by cutting a proper quantity of the molten glass flowing out from the molten glass outflow port 111. The cutting unit 160 includes a pair of cutting blades 161 and 162. The cutting blades 161 and 162 are driven so as to intersect each other on the path of the molten glass at constant timing. When the cutting blades 161 and 162 intersect each other, the molten glass is cut to obtain the gob. The obtained gob falls down toward the catch position.

The press unit 120 includes a first die 121, a second die 122, a first driving unit 123 and a second driving unit 124. Each of the first die 121 and the second die 122 is a plate-shaped member including a surface used to perform the press forming for the gob. The first die 121 and the second die 122 are disposed such that normal directions of the surfaces become substantially horizontal, and such that the surfaces become parallel to each other. The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other, for example, a mechanism in which an air cylinder or a solenoid and a coil spring are combined.

Because the structures of the press units 130, 140, and 150 are similar to that of the press unit 120, the descriptions of the press units 130, 140, and 150 are omitted.

After each press unit moves to the catch position, the falling gob is sandwiched between the first die and the second die by driving the first driving unit and the second driving unit, and the gob is formed into a predetermined thickness while rapidly cooled, thereby preparing a circular glass blank G. Next, after the press unit moves to the retreat position, the first die and the second die are separated to cause the formed glass blank G to fall down. A first conveyer 171, a second conveyer 172, a third conveyer 173, and a fourth conveyer 174 are provided below the retreat positions of the press units 120, 130, 140, and 150, respectively. Each of the first to fourth conveyers 171 to 174 receive the glass blank G falling down from the corresponding press unit, and the conveyer conveys the glass blank G to an apparatus (not illustrated) of the next process.

The apparatus 101 is configured such that the press units 120, 130, 140, and 150 sequentially move to the catch position and move to the retreat position while the gob is sandwiched, so that the glass blank G can continuously be formed without waiting for the cooling of the glass blank G in each press unit.

S1 of FIG. 13 to S3 of FIG. 13 more specifically illustrates press forming performed by the apparatus 101. S1 of FIG. 13 is a view illustrating the state before the gob is made, S2 of FIG. 13 is a view illustrating the state in which the gob is made by the cutting unit 160, and S3 of FIG. 13 is a view illustrating the state in which the glass blank G is formed by pressing the gob.

As illustrated in S1 of FIG. 13, a molten glass material $L_G$ continuously flows out from the molten glass outflow port 111. At this point, the cutting unit 160 is driven at predetermined timing to cut the molten glass material $L_G$ using the cutting blades 161 and 162 (S2 of FIG. 13). Therefore, the cut molten glass becomes a substantially spherical gob $G_G$ due to a surface tension thereof. Adjustment of the outflow quantity per time of the molten glass material $L_G$ and the driving interval of the cutting unit 160 may be appropriately performed according to a volume determined by the target size and thickness of the glass blank G.

The made gob $G_G$ falls down toward a gap between the first die 121 and second die 122 of the press unit 120. At this point, the first driving unit 123 and the second driving unit 124 (see FIG. 13) are driven such that the first die 121 and the second die 122 come close to each other at the timing the gob $G_G$ enters the gap between the first die 121 and the second die 122. Therefore, as illustrated in S3 of FIG. 13, the gob $G_G$ is captured (caught) between the first die 121 and the second die 122. An inner circumferential surface 121a of the first die 121 and an inner circumferential surface 122a of the second die 122 come close to each other with a micro gap, and the gob $G_G$ sandwiched between the inner circumferential surface 121a of the first die 121 and the inner circumferential surface 122a of the second die 122 is formed into a thin-plate shape. A projection 121b and a projection 122b are provided in the first inner circumferential surface 121a of the first die 121 and the second inner circumferential surface 122a of the second die 122, respectively, in order to keep the gap between the inner circumferential surface 121a of the first die 121 and the inner circumferential surface 122a of the second die 122 constant. That is, the projection 121b and the projection 122b abut against each other, whereby the gap between the inner circumferential surface 121a of the first die 121 and the inner circumferential surface 122a of the second die 122 is kept constant, so that a plate-shaped space is generated.

Press forming is performed using a pair of dies 121 and 122 in the press forming process in press forming in this embodiment, and the outer shape of the glass blank is not restricted by the shape of the die. That is, as illustrated in S3 of FIG. 13, the gob stretched by closed dies does not reach projections 121b and 122b of the dies.

A temperature control mechanism (not illustrated) is provided in each of the first die 121 and second die 122, and temperatures at the first die 121 and second die 122 are retained lower than the glass transition point (Tg) of the molten glass $L_G$ over a period of time until the glass blank G is separated from the die after contacting the die. Therefore, it is not necessary to attach a mold release material to the first die 121 and the second die 122 in the press forming process.

There is a correlation between a difference in temperature at a position where the inner circumferential surface 121a of the first die 121 and the inner circumferential surface 122a of the second die 122 face each other at the time of pressforming the gob $G_G$, and a flatness of the glass blank obtained after press forming. That is, the flatness of the glass blank obtained after press forming becomes better as the difference in temperature at an opposed position between the inner circumferential surface 121a of the first die 121 and the inner circumferential surface 122a of the second die 122 decreases. This is because when the difference in temperature between a pair of dies is smaller, a thermal balance is achieved when the gob $G_G$ at a high temperature comes into contact the inner circumferential surface of the die and is thereby rapidly cooled, so that deterioration of the flatness of the glass blank that may be caused by a very small difference in degree of heat deformation between a pair dies at the cooling stage can be further suppressed.

Thus, if this correlation is known, a maximum value of a difference in temperature (absolute value) between a air of dies (between the inner circumferential surface 121a of the first die 121 and the inner circumferential surface 122a of the second die 122) for achieving a flatness required for the glass substrate for magnetic disk can be determined. Thus, when a difference in temperature between a pair of dies is controlled so as not to exceed its maximum value, a flatness required for the glass substrate for magnetic disk can be achieved. For example, if the flatness required for the glass substrate for magnetic disk is 4 μm, press forming is performed while the difference in temperature between a pair of dies is kept at 10° C. or less.

The difference in temperature may be appropriately determined from the correlation according to the flatness required for the glass substrate for magnetic disk, but the difference in temperature may also be determined from the following standpoint.

Since glass substrate for magnetic disk of this embodiment is incorporated while being pivotally supported by a metallic spindle having a high thermal expansion coefficient within a hard disk as a magnetic disk that is a final product, the thermal expansion coefficient of the glass substrate for magnetic disk is preferably as high as that of the spindle. Therefore, the composition of the glass substrate for magnetic disk is defined so that the glass substrate for magnetic disk has a high thermal coefficient. The thermal expansion coefficient of the glass substrate for magnetic disk is, for example, in a range of 30 to $100 \times 10^{-7} (K^{-1})$, preferably in a range of 50 to $100 \times 10^{-7} (K^{-1})$. The thermal expansion coefficient is a value calculated using the linear expansion coefficients of the glass substrate for magnetic disk at temperatures of 100° C. and 300° C. A thermal expansion coefficient of, for example, less than $30 \times 10^{-7} (K^{-1})$ or more than $100 \times 10^{-7}$ is not preferable because a difference in thermal expansion coefficient between the glass substrate and the spindle is increased. From the point of view, temperature conditions at the circumference of the principal face of the glass blank are made uniform in the press forming process when a glass substrate for magnetic disk having a high thermal expansion coefficient is prepared. As one example, it is preferable to perform temperature control so that the temperatures of the inner circumferential surface 121a of the first die 121 and the inner circumferential surface 122a of the second die 122 become substantially identical. When temperature control is performed so that the temperatures become identical, for example, a difference in temperature is preferably 5° C. or less. The difference in temperature is more preferably 3° C. or less, especially preferably 1° C. or less.

The difference in temperature between dies is a difference in temperature as measured using a thermocouple at a point which is located 1 mm from each of the front faces of the inner circumferential surface 121a of the first die 121 and the inner circumferential surface 122a of the second die 122 to the inside of the die and at which the inner circumferential surface 121a and the inner circumferential surface 122a face each other (e.g. a point corresponding to the central position of the glass blank and central points of the inner circumferential surface 121a and the inner circumferential surface 122a).

A time until the gob $G_G$ is completely confined between the first die 121 and the second die 122 after the gob $G_G$ comes into contact with the inner circumferential surface 121a of the first die 121 or the inner circumferential surface 122a of the second die 122, is as extremely short as about 0.06 second in the apparatus 101. Therefore, the gob $G_G$ is formed into the substantially disk shape by spreading along the inner circumferential surface 121a of the first die 121 and the inner circumferential surface 122a of the second die 122 within an extremely short time, and the gob $G_G$ is rapidly cooled and solidified in the form of amorphous glass. In this way, the glass blank G is prepared. The size of the glass blank G formed in this embodiment is, depending on the size of a desired glass substrate for magnetic disk, for example about 20 to 200 mm in diameter.

In the press forming method of this embodiment, the glass blank G is formed in a manner such that the inner circumferential surface 121a of the first die 121 and the inner circumferential surface 122a of the second die 122 are shape-transferred, and therefore preferably the flatness and the smoothness of each of the inner circumferential surfaces of a pair of dies are made comparable to those of a desired glass substrate for magnetic disk. In this case, necessity to subject the glass blank G to a surface processing process, i.e. a grinding and polishing process after press forming may be eliminated. That is, the glass blank G formed in the press forming method of this embodiment may have a thickness identical to the target thickness of the glass substrate for magnetic disk that is finally obtained. For example, the glass blank G is a disk-shaped sheet having a thickness of 0.2 to 1.1 mm. The surface roughness of each of the inner circumferential surface 121a and the inner circumferential surface 122a is preferably adjusted to 0.0005 to 0.05 µm so that the arithmetic mean roughness Ra of the glass blank G is 0.001 to 0.1 µm.

After the first die 121 and the second die 122 are closed, the press unit 120 quickly moves to the retreat position, instead the press unit 130 moves to the catch position, and the press unit 130 performs the pressing to the gob $G_G$.

After the press unit 120 moves to the retreat position, the first die 121 and the second die 122 are kept closed until the glass blank G is sufficiently cooled (at least until the glass blank G has a temperature below a yield point). Then, the first driving unit 123 and the second driving unit 124 are driven to separate the first die 121 and the second die 122, the glass blank G falls down from the press unit 120, and the conveyer 171 located below the press unit 120 receives the glass blank G (see FIG. 12).

As described above, in the apparatus 101, the first die 121 and the second die 122 are closed within a time as extremely short as 0.1 second (about 0.06 second), and the molten glass substantially simultaneously comes into contact with the whole of the inner circumferential surface 121a of the first die 121 and the whole of the inner circumferential surface 122a of the second die 122. Therefore, the inner circumferential surface 121a of the first die 121 and the inner circumferential surface 122a of the second die 122 are not locally heated, and a deformation is hardly generated in the inner circumferential surface 121a and the inner circumferential surface 122a. Because the molten glass is formed into the disk shape before the heat transfers from the molten glass to the first die 121 and the second die 122, a temperature distribution of the formed molten glass becomes substantially even. Therefore, in cooling the molten glass, variation of the shrinkage quantity of the glass material is small, and the large deformation is not generated in the glass blank G. Accordingly, the flatness of the principal face of the prepared glass blank G is improved as compared to a glass blank prepared by conventional press forming with an upper die and a lower die.

In the example illustrated in FIG. 13, the substantially spherical gob $G_G$ is formed by cutting the flowing-out molten glass $L_G$ using the cutting blades 161 and 162. However, when viscosity of the molten glass material $L_G$ is small with respect to a volume of the gob $G_G$ to be cut, the glass does not become the substantially spherical shape only by cutting the molten glass $L_G$, and the gob is not formed. In such cases, a gob forming die is used to form the gob.

Figure 14:
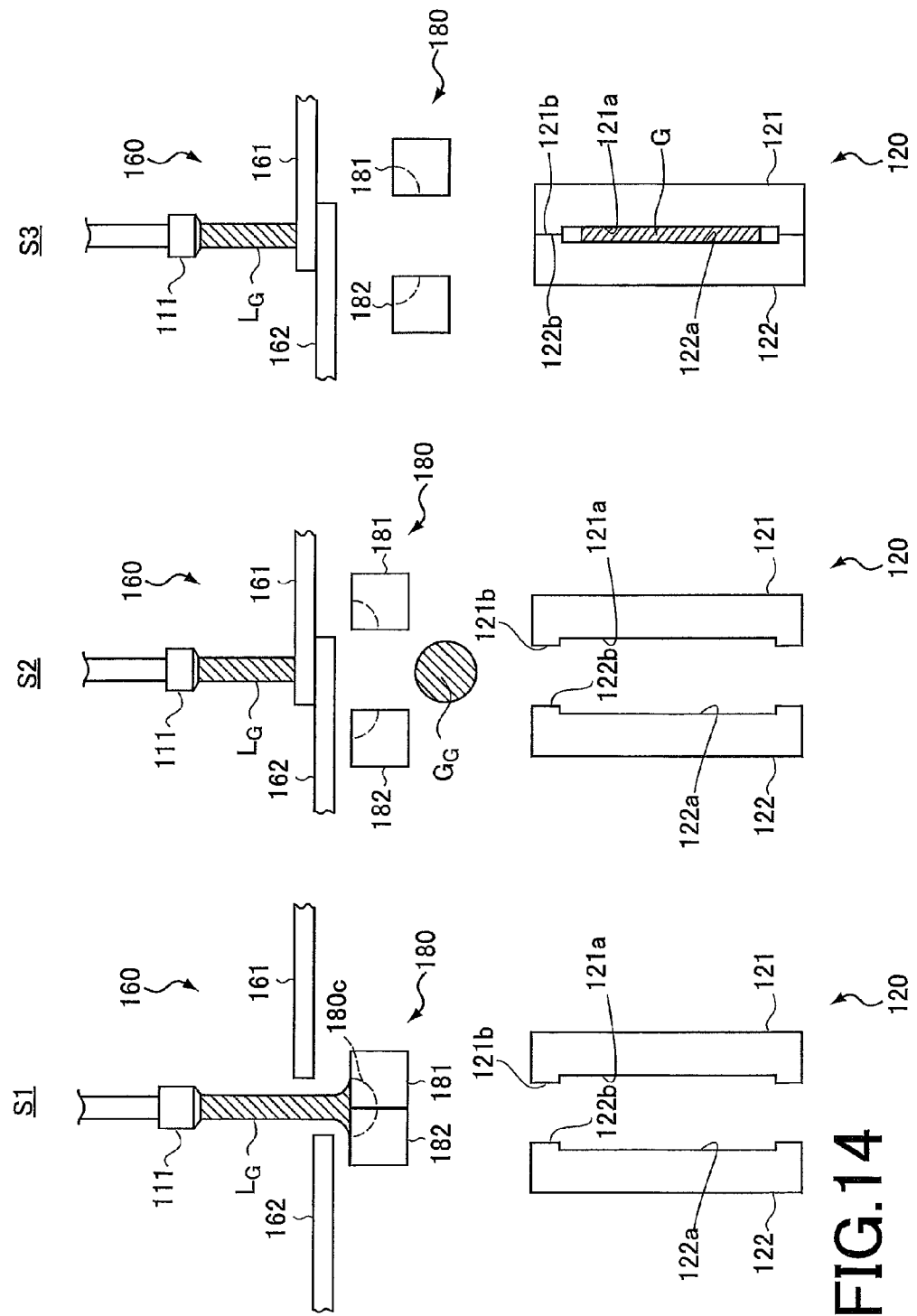
FIG. 14 is a view illustrating a modification of press forming of the embodiment using a gob forming die.

S1 of FIG. 14 to S3 of FIG. 14 are views illustrating a modification of the embodiment of FIG. 13. The gob forming die is used in the modification. S1 of FIG. 14 is a view illustrating the state before the gob is made, S2 of FIG. 14 is a view illustrating the state in which the gob $G_G$ is made by the cutting unit 160 and a gob forming die 180, and S3 of FIG. 14 is a view illustrating the state in which the press forming is performed to the gob $G_G$ to make the glass blank G.

As illustrated in S1 of FIG. 14, the path of the molten glass $L_G$ to the press unit 120 is closed by closing the blocks 181 and 182, and the lump of the molten glass $L_G$ cut with the cutting unit 160 is received by a recess 180C formed by the block 181 and 182. Then, as illustrated in S2 of FIG. 14, the molten glass $L_G$ that becomes the spherical shape in the recess 180C falls down toward the press unit 120 at one time by opening the blocks 181 and 182. When falling down toward the press unit 120, the gob $G_G$ becomes the spherical shape by the surface tension of the molten glass $L_G$. As illustrated in S3 of FIG. 14, during the fall of the gob $G_G$, the spherical gob $G_G$ is sandwiched between the first die 121 and the second die 122 to perform the press forming, thereby preparing the disk-shaped glass blank G.

Figure 15:
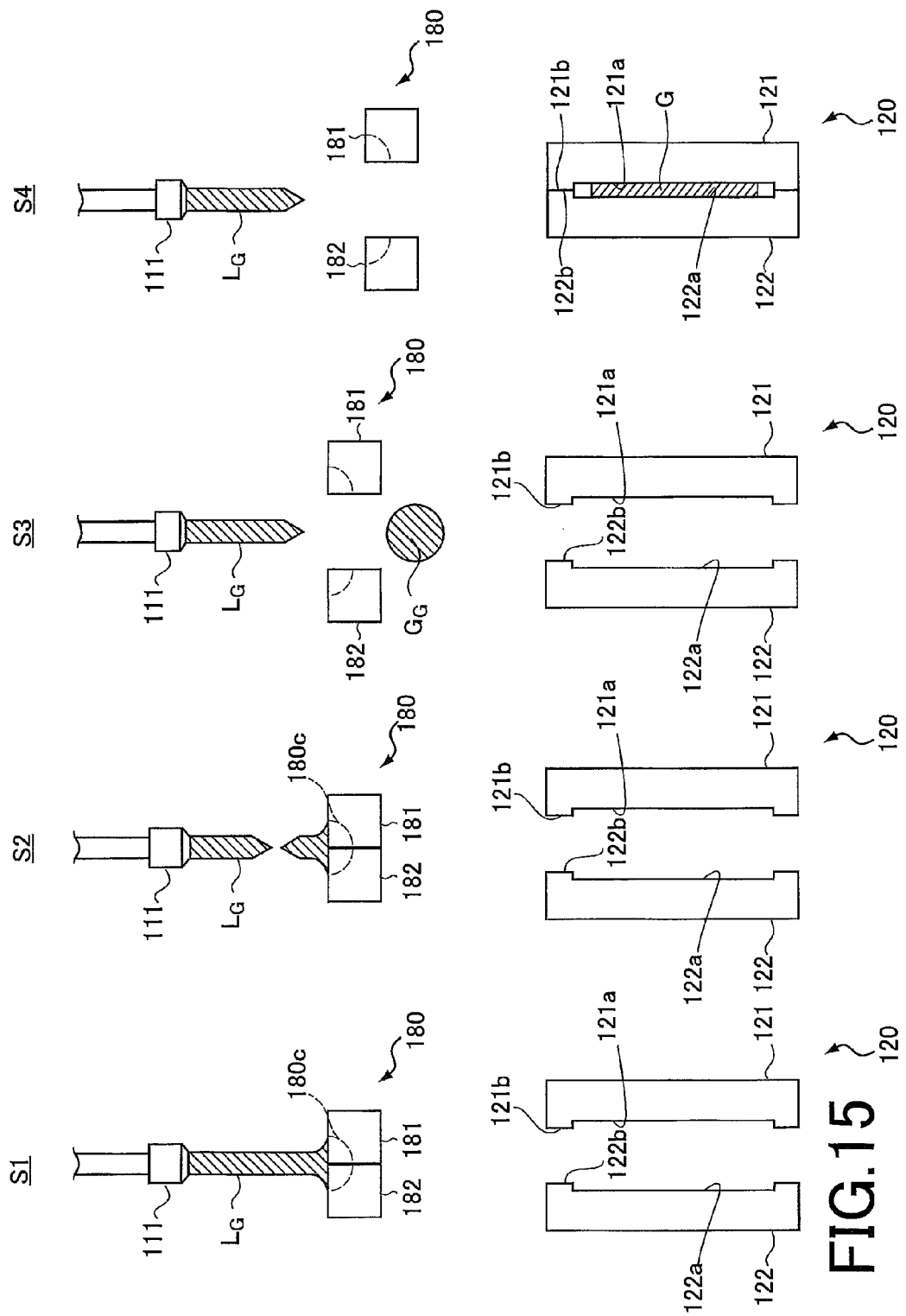
FIG. 15 is a view illustrating a modification of press forming of the embodiment in which a cutting unit is not used.

Alternatively, as illustrated in S1 of FIG. 15 to S4 of FIG. 15, in the apparatus 101, instead of using the cutting unit 160 illustrated in S1 of FIG. 14 to S3 of FIG. 14, a moving mechanism that moves the gob forming die 180 in an upstream direction or a downstream direction along the path of the molten glass $L_G$ may be used. S1 of FIG. 15 to S4 of FIG. 15 are views illustrating a modification in which the gob forming die 180 is used. S1 and S2 of FIG. 15 are views illustrating the state before the gob $G_G$ is made, S3 of FIG. 15 is a view illustrating the state in which the gob $G_G$ is made by the gob forming die 180, and S4 of FIG. 15 is a view illustrating the state in which the gob $G_G$ is subjected to press forming to make the glass blank G.

As illustrated in S1 of FIG. 15, the recess 180C formed by the block 181 and 182 receives the molten glass $L_G$ flowing, out from the molten glass outflow port 111. As illustrated in S2 of FIG. 15, the blocks 181 and, 182 are quickly moved onto the downstream side of the flow of the molten glass $L_G$ at predetermined timing. In this way, the molten glass $L_G$ is cut. Then, as illustrated, in S3 of FIG. 15, the blocks 181 and 182 are separated at predetermined timing. Therefore, the molten glass $L_G$ retained by the blocks 181 and 182 falls down at one time, and the gob $G_G$ becomes the spherical shape by the surface tension of the molten glass $L_G$. As illustrated in S4 of FIG. 15, during the fall of the gob $G_G$, the spherical gob $G_G$ is sandwiched between the first die 121 and the second die 122 to perform the press forming, thereby preparing the disk-shaped glass blank G.

Figure 16:
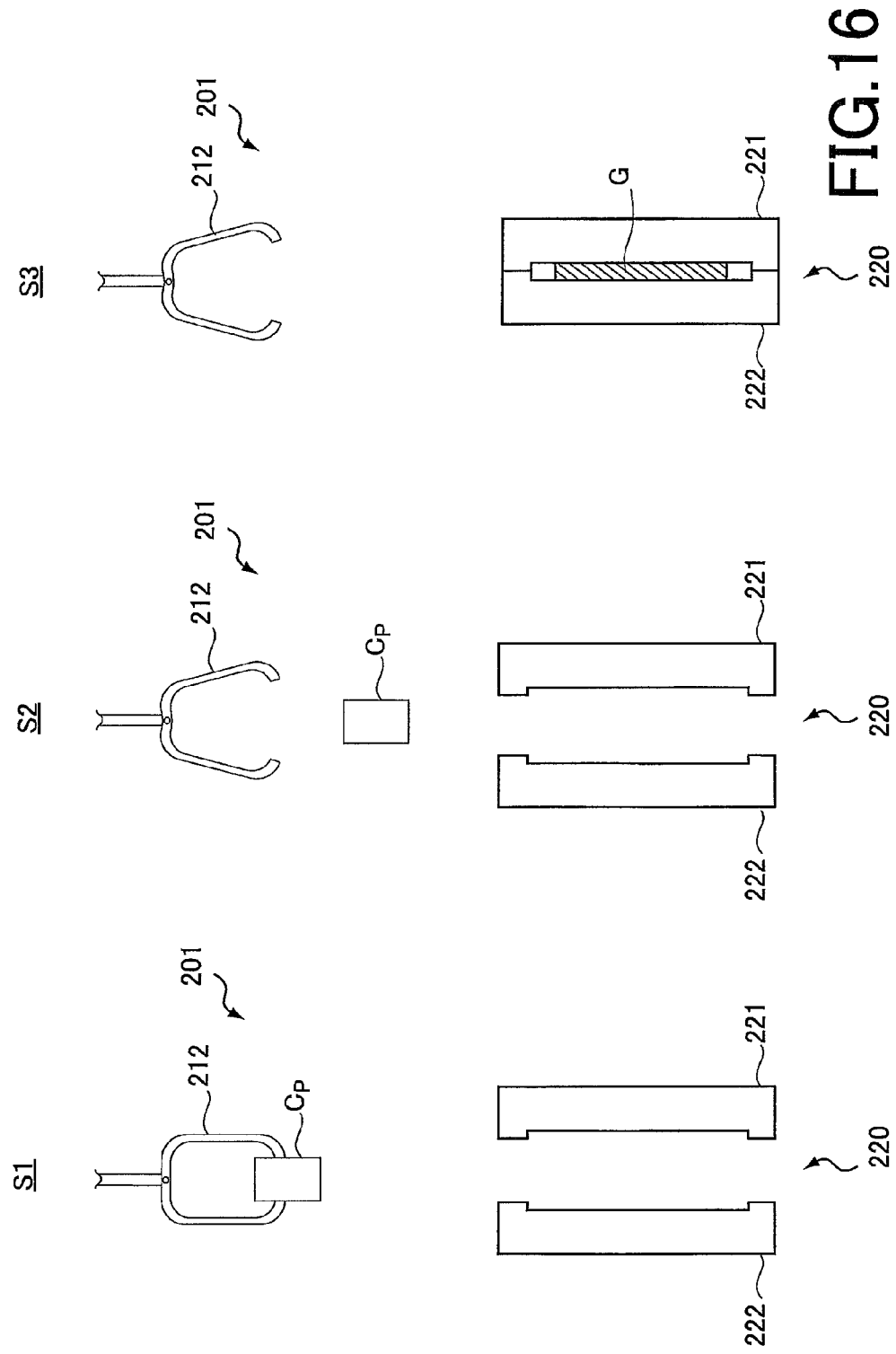
FIG. 16 is a view illustrating a modification of press forming of the embodiment using an optical glass heated by a softening furnace.

S1 of FIG. 16 to S3 of FIG. 16 are views illustrating another modification in which, instead of the gob $G_G$, a lump $C_P$ of the optical glass heated by a softening furnace (not illustrated) is caused to fall down and the press forming is performed to the lump $C_P$ while the lump $C_P$ is sandwiched from both sides between dies 221 and 222 during the fall of the lump $C_P$. S1 of FIG. 16 is a view illustrating the state before the lump of the heated optical glass is formed, S2 of FIG. 16 is a view illustrating the state in which the lump of the optical glass falls down, and S3 of FIG. 16 is a view illustrating the state in which the press forming is performed to the lump of the optical glass to make the glass blank G.

As illustrated in S1 of FIG. 16, in an apparatus 201, a glass material grasping mechanism 212 conveys the lump $C_P$ of the optical glass to a position above a press unit 220. As illustrated in S2 of FIG. 16, the glass material grasping mechanism 212 releases the lump $C_P$ of the optical glass to cause the lump $C_P$ of the optical glass to fall down. As illustrated in S3 of FIG. 16, during the fall of the lump $C_P$ of the optical glass, the lump $C_P$ is sandwiched between the first die 221 and the second die 222 to perform the press forming, thereby preparing the disk-shaped glass blank G. Because the first die 221 and the second die 222 have the same configuration and action as those of the first die 121 and second die 122 illustrated in FIG. 14, the descriptions are omitted.

[Thermally Equalizing Treatment of Die]

Figure 17:
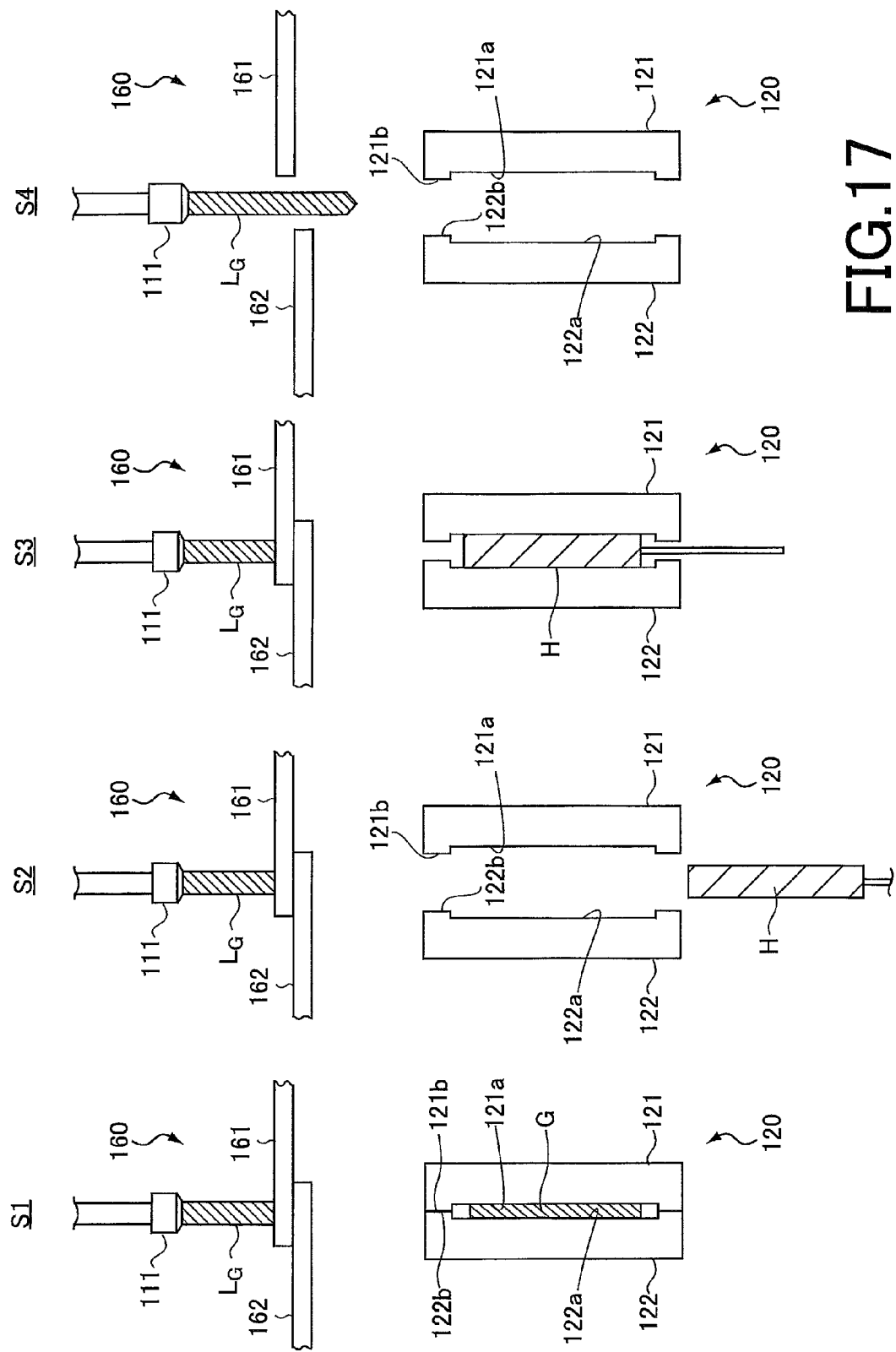
FIG. 17 is a view for explaining thermally equalizing treatment of dies in press forming of an embodiment.
Figure 18:
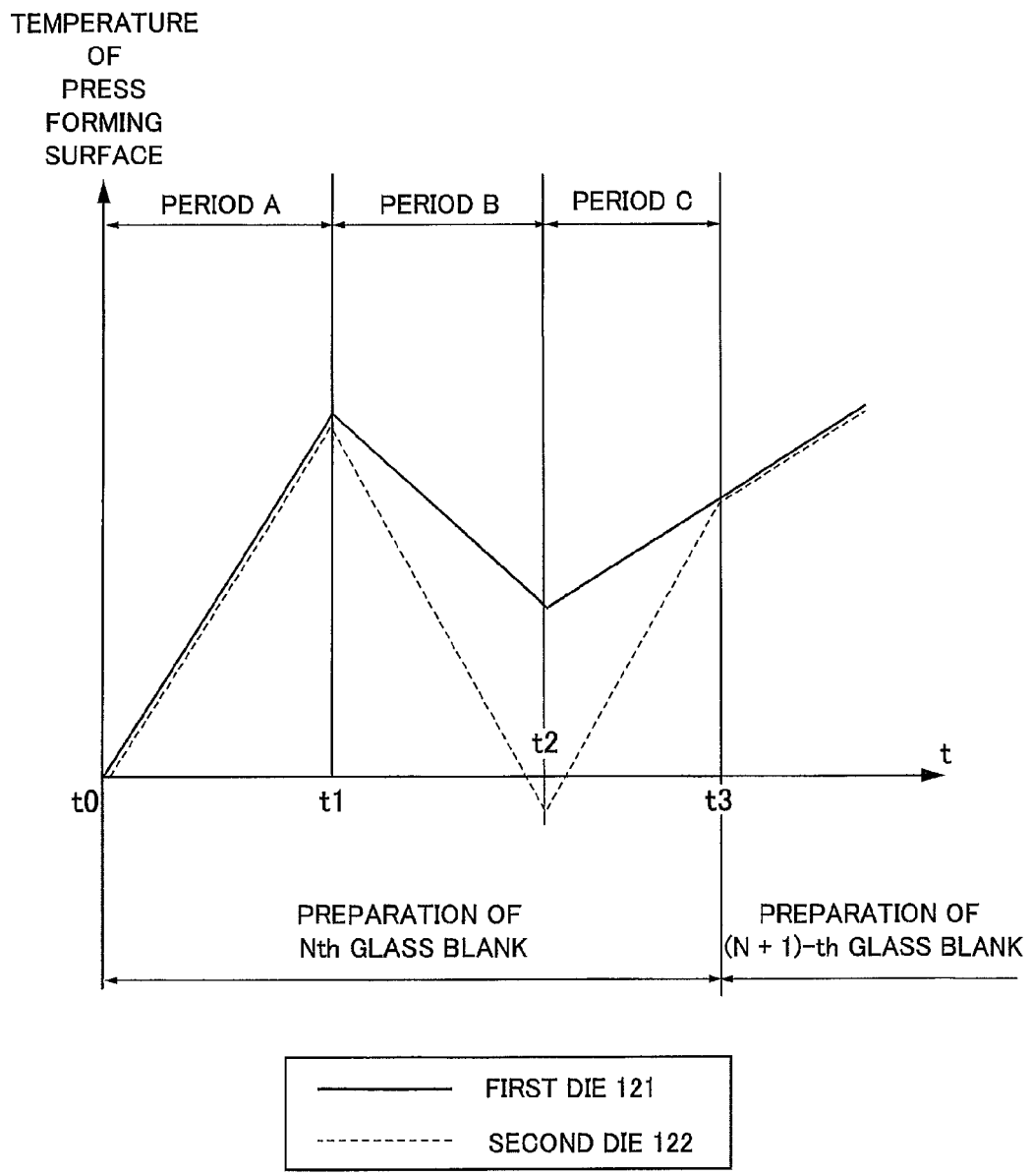
FIG. 18 is a view illustrating a change in temperature of the press forming surface of each of a pair of dies before and after the thermally equalizing treatment of the dies.
Figure 19:
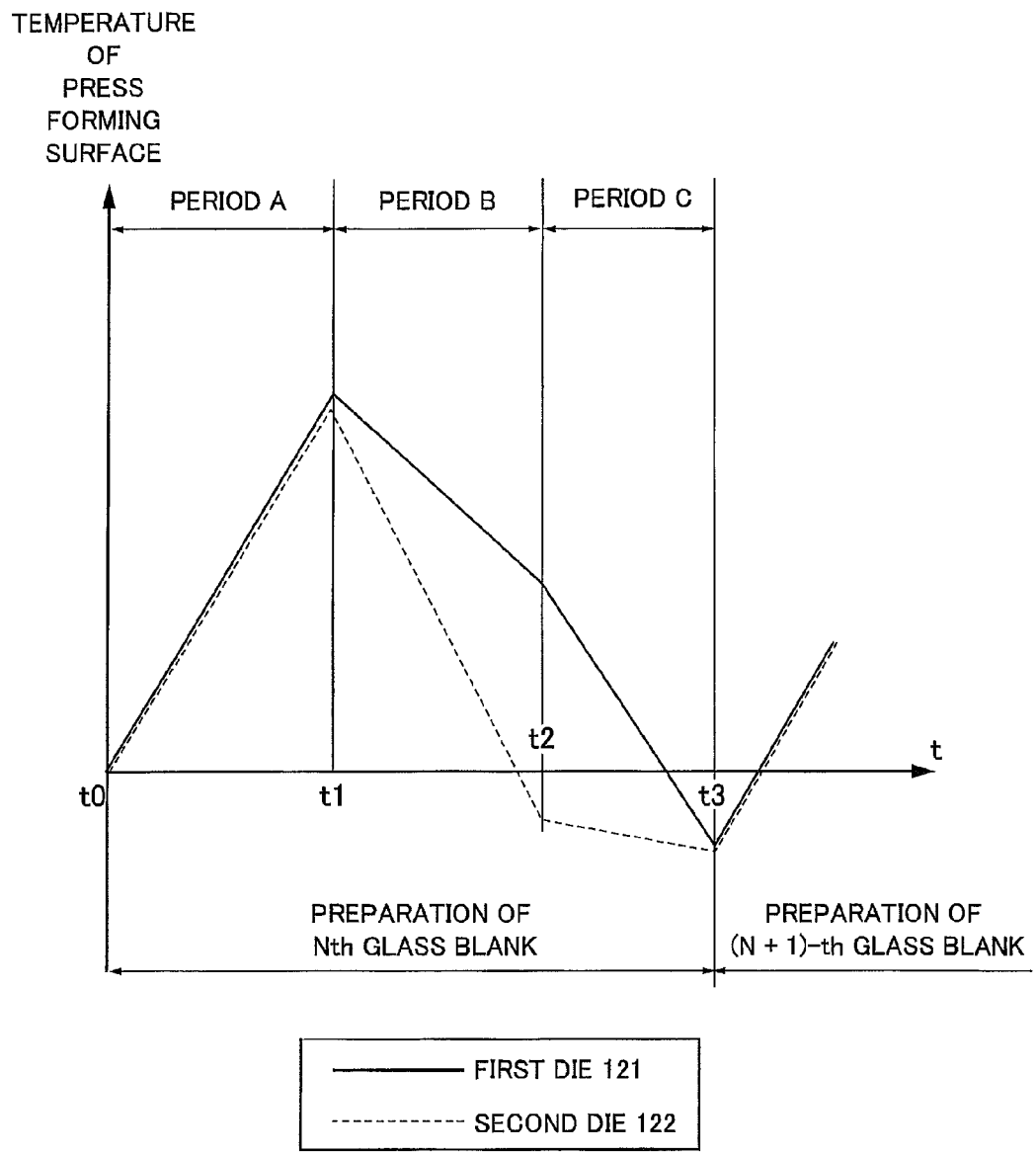
FIG. 19 is a view illustrating a change in temperature of the press forming surface of each of a pair of dies before and after the thermally equalizing treatment of the dies.

In the press forming process of this embodiment, thermally equalizing treatment (thermally equalizing process) of the die is performed at timing between press forming of a gob $G_G$ and press forming of the next gob $G_G$ when the molten glass material $L_G$ is continuously cut to cause the gob $G_G$ to fall down, so that the glass blank G is prepared. The thermally equalizing treatment of the die will be described with reference to FIGS. 17 to 19. FIG. 17 is a view for explaining thermally equalizing treatment of dies in press forming of this embodiment. FIGS. 18 and 19 are views each illustrating a change in temperature of the press forming surface of each of a pair of dies before and after the thermally equalizing treatment of the dies.

S1 of FIG. 17 to S4 of FIG. 17 illustrate treatment including press forming of the gob $G_G$ illustrated in FIG. 13 and press forming of the next gob $G_G$. S1 of FIG. 17 is identical to S3 of FIG. 13. Dies are closed after the glass blank G is formed by pressing the gob in S1 of FIG. 17, and the formed glass blank G vertically falls down (not illustrated in FIG. 17). Thereafter, as illustrated in S2 of FIG. 17, a thermally equalizing material H set at a predetermined temperature is inserted between the first die 121 and the second die 122, for example, from the lower side. Further, as illustrated in S3 of FIG. 17, the dies are closed with the thermally equalizing material H inserted in the dies, whereby both surfaces of the thermally equalizing material H are brought into surface contact with the inner circumferential surface 121a of the first die 121 and the inner circumferential surface 122a of the second die 122. The surface contact may be performed at the whole of the inner circumferential surface (press forming surface) of the die as illustrated in S3 of FIG. 17, but it suffices that the surface contact is performed at least at a portion of the inner circumferential surface which contacts the gob. Due to the surface contact, the inner circumferential surfaces of a pair of dies each have a temperature identical or close to the temperature of the thermally equalizing material H. The surface contact is continued until the molten glass is cut to cause a new gob to fall down for press forming as illustrated in S4 of FIG. 17. A time during which the dies and the thermally equalizing material H contact each other is, for example, 1, second or more. In the event of S4 of FIG. 17, the dies are opened again to cause the thermally equalizing material H to retreat to the lower side.

As described above, the thermally equalizing material is used for the purpose of reducing, or more preferably eliminating a difference in temperature between the first die 121 and the second die 122 during a time period between press forming of a gob and press forming of the next gob when gobs are continuously press-formed. The thermally equalizing material is preferably formed of a material having a high heat conductivity, such as, for example, copper, a copper alloy, aluminum or an aluminum alloy, and has a shape which allows the thermally equalizing material to come into surface contact with the inner circumferential surface 121a of the first die 121 and the inner circumferential surface 122a of the second die 122 at an equal pressure. When the thermally equalizing material is formed of a material having high heat conductivity, the whole of the thermally equalizing material is easily set at a uniform temperature, so that the temperatures of the first die 121 and the second die 122 are easily equalized.

The temperature of the thermally equalizing material is preferably between the upper limit and the lower limit of the temperature of a portion which contacts the gob when it is assumed that press forming is performed without bringing the thermally equalizing material into contact with the die. When the temperature of the thermally equalizing material is in the above-described range, a difference in temperature at the time point when the die and the thermally equalizing material start to come into contact with each other is small, so that a difference in temperature between the first die 121 and the second die 122 can be made close to zero in a short time.

FIG. 18 illustrates a change in temperature (change in temperature associated with the thermally equalizing treatment of the die) of the press forming surface of each of a pair of dies when the temperature of the die is higher than the temperature of the thermally equalizing material at the time point when the die and the thermally equalizing material start to come into contact with each other.

In FIG. 18, time t0 represents a time point when the pressing of the gob is started when the Nth glass blank is prepared. In FIG. 18, it is assumed that the temperatures of the first die 121 and the second die 122 are identical at time t0. During a period A of time t0 to t1, a high-heat gob comes into contact with both the dies, and heat is transferred equally to both the dies from the gob, so that the temperatures of both the dies rise at identical gradients. The glass blank is taken out from the die at around time t1.

During a period B of time t1 to t2, the press forming surface of the die is gradually cooled by outside air, so that the temperature decreases, with the temperature at time t2 being a peak. At this time, for example, even if the peak temperatures of a pair of dies are identical at time t2, their temperature decrease gradients may be different. For example, this occurs in the case where the glass blank remains stuck to one of dies when the dies are opened after the glass blank is formed. At this time, when air is discharged from the interior of the die toward the press forming surface, and the glass blank is detached from the die by means of the discharge force, the temperature decrease gradients of the dies in the period B are different if the discharge of air is performed for both the dies. This is because the degree of cooling of the die by discharge of air varies between the die to which the glass blank is stuck and the die to which the glass blank is not stuck.

In this embodiment, for example, the thermally equalizing material is inserted into dies at time t2, and the thermally, equalizing material is brought into contact with a pair of dies during a period C of time t2 to t3. Consequently, the temperatures of the first die 121 and the second die 122 rise to a temperature identical to that of the thermally equalizing material at time t3. At time t3, falling and pressing of a gob are started for preparation of the next (N+1)-th glass blank. At time t3, a difference in temperature between the dies is zero, and therefore the (N+1)-th glass blank has a good flatness.

FIG. 19 illustrates a change in temperature (change in temperature associated with the thermally equalizing treatment of the die) of the press forming surface of each of a pair of dies when the temperature of the die is lower than the temperature of the thermally equalizing material at the time point when the die and the thermally equalizing material start to come into contact with each other. In FIG. 19, unlike FIG. 18, the temperatures of the first die 121 and the second die 122 decreases to a temperature identical to that of the thermally equalizing material at time t3. Since it suffices that a difference in temperature between dies is reduced or eliminated before press forming of the next gob, the temperatures of a pair of dies may be elevated or may be decreased by the thermally equalizing material as illustrated in FIGS. 18 and 19.

(b). Scribing Process (Step S20)

Next, the scribing process will be described. After the press forming process, the formed glass blank G is subjected to scribing in the scribing process.

As used herein, the scribing means that two concentric (inside concentric and outside concentric) cutting lines (linear scratches) are provided in the surface of the glass blank G with a scriber made of a super alloy or diamond particles in order to obtain the donut-shape (ring-shape) of the formed glass blank G having a predetermined size. The glass blank G scribed into two-concentric-circle shape is partially heated, and a portion outside the outside concentric circle and a portion inside the inside concentric circle are removed by a difference in thermal expansion of the glass blank G. In this way, a donut-shaped glass substrate is obtained.

A donut-shaped glass substrate can also be obtained by forming a circular hole in the glass blank using a core drill or the like.

(c) Shape Processing Process (Step S30)

Next, the shape processing process will be described. The shape processing process includes chamfering processing of the end portion of the glass substrate (chamfering of outer circumferential end portion and inner circumferential end portion) after the scribing process. Chamfering processing is shape processing in which the outer circumferential end portion and inner circumferential end portion of the glass substrate after the scribing process is chamfered between a principal face and a side wall portion perpendicular to the principal face using a diamond abrasive grain. The chamfering angle is, for example, 40 to 50 degrees with respect to the principal face.

(d) Grinding Process Using Fixed Abrasive Grain (Step S40)

In the grinding process using a fixed abrasive grain, the principal face of the glass substrate after the shape processing process is subjected to grinding processing (machining) using a double faces grinding apparatus including a planet gear mechanism. For example, the grinding has the machining allowance of several micrometers to about 100 micrometers. The double faces grinding apparatus includes a pair of upper and lower surface plates (upper surface plate and lower surface plate), and a glass substrate is held between the upper surface plate and the lower surface plate. By moving one or both of the upper surface plate and the lower surface plate, the glass substrate and each surface plate are relatively moved, whereby both principal faces of the glass substrate can be ground.

In the press forming process of this embodiment, a glass blank having extremely high flatness can be prepared, and therefore the grinding process may be omitted. Before the grinding process, a lapping process may be performed using a double faces grinding apparatus similar to the apparatus used in the grinding process and an alumina loose abrasive grain.

(e) Edge Polishing Process (Step S50)

Next, edge polishing of the glass substrate after the grinding process is performed.

In edge polishing, the inner circumferential end face and outer circumferential end face of the glass substrate are subjected to mirror surface finishing by brush polishing. At this point, slurry that includes fine particles such as cerium oxide as the loose abrasive grain is used. By performing edge polishing, an impairment such as contamination by deposition of dust or the like, damage or a flaw is eliminated, whereby occurrence of a thermal asperity and deposition of ions of sodium, potassium and the like which may cause corrosion can be prevented.

(f) First Polishing Process (Step S60)

Next, the principal face of the glass substrate after the edge polishing process is subjected to first polishing. For example, first polishing has the machining allowance of several micrometers to about 50 micrometers. First polishing is intended to remove the flaw left on the principal face after the grinding using the fixed abrasive grain, the deformation and the micro-surface irregularity (micro-waviness and roughness). In the first polishing process, polishing is performed while a polishing solution is fed using a double polishing apparatus having a structure similar to that of the apparatus used in the grinding process. A polishing agent contained in the polishing solution is, for example, a cerium oxide abrasive grain or a zirconia abrasive grain.

In the first polishing process, polishing is performed so as to have a surface roughness (Ra) of 0.5 nm or less and a micro-waviness (MW-Rq) of 0.5 nm or less for the principal face of the glass substrate.

The micro-waviness may be represented by a RMS (Rq) value calculated as a roughness at a wavelength bandwidth of 100 to 500 μm in a region of 14.0 to 31.5 mm radius in the whole of the principal face, and can be measured using, for example, Model-4224 manufactured by Polytec Inc.

The surface roughness is represented by an arithmetic mean roughness Ra defined in JIS B0601:2001 and, for example, can be measured with a roughness measuring machine SV-3100 manufactured by Mitutoyo Corporation and calculated by a method defined in JIS B0633:2001 when the roughness is no less than 0.006 μm and no more than 200 μm. When as a result, the roughness is 0.03 μm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 512×512 pixels in a measurement area of 1 μm×1 μm square can be used.

(g) Chemically Strengthening Process (Step S70)

Next, the glass substrate after the first polishing process is chemically strengthened.

For example, a mixed solution of potassium nitride (60% by weight) and sodium sulfate (40% by weight) can be used as a chemically strengthening solution. In the chemically strengthening process, a chemically strengthening solution is heated to, for example, 300° C. to 400° C., a washed glass substrate is preheated to, for example, 200° C. to 300° C., and the glass substrate is then dipped in the chemically strengthening solution for, for example, 3 to 4 hours.

When the glass substrate is dipped in the chemically strengthening solution, the lithium ion and the sodium ion in the surface layer of the glass substrate are replaced, respectively, with the sodium ion and the potassium ion which have relatively large ion radiuses in the chemically strengthening solution, so that a compressive stress layer is formed on the surface layer portion, thereby strengthening the glass substrate. The glass substrate subjected to the chemically strengthening treatment is washed. For example, the glass substrate is washed with sulfuric acid, and then washed with pure water or the like.

(h) Second Polishing Process (Step S80)

Next, the glass substrate after chemically strengthening process is subjected to second polishing. Second polishing has the machining allowance of about 1 μm. Second polishing is intended at the mirror surface polishing of the principal face. In second polishing, for example, the polishing apparatus used in first polishing is used. At this point, the second polishing differs from the first polishing in the following points: the kind and particle size of the loose abrasive grain, and hardness of the resin polisher.

For example, the slurry of the turbid fine particles such as colloidal silica (particle size: diameter of about 10 to 50 nm) is used as the loose abrasive grain used in the second polishing.

The polished glass substrate is washed with a neutral detergent, pure water, IPA or the like to obtain a glass substrate for magnetic disk.

It is not necessarily essential to perform the second polishing process, but it is preferable to perform the second polishing process because the level of the surface irregularity of the principal face of the glass substrate can be further improved. By performing the second polishing process, the principal face can be made to have a roughness (Ra) of 0.1 nm or less and a micro-waviness (MW-Rq) of 0.1 nm or less.

As described above, the method for manufacturing a glass blank for magnetic disk in this embodiment includes a press forming process of press-forming a lump of molten glass using a pair of dies. Therefore, when the surface roughness of the inner circumferential surfaces of a pair of dies is set at a good level (e.g. surface roughness required for the glass substrate for magnetic disk), the surface roughness of the glass blank can be kept at a good level because the surface roughness of the inner circumferential surface of the die is shape-transferred as the surface roughness of the glass blank. In the press forming process, there is a correlation between a difference in temperature at a position where a pair of dies face each other at the time of press-forming the molten glass and flatness of the glass blank obtained after press forming. In this embodiment, a difference in temperature between dies at the initial stage of press forming that is performed continuously can be reduced or eliminated by performing the thermally equalizing treatment of the dies, so that the flatness of the glass blank can be always kept good when glass blanks are continuously prepared.

[Magnetic Disk]

The glass substrate for magnetic disk is prepared through the processes described above. A magnetic disk is obtained in the following manner using the above-described glass substrate for magnetic disk.

The magnetic disk has, for example, a configuration in which on the principal face of the glass substrate, at least an adhesive layer, an underlying layer, a magnetic layer (magnetic recording layer), a protective layer and a lubricant layer are stacked in this order from the side closest to the principal face.

For example, the substrate is introduced into an evacuated deposition apparatus, and the adhesive layer, the underlying layer and the magnetic layer are sequentially deposited in an Ar atmosphere by a DC magnetron sputtering method. For example CrTi may be used as the adhesive layer, and for example CrRu may be used as the underlying layer. For example a CoPt-based alloy may be used as the magnetic layer. Also, a CoPt-based alloy or FePt-based alloy having an $L_{10}$ ordered structure may be deposited to form a magnetic layer for heat assisted magnetic recording. After the deposition described above, the protective layer is deposited using $C_2H_4$ by, for example, a CVD method, and subsequently nitriding treatment is performed to introduce nitrogen to the surface, whereby a magnetic recording medium can be formed. Thereafter, the lubricant layer can be formed by applying, for example, PFPE (perfluoropolyether) onto the protective layer by a dip coating method.

<Second Additional Disclosure>

Recently, a hard disk drive device (HDD) is incorporated in a personal computer or a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for magnetic disk because the glass substrate hardly plastically deformed as compared to a metallic substrate (aluminum substrate) and the like.

The magnetic head includes, for example, a magnetic resistance effect element, but such a magnetic head may cause a thermal asperity trouble as its specific trouble. The thermal asperity trouble is a trouble in which when a magnetic head passes over a micro-irregularly-shaped surface of a magnetic disk while floating and flying, a magnetic resistance effect element is heated by adiabatic compression or contact of air, causing a read error. Thus, for avoiding the thermal asperity trouble, the glass substrate for magnetic disk is prepared such that surface properties, such as the surface roughness and flatness, of the principal face of the glass substrate are at a satisfactory level.

As a conventional method for manufacturing a sheet glass (glass blank), a vertical direct press method is known. This press method is a method in which a lump of molten glass is fed onto a lower die, and the lump of molten glass (molten glass lump) is press-formed using an upper die (Japanese Patent Laid-open Publication No. 2009-269762, FIG. 4, etc.). The vertical direct press method requires a work gripping device for gripping a glass blank obtained after pressing and taking out the glass blank from a die.

The known vertical direct press method has the problem that the flatness (shape accuracy) of a glass blank prepared is poor. The reason for this is as follows.

In the vertical direct press method, immediately after a molten glass lump is placed on a lower die, only a contact surface with the lower die and a part close to the contact surface, of the molten glass lump, are rapidly cooled to be solidified. Since glass has low heat conductivity, an upper part of the molten glass lump (a part which comes into contact with an upper die) remains at a high temperature while the molten glass lump is in contact with the lower die. Thereafter, the upper part comes into contact with the upper die, and is thereby rapidly cooled to be solidified. Therefore, in the case of the vertical direct press method, there is a gap in timing at which the molten glass lump is cooled to be solidified between the lower side and the upper side of the molten glass lump during a process in which the molten glass lump is formed into a glass blank. As a result, the molten glass lump is warped in a concave way, so that the flatness of the glass blank is increased (deteriorated). The gap in timing cannot be drastically suppressed in light of the press system of the vertical direct press method.

In the vertical direct press method, a mold release material ((mold) release agent) such as, for example, BN (boron nitride) should be attached to the die beforehand in order to prevent a situation in which the molten glass lump is stuck to the lower die and cannot be removed, but when such a mold release material remains attached on the glass blank, the surface roughness cannot be decreased. Preferably the temperatures of the upper die and the lower die are made identical wherever possible for preparing a glass blank having good flatness, but when the mold release material is attached on the lower die, the heat conductivity of the lower die is deteriorated, and therefore it is difficult to uniformly cool both surfaces of the glass blank in a press forming process. Therefore, the glass blank prepared by the vertical direct press method absolutely requires removal processes by polishing/grinding and so on in subsequent processes in order to improve the flatness and remove the mold release material sticking to the surface of the glass blank.

Further, the vertical direct press method requires a work gripping device for gripping a glass blank obtained after pressing and taking out the glass blank from a die as described above, but when the glass blank on the die is gripped after pressing, the work gripping, device may come into contact with the glass blank or die surface to damage the glass blank or die surface.

An object of the invention of the second additional disclosure is to provide a method for manufacturing a glass blank for magnetic disk, by which a glass blank for magnetic disk having good flatness is obtained by press forming and in which a glass blank or a die is not damaged when the blank is taken out from the die, and a method for manufacturing a glass substrate for magnetic disk.

In view of the above-described problems, the present inventors have intensively conducted studies, and resultantly devised a novel press forming method. That is, in a method for manufacturing a glass blank according to this embodiment, a horizontal direct press method is employed in which a falling molten glass, lump is press-formed using a pair of dies (press forming dies) arranged so as to face each other in a direction (horizontal direction) orthogonal to the falling direction of the molten glass lump. In the horizontal direct press method, unlike the conventional vertical direct press method, the molten glass lump is not temporarily retained in contact with a member having a temperature lower than that of the molten glass lump over a period of time until it is press-formed. Thus, at the time point immediately before press forming is started, the viscosity distribution of the interior of the molten glass lump becomes very wide during press forming in the vertical direct press method, whereas the viscosity distribution of the molten glass lump is kept even in the horizontal direct press of this embodiment. Accordingly, in the horizontal direct press method, it is extremely easy to uniformly thinly draw the molten glass lump to be press-formed as compared to the vertical direct press method. Consequently, as compared to the case where a glass blank is prepared using the vertical direct press method, it is extremely easy to drastically suppress deterioration of the flatness when a glass blank is prepared using the horizontal direct press method.

With the horizontal direct press method, press forming is performed using a pair of dies arranged so as to face each other in a direction orthogonal to the falling direction of the molten glass lump, and therefore after the dies are opened, the press-formed glass blank falls down vertically due to its gravity in most cases. Thus, a work gripping device for taking out the glass blank from the die is not required, and therefore unlike the vertical direct press method, the glass blank or die is not damaged when the glass blank is taken out from the die.

However, the present inventors performed a large number of press forming operations using the devised horizontal direct press method described above, and resultantly found the fact that even after dies are opened, the glass blank is stuck to one of a pair of dies arranged in a horizontal direction. Since the sticking force of the glass blank to the die is not strong, a method was contemplated in which after the die is opened, air is discharged from the interior of the die toward the press forming surface (i.e. in the horizontal direction), and the glass blank is detached from the die by means of the discharge force, but in such a method, the flatness of the glass blank is deteriorated when the glass blank is mass-produced. The reason for this is as follows. That is, to which of a pair of dies the glass blank is stuck is unknown unless the dies are opened. Thus, discharge of air in the horizontal direction must be performed for both the dies. Consequently, the degree of cooling of the die by discharge of air varies between the die to which the glass blank is stuck and the die to which the glass blank is not stuck, so that a next molten glass lump is pressed while there is a large difference in temperature between the dies. When press forming is performed while there is a large difference in temperature between the dies, the cooling process varies between one surface and the other surface of the glass blank which is press-formed, so that a strain is generated, resulting in deterioration of the flatness.

Base of the findings described above, the present inventors devised a method in which a difference in temperature between dies is not increased when a glass blank is detached from one of a pair of dies. Even if a glass blank is attached to one of a pair of dies after press forming, a difference in temperature between dies is not increased at the time of press-forming the next molten glass when the glass blank is detached using the method in which a difference in temperature between dies. Therefore, glass blanks having good flatness can be continuously obtained when the molten glass is continuously press-formed (i.e. in the mass production process).

From the viewpoint described above, the present invention may be a method for manufacturing a glass blank for magnetic disk, which includes a forming process of forming a plate-shaped glass blank by press-forming a falling molten glass in a direction orthogonal to the falling direction using a pair of dies, wherein after the forming process, a detachment process of detaching from the die the glass blank attached to the die without causing a difference in temperature between the dies is performed, followed by subjecting a next molten glass to the forming process.

In one form of the method for manufacturing a glass blank for magnetic disk, in the detachment process, at least a part of the outer circumferential portion of the glass blank may be cooled while both the dies and the glass blank are in contact with each other.

In one form of the method for manufacturing a glass blank for magnetic disk, in the detachment process, at least a part of the outer circumferential edge portion of the glass blank may be cooled by supplying a gas to the glass blank.

In one form of the method for manufacturing a glass blank for magnetic disk, the gas may be supplied at timing immediately before or concurrent with timing at which the pair of dies in a closed state starts to open.

In the method for manufacturing a glass blank for magnetic disk, preferably, in the forming process, press forming may be performed so that the temperature of a portion of the die, which contacts the molten glass, is substantially identical between the pair of dies.

In the method for manufacturing a glass blank for magnetic disk, the temperature of the pair of dies may be kept lower than the glass transition point (Tg) of the molten glass over a period of time until the glass blank is separated from the die after contacting the die.

In the method for manufacturing a glass blank for magnetic disk, press forming may be performed without attaching a mold release material to the die.

In the method for manufacturing a glass blank for magnetic disk, the surface roughness (Ra) of the die may be 0.1 μm or less.

The present invention may be a method for manufacturing a glass blank for magnetic disk, which includes a forming process of forming a plate-shaped glass blank by press-forming a falling molten glass in a direction orthogonal to the falling direction using a pair of dies, wherein each of the pair of dies includes a passage for introducing a gas to a space formed by closing of the die, and in the forming process, a gas is supplied to the space through the passage of each die at the time when the die is closed.

In a method for manufacturing a glass substrate for magnetic disk according to the present invention, a glass blank for magnetic disk may be subjected to polishing processing having a machining allowance of 50 μm or less to manufacture a glass substrate for magnetic disk, the glass blank being manufactured with the above-mentioned method for manufacturing a glass blank for magnetic disk.

In a method for manufacturing a glass substrate for magnetic disk according to the present invention, a glass substrate for magnetic disk may be manufactured using a glass blank for magnetic disk, the glass blank, being obtained by the above-mentioned method for manufacturing a glass blank for magnetic disk.

According to the present invention, a glass blank for magnetic disk, which has good flatness, is obtained by press forming, and when the glass blank is taken out from a die, the glass blank or die is not damaged.

[Explanation of Embodiment in Second Additional Disclosure]

A method for manufacturing a glass blank for magnetic disk and a method for manufacturing a glass substrate for magnetic disk in this embodiment will be described in detail below.

[Glass Substrate for Magnetic Disk]

Figure 20:
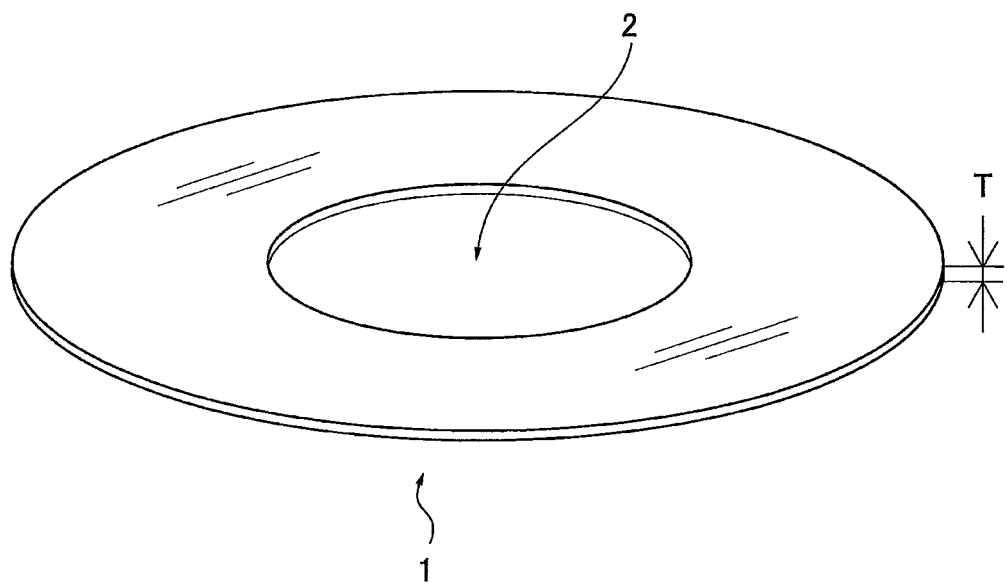
FIG. 20 is a perspective view illustrating an external shape of a glass substrate for magnetic disk of an embodiment.

As illustrated in FIG. 20, a glass substrate for magnetic disk 1 in this embodiment is a donut-shaped thin glass substrate. The size of the glass substrate for magnetic disk is not limited but for example, a glass substrate for magnetic disk having a nominal diameter of 2.5 inches is suitable. In the case of the glass substrate for magnetic disk having a nominal diameter of 2.5 inches, for example, the outer diameter is 65 mm, the diameter of a central hole 2 is 20 mm, and the thickness T is 0.6 to 1.0 mm. The flatness of the principal face of the glass substrate for magnetic disk of the embodiment is, for example, 4 μm or less, and the surface roughness (arithmetic mean roughness Ra) of the principal face is, for example, 0.2 nm or less. It is to be noted that the flatness required for a substrate for magnetic disk as a final product is, for example, 4 μm or less.

Aluminosilicate glass, soda-lime glass, borosilicate glass or the like can be used as a material of the glass substrate for magnetic disk in this embodiment. Particularly, the aluminosilicate glass can be suitably used in that chemically strengthening can be performed, and a glass substrate for magnetic disk excellent in flatness of the principal face and strength of the substrate can be prepared.

The composition of the glass substrate for magnetic disk of this embodiment is not limited, but the glass substrate of this embodiment is preferably made of aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol %.

[Method for Manufacturing Glass Substrate for Magnetic Disk of Embodiment]

Figure 21:
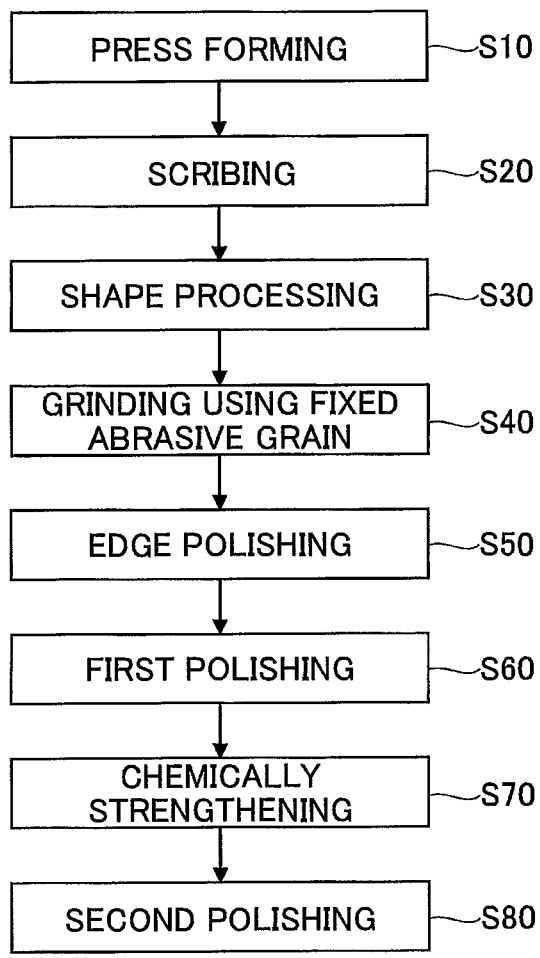
FIG. 21 is a view illustrating a flow of one embodiment of a method for manufacturing the glass substrate for magnetic disk of the embodiment.

Next, a flow of a method for manufacturing a glass substrate for magnetic disk will be described with reference to FIG. 21. FIG. 21 is a view illustrating a flow of one embodiment of a method for manufacturing a glass substrate for magnetic disk.

As illustrated in FIG. 21, in the method for manufacturing a glass substrate for magnetic disk in this embodiment, first a disk-shaped glass blank is prepared by press forming (Step S10). Next, the formed glass blank is scribed to prepare a donut-shaped glass substrate (Step S20). Next, the scribed glass substrate is subjected to shape processing (chamfering processing) (Step S30). Next, the glass substrate is subjected to grinding using a fixed abrasive grain (Step S40). Next, edge polishing of the glass substrate is performed (Step S50). Next, the principal face of the glass substrate is subjected to first polishing (Step S60). Next, the glass substrate, after first polishing, is subjected to chemically strengthening (Step S70). Next, the chemically strengthened glass substrate is subjected to second polishing (Step S80). The glass substrate for magnetic disk is obtained through the above processes.

Each process will be described in detail below.

(a) Press Forming Process (Step S10)

First, the press forming process will be described. The press forming process includes a forming process and a detachment process. The forming process is a process of forming a plate-shaped glass blank by press-forming a falling molten glass in a direction orthogonal to the falling direction using a pair of dies. The detachment process is a process of detaching from the die the glass blank attached to the die without causing a difference in temperature between dies after the forming process. For continuously forming a plurality of glass blanks, the forming process and the detachment process may be performed in succession.

Figure 22:
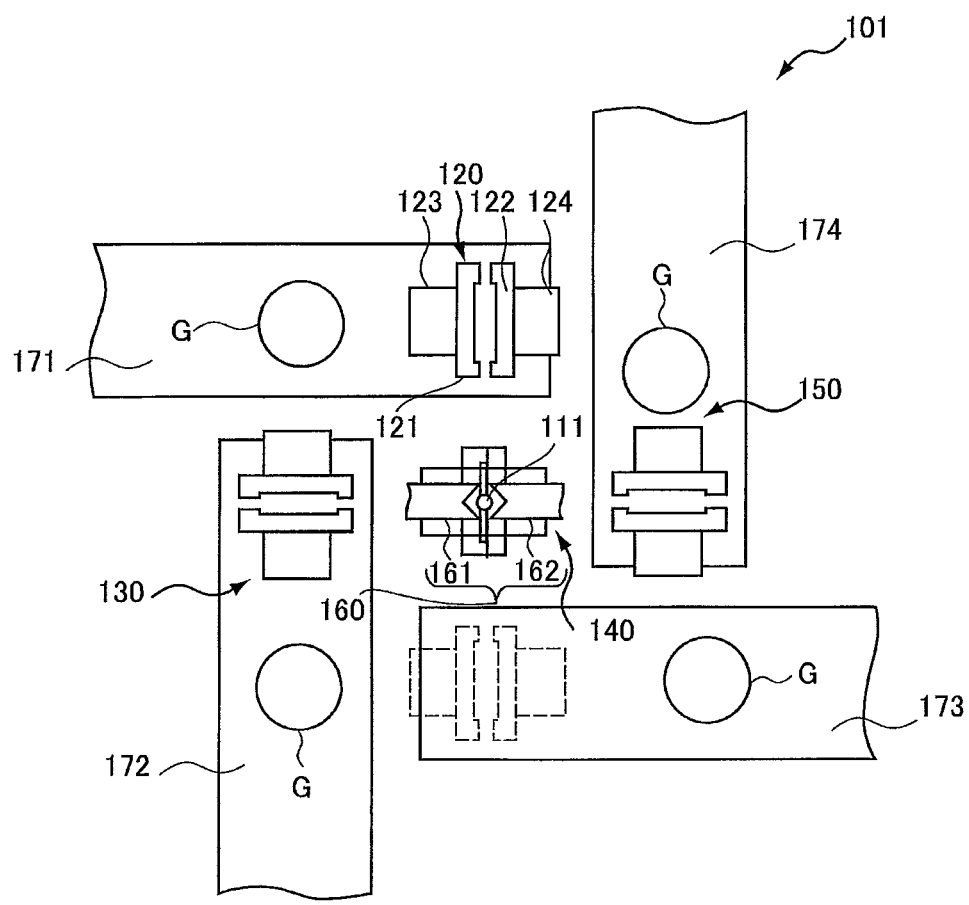
FIG. 22 is a plan view of an apparatus used in press forming of the embodiment.

FIG. 22 is a plan view of an apparatus used in press forming. As illustrated in FIG. 22, an apparatus 101 includes four sets of press units 120, 130, 140 and 150, a cutting unit 160 and a cutting blade 165 (not illustrated in FIG. 22). The cutting unit 160 is provided on a path of a molten glass that flows out from a molten glass outflow port 111. In the apparatus 101, a lump of molten glass (hereinafter, also referred to as a gob) cut by the cutting unit 160 is caused to fall down, and the lump is pressed from both sides of the falling path of the lump while the lump is sandwiched between surfaces of a pair of dies facing each other, thereby forming the glass blank.

Figure 23:
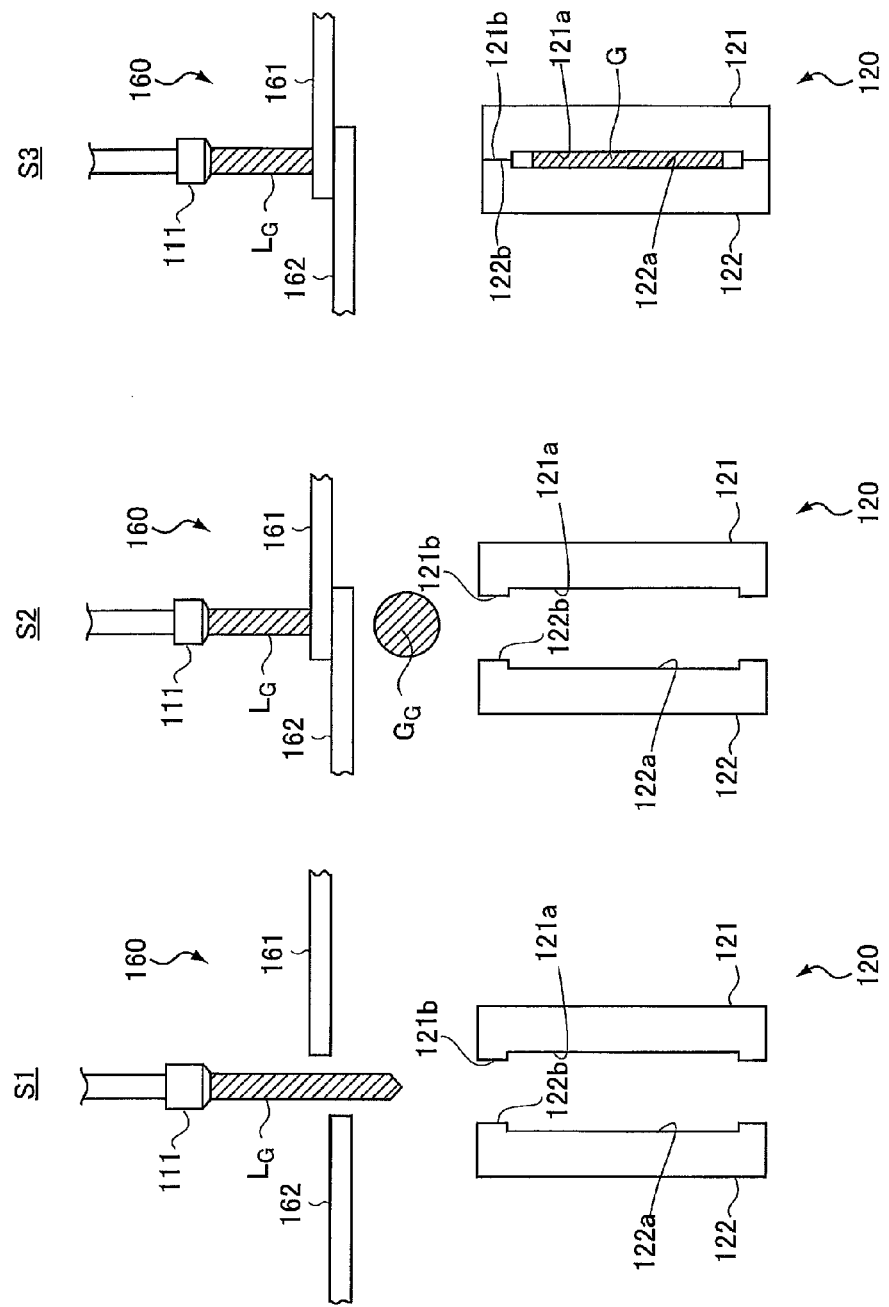
FIG. 23 is a plan view illustrating an arrangement of four sets of press units of an apparatus used in press forming of the embodiment.

Specifically, as illustrated in FIG. 23, in the apparatus 101, the four sets of press units 120, 130, 140, and 150 are provided at intervals of 90 degrees around the molten glass outflow port 111.

Each of the press units 120, 130, 140, and 150 is driven by a moving mechanism (not illustrated) so as to be able to proceed and retreat with respect to the molten glass outflow port 111. That is, each of the press units 120, 130, 140, and 150 can be moved between a catch position and a retreat position. The catch position (position in which the press unit 140 is drawn by a solid line in FIG. 22) is located immediately below the molten glass outflow port 111. The retreat position (positions in which the press units 120, 130, and 150 are drawn by solid lines and a position in which the press unit 140 is drawn by a broken line in FIG. 22) is located away from the molten glass outflow port 111.

The cutting unit 160 is provided on a path of the molten glass between the catch position (position in which the gob is captured by the press unit) and the molten glass outflow port 111. The cutting unit 160 forms the lump of molten glass by cutting a proper quantity of the molten glass flowing out from the molten glass outflow port 111. The cutting unit 160 includes a pair of cutting blades 161 and 162. The cutting blades 161 and 162 are driven so as to intersect each other on the path of the molten glass at constant timing. When the cutting blades 161 and 162 intersect each other, the molten glass is cut to obtain the gob. The obtained gob falls down toward the catch position.

The press unit 120 includes a first die 121, a second die 122, a first driving unit 123 and a second driving unit 124. Each of the first die 121 and the second die 122 is a plate-shaped member including a surface used to perform the press forming for the gob. The first die 121 and the second die 122 are disposed such that normal directions of the surfaces become substantially horizontal, and such that the surfaces become parallel to each other. The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other, for example, a mechanism in which an air cylinder or a solenoid and a coil spring are combined.

Because the structures of the press units 130, 140, and 150 are similar to that of the press unit 120, the descriptions of the press units 130, 140, and 150 are omitted.

After each press unit moves to the catch position, the falling gob is sandwiched between the first die and the second die by driving the first driving unit and the second driving unit, and the gob is formed into a predetermined thickness while rapidly cooled, thereby preparing a circular glass blank G. Next, after the press unit moves to the retreat position, the first die and the second die are separated to cause the formed glass blank G to fall down. A first conveyer 171, a second conveyer 172, a third conveyer 173, and a fourth conveyer 174 are provided below the retreat positions of the press units 120, 130, 140, and 150, respectively. Each of the first to fourth conveyers 171 to 174 receive the glass blank G falling down from the corresponding press unit, and the conveyer conveys the glass blank G to an apparatus (not illustrated) of the next process.

The apparatus 101 is configured such that the press units 120, 130, 140, and 150 sequentially move to the catch position and move to the retreat position while the gob is sandwiched, so that the glass blank G can continuously be formed without waiting for the cooling of the glass blank G in each press unit.

S1 of FIG. 23 to S3 of FIG. 23 more specifically illustrates press forming performed by the apparatus 101. S1 of FIG. 23 is a view illustrating the state before the gob is made, S2 of FIG. 23 is a view illustrating the state in which the gob is made by the cutting unit 160, and S3 of FIG. 23 is a view illustrating the state in which the glass blank G is formed by pressing the gob.

As illustrated in S1 of FIG. 23, a molten glass material $L_G$ continuously flows out from the molten glass outflow port 111. At this point, the cutting unit 160 is driven at predetermined timing to cut the molten glass material $L_G$ using the cutting blades 161 and 162 (S2 of FIG. 23). Therefore, the cut molten glass becomes a substantially spherical gob $G_G$ due to a surface tension thereof. Adjustment of the outflow quantity per time of the molten glass material $L_G$ and the driving interval of the cutting unit 160 may be appropriately performed according to a volume determined by the target size and thickness of the glass blank G.

The made gob $G_G$ falls down toward a gap between the first die 121 and second die 122 of the press unit 120. At this point, the first driving unit 123 and the second driving unit 124 (see FIG. 23) are driven such that the first die 121 and the second die 122 come close to each other at the timing the gob $G_G$ enters the gap between the first die 121 and the second die 122. Therefore, as illustrated in S3 of FIG. 23, the gob $G_G$ is captured (caught) between the first die 121 and the second die 122. An inner circumferential surface 121a of the first die 121 and an inner circumferential surface 122a of the second die 122 come close to each other with a micro gap, and the gob $G_G$ sandwiched between the inner circumferential surface 121a of the first die 121 and the inner circumferential surface 122a of the second die 122 is formed into a thin-plate shape. A projection 121b and a projection 122b are provided in the first inner circumferential surface 121a of the first die 121 and the second inner circumferential surface 122a of the second die 122, respectively, in order to keep the gap between the inner circumferential surface 121a of the first die 121 and the inner circumferential surface 122a of the second die 122 constant. That is, the projection 121b and the projection 122b abut against each other, whereby the gap between the inner circumferential surface 121a of the first die 121 and the inner circumferential surface 122a of the second die 122 is kept constant, so that a plate-shaped space is generated.

Press forming is performed using a pair of dies 121 and 122 in the forming process in press forming in this embodiment, and the outer shape of the glass blank is not restricted by the shape of the die. That is, as illustrated in S3 of FIG. 23, the gob stretched by closed dies does not reach projections 121b and 122b of the dies.

A temperature control mechanism (not illustrated) is provided in each of the first die 121 and second die 122, and temperatures at the first die 121 and second die 122 are retained lower than the glass transition point (Tg) of the molten glass $L_G$ over a period of time until the glass blank G is separated from the die after contacting the die. Therefore, it is not necessary to attach a mold release material to the first die 121 and the second die 122 in the forming process.

There is a correlation between a difference in temperature at a position where the inner circumferential surface 121a of the first die 121 and the inner circumferential surface 122a of the second die 122 face each other at the time of press-forming the gob $G_G$, and flatness of the glass blank obtained after press forming. That is, the flatness of the glass blank obtained after press forming becomes better as the difference in temperature at an opposed position between the inner circumferential surface 121a of the first die 121 and the inner circumferential surface 122a of the second die 122 decreases. This is because when the difference in temperature between a pair of dies is smaller, a thermal balance is achieved when the gob $G_G$ at a high temperature comes into contact the inner circumferential, surface of the die and is thereby rapidly cooled, so that deterioration of the flatness of the glass blank that may be caused by a very small difference in degree of heat deformation between a pair dies at the cooling stage can be further suppressed.

Thus, if this correlation is known, a maximum value of a difference in temperature (absolute value) between a pair of dies (between the inner circumferential surface 121a of the first die 121 and the inner circumferential surface 122a of the second die 122) for achieving flatness required for the glass substrate for magnetic disk can be determined. Thus, when a difference in temperature between a pair of dies is controlled so as not exceed its maximum value, flatness required for the glass substrate for magnetic disk can be achieved. For example, if the flatness required for the glass substrate for magnetic disk is 4 μm, press forming is performed while the difference in temperature between a pair of dies is kept at 10° C. or less.

The difference in temperature may be appropriately determined from the correlation according to the flatness required for the glass substrate for magnetic disk, but the difference in temperature may also be determined from the following standpoint.

Since glass substrate for magnetic disk of this embodiment is incorporated while being pivotally supported by a metallic spindle having a high thermal expansion coefficient within a hard disk as a magnetic disk that is a final product, the thermal expansion coefficient of the glass substrate for magnetic disk is preferably as high as that of the spindle. Therefore, the composition of the glass substrate for magnetic disk is defined so that the glass substrate for magnetic disk has a high thermal coefficient. The thermal expansion coefficient of the glass substrate for magnetic disk is, for example, in a range of 30 to $100 \times 10^{-7}(K^{-1})$, preferably in a range of 50 to $100 \times 10^{-7}(K^{-1})$. The thermal expansion coefficient is a value calculated using the linear expansion coefficients of the glass substrate for magnetic disk at temperatures of 100° C. and 300° C. A thermal expansion coefficient of, for example, less than $30 \times 10^{-7}(K^{-1})$ or more than $100 \times 10^{-7}$ is not preferable because a difference in thermal expansion coefficient between the glass substrate and the spindle is increased. From the point of view, temperature conditions at the circumference of the principal face of the glass blank are made uniform in the forming process when a glass substrate for magnetic disk having a high thermal expansion coefficient is prepared. As one example, it is preferable to perform temperature control so that the temperatures of the inner circumferential surface 121a of the first die 121 and the inner circumferential surface 122a of the second die 122 become substantially identical. When temperature control is performed so that the temperatures become identical, for example, a difference in temperature is preferably 5° C. or less. The difference in temperature is more preferably 3° C. or less, especially preferably 1° C. or less.

The difference in temperature between dies is a difference in temperature as measured using a thermocouple at a point which is located 1 mm from each of the front faces of the inner circumferential surface 121a of the first die 121 and the inner circumferential surface 122a of the second die 122 to the inside of the die and at which the inner circumferential surface 121a and the inner circumferential surface 122a face each other (e.g. a point corresponding to the central position of the glass blank and central points of the inner circumferential surface 121a and the inner circumferential surface 122a).

A time until the gob $G_G$ is completely confined between the first die 121 and the second die 122 after the gob $G_G$ comes into contact with the inner circumferential surface 121a of the first die 121 or the inner circumferential surface 122a of the second die 122, is as extremely short as about 0.06 second in the apparatus 101. Therefore, the gob $G_G$ is formed into the substantially disk shape by spreading along the inner circumferential surface 121a of the first die 121 and the inner circumferential surface 122a of the second die 122 within an extremely short time, and the gob $G_G$ is rapidly cooled and solidified in the form of amorphous glass, in this way, the glass blank G is prepared. The size of the glass blank G formed in this embodiment is, depending on the size of a desired glass substrate for magnetic disk, for example about 20 to 200 mm in diameter.

In the press forming method of this embodiment, the glass blank G is formed in a manner such that the inner circumferential surface 121a of the first die 121 and the inner circumferential surface 122a of the second die 122 are shape-transferred, and therefore preferably the flatness and the smoothness of each of the inner circumferential surfaces of a pair of dies are made comparable to those of a desired glass substrate for magnetic disk. In this case, necessity to subject the glass blank G to a surface processing process, i.e. a grinding and polishing process after press forming may be eliminated. That is, the glass blank G formed in the press forming method of this embodiment may have a thickness identical to the target thickness of the glass substrate for magnetic disk that is finally obtained. For example, the glass blank G is a disk-shaped sheet having a thickness of 0.2 to 1.1 mm. The surface roughness of each of the inner circumferential surface 121a and the inner circumferential surface 122a is preferably adjusted to 0.0005 to 0.05 μm so that the arithmetic mean roughness Ra of the glass blank G is 0.001 to 0.1 μm.

When the glass blank obtained by press forming is subjected to the polishing process without passing through the cutting process described later, the polishing process is performed so that the surface roughness of the glass blank is, for example, 0.2 μm or less in terms of Ra. If Ra is more than 0.2 μm, there arises such a problem that when the glass blank is polished until the surface roughness becomes ultimately a sufficiently low level (e.g. 0.2 nm in Ra), the polishing time becomes too long because the polishing allowance is increased, so that productivity is reduced, and further the shape of the edge portion is deteriorated.

After the first die 121 and the second die 122 are closed, the press unit 120 quickly moves to the retreat position, instead the press unit 130 moves to the catch position, and the press unit 130 performs the pressing to the gob $G_G$.

After the press unit 120 moves to the retreat position, the first die 121 and the second die 122 are kept closed until the glass blank G is sufficiently cooled (at least until the glass blank G has a temperature below a yield point). Then, the first driving unit 123 and the second driving unit 124 are driven to separate the first die 121 and the second die 122, the glass blank G falls down from the press unit 120, and the conveyer 171 located below the press unit 120 receives the glass blank G (see FIG. 22).

As described above, in the apparatus 101, the first die 121 and the second die 122 are closed within a time as extremely short as 0.1 second (about 0.06 second), and the molten glass substantially simultaneously comes into contact with the whole of the inner circumferential surface 121a of the first die 121 and the whole of the inner circumferential surface 122a of the second die 122. Therefore, the inner circumferential surface 121a of the first die 121 and the inner circumferential surface 122a of the second die 122 are not locally heated, and a strain is hardly generated in the inner circumferential surface 121a and the inner circumferential surface 122a. Because the molten glass is formed into the disk shape before the heat transfers from the molten glass to the first die 121 and the second die 122, a temperature distribution of the formed molten glass becomes substantially even. Therefore, in cooling the molten glass, variation of the shrinkage quantity of the glass material is small, and the large strain is not generated in the glass blank G. Accordingly, the flatness of the principal face of the prepared glass blank G is improved as compared to a glass blank prepared by conventional press forming with an upper die and a lower die.

In the example illustrated in FIG. 23, the substantially spherical gob $G_G$ is formed by cutting the flowing-out molten glass $L_G$ using the cutting blades 161 and 162. However, when viscosity of the molten glass material $L_G$ is small with respect to a volume of the gob $G_G$ to be cut, the glass does not become the substantially spherical shape only by cutting the molten glass $L_G$, and the gob is not formed. In such cases, a gob forming die is used to form the gob.

Figure 24:
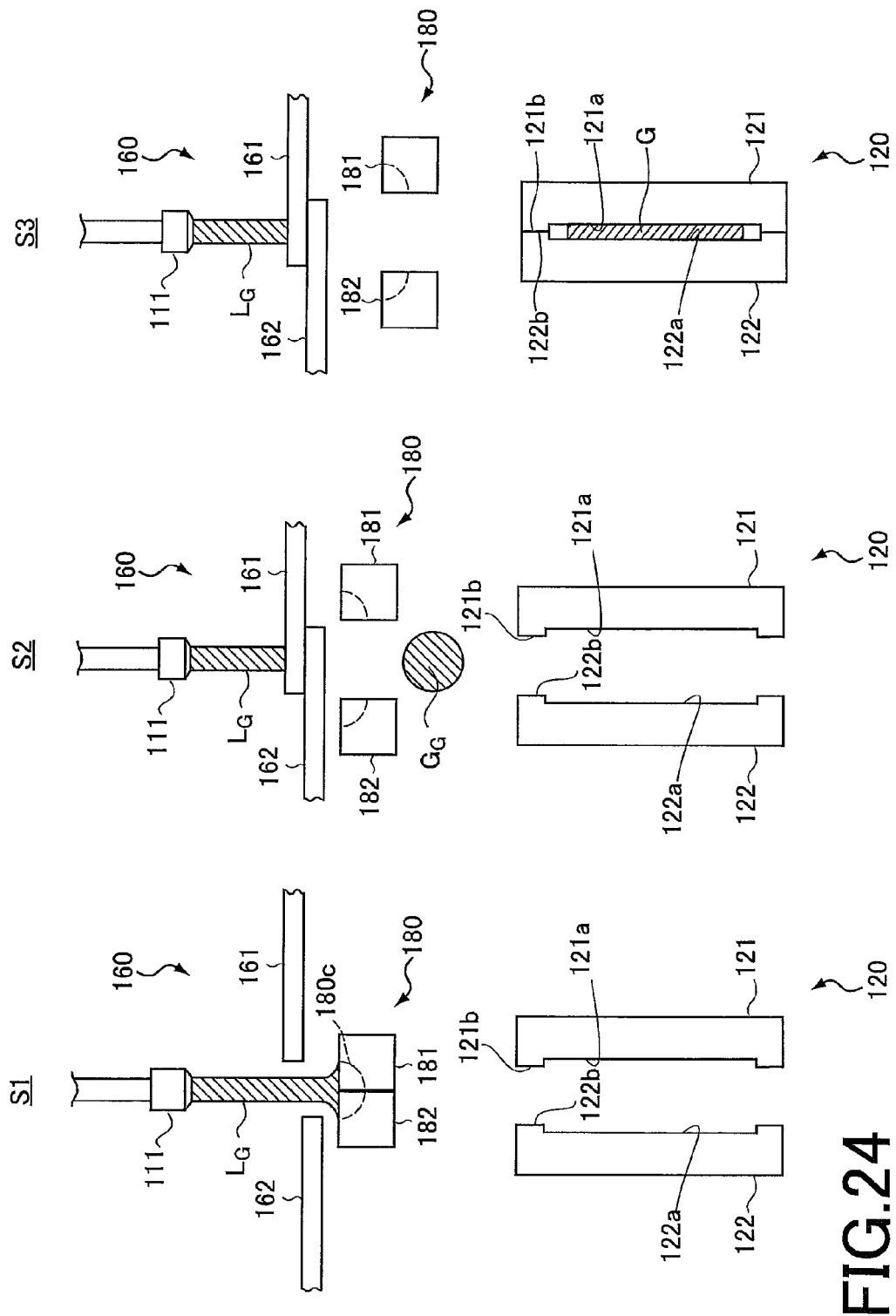
FIG. 24 is a view illustrating a modification of press forming of the embodiment using a gob forming die.

S1 of FIG. 24 to S3 of FIG. 24 are views illustrating a modification of the embodiment of FIG. 23. The gob forming die is used in the modification. S1 of FIG. 24 is a view illustrating the state before the gob is made, S2 of FIG. 24 is a view illustrating the state in which the gob $G_G$ is made by the cutting unit 160 and a gob forming die 180, and S3 of FIG. 24 is a view illustrating the state in which the press forming is performed to the gob $G_G$ to make the glass blank G.

As illustrated in S1 of FIG. 24, the path of the molten glass $L_G$ to the press unit 120 is closed by closing the blocks 181 and 182, and the lump of the molten glass $L_G$ cut with the cutting unit 160 is received by a recess 180C formed by the blocks 181 and 182. Then, as illustrated in S2 of FIG. 24, the molten glass $L_G$ that becomes the spherical shape in the recess 180C falls down toward the press unit 120 at one time by opening the blocks 181 and 182. When falling down toward the press unit 120, the gob $G_G$ becomes the spherical shape by the surface tension of the molten glass $L_G$. As illustrated in S3 of FIG. 24, during the fall of the gob $G_G$, the spherical gob $G_G$ is sandwiched between the first die 121 and the second die 122 to perform the press forming, thereby preparing the disk-shaped glass blank G.

Figure 25:
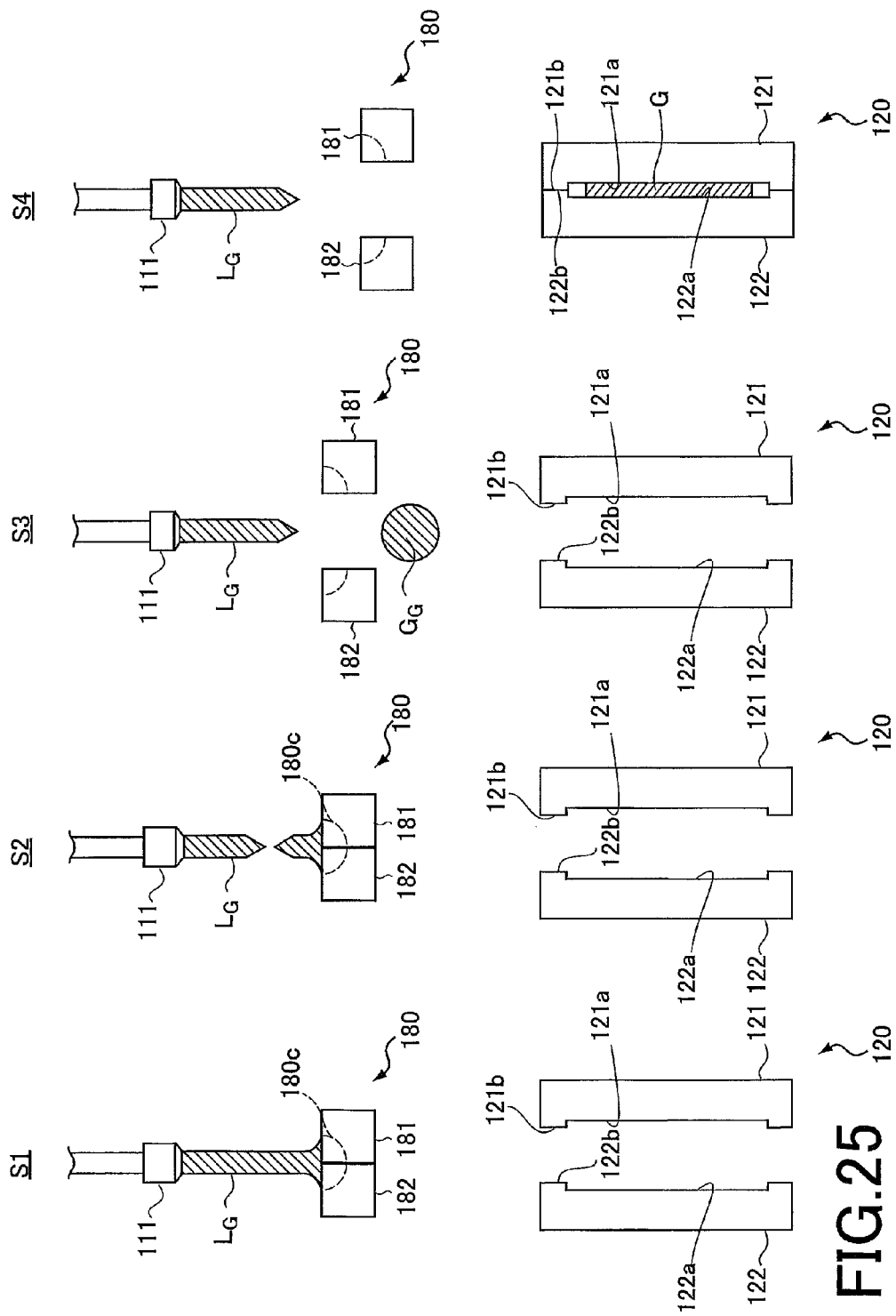
FIG. 25 is a view illustrating a modification of press forming of the embodiment in which a cutting unit is not used.

Alternatively, as illustrated in S1 of FIG. 25 to S4 of FIG. 25, in the apparatus 101, instead of using the cutting unit 160 illustrated in S1 of FIG. 24 to S3 of FIG. 24, a moving mechanism that moves the gob forming die 180 in an upstream direction or a downstream direction along the path of the molten glass $L_G$ may be used. S1 of FIG. 25 to S4 of FIG. 25 are views illustrating a modification in which the gob forming die 180 is used. S1 of FIG. 25 and S2 of FIG. 25 are views illustrating the state before the gob $G_G$ is made, S3 of FIG. 25 is a view illustrating the state in which the gob $G_G$ is made by the gob forming die 180, and S4 of FIG. 25 is a view illustrating the state in which the gob $G_G$ is subjected to press forming to make the glass blank G.

As illustrated in S1 of FIG. 25, the recess 180C formed by the blocks 181 and 182 receives the molten glass $L_G$ flowing out from the molten glass outflow port 111. As illustrated in S2 of FIG. 25, the blocks 181 and 182 are quickly moved onto the downstream side of the flow of the molten glass $L_G$ at predetermined timing. In this way, the molten glass $L_G$ is cut. Then, as illustrated in S3 of FIG. 25, the blocks 181 and 182 are separated at predetermined timing. Therefore, the molten glass $L_G$ retained by the blocks 181 and 182 falls down at one time, and the gob $G_G$ becomes the spherical shape by the surface tension of the molten glass $L_G$. As illustrated in S4 of FIG. 25, during the fall of the gob $G_G$, the spherical gob $G_G$ is sandwiched between the first die 121 and the second die 122 to perform the press forming, thereby preparing the disk-shaped glass blank G.

Figure 26:
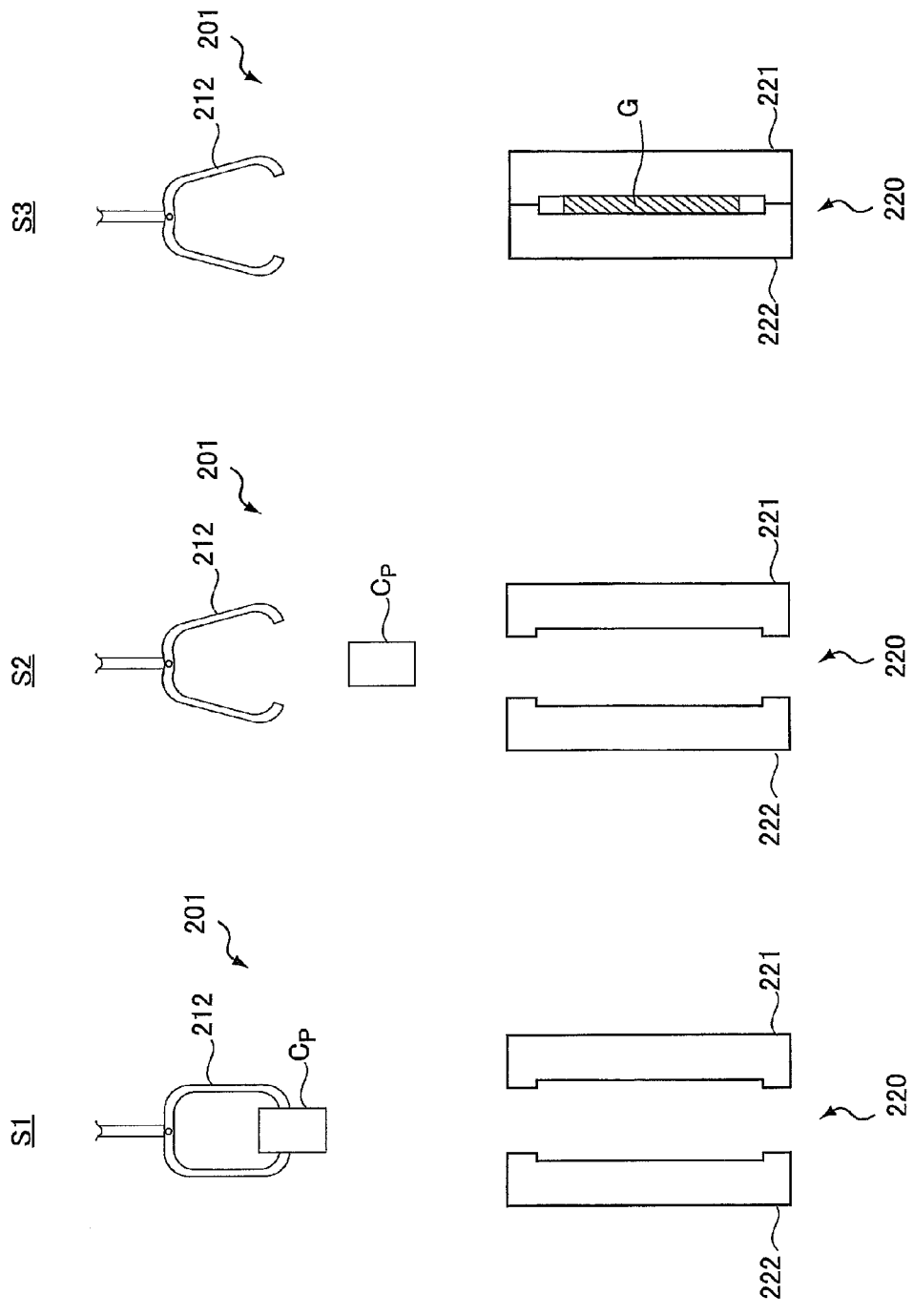
FIG. 26 is a view illustrating a modification of press forming of the embodiment using an optical glass heated by a softening furnace.

S1 of FIG. 26 to S3 of FIG. 26 are views illustrating another modification in which, instead of the gob $G_G$, a lump $C_P$ of the optical glass heated by a softening furnace (not illustrated) is caused to fall down and the press forming is performed to the lump $C_P$ while the lump $C_P$ is sandwiched from both sides between dies 221 and 222 during the fall of the lump $C_P$. S1 of FIG. 26 is a view illustrating the state before the lump of the heated optical glass is formed, S2 of FIG. 26 is a view illustrating the state in which the lump of the optical glass falls down, and S3 of FIG. 26 is a view illustrating the state in which the press forming is performed to the lump of the optical glass to make the glass blank G.

As illustrated in S1 of FIG. 26, in an apparatus 201, a glass material grasping mechanism 212 conveys the lump $C_P$ of the optical glass to a position above a press unit 220. As illustrated in S2 of FIG. 26, the glass material grasping mechanism 212 releases the lump $C_P$ of the optical glass to cause the lump $C_P$ of the optical glass to fall down. As illustrated in S3 of FIG. 26, during the fall of the lump $C_P$ of the optical glass, the lump $C_P$ is sandwiched between the first die 221 and the second die 222 to perform the press forming, thereby preparing the disk-shaped glass blank G. Because the first die 221 and the second die 222 have the same configuration and action as those of the first die 121 and second die 122 illustrated in FIG. 24, the descriptions are omitted.

Next, in the detachment process, treatment is performed for ensuring that the glass blank G falls down without being attached to any of the inner circumferential surface 121a of the first die 121 and the inner circumferential surface 122a of the second die 122 after press forming. The treatment in the detachment process will be described with reference to FIG. 27. FIG. 27 is a view illustrating treatment in the detachment process where a method is used in which a gas is supplied to a space formed by closing of the die.

In the detachment process, at least a part of the outer circumferential portion of the glass blank G is locally cooled while both the dies (first die 121 and second die 122) and the glass blank G are in contact with each other, so that the glass blank G is easily detached from the die. This is considered to be because the outer circumferential end portion of the glass blank G is cooled and thereby shrunk, and slightly turned up from the inner circumferential surface, and consequently when the die is opened, air easily enters a gap between the glass blank G and the die, so that the glass blank is easily detached.

Specific examples of the method for cooling at least a part of the outer circumferential portion of the glass blank D while the both the dies and the glass blank G are in contact with each other include a method in which a gas (e.g. air) is supplied to a space S formed by closing of the dies. That is, a gas (e.g. air) is supplied to the space S formed by closing of the dies for cooling the glass blank G immediately before or concurrently with timing at which the first die 121 and the second die 122 in a closed state (e.g. closed state illustrated in S3 of FIG. 23) start to open. The temperature of the gas supplied may be a temperature for locally cooling the glass blank G at the time of press forming, and is, for example, room temperature. FIG. 27 illustrates two aspects E1 and E2 as an aspect of supplying the gas. In the aspect illustrated in E1 of FIG. 27, the gas is introduced (supplied) into the space S in parallel to the inner circumferential surfaces 121a and 122a of the dies. Consequently, the glass blank G is locally cooled and thereby thermally shrunk, and immediately thereafter or concurrently therewith, the dies are opened, so that the glass blank falls down in a vertical direction without being attached to any of the inner circumferential surface 121a of the first die 121 and the inner circumferential surface 122a of the second die 122.

E1 of FIG. 27 illustrates one example in which the gas is introduced into the space from two locations in each die through a passage provided in each die, but the present invention is not limited thereto. Since the space S is formed in a donut shape along the circumference of the glass blank S, the gas can be introduced, into the space S from an arbitrary place on the circumference of the die.

The gas is introduced into the space S at timing immediately before or concurrent with timing at which the dies in a closed state start to open as described above, but the phrase "immediately before" refers to timing about 10 to 1000 ms before the timing at which the dies start to open.

On the other hand, in the aspect illustrated in E2 of FIG. 27, the gas is introduced into the space S perpendicularly to the inner circumferential surfaces 121a and 122a (i.e. in the press direction) through the passage provided in each die. Even in this introduction aspect, the gas introduced in opposite directions causes convention currents in the space S, so that a stream of gas toward the glass blank G is generated, and therefore the glass blank G is locally cooled and thereby thermally shrunk. Accordingly, at the same time of closing of the dies, the glass blank falls down in a vertical direction without being attached to any of the inner circumferential surface 121*a* of the first die 121 and the inner circumferential surface 122*a* of the second die 122 as in the case of E1 of FIG. 27.

In the treatment in the detachment process illustrated in FIG. 27, preferably the gas is introduced at positions symmetrical with respect to each of a pair of dies, and there is no difference in rate and pressure of the introduced gas between a pair of dies. The structure of the passage (path, passage diameter, etc.) for supply of a gas, which is provided in each of a pair of dies, is preferably symmetrical between dies. Consequently, it can be ensured there is no influence on a difference in temperature between dies by introduction of the gas over a period of time until the dies are opened after the glass blank G is formed. Accordingly, a situation can be avoided in which as the detachment step is performed, a difference in temperature between dies is increased to deteriorate the flatness of the glass blank G.

As described above, the glass blank G obtained in the forming step has a good level of surface roughness by keeping the surface roughness (Ra) of the inner circumferential surface 121*a* and the inner circumferential surface 122*a* of the dies at 0.1 μm or less. So far, the glass blank G has been easily attached to the inner circumferential surface of the die after formation when the glass blank is formed using dies having inner circumferential surfaces having such a small surface roughness. In this embodiment, however, the glass blank can be caused to fall down without being attached to the inner circumferential surface of any of the dies owing to the detachment process described above. That is, owing to the detachment process, both the advantage that the surface roughness of the glass blank G is decreased and the advantage that the glass blank is not attached to the die after formation can be achieved. That is, the detachment process can be suitably used particularly in manufacture of a glass blank required to have small surface roughness.

(b) Scribing Process (Step S20)

Next, the scribing process will be described. After the press forming process, the formed glass blank G is subjected to scribing in the scribing process.

As used herein, the scribing means that two concentric (inside concentric and outside concentric) cutting lines (linear scratches) are provided in the surface of the glass blank G with a scriber made of a super alloy or diamond particles in order to obtain the donut-shape (ring-shape) of the formed glass blank G having a predetermined size. The glass blank G scribed into two-concentric-circle shape is partially heated, and a portion outside the outside concentric circle and a portion inside the inside concentric circle are removed by a difference in thermal expansion of the glass blank G. In this way, a donut-shaped glass substrate is obtained.

A donut-shaped glass substrate can also be obtained by forming a circular hole in the glass blank using a core drill or the like.

(c) Shape Processing Process (Step S30)

Next, the shape processing process will be described. The shape processing process includes chamfering processing of the end portion of the glass substrate (chamfering of outer circumferential end portion and inner circumferential end portion) after the scribing process. Chamfering processing is shape processing in which the outer circumferential end portion and inner circumferential end portion of the glass substrate after the scribing process is chamfered between a principal face and a side wall portion perpendicular to the principal face using a diamond abrasive grain. The chamfering angle is, for example, 40 to 50 degrees with respect to the principal face.

(d) Grinding Process Using Fixed Abrasive Grain (Step S40)

In the grinding process using a fixed abrasive grain, the principal face of the glass substrate after the shape processing process is subjected to grinding processing (machining) using a double faces grinding apparatus including a planet gear mechanism. For example, the grinding has the machining allowance of several micrometers to about 100 micrometers. The double faces grinding apparatus includes a pair of upper and lower surface plates (upper surface plate and lower surface plate), and a glass substrate is held between the upper surface plate and the lower surface plate. By moving one or both of the upper surface plate and the lower surface plate, the glass substrate and each surface plate are relatively moved, whereby both principal faces, of the glass substrate can be ground.

In the press forming process of this embodiment, a glass blank having an extremely high flatness can be prepared, and therefore the grinding process may be omitted. Before the grinding process, a lapping process may be performed using a double faces grinding apparatus similar to the apparatus used in the grinding process and an alumina loose abrasive grain.

(e) Edge Polishing Process (Step S50)

Next, edge polishing of the glass substrate after the grinding process is performed.

In edge polishing, the inner circumferential end face and outer circumferential end face of the glass substrate are subjected to mirror surface finishing by brush polishing. At this point, slurry that includes fine particles such as cerium oxide as the loose abrasive grain is used. By performing edge polishing, an impairment such as contamination by deposition of dust or the like, damage or a flaw is eliminated, whereby occurrence of a thermal asperity and deposition of ions of sodium, potassium and the like which may cause corrosion can be prevented.

(f) First Polishing Process (Step S60)

Next, the principal face of the glass substrate after the edge polishing process is subjected to first polishing. For example, first polishing has the machining allowance of several micrometers to about 50 micrometers. First polishing is intended to remove the flaw left on the principal face after the grinding using the fixed abrasive grain, the strain and the micro-surface irregularity (micro-waviness and roughness). In the first polishing process, polishing is performed while a polishing solution is fed using a double polishing apparatus having a structure similar to that of the apparatus used in the grinding process. A polishing agent contained in the polishing solution is, for example, a cerium oxide abrasive grain or a zirconia abrasive grain.

In the first polishing process, polishing is performed so as to have surface roughness (Ra) of 0.5 nm or less and micro-waviness (MW-Rq) of 0.5 nm or less for the principal face of the glass substrate. The micro-waviness may be represented by a RMS (Rq) value calculated as roughness at a wavelength bandwidth of 100 to 500 μm in a region of 14.0 to 31.5 mm radius in the whole of the principal face, and can be measured using, for example, Model-4224 manufactured by Polytec Inc.

The surface roughness is represented by an arithmetic mean roughness Ra defined in JIS B0601:2001 and, for example, can be measured with a roughness measuring machine SV-3100 manufactured by Mitutoyo Corporation and calculated by a method defined in JIS B0633:2001 when the roughness is no less than 0.006 μm and no more than 200 μm. When as a result, the roughness is 0.03 μm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 512×512 pixels in a measurement area of 1 μm×1 μm square can be used.

(g) Chemically Strengthening Process (Step S70)

Next, the glass substrate after the first polishing process is chemically strengthened.

For example, a mixed solution of potassium nitride (60% by weight) and sodium sulfate (40% by weight) can be used as a chemically strengthening solution. In the chemically strengthening process, a chemically strengthening solution is heated to, for example, 300° C. to 400° C., a washed glass substrate is preheated to, for example, 200° C. to 300° C., and the glass substrate is then dipped in the chemically strengthening solution for, for example, 3 to 4 hours.

When the glass substrate is dipped in the chemically strengthening solution, the lithium ion and the sodium ion in the surface layer of the glass substrate are replaced, respectively, with the sodium ion and the potassium ion which have relatively large ion radiuses in the chemically strengthening solution, so that a compressive stress layer is formed on the surface layer portion, thereby strengthening the glass substrate. The glass substrate subjected to the chemically strengthening treatment is washed. For example, the glass substrate is washed with sulfuric acid, and then washed with pure water or the like.

(h) Second Polishing Process (Step S80)

Next, the glass substrate after chemically strengthening process is subjected to second polishing. Second polishing has the machining allowance of about 1 μm. Second polishing is intended at the mirror surface polishing of the principal face. In second polishing, for example, the polishing apparatus used in first polishing is used. At this point, the second polishing differs from the first polishing in the following points: the kind and particle size of the loose abrasive grain, and hardness of the resin polisher.

For example, the slurry of the turbid fine particles such as colloidal silica (particle size: diameter of about 10 to 50 nm) is used as the loose abrasive grain used in the second polishing.

The polished glass substrate is washed with a neutral detergent, pore water, IPA or the like to obtain a glass substrate for magnetic disk.

It is not necessarily essential to perform the second polishing process, but it is preferable to perform the second polishing process because the level of the surface irregularity of the principal face of the glass substrate can be further improved. By performing the second polishing process, the principal face can be made to have roughness (Ra) of 0.1 nm or less and micro-waviness (MW-Rq) of 0.1 nm or less.

As described above, the method for manufacturing a glass blank for magnetic disk in this embodiment includes a press forming process of press-forming a lump of molten glass using a pair of dies. Therefore, when the surface roughness of the inner circumferential surfaces of a pair of dies is set at a good level (e.g. surface roughness required for the glass substrate for magnetic disk), the surface roughness of the glass blank can be kept at a good level because the surface roughness of the inner circumferential surface of the die is shape-transferred as the surface roughness of the glass blank. In the press forming process, there is a correlation between a difference in temperature at a position where a pair of dies face each other at the time of press-forming the molten glass and flatness of the glass blank obtained after press forming. In this embodiment, by performing the detachment, process, attachment of the glass blank to any of the dies after press forming can be reliably prevented, and the treatment in the detachment process does not increase a difference in temperature between the dies, so that deterioration of the flatness of the glass blank can be avoided when glass blanks are continuously prepared.

[Magnetic Disk]

The glass substrate for magnetic disk is prepared through the processes described above. A magnetic disk is obtained, in the following manner using the above-described glass substrate for magnetic disk.

The magnetic disk has, for example, a configuration in which on the principal face of the glass substrate, at least an adhesive layer, an underlying layer, a magnetic layer (magnetic recording layer), a protective layer and a lubricant layer are stacked in this order from the side closest to the principal face.

For example, the substrate is introduced into an evacuated deposition apparatus, and the adhesive layer, the underlying layer and the magnetic layer are sequentially deposited in an Ar atmosphere by a DC magnetron sputtering method. For example CrTi may be used as the adhesive layer, and for example CrRu may be used as the underlying layer. For example a CoPt-based alloy may be used as the magnetic layer. Also, a CoPt-based alloy or FePt-based alloy having a $L_{10}$ ordered structure may be deposited to form a magnetic layer for heat assisted magnetic recording. After the deposition described above, the protective layer is deposited using $C_2H_4$ by, for example, a CVD method, and subsequently nitriding treatment is performed to introduce nitrogen to the surface, whereby a magnetic recording medium can be formed. Thereafter, the lubricant layer can be formed by applying, for example, PFPE (perfluoropolyether) onto the protective layer by a dip coating method.

<Third Additional Disclosure>

Recently, a hard disk drive device (HDD) is incorporated in a personal computer or a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for magnetic disk because the glass substrate hardly plastically deformed as compared to a metallic substrate (aluminum substrate) and the like.

The magnetic head includes, for example, a magnetic resistance effect element, but such a magnetic head may cause a thermal asperity trouble as its specific trouble. The thermal asperity trouble is a trouble in which when a magnetic head passes over a micro-irregularly-shaped surface of a magnetic disk while floating and flying, a magnetic resistance effect element is heated by adiabatic compression or contact of air, causing a read error. Thus, for avoiding the thermal asperity trouble, the glass substrate for magnetic disk is prepared such that surface properties, such as the surface roughness and flatness, of the principal face of the glass substrate are at a satisfactory level.

As a conventional method for manufacturing a sheet glass (glass blank), a vertical direct press method is known. This press method is a method in which, a lump of molten glass is fed onto a lower die, and the lump of molten glass (molten glass lump) is press-formed using an upper die (Japanese Patent Laid-open Publication No. 2009-269762, FIG. 4, etc.).

However, the known vertical direct press method has the problem that the flatness (shape accuracy) of a glass blank prepared is poor. The reason for this is as follows.

In the vertical direct press method, immediately after a molten glass lump is placed on a lower die, only a contact surface with the lower die and a part close to the contact surface, of the molten glass lump, are rapidly cooled to be solidified. Since glass has low heat conductivity an upper part of the molten glass lump (a part which comes into contact with an upper die) remains at a high temperature while the molten glass lump is in contact with the lower die. Thereafter, the upper part comes into contact with the upper die, and is thereby rapidly cooled to be solidified. Therefore, in the case of the vertical direct press method, there is a gap in timing at which the molten glass lump is cooled to be solidified between the lower side and the upper side of the molten glass lump during a process in which the molten glass lump is formed into a glass blank. As a result, the molten glass lump is warped in a concave way, so that the flatness of the glass blank is increased (deteriorated). The gap in timing cannot be drastically suppressed in light of the press system of the vertical direct press method.

Further, in the vertical direct press method, a mold release material ((mold) release agent) such as, for example, BN (boron nitride) should be attached to the die beforehand in order to prevent a situation in which the molten glass lump is stuck to the lower die and cannot be removed, but when such a mold release material remains attached on the glass blank, the surface roughness cannot be decreased. Preferably the temperatures of the upper die and the lower die are made identical wherever possible for preparing a glass blank having good flatness, but when the mold release material is attached on the lower die, the heat conductivity of the lower die is deteriorated, and therefore it is difficult to uniformly cool both surfaces of the glass blank in a press forming process. Therefore, the glass blank prepared by the vertical direct press method absolutely requires removal processes by polishing/grinding and so on in subsequent processes in order to improve the flatness and remove the mold release material sticking to the surface of the glass blank.

An object of the invention of the third additional disclosure is to provide a method for manufacturing a glass blank for magnetic disk, by which a glass blank for magnetic disk having good flatness is obtained by press forming, a method for manufacturing a glass substrate for magnetic disk, and a glass blank for magnetic disc.

In view of the above-described problems, the present inventors have intensively conducted studies, and resultantly devised a novel press forming method. That is, in a method for manufacturing a glass blank according to this embodiment, a horizontal direct press method is employed in which a falling molten glass lump is press-formed using a pair of dies (press forming die) arranged so as to face each other in a direction (horizontal direction) orthogonal to the falling direction of the molten glass lump. In the horizontal direct press method, unlike the conventional vertical direct press method, the molten glass lump is not temporarily retained in contact with a member having a temperature lower than that of the molten glass lump over a period of time until it is press-formed. Thus, at the time point immediately before press forming is started, the viscosity distribution of the interior of the molten glass lump becomes very wide during press forming in the vertical direct press method, whereas the viscosity distribution of the molten glass lump is kept even in the horizontal direct press of this embodiment. Accordingly, in the horizontal direct press method, it is extremely easy to uniformly thinly draw the molten glass lump to be press-formed as compared to the vertical direct press method. Consequently, as compared to the case where a glass blank is prepared using the vertical direct press method, it is extremely easy to drastically suppress deterioration of the flatness when a glass blank is prepared using the horizontal direct press method.

When a difference in temperature at a position where a pair of dies face each other at the time of press-forming the molten glass is small, the flatness of the glass blank produced can be decreased as compared to the case where the above-mentioned difference is large. This is because when the difference in temperature between a pair of dies is smaller, a thermal balance is easily achieved when the molten glass at a high temperature comes into contact the inner circumferential surface of the die and is thereby rapidly cooled, so that deterioration of the flatness of the glass blank that may be caused by a very small difference in degree of heat deformation between a pair dies at the cooling stage can be further suppressed. There is a correlation between a difference in temperature at a position where a pair of dies face each other at the time of press-forming the molten glass and flatness of the glass blank obtained after press forming. If this correlation is known, a maximum value of a difference in temperature (absolute value) between a pair of dies for achieving flatness required for the glass substrate for magnetic disk can be determined. Thus, when a difference in temperature between a pair of dies is controlled so as not exceed its maximum value, flatness required for the glass substrate for magnetic disk can be achieved.

From the viewpoint described above, the present invention may be a method for manufacturing a glass blank for magnetic disk, which includes a forming process of press-forming a lump of molten glass using a pair of dies, wherein a correlation between a difference in temperature at a position where a pair of dies face each other at the time of press-forming the molten glass and flatness of the glass blank obtained after press forming is obtained, a difference in temperature between the pair of dies, with which flatness required for the glass blank can be achieved, is determined based on the correlation, and press forming is performed while a difference in temperature between dies is kept at no more than the determined difference in temperature.

In the method for manufacturing a glass blank for magnetic disk, preferably the flatness required for the glass blank may be equal to flatness of a magnetic disk, with which contact of a head can be prevented when the magnetic disk is mounted in a hard disk device.

In the method for manufacturing a glass blank for magnetic disk, preferably, in the forming process, press forming may be performed so that the temperature of portions of the pair of dies, which contact the molten glass, is substantially identical.

In the method for manufacturing a glass blank for magnetic disk, the temperature of the pair of dies may be kept lower than the glass transition point (Tg) of the molten glass over a period of time until the glass blank is separated from the die after contacting the die.

In the method for manufacturing a glass blank for magnetic disk, press forming may be performed without attaching a mold release material to the die.

In the method for manufacturing a glass blank for magnetic disk, the thermal expansion coefficient at 100° C. to 300° C. of a glass blank obtained after formation may be in a range of 30 to $100 \times 10^{-7} (K^{-1})$.

In a method for manufacturing a glass substrate for magnetic disk according to the present invention, the glass blank for magnetic disk may be subjected to polishing processing having a machining allowance of 50 μm or less, the glass blank being manufactured with the above-described method for manufacturing a glass blank for magnetic disk.

In a method for manufacturing a glass substrate for magnetic disk according to the present invention, a glass substrate for magnetic disk may be manufactured using a glass blank for magnetic disk, the glass blank being obtained with the above-mentioned method for manufacturing a glass blank for magnetic disk.

According to the present invention, a glass blank for magnetic disk and a glass substrate for magnetic disk, which have good flatness, can be manufactured by press forming.

[Explanation of Embodiment in Third Additional Disclosure]

A method for manufacturing a glass blank for magnetic disk and a method for manufacturing a glass substrate for magnetic disk in this embodiment will be described in detail below.

[Glass Substrate for Magnetic Disk]

Figure 28:
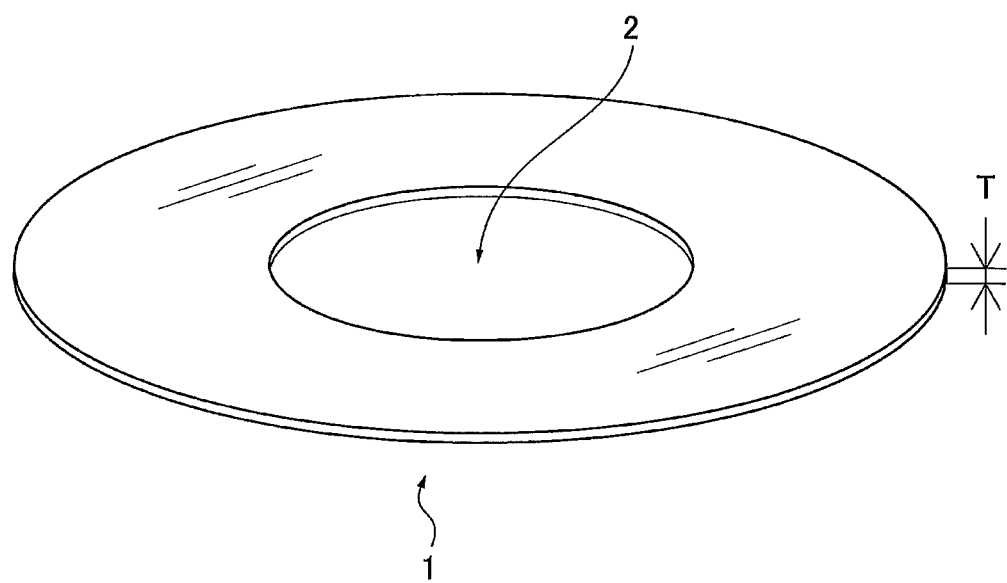
FIG. 28 is a perspective view illustrating an external shape of a glass substrate for magnetic disk of an embodiment.

As illustrated in FIG. 28, a glass substrate for magnetic disk 1 in this embodiment is a donut-shaped thin glass substrate. The size of the glass substrate for magnetic disk is not limited but for example, a glass substrate for magnetic disk having a nominal diameter of 2.5 inches is suitable. In the case of the glass substrate for magnetic disk having a nominal diameter of 2.5 inches, for example, the outer diameter is 65 mm, the diameter of a central hole 2 is 20 mm, and the thickness T is 0.6 to 1.0 mm. The flatness of the principal face of the glass substrate for magnetic disk of the embodiment is, for example, 4 μm or less, and the surface roughness (arithmetic mean roughness Ra) of the principal face is, for example, 0.2 nm or less. It is to be noted that the flatness required for a substrate for magnetic disk as a final product is, for example, 4 μm or less.

Aluminosilicate glass, soda-lime glass, borosilicate glass or the like can be used as a material of the glass substrate for magnetic disk in this embodiment. Particularly, the aluminosilicate glass can be suitably used in that chemically strengthening can be performed, and a glass substrate for magnetic disk excellent in flatness of the principal face and strength of the substrate can be prepared.

The composition of the glass substrate for magnetic disk of this embodiment is not limited, but the glass substrate of this embodiment is preferably made of aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol %.

[Method for Manufacturing Glass Substrate for Magnetic Disk of Embodiment]

Figure 29:
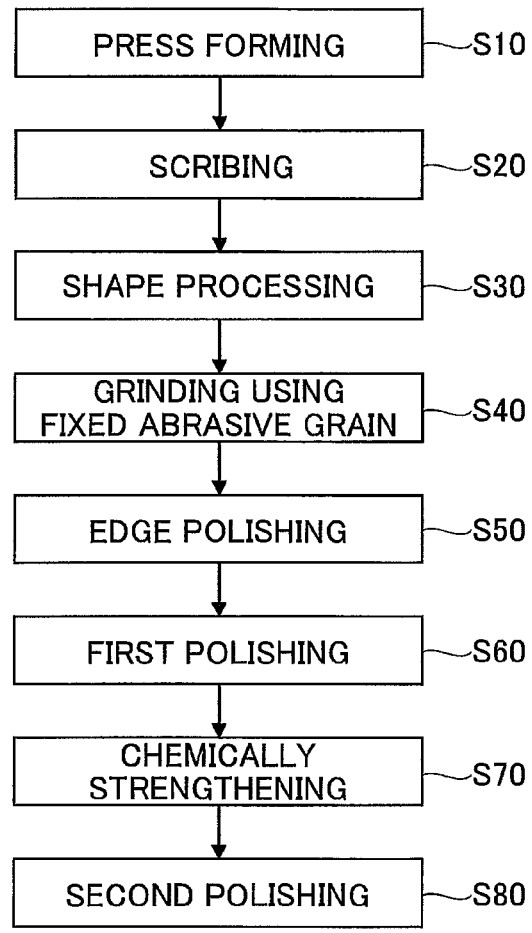
FIG. 29 is a view illustrating a flow of one embodiment of a method for manufacturing the glass substrate for magnetic disk of the embodiment.

Next, a flow of a method for manufacturing a glass substrate for magnetic disk will be described with reference to FIG. 29. FIG. 29 is a view illustrating a flow of one embodiment of a method for manufacturing a glass substrate for magnetic disk.

As illustrated in FIG. 29, in the method for manufacturing a glass substrate for magnetic disk in this embodiment, first a disk-shaped glass blank is prepared by press forming (Step S10). Next, the formed glass blank is scribed to prepare a donut-shaped glass substrate (Step S20). Next, the scribed glass substrate is subjected to shape processing (chamfering processing) (Step S30). Next, the glass substrate is subjected to grinding using a fixed abrasive grain (Step S40). Next, edge polishing of the glass substrate is performed (Step S50). Next, the principal face of the glass substrate is subjected to first polishing (Step S60). Next, the glass substrate, after first polishing, is subjected to chemically strengthening (Step S70). Next, the chemically strengthened glass substrate is subjected to second polishing (Step S80). The glass substrate for magnetic disk is obtained through the above processes.

Each process will be described in detail below.

(a) Press Forming Process (Step S10)

Figure 30:
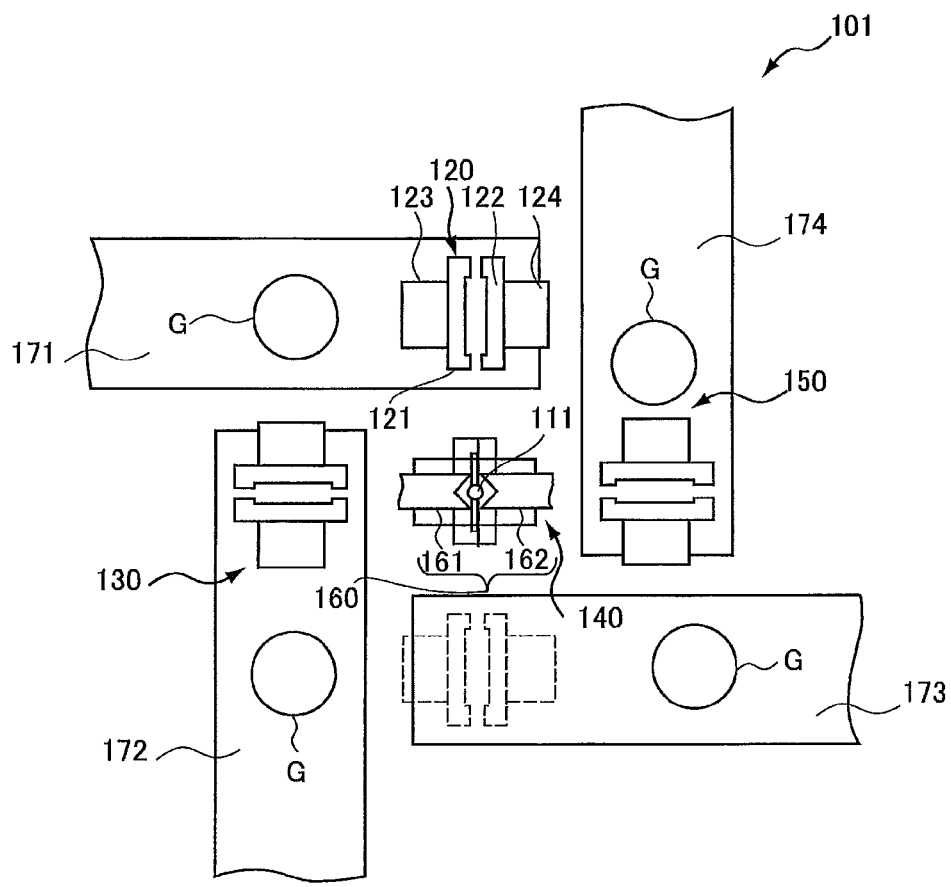
FIG. 30 is a plan view of an apparatus used in press forming of the embodiment.

First, the press forming process will be described with reference to FIG. 30. FIG. 30 is a plan view of an apparatus used in press forming. As illustrated in FIG. 30, an apparatus 101 includes four sets of press units 120, 130, 140 and 150, a cutting unit 160 and a cutting blade 165 (not illustrated in FIG. 29). The cutting unit 160 is provided on a path of a molten glass that flows out from a molten glass outflow port 111. In the apparatus 101, a lump of molten glass (hereinafter, also referred to as a gob) cut by the cutting unit 160 is caused to fall down, and the lump is pressed from both Sides of the falling path of the lump while the lump is sandwiched between surfaces of a pair of dies facing each other, thereby forming the glass blank.

Figure 31:
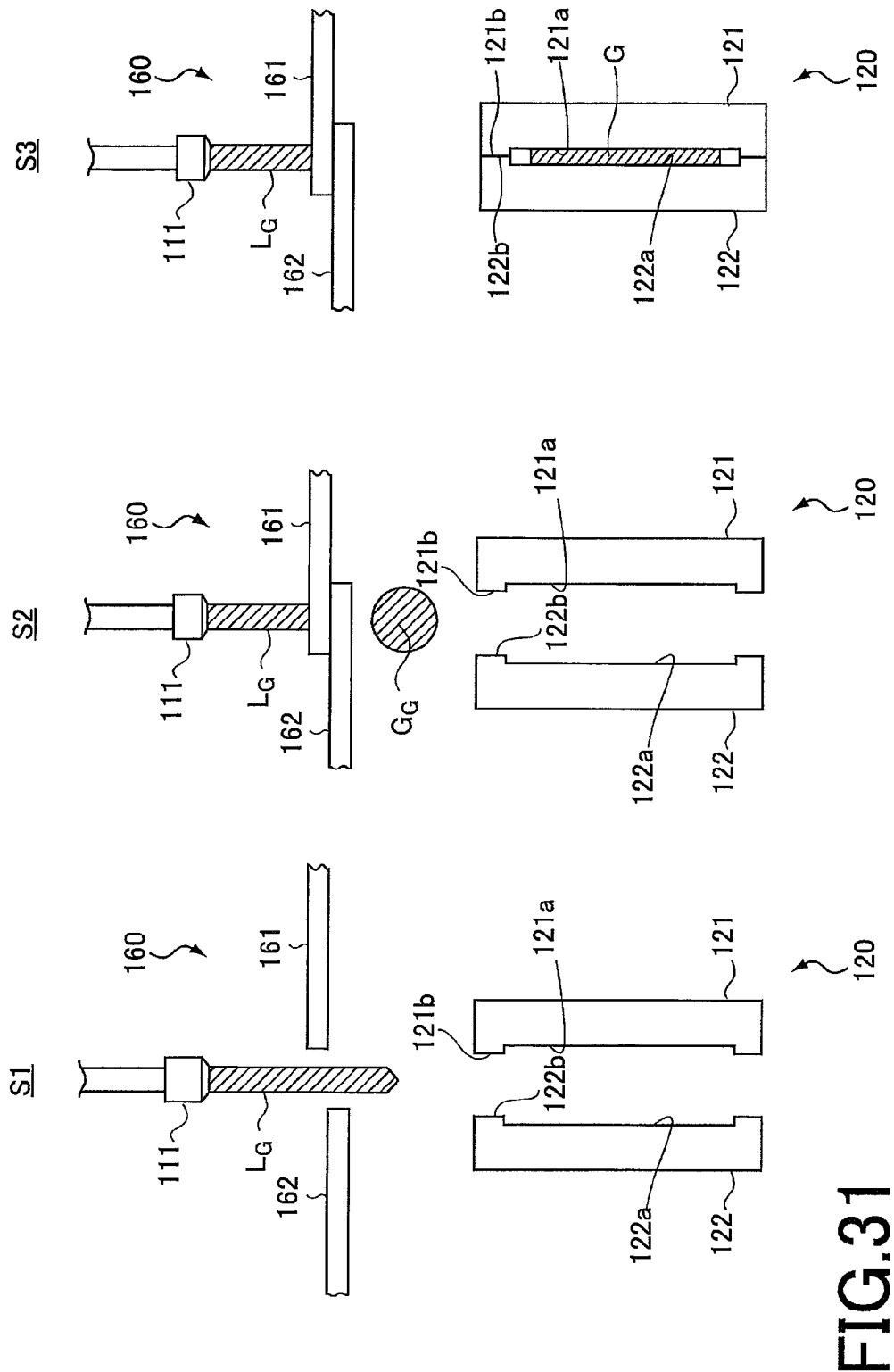
FIG. 31 is a view illustrating press forming of the embodiment.

Specifically, as illustrated in FIG. 31, in the apparatus 101, the four sets of press units 120, 130, 140, and 150 are provided at intervals of 90 degrees around the molten glass outflow port 111.

Each of the press units 120, 130, 140, and 150 is driven by a moving mechanism (not illustrated) so as to be able to proceed and retreat with respect to the molten glass outflow port 111. That is, each of the press units 120, 130, 140, and 150 can be moved between a catch position and a retreat position. The catch position (position in which the press unit 140 is drawn by a solid line in FIG. 30) is located immediately below the molten glass outflow port 111. The retreat position (positions in which the press units 120, 130, and 150 are drawn by solid lines and a position in which the press unit 140 is drawn by a broken line in FIG. 30) is located away from the molten glass outflow port 111.

The cutting unit 160 is provided on a path of the molten glass between the catch position (position in which the gob is captured by the press unit) and the molten glass outflow port 111. The cutting unit 160 forms the lump of molten glass by cutting a proper quantity of the molten glass flowing out from the molten glass outflow port 111. The cutting unit 160 includes a pair of cutting blades 161 and 162. The cutting blades 161 and 162 are driven so as to intersect each other on the path of the molten glass at constant timing. When the cutting blades 161 and 162 intersect each other, the molten glass is cut to obtain the gob. The obtained gob falls down toward the catch position.

The press unit 120 includes a first die 121, a second die 122, a first driving unit 123 and a second driving unit 124. Each of the first die 121 and the second die 122 is a plate-shaped member including a surface used to perform the press forming for the gob. The first die 121 and the second die 122 are disposed such that normal directions of the surfaces become substantially horizontal, and such that the surfaces become parallel to each other. The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other, for example, a mechanism in which an air cylinder or a solenoid and a coil spring are combined.

Because the structures of the press units 130, 140, and 150 are similar to that of the press unit 120, the descriptions of the press units 130, 140, and 150 are omitted.

After each press unit moves to the catch position, the falling gob is sandwiched between the first die and the second die by driving the first driving unit and the second driving unit, and the gob is formed into a predetermined thickness while rapidly cooled, thereby preparing a circular glass blank G. Next, after the press unit moves to the retreat position, the first die and the second die are separated to cause the formed glass blank G to fall down. A first conveyer 171, a second conveyer 172, a third conveyer 173, and a fourth conveyer 174 are provided below the retreat positions of the press units 120, 130, 140, and 150, respectively. Each of the first to fourth conveyers 171 to 174 receive the glass blank G falling down from the corresponding press unit, and the conveyer conveys the glass blank G to an apparatus (not illustrated) of the next process.

The apparatus 101 is configured such that the press units 120, 130, 140, and 150 sequentially move to the catch position and move to the retreat position while the gob is sandwiched, so that the glass blank G can continuously be formed without waiting for the cooling of the glass blank G in each press unit.

S1 of FIG. 31 to S3 of FIG. 31 more specifically illustrates press forming performed by the apparatus 101. S1 of FIG. 31 is a view illustrating the state before the gob is made, S2 of FIG. 31 is a view illustrating the state in which the gob is made by the cutting unit 160, and S3 of FIG. 31 is a view illustrating the state in which the glass blank G is formed by pressing the gob.

As illustrated in S1 of FIG. 31, a molten glass material $L_G$ continuously flows out from the molten glass outflow port 111. At this point, the cutting unit 160 is driven at predetermined timing to cut the molten glass material $L_G$ using the cutting blades 161 and 162 (S2 of FIG. 31). Therefore, the cut molten glass becomes a substantially spherical gob $G_G$ due to a surface tension thereof. Adjustment of the outflow quantity per time of the molten glass material $L_G$ and the driving interval of the cutting unit 160 may be appropriately performed according to a volume determined by the target size and thickness of the glass blank G.

The made gob $G_G$ falls down toward a gap between the first die 121 and second die 122 of the press unit 120. At this point, the first driving unit 123 and the second driving unit 124 (see FIG. 31) are driven such that the first die 121 and the second die 122 come close to each other at the timing the gob $G_G$ enters the gap between the first die 121 and the second die 122. Therefore, as illustrated in S3 of FIG. 31, the gob $G_G$ is captured (caught) between the first die 121 and the second die 122. An inner circumferential surface 121a of the first die 121 and an inner circumferential surface 122a of the second die 122 come close to each other with a micro gap, and the gob $G_G$ sandwiched between the inner circumferential surface 121a of the first die 121, and the inner circumferential surface 122a of the second die 122 is formed into a thin-plate shape. A projection 121b and a projection 122b are provided in the first inner circumferential surface 121a of the first die 121 and the second inner, circumferential surface 122a of the second die 122, respectively, in order to keep the gap between the inner circumferential surface 121a of the first die 121 and the inner circumferential surface 122a of the second die 122 constant. That is, the projection 121b and the projection 122b abut against each other, whereby the gap between the inner circumferential surface 121a of the first die 121 and the inner circumferential surface 122a of the second die 122 is kept constant, so that a plate-shaped space is generated.

Press forming is performed using a pair of dies 121 and 122 in the press forming process in press forming in this embodiment, and the outer shape of the glass blank is not restricted by the shape of the die. That is, as illustrated in S3 of FIG. 31, the gob stretched by closed dies does not reach projections 121b and 122b of the dies.

A temperature control mechanism (not illustrated) is provided in each of the first die 121 and second die 122, and temperatures at the first die 121 and second die 122 is retained sufficiently lower than the glass transition temperature $T_G$ of the molten glass $L_G$. It is not necessary to attach a mold release material to the first die 121 and the second die 122 in the press forming process.

There is a correlation between a difference in temperature at a position where the inner circumferential surface 121a of the first die 121 and the inner circumferential surface 122a of the second die 122 face each other at the time of press-forming the gob $G_G$, and flatness of the glass blank obtained after press forming. That is, the flatness of the glass blank obtained after press forming becomes better as the difference in temperature at an, opposed position between the inner circumferential surface 121 of the first die 121 and the inner circumferential surface 122a of the second die 122 decreases. This is because when the difference in temperature between a pair of dies is smaller, a thermal balance is achieved when the gob $G_G$ at a high temperature comes into contact the inner circumferential surface of the die and is thereby rapidly cooled, so that deterioration of the flatness of the glass blank that may be caused by a very small difference in degree of heat deformation between a pair dies at the cooling stage can be further suppressed.

Thus, if this correlation is known, a maximum value of a difference in temperature (absolute value) between a pair of dies (between the inner circumferential surface 121a of the first die 121 and the inner circumferential surface 122a of the second die 122) for achieving flatness required for the glass substrate for magnetic disk can be determined. Thus, when a difference in temperature between a pair of dies is controlled so as not to exceed its maximum value, flatness required for the glass substrate for magnetic disk can be achieved. For example, if the flatness required for the glass substrate for magnetic disk is 4 μm, press forming is performed while the difference in temperature between a pair of dies is kept at 5° C. or less.

The difference in temperature between dies is a difference in temperature as measured using a thermocouple at a point which is located 1 mm from each of the front faces of the inner circumferential surface 121a of the first die 121 and the inner circumferential surface 122a of the second die 122 to the inside of the die and at which the inner circumferential surface 121a and the inner circumferential surface 122a face each other (e.g. a point corresponding to the central position of the glass blank and central points of the inner circumferential surface 121a and the inner circumferential surface 122a).

Since glass substrate for magnetic disk of this embodiment is incorporated while being pivotally supported by a metallic spindle having a high thermal expansion coefficient within a hard disk as a magnetic disk that is a final product, the thermal expansion coefficient of the glass substrate for magnetic disk is preferably as high as that of the spindle. Therefore, the composition of the glass substrate for magnetic disk is defined so that the glass substrate for magnetic disk has a high thermal coefficient. The thermal expansion coefficient of the glass substrate for magnetic disk is, for example, in a range of 30 to $100\times10^{-7}(K^{-1})$, preferably in a range of 50 to $100\times10^{-7}(K^{-1})$. The thermal expansion coefficient is a value calculated using the linear expansion coefficients of the glass substrate for magnetic disk at temperatures of 100° C. and 300° C. A thermal expansion coefficient of, for example, less than $30\times10^{-7}(K^{-1})$ or more than $100\times10^{-7}$ is not preferable because a difference in thermal expansion coefficient between the glass substrate and the spindle is increased.

A time until the gob $G_G$ is completely confined between the first die 121 and the second die 122 after the gob $G_G$ comes into contact with the inner circumferential surface 121a of the first die 121 or the inner circumferential surface 122a of the second die 122, is as extremely short as about 0.06 second in the apparatus 101. Therefore, the gob $G_G$ is formed into the substantially disk shape by spreading along the inner circumferential surface 121a of the first die 121 and the inner circumferential surface 122a of the second die 122 within an extremely short time, and the gob $G_G$ is rapidly cooled and solidified in the form of amorphous glass. In this way, the glass blank G is prepared. The size of the glass blank G formed in this embodiment is, depending on the size of a desired glass substrate for magnetic disk, for example about 20 to 200 mm in diameter.

In the press forming method of this embodiment, the glass blank G is formed in a manner such that the inner circumferential surface 121a of the first die 121 and the inner circumferential surface 122a of the second die 122 are shape-transferred, and therefore preferably the flatness and the smoothness of each of the inner circumferential surfaces of a pair of dies are made comparable to those of a desired glass substrate for magnetic disk. In this case, necessity to subject the glass blank G to a surface processing process, i.e. a grinding and polishing process after press forming may be eliminated. That is, the glass blank G formed in the press forming method of this embodiment may have a thickness identical to the target thickness of the glass substrate for magnetic disk that is finally obtained. For example, the glass blank G is a disk-shaped sheet having a thickness of 0.2 to 1.1 mm. The surface roughness of each of the inner circumferential surface 121a and the inner circumferential surface 122a is preferably adjusted to 0.0005 to 0.05 μm so that the arithmetic mean roughness Ra of the glass blank G is 0.001 to 0.1 μm.

After the first die 121 and the second die 122 are closed, the press unit 120 quickly moves to the retreat position, instead the press unit 130 moves to the catch position, and the press unit 130 performs the pressing to the gob $G_G$.

After the press unit 120 moves to the retreat position, the first die 121 and the second die 122 are kept closed until the glass blank G is sufficiently cooled (at least until the glass blank G has a temperature below a yield point). Then, the first driving unit 123 and the second driving unit 124 are driven to separate the first die 121 and the second die 122, the glass blank G falls down from the press unit 120, and the conveyer 171 located below the press unit 120 receives the glass blank G (see FIG. 30).

As described above, in the apparatus 101, the first die 121 and the second die 122 are closed within a time as extremely short as 0.1 second (about 0.06 second), and the molten glass substantially simultaneously comes into contact with the whole of the inner circumferential surface 121a of the first die 121 and the whole of the inner circumferential surface 122a of the second die 122. Therefore, the inner circumferential surface 121a of the first die 121 and the inner circumferential surface 122a of the second die 122 are not locally heated, and a strain is hardly generated in the inner circumferential surface 121a and the inner circumferential surface 122a. Because the molten glass is formed into the disk shape before the heat transfers from the molten glass to the first die 121 and the second die 122, a temperature distribution of the formed molten glass becomes substantially even. Therefore, in cooling the molten glass, variation of the shrinkage quantity of the glass material is small, and the large strain is not generated in the glass blank G. Accordingly, the flatness of the principal face of the prepared glass blank G is improved as compared to a glass blank prepared by conventional press forming with an upper die and a lower die.

In the example illustrated in FIG. 31, the substantially spherical gob $G_G$ is formed by cutting the flowing-out molten glass $L_G$ using the cutting blades 161 and 162. However, when viscosity of the molten glass material $L_G$ is small with respect to a volume of the gob $G_G$ to be cut, the glass does not become the substantially spherical shape only by cutting the molten glass $L_G$, and the gob is not formed. In such cases, a gob forming die is used to form the gob.

Figure 32:
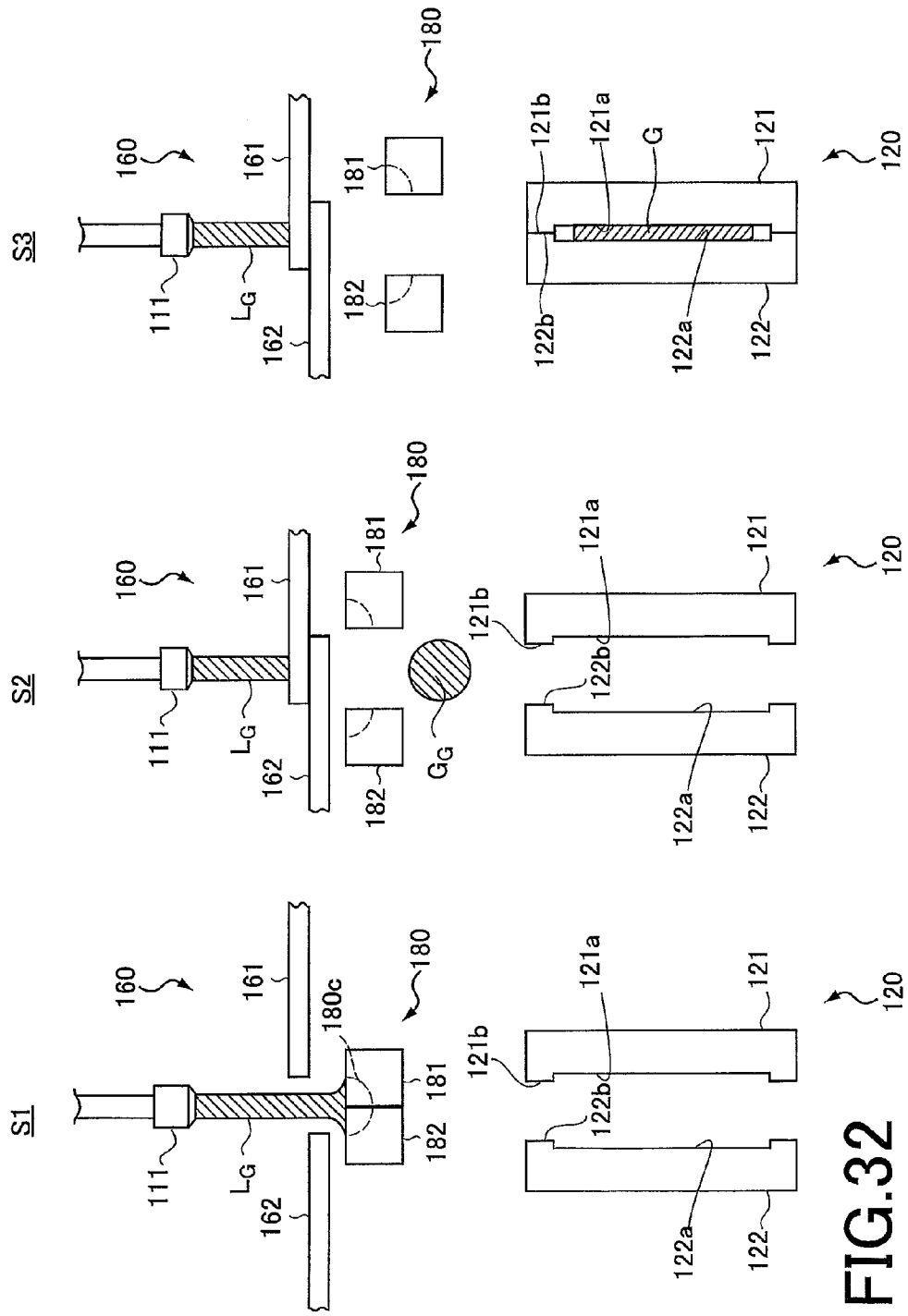
FIG. 32 is a view illustrating a modification of press forming of the embodiment using a gob forming die.

S1 of FIG. 32 to S3 of FIG. 32 are views illustrating a modification of the embodiment of FIG. 31. The gob forming die is used in the modification. S1 of FIG. 32 is a view illustrating the state before the gob is made, S2 of FIG. 32 is a view illustrating the state in which the gob $G_G$ is made by the cutting unit 160 and a gob forming die 180, and S3 of FIG. 32 is a view illustrating the state in which the press forming is performed to the gob $G_G$ to make the glass blank G.

As illustrated in S1 of FIG. 32, the path of the molten glass $L_G$ to the press unit 120 is closed by closing the blocks 181 and 182, and the lump of the molten glass $L_G$ cut with the cutting unit 160 is received by a recess 180C formed by the blocks 181 and 182. Then, as illustrated in S2 of FIG. 32, the molten glass $L_G$ that becomes the spherical shape in the recess 180C falls down toward the press unit 120 at one time by opening the blocks 181 and 182. When falling down toward the press unit 120, the gob $G_G$ becomes the spherical shape by the surface tension of the molten glass $L_G$. As illustrated in S3 of FIG. 32, during the fall of the gob $G_G$, the spherical gob $G_G$ is sandwiched between the first die 121 and the second die 122 to perform the press forming, thereby preparing the disk-shaped glass blank G.

Figure 33:
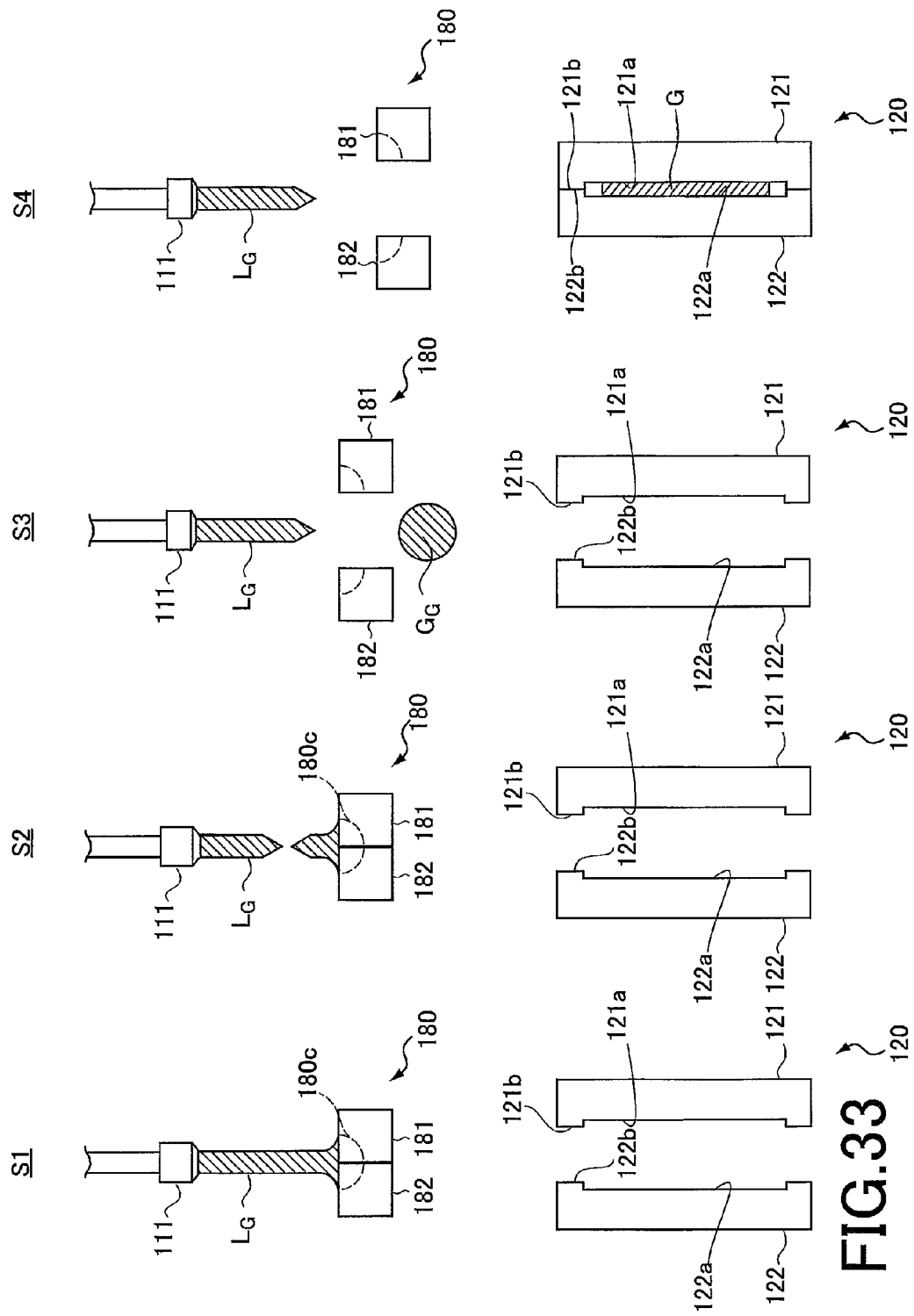
FIG. 33 is a view illustrating a modification of press forming of the embodiment in which a cutting unit is not used.

Alternatively, as illustrated in S1 of FIG. 33 to S4 FIG. 33, in the apparatus 101, instead of using the cutting unit 160 illustrated in S1 of FIG. 32 to S3 of FIG. 32, a moving mechanism that moves the gob forming die 180 in an upstream direction or a downstream direction along the path of the molten glass $L_G$ may be used. S1 of FIG. 33 to S4 of FIG. 33 are views illustrating a modification in which the gob forming die 180 is used. S1 of FIG. 33 and S2 of FIG. 33 are views illustrating the state before the gob $G_G$ is made, S3 of FIG. 33 is a view illustrating the state in which the gob $G_G$ is made by the gob forming die 180, and S4 of FIG. 33 is a view illustrating the state in which the gob $G_G$ is subjected to press forming to make the glass blank G.

As illustrated in S1 of FIG. 33, the recess 180C formed by the blocks 181 and 182 receives the molten glass $L_G$ flowing out from the molten glass outflow port 111. As illustrated in S2 of FIG. 33, the blocks 181 an 182 are quickly moved onto the downstream side of the flow of the molten glass $L_G$ at predetermined timing. In this way, the molten glass $L_G$ is cut. Then, as illustrated in S3 of FIG. 33, the blocks 181 and 182 are separated at predetermined timing. Therefore, the molten glass $L_G$ retained by the blocks 181 and 182 falls down at one time, and the gob $G_G$ becomes the spherical shape by the surface tension of the molten glass $L_G$. As illustrated in S4 of FIG. 33, during the fall of the gob $G_G$, the spherical gob $G_G$ is sandwiched between the first die 121 and the second die 122 to perform the press forming, thereby preparing the disk-shaped glass blank G.

Figure 34:
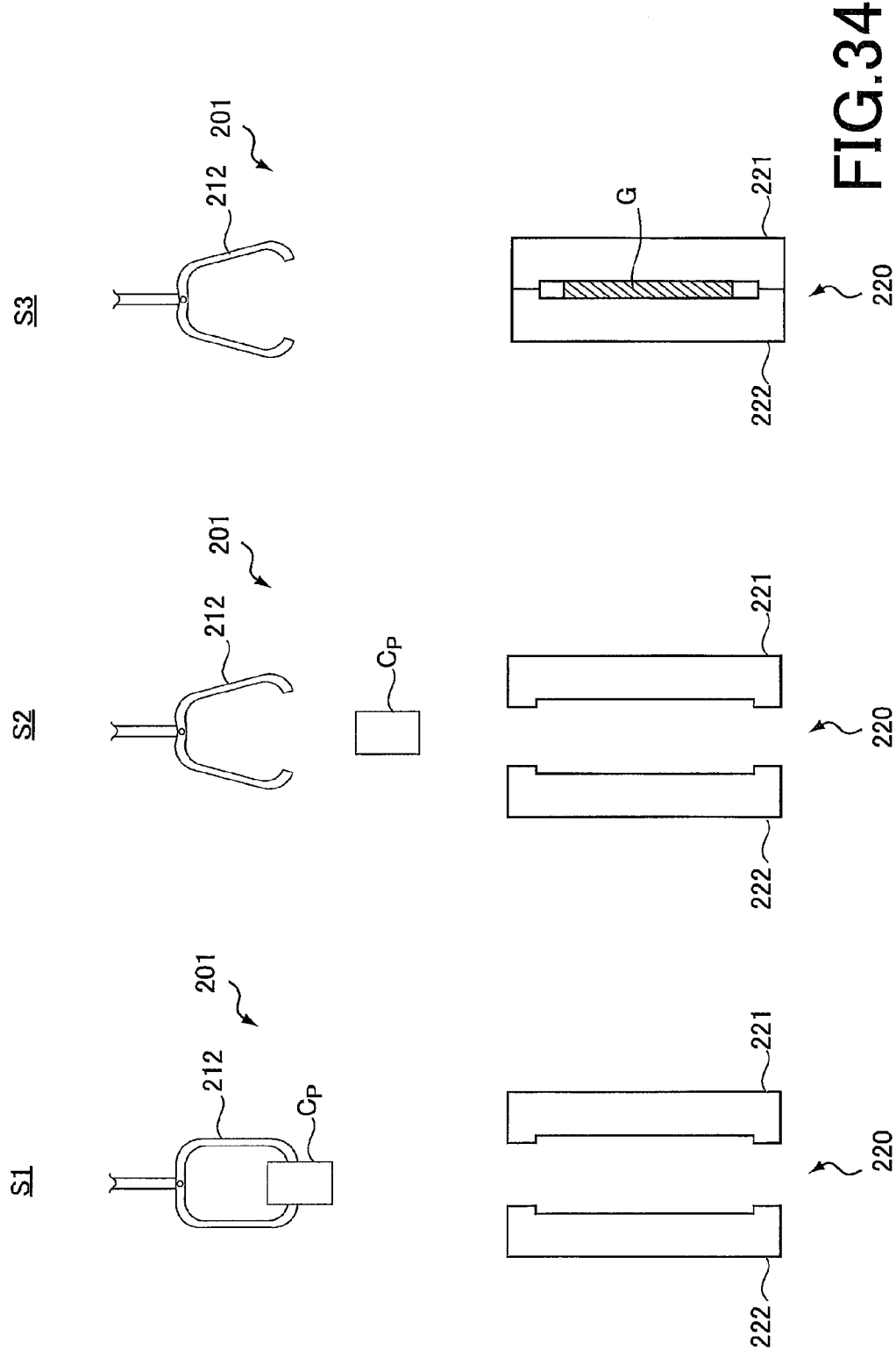
FIG. 34 is a view illustrating a modification of press forming of the embodiment using an optical glass heated by a softening furnace.

S1 of FIG. 34 to S3 of FIG. 34 are views illustrating another modification in which, instead of the gob $G_G$, a lump $C_P$, of the optical glass heated by a softening furnace (not illustrated) is caused to fall down and the press forming is performed to the lump $C_P$ while the lump $C_P$ is sandwiched from both sides between dies 221 and 222 during the fall of the lump $C_P$. S1 of FIG. 34 is a view illustrating the state before the lump of the heated optical glass is formed, S2 of FIG. 34 is a view illustrating the state in which the lump of the optical glass falls down, and S3 of FIG. 34 is a view illustrating the state in which the press forming is performed to the lump of the optical glass to make the glass blank G.

As illustrated in S1 of FIG. 34, in an apparatus 201, a glass material grasping mechanism 212 conveys the lump $C_P$ of the optical glass to a position above a press unit 220. As illustrated in S2 of FIG. 34, the glass material grasping mechanism 212 releases the lump $C_P$ of the optical glass to cause the lump $C_P$ of the optical glass to fall down. As illustrated in S3 of FIG. 34, during the fall of the lump $C_P$ of the optical glass, the lump $C_P$ is sandwiched between the first die 221 and the second die 222 to perform the press forming, thereby preparing the disk-shaped glass blank G. Because the first die 221 and the second die 222 have the same configuration and action as those of the first die 121 and second die 122 illustrated in FIG. 32, the descriptions are omitted.

[Modification of Press Forming Method]

A modification of the press forming method will be described with reference to FIG. 35.

Figure 35:
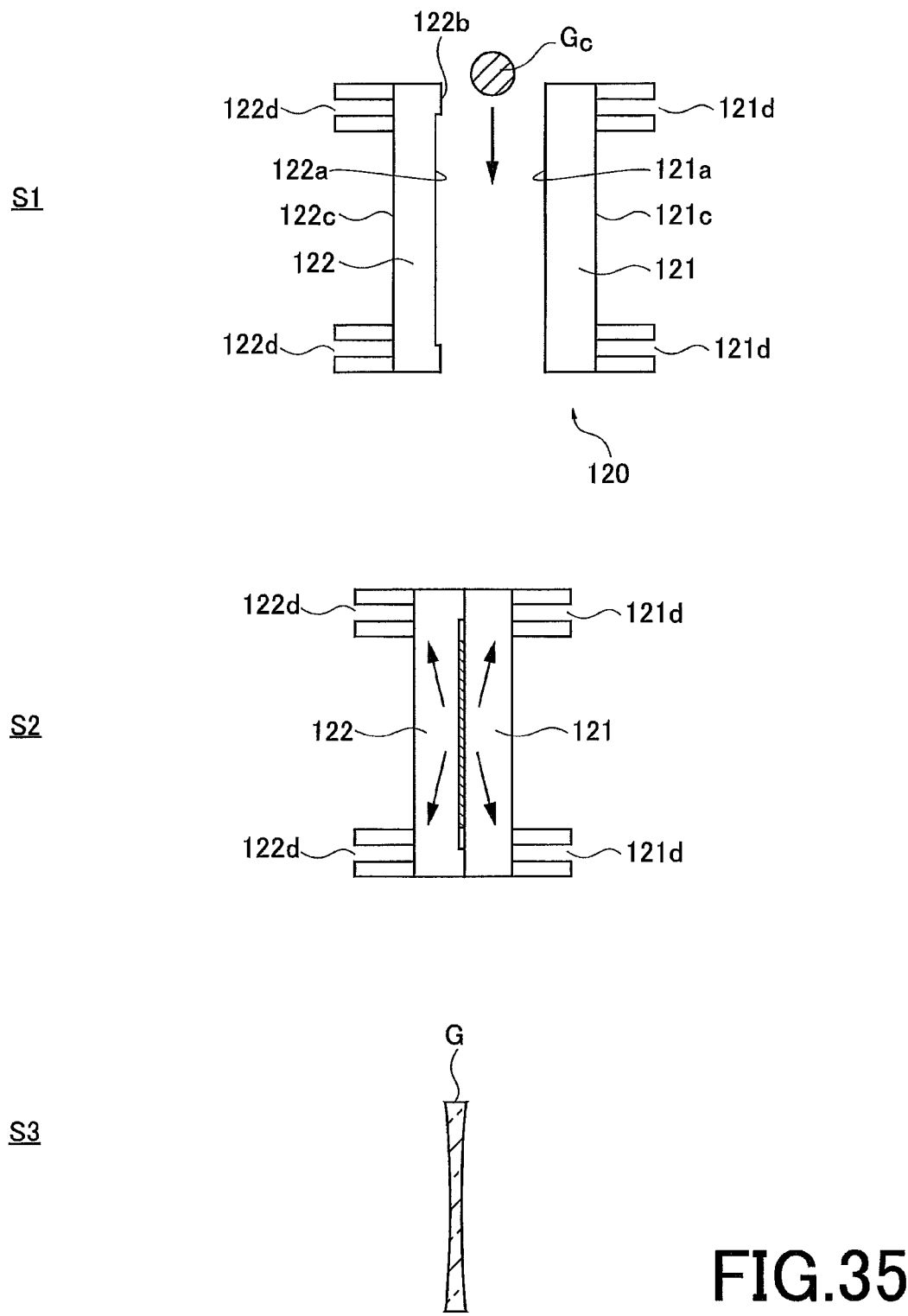
FIG. 35 is a view illustrating another modification of press forming of the embodiment.

In this modification, as illustrated in S1 of FIG. 35, heat sinks 121d and 122d are provided at the outer circumferential edges of outer circumferential surfaces 121c and 122c opposite, respectively, to the inner circumferential surface 121a and inner circumferential surface 122a as planar press forming surfaces, such that the heat sinks 121d and 122d surround the circumference of the disk-shaped glass blank, in the first die 121 and second die 122 illustrated in S1 of FIG. 31 to S3 of FIG. 31. Since the heat sinks 121d and 122d are provided in the first die 121 and the second die 122, a flow of heat as illustrated in S2 of FIG. 35 is generated in the first die 121 and the second die 122 during press forming, so that there is a difference in cooling between the portion of the outer circumference side and the central portion side of the glass blank during press forming. Consequently, the glass blank G after press forming is a concave-shaped glass blank in which the cross-sectional shape of the formed glass blank G decreases in thickness as going from the outer circumference side toward the center side as illustrated in S3 of FIG. 35. In this case, the flatness of the glass blank G can lead to target flatness intended for a glass substrate for magnetic disk, for example 4 μm or less. This is because when the glass blank G is press-formed, the temperature of the portions of the inner circumferential surface 121a and inner circumferential surface 122a on both sides of dies, which are in contact with the glass blank, is substantially identical between the inner circumferential surface, 121 and the inner circumferential surface 122a over a period of time until the pressed glass blank G decreases to a strain point after press of dies is started.

The purpose of intentionally forming the concave-shaped glass blank is to efficiently perform grinding using a fixed abrasive grain as a subsequent process. For example, at the time of grinding, the outer circumferential edge portion of the glass blank, which has a large thickness, is easily serves as a starting point of grinding processing using a fixed abrasive grain such as a diamond sheet. The machining allowance in grinding can be reduced to about a half of that of a glass blank having a uniform thickness. Further, the warp of a glass blank having a surface irregularity, the period of which is long as compared to the flatness, can be improved.

For the thickness of the glass blank G having a concave-shaped cross section as illustrated in S3 of FIG. 35, a difference between the maximum thickness and the minimum thickness is, for example, 8 μm. The thickness of the glass blank G can be measured using, for example, a micrometer.

(b) Scribing Process (Step S20)

Next, the scribing process will be described. After the press forming process, the formed glass blank G is subjected to scribing in the scribing process.

As used herein, the scribing means that two concentric (inside concentric and outside concentric) cutting lines (linear scratches) are provided in the surface of the glass blank G with a scriber made of a super alloy or diamond particles in order to obtain the donut-shape (ring-shape) of the formed glass blank G having a predetermined size. The glass blank G scribed into two-concentric-circle shape is partially heated, and a portion outside the outside concentric circle and a portion inside the inside concentric circle are removed by a difference in thermal expansion of the glass blank G In this way, a donut-shaped glass substrate is obtained.

A donut-shaped glass substrate can also be obtained by forming a circular hole in the glass blank using a core drill or the like.

(c) Shape Processing Process (Step S30)

Next, the shape processing process will be described. The shape processing process includes chamfering processing of the end portion of the glass substrate (chamfering of outer circumferential end portion and inner circumferential end portion) after the scribing process. Chamfering processing is shape processing in which the outer circumferential end portion and inner circumferential end portion of the glass substrate after the scribing process is chamfered between a principal face and a side wall portion perpendicular to the principal face using a diamond abrasive grain. The chamfering angle is, for example, 40 to 50 degrees with respect to the principal face.

(d) Grinding Process using Fixed Abrasive Grain (Step S40)

In the grinding process using a fixed abrasive grain, the principal face of the glass substrate after the shape processing process is subjected to grinding processing (machining) using a double faces grinding apparatus including a planet gear mechanism. For example, the grinding has the machining allowance f several micrometers to about 100 micrometers. The double faces grinding apparatus includes a pair of upper and lower surface plates (upper surface plate and lower surface plate), and a glass substrate is held between the upper surface plate and the lower surface plate. By moving one or both of the upper surface plate and the lower surface plate, the glass substrate and each surface plate are relatively moved, whereby both principal faces of the glass substrate can be ground.

In the press forming process of this embodiment, a glass blank having an extremely high flatness can be prepared, and therefore the grinding process may be omitted. Before the grinding process, a lapping process may be performed using a double faces grinding apparatus similar to the apparatus used in the grinding process and an alumina loose abrasive grain.

(e) Edge Polishing Process (Step S50)

Next, the glass substrate after the grinding process is subjected to edge polishing.

In edge polishing, the inner circumferential end face and outer circumferential end face of the glass substrate are subjected to mirror surface finishing by brush polishing. At this point, slurry that includes fine particles such as cerium oxide as the loose abrasive grain is used. By performing edge polishing, an impairment such as contamination by deposition of dust or the like, damage or a flaw is eliminated, whereby occurrence of a thermal asperity and deposition of ions of sodium, potassium and the like which may cause corrosion can be prevented.

(f) First Polishing Process (Step S60)

Next, the principal face of the glass substrate after the edge polishing process is subjected to first polishing. For example, first polishing has the machining allowance of several micrometers to about 50 micrometers. First polishing is intended to remove the flaw left on the principal face after the grinding using the fixed abrasive grain, the strain and the micro-surface irregularity (micro-waviness and roughness). In the first polishing process, polishing is performed while a polishing solution is fed using a double polishing apparatus having a structure similar to that of the apparatus used in the grinding process. A polishing agent contained in the polishing solution is, for example, a cerium oxide abrasive grain or a zirconia abrasive grain.

In the first polishing process, polishing is performed so as to have a surface roughness (Ra) of 0.5 nm or less and micro-waviness (MW-Rq) of 0.5 nm or less for the principal face of the glass substrate.

The micro-waviness may be represented by a RMS (Rq) value, calculated as roughness at a wavelength bandwidth of 100 to 500 μm in a region of 14.0 to 31.5 mm radius in the whole of the principal face, and can be measured using, for example, Model-4224 manufactured by Polytec Inc.

The surface roughness is represented by an arithmetic mean roughness Ra defined in JIS B0601:2001 and, for example, can be measured with a roughness measuring machine SV-3100 manufactured by Mitutoyo Corporation and calculated by a method defined in JIS B0633:2001 when the roughness is no less than 0.006 μm and no more than 200 μm. When as a result, the roughness is 0.03 μm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 512×512 pixels in a measurement area of 1 μm×1 μm square can be used.

(g) Chemically Strengthening Process (Step S70)

Next, the glass substrate after the first polishing process is subjected to chemically strengthening treatment.

For example, a mixed solution of potassium nitride (60% by weight) and sodium sulfate (40% by weight) can be used as a chemically strengthening, solution. In the chemically strengthening process, a chemically strengthening solution is heated to, for example, 300° C. to 400° C., a washed glass substrate is preheated to, for example, 200° C. to 300° C., and the glass substrate is then dipped in the chemically strengthening solution for, for example, 3 to 4 hours.

When the glass substrate is dipped in the chemically strengthening solution, the lithium ion and the sodium ion in the surface layer of the glass substrate are replaced, respectively, by the sodium ion and the potassium ion which have relatively large ion radiuses in the chemically strengthening solution, so that a compressive stress layer is formed on the surface layer portion, thereby strengthening the glass substrate. The glass substrate subjected to the chemically strengthening treatment is washed. For example, the glass substrate is washed with sulfuric acid, and then washed with pure water or the like.

(h) Second Polishing Process (Step S80)

Next, the glass substrate, after chemically strengthening process is subjected to second polishing. Second polishing has the machining allowance of about 1 μm. Second polishing is intended at the mirror surface polishing of the principal face. In second polishing, for example, the polishing apparatus used in first polishing is used. At this point, the second polishing differs from the first polishing in the following points: the kind and particle size of the loose abrasive grain, and hardness of the resin polisher.

For example, the slurry of the turbid fine particles such as colloidal silica (particle size: diameter of about 10 to 50 nm) is used as the loose abrasive grain used in the second polishing.

The polished glass substrate is washed with a neutral detergent, pure water, IPA or the like to obtain a glass substrate for magnetic disk.

It is not necessarily essential to perform the second polishing process, but it is preferable to perform the second polishing process because the level of the surface irregularity of the principal face of the glass substrate can be further improved. By performing the second polishing process, the principal face can be made to have roughness (Ra) of 0.1 nm or less and micro-waviness (MW-Rq) of 0.1 nm or less.

As described above, the method for manufacturing a glass blank for magnetic disk in this embodiment includes a press forming process of press-forming a lump of molten glass using a pair of dies. Therefore, when the surface roughness of the inner circumferential surfaces of a pair of dies is set at a good level (e.g. surface roughness required for the glass substrate for magnetic disk), the surface roughness of the glass blank can be kept at a good level because the surface roughness of the inner circumferential surface of the die is shape-transferred as the surface roughness of the glass blank. In the press forming process, a difference in temperature between a pair of dies, with which flatness required for the glass, substrate, for magnetic disk can be achieved, may be determined based on a correlation between a difference in temperature at a position where the pair of dies face each other at the time of press-forming the molten glass and flatness of the glass blank obtained after press forming, followed by performing press forming while the temperature of a pair of dies is controlled so that a difference in temperature between a pair of dies is no more than the determined difference in temperature. Therefore, the glass blank obtained in the press forming process of this embodiment does not require a process of machining the principal face because the surface roughness and flatness of the principal face of the glass blank can be kept at a level required for the glass substrate for magnetic disk. The glass substrate shape-processed into a predetermined shape based on the glass blank is subjected to chemically strengthening, but the flatness of the glass substrate is not deteriorated by chemically strengthening in this embodiment. Therefore, the glass substrate for magnetic disk which is finally obtained is thin, and has a high mechanical strength, and flatness higher than was previously possible.

[Magnetic Disk]

The glass substrate for magnetic disk is prepared through the processes described above. A magnetic disk is obtained in the following manner using the above-described glass substrate for magnetic disk.

The magnetic disk has, for example, a configuration in which on the principal face of the glass substrate, at least an adhesive layer, an underlying layer, a magnetic layer (magnetic recording layer), a protective layer and a lubricant layer are stacked in this order from the side closest to the principal face.

For example, the substrate is introduced into an evacuated deposition apparatus, and the adhesive layer, the underlying layer and the magnetic layer are sequentially deposited in an Ar atmosphere by a DC magnetron sputtering method. For example CrTi may be used as the adhesive layer, and for example CrRu may be used as the underlying layer. For example a CoPt-based alloy may be used as the magnetic layer. Also, a CoPt-based alloy or FePt-based alloy having a $L_{10}$ ordered structure may be deposited to form a magnetic layer for heat assisted magnetic recording. After the deposition described above, the protective layer is deposited using $C_2H_4$ by, for example, a CVD method, and subsequently nitriding treatment is performed to introduce nitrogen to the surface, whereby a magnetic recording medium can be formed. Thereafter, the lubricant layer can be formed by applying, for example, PFPE (perfluoropolyether) onto the protective layer by a dip coating method.

Examples

The present invention will be further described below by way of Examples. However, the present invention is not limited to aspects described in Examples.

(1) Preparation of Molten Glass

Raw materials were weighed so as to obtain a glass having the following composition, and mixed to obtain a mixed raw material. This raw material was put in a melting vessel, heated, melted, clarified and stirred to prepare a homogeneous molten glass free from, foam and an unmelted substance. Foam and an unmelted substance, deposition of crystals, and contaminants such as a refractory material, and platinum forming the melting vessel were not observed in the glass obtained.

[Composition of Glass]

Aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol %.

The above-described molten glass was provided, and a glass blank having a diameter of 75 mm and a thickness of 0.9 mm was prepared using a press forming method of the present invention (method using the apparatus in FIGS. 30 and 31). The temperature of a molten glass material $L_G$ discharged from a molten glass outflow port 111 was 1300° C., and the viscosity of the molten glass material $L_G$ at this time was 700 poise. The surface roughness (arithmetic mean roughness Ra) of the inner circumferential surfaces of a first die and a second die was 0.01 μm to 0.1 μm.

The molten glass material $L_G$ discharged from a molten glass outflow port 111 was cut by a cutting unit 160, so that a gob $G_G$ having a thickness of about 20 mm was formed. The gob $G_G$ was cooled while being pressed under a load of 3000 kgf by a press unit until the gob $G_G$ had a temperature equal to or lower than the glass transition temperature (Tg) of the molten glass material (about 10 seconds), so that a glass blank having a diameter of 75 mm was formed.

In this Example, the target flatness of the glass blank formed by the press forming process (flatness required for the glass blank) was 8 μm or less as one example. Here, the reason why the target flatness of the glass blank was 8 μm or less is that the target flatness of a magnetic disk, which is required for preventing contact of a head when the magnetic disk as a final product is mounted in a hard disk device, is considered to be 4 μm. Since the flatness is not changed before and after formation of a film on the glass substrate for magnetic disk, it can be ensured that the flatness of the magnetic disk is 4 μm or less if the flatness of the glass substrate for magnetic disk is 4 μm or less, but if the flatness of the glass blank formed in the press forming process is more than 8 μm, it is difficult to ensure that the flatness of the glass substrate after grinding process is 4 μm or less even when the grinding process as a subsequent process is performed. Thus, the target flatness of the glass blank was 8 μm or less. It is further preferred that the flatness of the glass blank formed in the press forming process is 4 μm or less because it can be ensured that the flatness of the magnetic disk is 4 μm or less even if the grinding process as a subsequent process is omitted.

In this Example, the flatness of the resulting glass blank was measured with the temperature of the second die being changed from 450 to 490° C. while the temperature of the first die was fixed at 470° C. in order to find out conditions for a difference in temperature between a pair of dies, which satisfies the target flatness of the glass blank. The reason why the minimum temperature of the die was set to 450° C. is that when the minimum temperature of the die is lower than 450° C., the glass may be broken during pressing.

[Measurement of Glass Blank Prepared in Example]

For the glass blank having a diameter of 75 mm, which had been prepared in Example, the flatness and the surface roughness (arithmetic mean roughness Ra) were measured.

The flatness can be defined as a difference in height between the lowest position and the highest position in the normal axis direction in the principal face of the disk-shaped glass blank.

The flatness was measured using, for example, Flatness Tester FT-900 manufactured by NIDEK CO., LTD. Evaluation criteria for the flatness illustrated in Table 4 are as follows. It is preferred that the flatness of the glass blank is 8.0 μm or less in the following criteria because the flatness can be improved to a level of 4 μm or less, which is target flatness of the glass substrate for magnetic disk. It is preferred that the flatness of the glass blank is 4.0 μm or less because the target flatness of the glass substrate for magnetic disk can be achieved even if the grinding process is omitted, thereby leading to cost reduction.

Very good: The flatness is 2.0 μm or less.
Good: The flatness is more than 2.0 μm and no more than 4.0 μm.
Fair: The flatness is more than 4.0 μm and no more than 8.0 μm.
Poor: The flatness is more than 8.0 μm.

The surface roughness is represented by an arithmetic mean roughness Ra defined in JIS B0601:2001 and for example, can be measured with a roughness measuring machine SV-3100 manufactured by Mitutoyo Corporation and calculated by a method defined in JIS B0633:2001 when the roughness is no less than 0.006 μm and no more than 200 μm. When as a result, the roughness is 0.03 μm or less, for example, the roughness can be measured with a scanning probe microscope (atomic force microscope) nanoscope manufactured by Veeco Instruments Inc. and can be calculated by a method defined in JIS R683:2007. In the present, application, an arithmetic mean roughness Ra as measured in a resolution of 256×256 pixels in a measurement area of 10 μm×10 μm square was used. As a result, the surface roughness of the glass blank was 0.05 μm or less in all examples. This is because regardless of the temperature of the die, the inner circumferential surfaces of the first die and the second die are shape-transferred to the glass blank, so that the surface roughness of the glass blank is comparable to the surface roughness of the inner circumferential surfaces of the first die and the second die. When the arithmetical mean roughness Ra is 0.1 µm or less, target surface properties of the glass substrate for magnetic disk can be obtained by omitting the grinding process to the principal face and performing the polishing process directly.

In the press forming method of this embodiment, unlike the conventional direct press method, the glass gob is not seized to the die even when the surface roughness is reduced. Thus, the press forming method of this embodiment is preferable in that the surface roughness of the die can be reduced for obtaining a glass blank having a desired surface roughness.

TABLE 4

|  | Difference in temperature between first die and second die(*) | Flatness | Evaluation of flatness |
|---|---|---|---|
| Sample 1 | +20° C. | 15.8 µm | Poor |
| Sample 2 | −20° C. | 16.1 µm | Poor |
| Sample 3 | +11° C. | 8.9 µm | Poor |
| Sample 4 | −11° C. | 8.8 µm | Poor |
| Sample 5 | +9° C. | 7.5 µm | Fair |
| Sample 6 | −9° C. | 7.0 µm | Fair |
| Sample 7 | +5° C. | 3.9 µm | Good |
| Sample 8 | +1° C. | 1.0 µm | Very good |

(*)The difference in temperature between the first die and the second die is a value obtained by subtracting the temperature of the first die (470° C. here) from the temperature of the second die.

Figure 36:
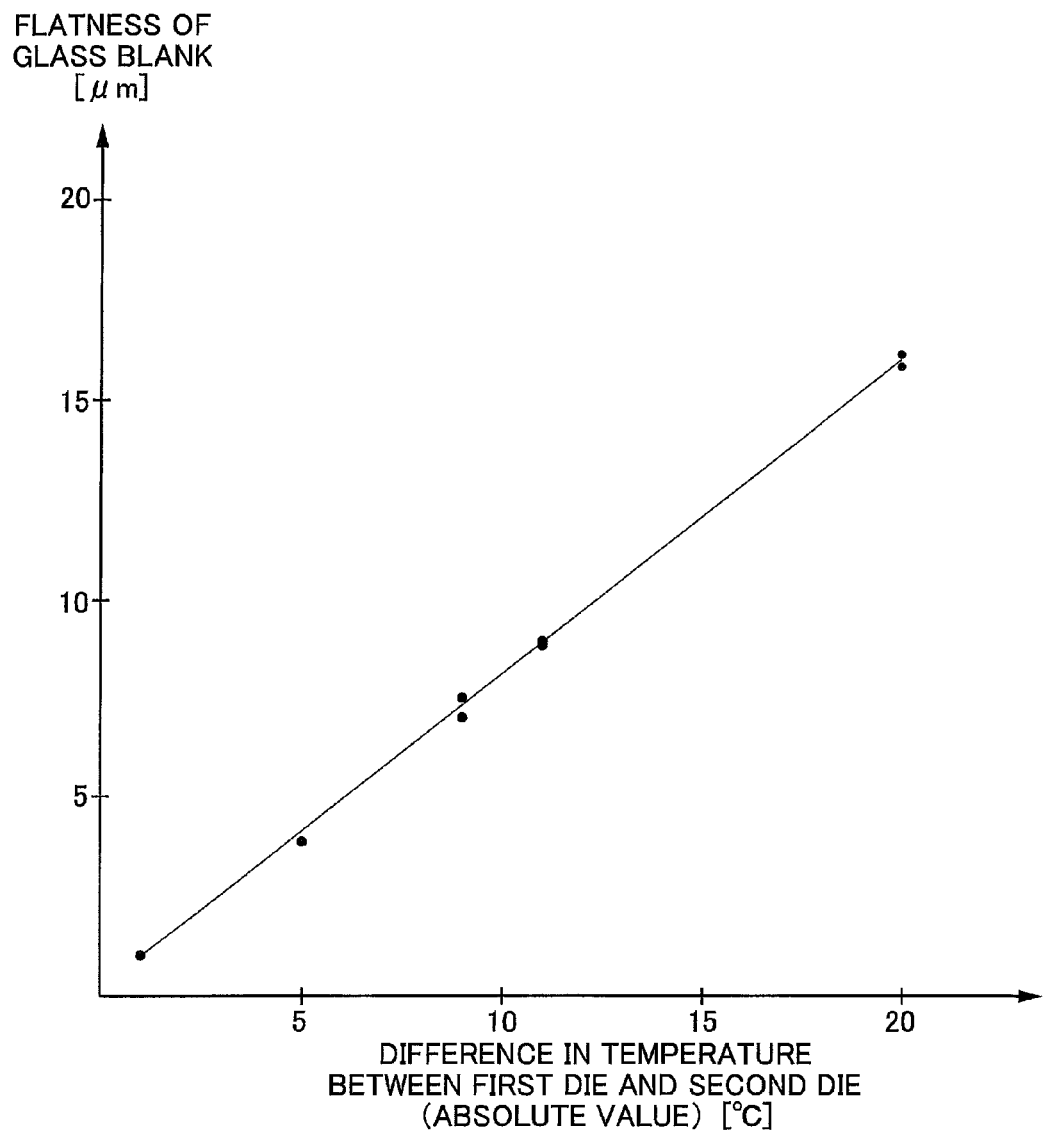
FIG. 36 is a view illustrating a correlation between a difference in temperature between a pair of dies and flatness of a glass blank in Example.

From Table 4, it is apparent that there is a correlation between a difference in temperature between a pair of dies when the glass blank of each sample is press-formed and flatness of the glass blank of each sample. When the relationship between the difference in temperature and the flatness for each sample in Table 4 is plotted, there is an approximately proportional relationship between the former and the latter as illustrated in FIG. 36. That is, where the difference in temperature on the abscissa is X[° C.] and the flatness on the ordinate is Y[µm], the relationship of Y=0.8X holds on the whole. As is apparent from Table 4 and FIG. 36, particularly the highest flatness was achieved when the difference in temperature was 1° C. or less.

When referring to FIG. 36, it is apparent that the difference in temperature between the first die and the second die may be set at 10° C. or less for satisfying the target flatness of the glass blank (8 µm or less in this embodiment). The flatness of the glass blank may be set at 4 µm or less for omitting the grinding process after press forming as described above, and it is apparent that for achieving this flatness, the difference in temperature between the first die and the second die may be set at 5° C. or less.

[Preparation of Glass Substrate for Magnetic Disk in Example]

Using the glass blanks of samples 2, 4, 6 and 7 described above, glass substrates for magnetic disk were prepared, respectively, by performing all the processes except for the process of the step S40 illustrated in FIG. 29. That is, the glass substrate for magnetic disk was prepared without performing the process of grinding the principal face for improving the flatness. The prepared glass substrate for magnetic disk has a nominal 2.5 inch size (an inner diameter of 20 mm, an outer diameter of 65 mm and a thickness of 0.8 mm).

In preparation of the glass substrate for magnetic disk, the processes of first polishing and second polishing were performed under the following conditions.

First polishing process: polishing was performed using cerium oxide (average particle size: 1 to 2 µm in diameter) and a hard urethane pad. Machining allowance is 10 µm.

Second polishing process: polishing was performed using colloidal silica (average particle size: 0.03 µm in diameter) and a soft urethane pad. Machining allowance is 1 µm.

Next, recording layers were deposited on the glass substrates for magnetic disk, which had been prepared based on the glass blanks of samples 2, 4, 6 and 7, to prepare magnetic disks (samples 2A, 4A, 6A and 7A, respectively).

Deposition of recording layer on the glass substrate for magnetic disk was performed in the following manner. First, an adhesive layer, a soft magnetic layer, a pre-underlying layer, an underlying layer, a principal recording layer, and an auxiliary recording layer, a protective layer and a lubricant layer were sequentially deposited in an Ar atmosphere by a DC magnetron sputtering method using an evacuated deposition apparatus. The Ar gas pressure at the time of deposition was 0.6 Pa unless otherwise specified. As the adhesive layer, Cr-50Ti was deposited in a thickness of 10 nm. As the soft magnetic layer, layers of 92Co-3Ta-5Zr were each deposited in a thickness of 20 nm with a Ru layer of 0.7 nm interposed therebetween. As the pre-underlying layer, Ni-5W was deposited in a thickness of 8 nm. As the underlying layer, Ru was deposited in a thickness of 10 nm at 0.6 Pa, and Ru was deposited thereon in a thickness of 10 nm at 5 Pa. As the principal recording layer, 90(72Co-10Cr-18Pt)-5($SiO_2$)-5($TiO_2$) was deposited in a thickness of 15 nm at 3 Pa. As the auxiliary recording layer, 62Co-18Cr-15Pt-5B was deposited in a thickness of 6 nm. As the protective layer, a layer was deposited in a thickness of 4 nm using $C_2H_4$ by a CVD method, and the surface layer was subjected to nitriding treatment. As the lubricant layer, a layer was formed in a thickness of 1 nm using PFPE by a dip coating method.

[Evaluation of Magnetic Disk of Examples]

For the magnetic disks of samples 2A, 4A, 6A and 7A, a touch-down test (DFH touch-down test) of a DFH (Dynamic Fly height) head element portion was conducted using a HDF tester (Head/Disk Flyability Tester) manufactured by Kubota Comps Corporation. In this test, the element portion is gradually protruded by a DFH mechanism, and contact thereof with the surface of magnetic disk is detected with an AE (Acoustic Emission) sensor to thereby evaluate a protrusion amount when the head element portion comes into contact with the surface of the magnetic disk. As the head, a DFH head for 320 GB/P magnetic disks (2.5 inch size) was used. A flying height when the element portion is not protruded is 10 nm. That is, for example, the head flying height is 2 nm when the protrusion amount is 8 nm. Other conditions were set as described below.

Evaluation radius: 22 mm
Rotation number of magnetic disk: 5400 rpm
Temperature: 25° C.
Humidity: 60%

Results of the DFH touch-down test are illustrated in Table 5. In Table 5, evaluations were made as described below according to the protrusion amount of the head element portion.

Good: Protrusion amount≥8 nm
Poor: Protrusion amount<8 nm

TABLE 5

|  | Evaluation of protrusion amount |
|---|---|
| Sample 2A | Poor |
| Sample 4A | Poor |
| Sample 6A | Poor |
| Sample 7A | Good |

For the sample 7A, the glass blank of the sample 7 as a base has flatness of 4.0 μm or less, i.e. target flatness of the glass substrate for magnetic disk, as illustrated in Table 4. Accordingly, the sample 7A, which is a magnetic disk prepared based on the glass blank of the sample 7 without passing through the grinding process, also has flatness of 4.0 μm or less. As a result, the protrusion amount of the DFH head could be sufficiently increased even though the grinding process was omitted for the sample 7A. That is, for the sample 7A, it could be confirmed that a glass substrate for magnetic disk, which has good flatness and surface roughness and allows a good DFH touch test result to be obtained when the glass substrate is formed into a medium, can be manufactured even though the grinding process is omitted.

<Fourth Additional Disclosure>

Recently, a hard disk drive device (HDD) is incorporated in a personal computer or a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for magnetic disk because the glass substrate hardly plastically deformed as compared to a metallic substrate (aluminum substrate) and the like.

The magnetic head includes, for example, a magnetic resistance effect element, but such a magnetic head may cause a thermal asperity trouble as its specific trouble. The thermal asperity trouble is a trouble in which when a magnetic head passes over a micro-irregularly-shaped surface of a magnetic disk while floating and flying, a magnetic resistance effect element is heated by adiabatic compression or contact of air, causing a read error. Thus, for avoiding the thermal asperity trouble, the glass substrate for magnetic disk is prepared such that surface properties, such as the surface roughness and flatness, of the principal face of the glass substrate are at a satisfactory level.

So far, a vertical direct press method has been known as a method for manufacturing a sheet glass (glass blank) as abase of the glass substrate for magnetic disk. This press method is a method in which a lump of molten glass is fed onto a lower die, and the lump of molten glass (molten glass lump) is press-formed using an upper die (Japanese Patent Laid-open Publication No. 1999-255521)

As a method for manufacturing a glass substrate for magnetic disk, a method is known in which a glass blank prepared by press-forming a molten glass lump is subjected to annealing treatment (Japanese Patent Laid-open Publication No. 2008-287779). The annealing treatment is treatment for releasing an internal strain of a glass blank by holding the glass blank prepared by press forming for a predetermined time period at a predetermined temperature around a strain point. By the annealing treatment, for example, the glass blank can be prevented from being ruptured by an internal strain when cutting lines (linear scratches or cutting lines) are provided for forming the glass blank into a donut shape. The strain point is a temperature at which the internal strain of glass disappears in several hours, and at which the viscosity of glass is about $10^{4.5}$ dPa·s.

However, the known vertical direct press method has the problem that the flatness (shape accuracy) of a glass blank prepared is poor. The reason for this is as follows.

In the vertical direct press method, immediately after a molten glass lump is placed on a lower die, only a contact surface with the lower die and a part close to the contact surface, of the molten glass lump, are rapidly cooled to be solidified. Since glass has low heat conductivity, an upper part of the molten glass lump (a part which comes into contact with an upper die) remains at a high temperature while the molten glass lump is in contact with the lower die. Therefore, in the case of the vertical direct press method, there is a gap in timing at which the molten glass lump is cooled to be solidified, between the lower side and the upper side of the molten glass lump during a process in which the molten glass lump is formed into a glass blank. As a result, the molten glass lump is warped in a concave way, so that the flatness of the glass blank is increased (deteriorated). The gap in timing cannot be drastically suppressed in light of the press system of the vertical direct press method.

Further, in the vertical direct press method, a mold release material ((mold) release agent) such as, for example, BN (boron nitride) should be attached to the die beforehand in order to prevent a situation in which the molten glass lump is stuck to the lower die and cannot be removed, but when such a mold release agent remains attached on the glass blank, the surface roughness cannot be decreased. Preferably the temperatures of the upper die and the lower die are made identical wherever possible for preparing a glass blank having a good flatness, but when the mold release material is attached on the lower die, the heat conductivity of the lower die is deteriorated, and therefore it is difficult to uniformly cool both surfaces of the glass blank in a press forming process. Therefore, the glass blank prepared by the vertical direct press method absolutely requires polishing or grinding and so on in subsequent processes in order to improve the flatness and remove the mold release material sticking to the surface of the glass blank.

For performing the annealing treatment, a large-scale annealing treatment apparatus formed so as to have a longitudinal direction of about 30 to 40 meters is required. Further, when the annealing treatment is performed, it may be required that a state in which the temperature of the glass blank is set at no lower than a strain point and no higher than a glass transition point (Tg) should be maintained for about 3 to 12 hours. Accordingly, when a glass substrate for magnetic disk is manufactured by performing the annealing treatment, large-scale equipment and much time are required, so that manufacture costs of the glass substrate for magnetic disk are increased.

Further, when a glass blank with an internal strain generated during press forming is subjected to the annealing treatment, the internal strain of the glass blank is released, but the glass blank is deformed as the internal strain is released, so that the flatness of deteriorated. For example, when a glass blank press-formed so that the flatness is 4 μm or less is subjected to annealing treatment, the flatness of the glass blank after annealing treatment may be larger than 8 μm if the internal strain remains in the glass blank during press forming.

Incidentally, in heat assisted magnetic recording (HAMR) for which studies have been conducted in recent years as a magnetic recording technique for increasing storage density of the magnetic disk, a magnetic layer composed of a ferromagnetic alloy basing a $L_{10}$ ordered structure is deposited under a high-temperature environment of, for example, about 600° C. and thereby formed on the principal face of a glass substrate. At this time, if the strain point of the material of the glass substrate is a value close to 600° C. and the internal strain remains in the glass blank as a base of the glass substrate, the internal strain of the glass substrate is released under a high-temperature environment, but the flatness of the glass substrate is deteriorated as in the case of the annealing treatment described above. In this case, the flatness of the glass substrate will be changed after the glass substrate is shipped as a product, thus being not preferable. Therefore, if the flatness of the glass substrate is deteriorated so significantly as to fail to satisfy a predetermined specification required for the magnetic disk, the glass substrate will be discarded.

Therefore, the glass substrate for magnetic disk, which is used in HAMR, is preferably one that is manufactured based on a glass blank in which the internal strain does not remain.

An object of the invention of the fourth additional disclosure is to provide a method for manufacturing a glass substrate for magnetic disk, the internal strain of which is reduced, without performing annealing treatment.

In view of the above-described problems, the present inventors have intensively conducted studies, and resultantly devised a novel press forming method. That is, in a method for manufacturing a glass blank according to this embodiment, a horizontal direct press method is employed in which a falling molten glass lump is press-formed using a pair of dies (press forming dies) arranged so as to face each other in a direction (horizontal direction) orthogonal to the falling direction of the molten glass lump. In the horizontal direct press method, the molten glass lump is not temporarily retained in contact with only one of a pair of dies until press forming is started with the molten glass lump sandwiched between a pair of dies. That is, in the horizontal direct press method, unlike the conventional direct press method, a difference in temperature, which is generated throughout the molten glass lump, can be reduced by the time when press forming of the molten glass lump is started. Thus, at the time point immediately before press forming is started, the viscosity distribution of the molten glass lump becomes very wide in the vertical direct press method, whereas the viscosity distribution of the molten glass lump is kept even in the horizontal direct press method of this embodiment. That is, in the horizontal direct method, a variation in the viscosity throughout the molten glass lump can be suppressed. Accordingly, in the horizontal direct press method, it is extremely easy to uniformly thinly draw the molten glass lump to be press-formed as compared to the vertical direct press method. Consequently, as compared to the case where q glass blank is prepared using the vertical direct press method, it is extremely easy to drastically suppress deterioration of the flatness when a glass blank is prepared using the horizontal direct press method.

In addition, the present inventors have arrived at the following findings.

As described above, the flatness of a glass blank prepared is improved by using a horizontal direct press method using a pair of dies. Here, even when the horizontal direct press method is used, heat of the molten glass lump is easily exhausted through the die at a surface portion of the molten glass lump which contacts the press forming surface of the die when the molten glass lump is cooled during press forming. On the other hand, at the central portion of the molten glass lump, heat of the molten glass is easily confined because this portion does not contact the press forming surface of the die. Therefore, there is a difference in temperature between the surface portion and the central portion of the molten glass lump. At this time, shrinkage associated with cooling of the molten glass lump precedes at the surface portion, and therefore a compressive stress layer (hereinafter, referred to as a residual stress layer) having a predetermined thickness is formed on the principal face of the glass blank after press forming. A tensile stress layer having a predetermined thickness is formed in the glass blank as a reaction to the residual stress layer at the surface portion, which has been formed previously. That is, it has become evident that in the press-formed glass blank, an internal strain by a compressive stress (hereinafter, referred to as a residual stress) and a tensile stress appropriate to the residual stress is generated across the thickness direction of the glass blank. It has become apparent that therefore, when the glass blank is subjected to machining using a scriber, a core drill or the like, the glass blank is ruptured when cut lines or the like formed by machining reach the tensile stress layer in the glass blank.

Accordingly, the present inventors have found that when at least a part of the residual stress layer formed on the principal face of the glass blank is removed, the residual stress in the residual stress layer and the tensile stress in the tensile stress layer can be decreased, so that the internal strain of the glass blank can be reduced.

From the viewpoint described above, the present invention may be a method for manufacturing a glass substrate for magnetic disk, which includes a forming process of forming a plate-shaped glass blank by pressing a lump of molten glass using a pair of dies, wherein the method includes: a removing process of removing at least a part of a residual stress layer formed on the principal face of the glass blank press-formed in the forming process; and a process of forming a donut-shaped glass substrate by subjecting the glass blank after the removing process to machining.

In the method for manufacturing a glass substrate for magnetic disk, preferably, in the removing process, at least a part of each of the residual stress layers formed on both sides of a pair of principal faces of the glass blank may be removed.

In the method for manufacturing a glass substrate for magnetic disk, in the forming process, the falling lump of molten glass may be press-formed using the pair of dies from a direction orthogonal to the falling direction.

In the method for manufacturing a glass substrate for magnetic disk, in the forming process, press forming may be performed so that the temperature of the press forming surface of the pair of dies is substantially identical.

In the method for manufacturing a glass substrate for magnetic disk, the temperature of the pair of dies may be kept lower than the glass transition point (Tg) of the molten glass over a period of time until the glass blank is separated from the die after contacting the die.

In the method for manufacturing a glass substrate for magnetic disk, the machining may be scribing processing.

In the method for manufacturing a glass substrate for magnetic disk, two concentric circles for forming the glass blank into a donut shape may be scribed in the glass blank at the same time in the scribing processing.

According to the present invention, a glass substrate for magnetic disk, the internal strain of which is reduced, can be manufactured without performing annealing treatment.

[Explanation of Embodiment in Fourth Additional Disclosure]

A method for manufacturing a glass substrate for magnetic disk in this embodiment will be described in detail below.

[Glass Substrate for Magnetic Disk]

Figure 37:
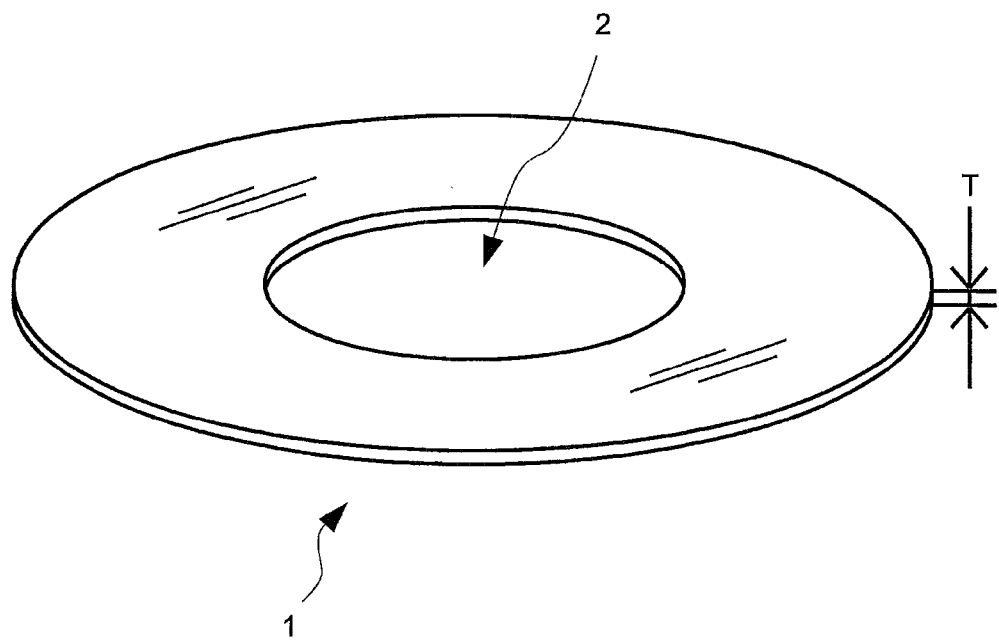
FIG. 37 is a perspective view illustrating an external shape of a glass substrate for magnetic disk of an embodiment.

As illustrated in FIG. 37, a glass substrate for magnetic disk 1 in this embodiment is a donut-shaped thin glass substrate. The size of the glass substrate for magnetic disk is not limited but for example, a glass substrate for magnetic disk having a nominal diameter of 2.5 inches is suitable. In the case of the glass substrate for magnetic disk having a nominal diameter of 2.5 inches, for example, the outer diameter is 65 mm, the diameter of a central hole 2 is 20 mm, and the thickness T is 0.6 to 1.0 mm. The flatness of the principal face of the glass substrate for magnetic disk of the embodiment is, for example, 4 μm or less, and the surface roughness (arithmetic mean roughness Ra) of the principal face is, for example, 0.2 nm or less. It is to be noted that the flatness required for a substrate for magnetic disk as a final product is, for example, 4 μm or less.

Aluminosilicate glass, soda-lime glass, borosilicate glass or the like can be used as a material of the glass substrate for magnetic disk in this embodiment. Particularly, the aluminosilicate glass can be suitably used in that chemically strengthening can be performed, and a glass substrate for magnetic disk excellent in flatness of the principal, face and strength of the substrate can be prepared.

The composition of the glass substrate for magnetic disk of this embodiment is not limited, but the glass substrate of this embodiment is preferably made of aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol %.

[Method for Manufacturing Glass Substrate for Magnetic Disk of Embodiment]

Figure 38:
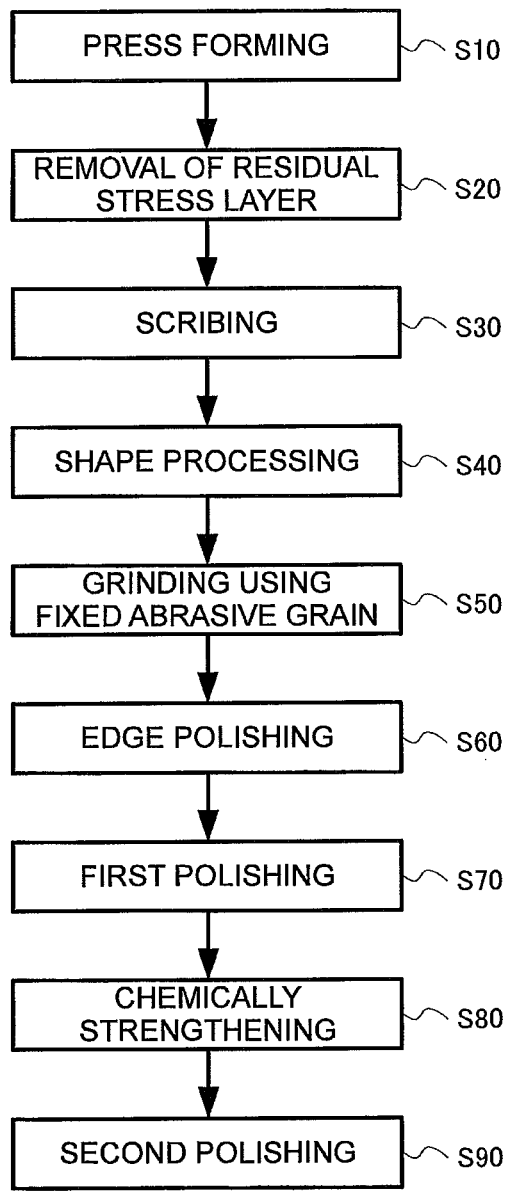
FIG. 38 is a view illustrating a flow of one embodiment of a method for manufacturing the glass substrate for magnetic disk of the embodiment.

Next, a flow of a method for manufacturing a glass substrate for magnetic disk will be described with reference to FIG. 38. FIG. 38 is a view illustrating a flow of one embodiment of a method for manufacturing a glass substrate for magnetic disk.

As illustrated in FIG. 38, in the method for manufacturing a glass substrate for magnetic disk in this embodiment, first a disk-shaped glass blank is prepared by press forming (Step S10). Next, at least a part of the residual stress layer formed on the principal face of the prepared glass blank is removed (Step S20). Next, the glass blank is scribed to prepare a donut-shaped glass substrate (Step S30). Next, the scribed glass substrate is subjected to shape processing (chamfering processing) (Step S40). Next, the glass substrate is subjected to grinding using a fixed abrasive grain (Step S50). Next, edge polishing of the glass substrate is performed (Step S60). Next, the principal face of the glass substrate is subjected to first polishing (Step S70). Next, the glass substrate, after first polishing, is subjected to chemically strengthening (Step S80). Next, the chemically strengthened glass substrate is subjected to second polishing (Step S90). The glass substrate for magnetic disk is obtained through the above processes.

Each process will be described in detail below.

(a) Press Forming Process (Step S10)

Figure 39:
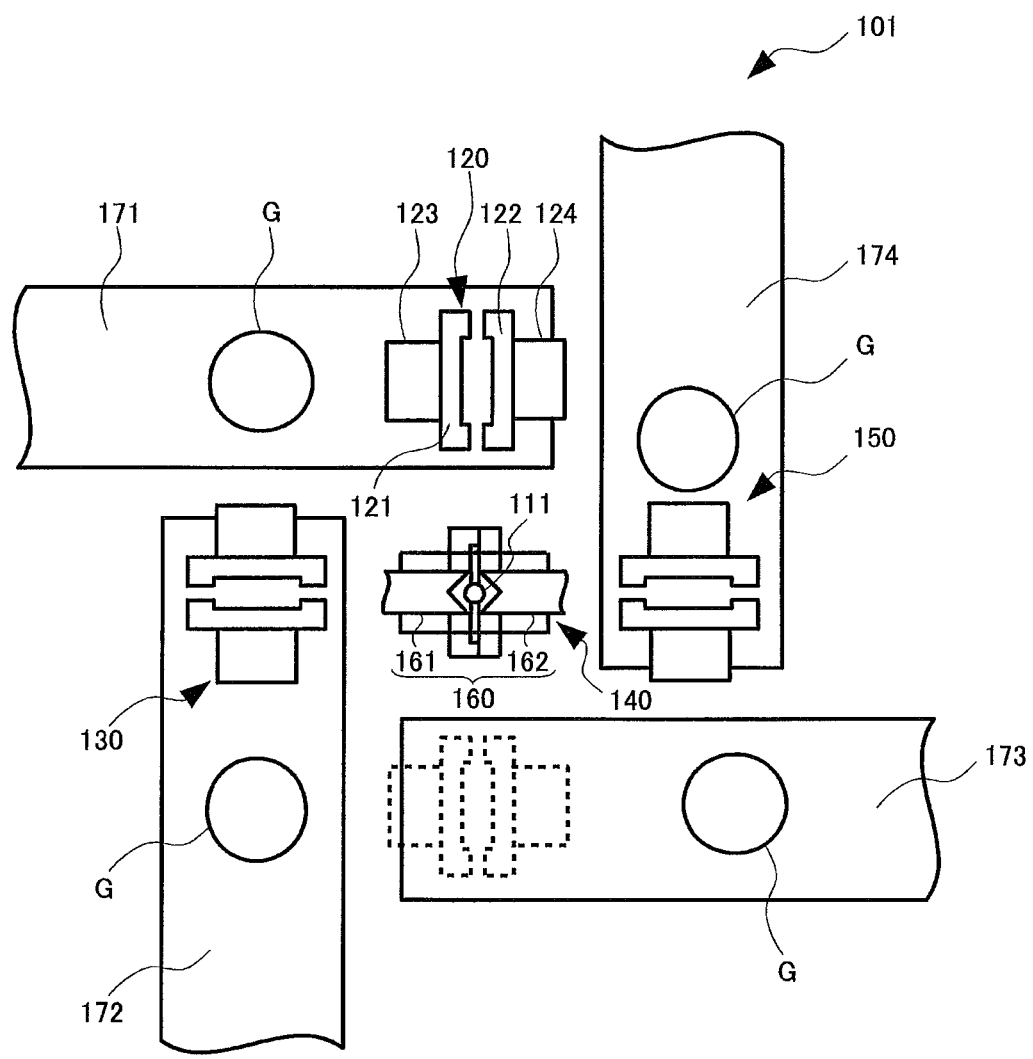
FIG. 39 is a plan view of an apparatus used in press forming of the embodiment.

First, the press forming process will be described with reference to FIG. 39. FIG. 39 is a plan view of an apparatus used in press forming. As illustrated in FIG. 39, an apparatus 101 includes four sets of press units 120, 130, 140 and 150, a cutting unit 160 and a cutting blade 165 (not illustrated in FIG. 38). The cutting unit 160 is provided on a path of a molten glass that flows out from a molten glass outflow port 111. In the apparatus 101, a lump of molten glass (hereinafter, also referred to as a gob) cut by the cutting unit 160 is caused to fall down, and the lump is pressed from both sides of the falling path of the lump while the lump is sandwiched between surfaces of a pair of dies facing each other, thereby forming the glass blank.

Figure 40:
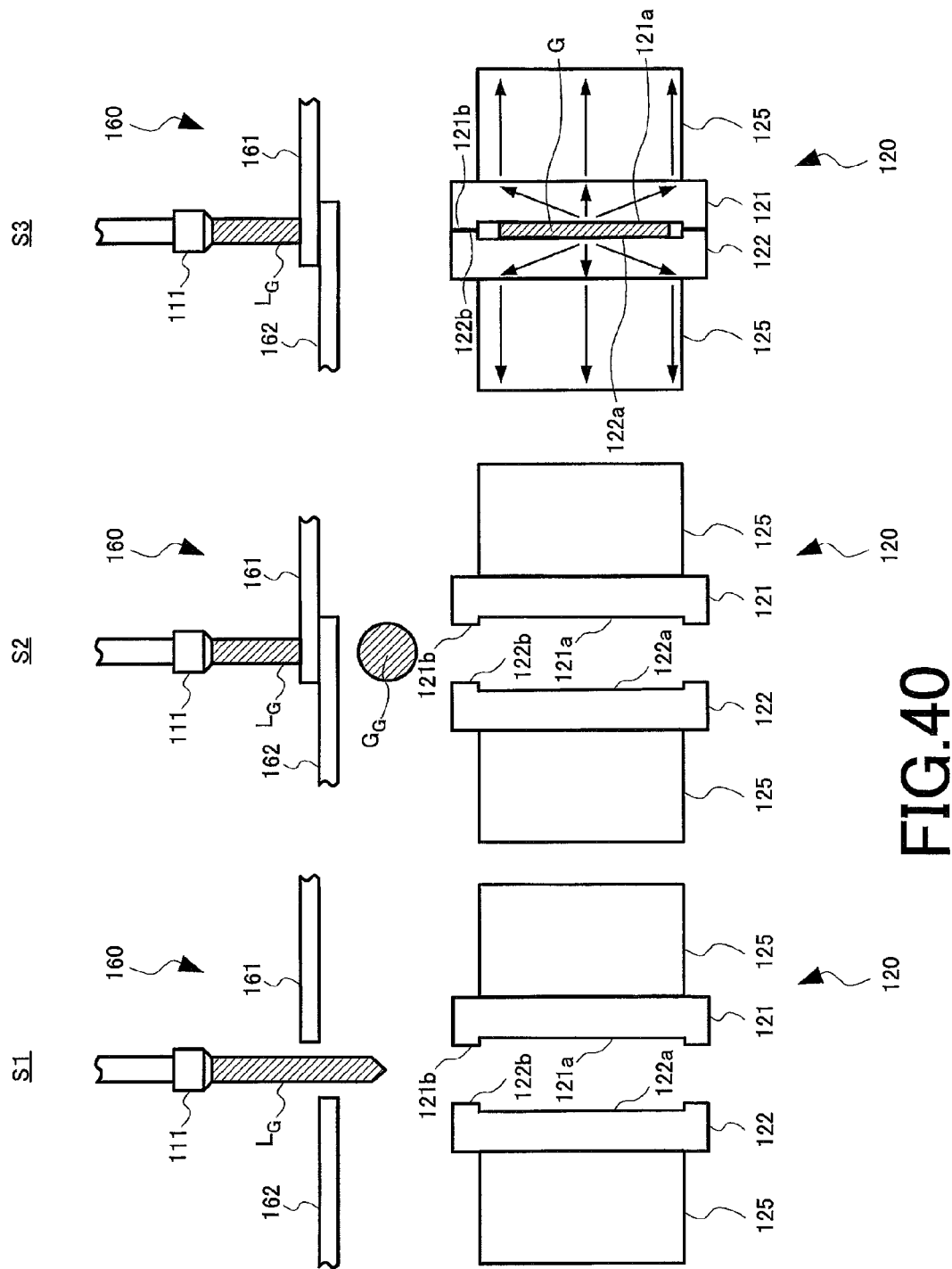
FIG. 40 is a plan view illustrating an arrangement of four sets of press units of an apparatus used in press forming of the embodiment.

Specifically, as illustrated in FIG. 40, in the apparatus 101, the four sets of press units 120, 130, 140, and 150 are provided at intervals of 90 degrees around the molten glass outflow port 111.

Each of the press units 120, 130, 140, and 150 is driven by a moving mechanism (not illustrated) so as to be able to proceed and retreat with respect to the molten glass outflow port 111. That is, each of the press units 120, 130, 140, and 150 can be moved between a catch position and a retreat position. The catch position (position in which the press unit 140 is drawn by a solid line in FIG. 39) is located immediately below the molten glass outflow port 111. The retreat position (positions in which the press units 120, 130, and 150 are drawn by solid lines and a position in which the press unit 140 is drawn by a broken line in FIG. 39) is located away from the molten glass outflow port 111.

The cutting unit 160 is provided on a path of the molten glass between the catch position (position in which the gob is captured by the press unit) and the molten glass outflow port 111. The cutting unit 160 forms the lump of molten glass by cutting a proper quantity of the molten glass flowing out from the molten glass outflow port 111. The cutting unit 160 includes a pair of cutting blades 161 and 162. The cutting blades 161 and 162 are driven so as to intersect each other on the path of the molten glass at constant timing. When the cutting blades 161 and 162 intersect each other, the molten glass is cut to obtain the gob. The obtained gob falls down toward the catch position.

The press unit 120 includes a first die 121, a second die 122, a first driving unit 123, a second driving unit 124 and a temperature controlling unit 125. Each of the first die 121 and the second die 122 is a plate-shaped member including a surface (press forming surface) used to perform the press forming for the gob. The first die 121 and the second die 122 are disposed such that normal directions of the surfaces become substantially horizontal, and such that the surfaces become parallel to each other. The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other, for example, a mechanism in which an air cylinder or a solenoid and a coil spring are combined.

The temperature controlling unit 125 is one example of temperature controlling means for reducing a difference in temperature within the press forming surface of each of first and second dies 121 and 122 during press forming, of the gob. The temperature controlling unit 125 is provided so as to contact entire surfaces opposite to the press forming surfaces of first and second dies 121 and 122. Preferably the temperature controlling unit 125 is formed with material having heat conductivity higher than that of each of first and second dies 121 and 122. For example, when first and second dies 121 and 122 are formed of an ultrahard alloy (e.g. VM40), the temperature controlling unit 125 may be formed of copper, a copper alloy, aluminum, an aluminum alloy or the like. Since the temperature controlling unit 125 has heat conductivity higher than that of each of first and second dies 121 and 122, heat from first and second dies 121 and 122 can be efficiently discharged to outside. The heat conductivity of the ultrahard alloy (VM40) is 71 (W/m·K), and the heat conductivity of copper is 400 (W/m·K). The member that forms the temperature controlling unit 125 may be appropriately selected according to the heat conductivity, hardness, thickness and dimension, etc. of the metal forming first and second dies 121 and 122. First and second dies 121 and 122 are required to have strength capable of sustaining press, and therefore preferably they are not integrated with the temperature controlling unit 125.

Because the structures of the press units 130, 140, and 150 are similar to that of the press unit 120, the descriptions of the press units 130, 140, and 150 are omitted.

After each press unit moves to the catch position, the falling gob is sandwiched between the first die and the second die by driving the first driving unit and the second driving unit, and the gob is formed into a predetermined thickness while rapidly cooled, thereby preparing a circular glass blank G. Next, after the press unit moves to the retreat position, the first die and the second die are separated to cause the formed glass blank G to fall down. A first conveyer 171, a second conveyer 172, a third conveyer 173, and a fourth conveyer 174 are provided below the retreat positions of the press units 120, 130, 140, and 150, respectively. Each of the first to fourth conveyers 171 to 174 receive the glass blank G falling down from the corresponding press unit, and the conveyer conveys the glass blank G to an apparatus (not illustrated) of the next process.

The apparatus 101 is configured such that the press units 120, 130, 140, and 150 sequentially move to the catch position and move to the retreat position while the gob is sandwiched, so that the glass blank G can continuously be formed without waiting for the cooling of the glass blank G in each press unit.

S1 of FIG. 40 to S3 of FIG. 40 more specifically illustrates press forming performed by the apparatus 101. S1 of FIG. 40 is a view illustrating the state before the gob is made, S2 of FIG. 40 is a view illustrating the state in which the gob is made by the cutting unit 160, and S3 of FIG. 40 is a view illustrating the state in which the glass blank G is formed by pressing the gob.

As illustrated in S1 of FIG. 40, a molten glass material $L_G$ continuously flows out from the molten glass outflow port 111. At this point, the cutting unit 160 is driven at predetermined timing to cut the molten glass material $L_G$ using the cutting blades 161 and 162 (S2 of FIG. 40). Therefore, the cut molten glass becomes a substantially spherical gob $G_G$ due to a surface tension thereof. Adjustment of the outflow quantity per time of the molten glass material $L_G$ and the driving interval of the cutting unit 160 may be appropriately performed according to a volume determined by the target size and thickness of the glass blank G.

The made gob $G_G$ falls down toward a gap between the first die 121 and second die 122 of the press unit 120. At this point, the first driving unit 123 and the second driving unit 124 (see FIG. 40) are driven such that the first die 121 and the second die 122 come close to each other at the timing the gob $G_G$ enters the gap between the first die 121 and the second die 122. Therefore, as illustrated in S3 of FIG. 40, the gob $G_G$ is captured (caught) between the first die 121 and the second die 122. An inner circumferential surface 121a (press forming surface) of the first die 121 and an inner circumferential surface 122a (press forming surface) of the second die 122 come close to each other with a micro gap, and the gob $G_G$ sandwiched between the inner circumferential surface 121a of the first die 121 and the inner circumferential surface 122a of the second die 122 is formed into a thin-plate shape. A projection 121b and a projection 122b are provided in the first inner circumferential surface 121a of the first die 121 and the second inner circumferential surface 122a of the second die 122, respectively, in order to keep the gap between the inner circumferential surface 121a of the first die 121 and the inner circumferential surface 122a of the second die 122 constant. That is, the projection 121b and the projection 122b abut against each other, whereby the gap between the inner circumferential surface 121a of the first die 121 and the inner circumferential surface 122a of the second die 122 is kept constant, so that a plate-shaped space is generated.

Press forming is performed using a pair of dies 121 and 122 in the press forming process in press forming in this embodiment, and the outer shape of the glass blank is not restricted by the shape of the die. That is, as illustrated in S3 of FIG. 40, the gob stretched by closed dies does not reach projections 121b and 122b.

As illustrated in S3 of FIG. 40, heat transferred to central portions of inner circumferential surfaces 121a and 122a from the gob $G_G$ is discharged to outside through the temperature controlling unit 125 in accordance with a flow of heat illustrated by the arrow in the figure.

A temperature control mechanism (not illustrated) is provided in each of the first die 121 and second die 122, and temperatures at the first die 121 and second die 122 is retained lower than the glass transition point $T_G$ of the molten glass $L_G$.

It is not necessary to attach a mold release material to the first die 121 and the second die 122 in the press forming process.

The flatness of the glass blank obtained after press forming becomes better as a difference in temperature of the inner circumferential surface of the die at the time of press-forming the gob $G_G$ decreases. Particularly, it is preferable to decrease the difference in temperature by efficiently discharging heat from the gob $G_G$, which is easily confined in the central portion of each of inner circumferential surfaces 121a and 122a, to outside. This is because when a difference in temperature of the inner circumferential surface of the die during press forming is decreased, the temperature of the central portion and the temperature of the circumferential edge portion of the inner circumferential surface are almost identical, so that the central portion and the circumferential edge portion of the gob $G_G$ can be solidified almost at the same time.

Since the temperature of the central portion and the temperature of the circumferential edge portion of the inner circumferential surface are almost identical, an internal Strain (in-plane strain) by a residual stress directing from the circumferential edge portion to the central portion of the press forming surface can be prevented from being generated in the press-formed glass blank.

Thus, by reducing a difference in temperature of the inner circumferential surface of the die during pressing of the glass blank using the temperature controlling unit 125, flatness required for the glass substrate for magnetic disk can be achieved, and the central portion and the circumferential edge portion of the gob $G_H$ can be solidified at the same time. For example, if the flatness required for the glass substrate for magnetic disk is 4 µm, press forming is performed while the difference in temperature between the central portion and the circumferential edge portion of the inner circumferential surface is kept at 10° C. or less. Generation of the in-plane strain of the glass blank is best prevented when a difference in temperature between the central portion and the circumferential edge portion is 0° C., but the difference in temperature may be appropriately determined according to the size of the glass blank G formed, the composition of the glass, and so on.

A difference in temperature between the first die 121 and the second die 122 may be determined from the following viewpoint according to flatness required for the glass substrate for magnetic disk.

Since glass substrate for magnetic disk of this embodiment is incorporated while being pivotally supported by a metallic spindle having a high thermal expansion coefficient within a hard disk as a magnetic disk that is a final product, the thermal expansion coefficient of the glass substrate for magnetic disk is preferably as high as that of the spindle. Therefore, the composition of the glass substrate for magnetic disk is defined so that the glass substrate for magnetic disk has a high thermal coefficient. The thermal expansion coefficient of the glass substrate for magnetic disk is, for example, in a range of 30 to $100 \times 10^{-7}(\text{K}^{-1})$, preferably in a range of 50 to $100 \times 10^{-7}(\text{K}^{-1})$. The thermal expansion coefficient is a value calculated using the linear expansion coefficients of the glass substrate for magnetic disk at temperatures of 100° C. and 300° C. A thermal expansion coefficient of, for example, less than $30 \times 10^{-7}(\text{K}^{-1})$ or more than $100 \times 10^{-7}$ is not preferable because a difference in thermal expansion coefficient between the glass substrate and the spindle is increased. From the point of view, temperature conditions at the circumference of the principal face of the glass blank are made uniform in the press forming process when a glass substrate for magnetic disk having a high thermal expansion coefficient is prepared. As one example, it is preferable to perform temperature control so that the temperatures of the inner circumferential surface 121a of the first die 121 and the inner circumferential surface 122a of the second die 122 become substantially identical. When temperature control is performed so that the temperatures become identical, for example, a difference in temperature is preferably 5° C. or less. The difference in temperature is more preferably 3° C. or less, especially preferably 1° C. or less.

The difference in temperature between dies is a difference in temperature as measured using a thermocouple at a point which is located 1 mm from each of the front faces of the inner circumferential surface 121a of the first die 121 and the inner circumferential surface 122a of the second die 122 to the inside of the die and at which the inner circumferential surface 121a and the inner circumferential surface 122a face each other (e.g. a point corresponding to the central position of the glass blank and central points of the inner circumferential surface 121a and the inner circumferential surface 122a).

A time until the gob $G_G$ is completely confined between the first die 121 and the second die 122 after the gob $G_G$ comes into contact with the inner circumferential surface 121a of the first die 121 or the inner circumferential surface 122a of the second die 122, is as extremely short as about 0.06 second in the apparatus 101. Therefore, the gob $G_G$ is formed into the substantially disk shape by spreading along the inner circumferential surface 121a of the first die 121 and the inner circumferential surface 122a of the second die 122 within an extremely short time, and the gob $G_G$ is cooled and solidified in the form of amorphous glass. In this way, the glass blank G is prepared. The size of the glass blank G formed in this embodiment is, depending on the size of a desired glass substrate for magnetic disk, for example about 20 to 200 mm in diameter.

In the press forming method of this embodiment, the glass blank G is formed in a manner such that the inner circumferential surface 121a of the first die 121 and the inner circumferential surface 122a of the second die 122 are shape-transferred, and therefore preferably the flatness and the smoothness of each of the inner circumferential surfaces of a pair of dies are made comparable to those of a desired glass substrate for magnetic disk. In this case, necessity to subject the glass blank G to a surface processing process, i.e. a grinding and polishing process after press forming may be eliminated. That is, the thickness of the glass blank G formed in the press forming method of this embodiment may be the sum of the target thickness of the glass substrate for magnetic disk that is finally obtained and the thickness of the residual stress layer that is removed in the removing process described later. For example, the glass blank G is preferably a disk-shaped sheet having a thickness of 0.2 to 1.1 mm. The surface roughness of each of the inner circumferential surface 121a and the inner circumferential surface 122a is preferably adjusted to 0.0005 to 0.05 μm so that the arithmetic mean roughness Ra of the glass blank G is 0.001 to 0.1 μm.

After the first die 121 and the second die 122 are closed, the press unit 120 quickly moves to the retreat position, instead the press unit 130 moves to the catch position, and the press unit 130 performs the pressing to the gob $G_G$.

After the press unit 120 moves to the retreat position, the first die 121 and the second die 122 are kept closed until the glass blank G is sufficiently cooled (at least until the glass blank G has a temperature below a yield point). Then, the first driving unit 123 and the second driving unit 124 are driven to separate the first die 121 and the second die 122, the glass blank G falls down from the press unit 120, and the conveyer 171 located below the press unit 120 receives the glass blank G (see FIG. 39).

As described above, in the apparatus 101, the first die 121 and the second die 122 are closed within a time as extremely short as 0.1 second (about 0.06 second), and the molten glass substantially simultaneously comes into contact with the whole of the inner circumferential surface 121a of the first die 121 and the whole of the inner circumferential surface 122a of the second die 122. Therefore, the inner circumferential surface 121a of the first die 121 and the inner circumferential surface 122a of the second die 122 are not locally heated, and a strain is hardly generated in the inner circumferential surface 121a and the inner circumferential surface 122a. Because the molten glass is formed into the disk shape before the heat transfers from the molten glass to the first die 121 and the second die 122, a temperature distribution of the formed molten glass becomes substantially even. Therefore, in cooling the molten glass, variation of the shrinkage quantity of the glass material is small, and the large strain is not generated in the principal face of the glass blank G. Accordingly, the flatness of the principal face of the prepared glass blank G is improved as compared to a glass blank prepared by conventional press forming with an upper die and a lower die.

In the example illustrated in FIG. 40, the substantially spherical gob $G_G$ is formed by cutting the flowing-out molten glass $L_G$ using the cutting blades 161 and 162. However, when viscosity of the molten glass material $L_G$ is small with respect to a volume of the gob $G_G$ to be cut, the glass does not become the substantially spherical shape only by cutting the molten glass $L_G$, and the gob is not formed. In such cases, a gob forming die is used to form the gob.

Figure 41:
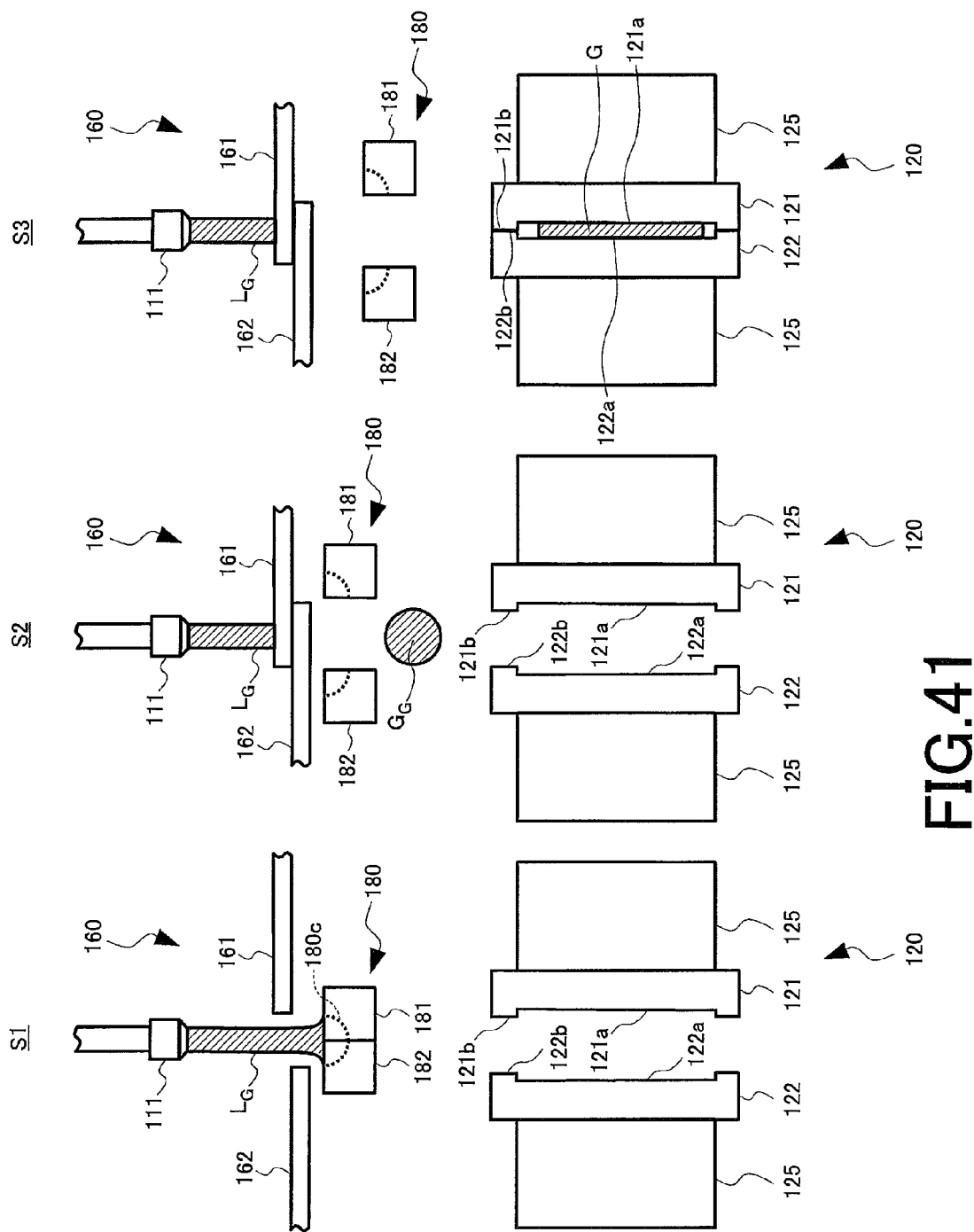
FIG. 41 is a view illustrating a modification of press forming of the embodiment using a gob forming die.

S1 of FIG. 41 to S3 of FIG. 41 are views illustrating a modification of the embodiment of FIG. 40. The gob forming die is used in the modification. S1 of FIG. 41 is a view illustrating the state before the gob is made, S2 of FIG. 41 is a view illustrating the state in which the gob $G_G$ is made by the cutting unit 160 and a gob forming die 180, and S3 of FIG. 41 is a view illustrating the state in which the press forming is performed to the gob $G_G$ to make the glass blank G.

As illustrated in S1 of FIG. 41, the path of the molten glass $L_G$ to the press unit 120 is closed by closing the blocks 181 and 182, and the lump of the molten glass $L_G$ cut with the cutting unit 160 is received by a recess 180C formed by the blocks 181 and 182. Then, as illustrated in S2 of FIG. 41, the molten glass $L_G$ that becomes the spherical shape in the recess 180C falls down toward the press unit 120 at one time by opening the blocks 181 and 182. When falling down toward the press unit 120, the gob $G_G$ becomes the spherical shape by the surface tension of the molten glass $L_G$. As illustrated in S3 of FIG. 41, during the fall of the gob $G_G$, the spherical gob $G_G$ is sandwiched between the first die 121 and the second die 122 to perform the press forming, thereby preparing the disk-shaped glass blank G.

Figure 42:
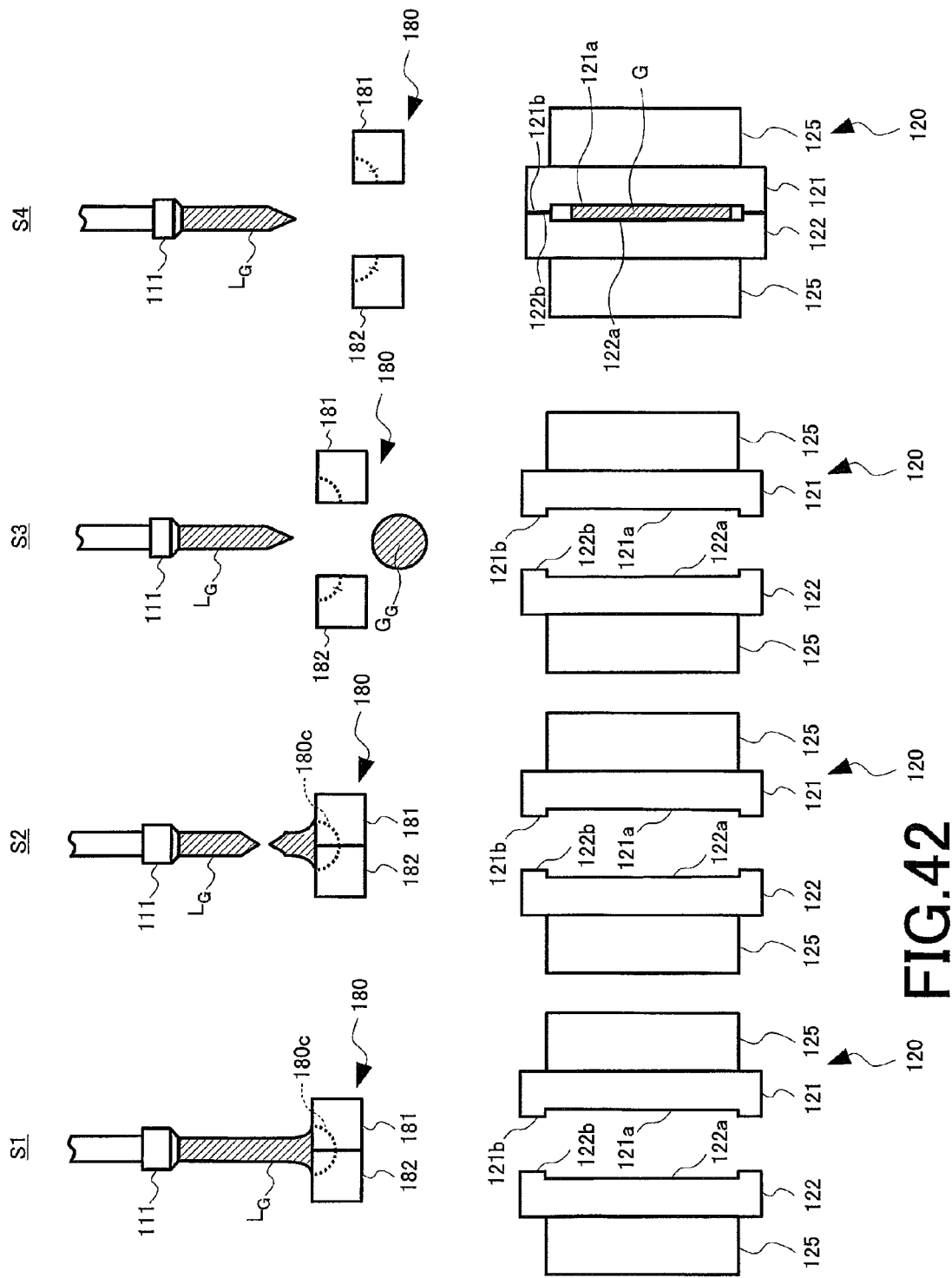
FIG. 42 is a view illustrating a modification of press forming of the embodiment in which a cutting unit is not used.

Alternatively, as illustrated in S1 of FIG. 42 to S4 of FIG. 42, in the apparatus 101, instead of using the cutting unit 160 illustrated in S1 of FIG. 41 to S3 of FIG. 41, a moving mechanism that moves the gob forming die 180 in an upstream direction or a downstream direction along the path of the molten glass $L_G$ may be used. S1 of FIG. 42 to S4 of FIG. 42 are views illustrating a modification in which the gob forming die 180 is used. S1 of FIG. 42 and S2 of FIG. 42 are views illustrating the state before the gob $G_G$ is made, S3 of FIG. 42 is a view illustrating the state in which the gob $G_G$ is made by the gob forming die 180, and S4 of FIG. 42 is a view illustrating the state in which the gob $G_G$ is subjected to press forming to make the glass blank G.

As illustrated in S1 of FIG. 42, the recess 180C formed by the blocks 181 and 182 receives the molten glass $L_G$ flowing out from the molten glass outflow port 111. As illustrated in S2 of FIG. 42, the blocks 181 and 182 are quickly moved onto the downstream side of the flow of the molten glass $L_G$ at predetermined timing. In this way, the molten glass $L_G$ is cut. Then, as illustrated in S3 of FIG. 42, the blocks 181 and 182 are separated at predetermined timing. Therefore, the molten glass $L_G$ retained by the blocks 181 and 182 falls down at one time, and the gob $G_G$ becomes the spherical shape by the surface tension of the molten glass $L_G$. As illustrated in S4 of FIG. 42, during the fall of the gob $G_G$, the spherical gob $G_G$ is sandwiched between the first die 121 and the second die 122 to perform the press forming, thereby preparing the disk-shaped glass blank G.

Figure 43:
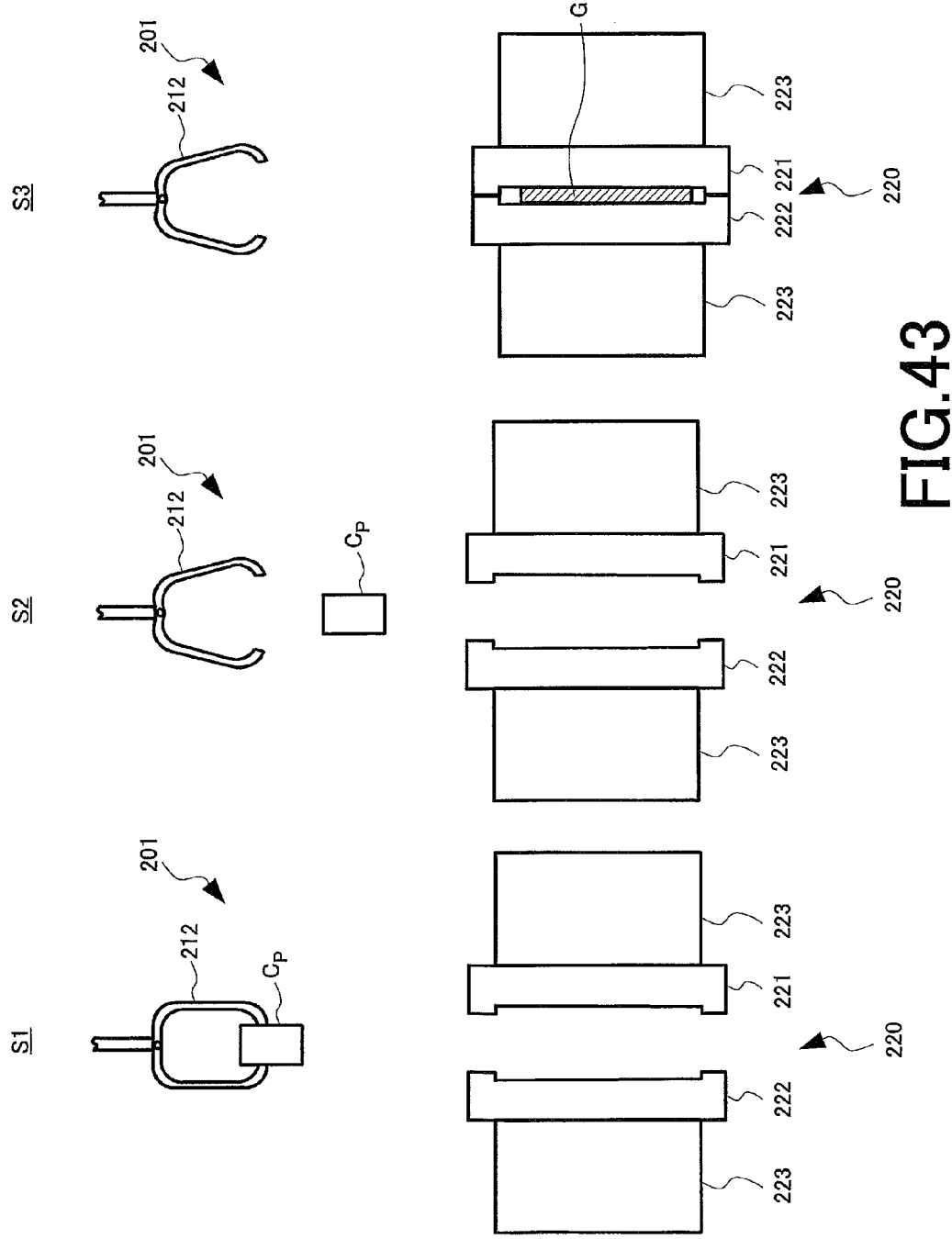
FIG. 43 is a view illustrating a modification of press forming of the embodiment using an optical glass heated by a softening furnace.

S1 of FIG. 43 to S3 of FIG. 43 are views illustrating another modification in which, instead of the gob $G_G$, a lump $C_P$ of the optical glass heated by a softening furnace (not illustrated) is caused to fall down and the press forming is performed to the lump $C_P$ while the lump $C_P$ is sandwiched from both sides between dies 221 and 222 during the fall of the lump $C_P$. S1 of FIG. 43 is a view illustrating the state before the lump of the heated optical glass is formed, S2 of FIG. 43 is a view illustrating the state in which the lump of the optical glass falls down, and S3 of FIG. 43 is a view illustrating the state in which the press forming is performed to the lump of the optical glass to make the glass blank G.

As illustrated in S1 of FIG. 43, in an apparatus 201, a glass material grasping mechanism 212 conveys the lump $C_P$ of the optical glass to a position above a press unit 220. As illustrated in S2 of FIG. 43, the glass material grasping mechanism 212 releases the lump $C_P$ of the optical glass to cause the lump $C_P$ of the optical glass to fall down. As illustrated in S3 of FIG. 43, during the fall of the lump $C_P$ of the optical glass, the lump $C_P$ is sandwiched between the first die 221 and the second die 222 to perform the press forming, thereby preparing the disk-shaped glass blank G. Because the first die 221 and the second die 222 have the same configuration and action as those of the first die 121 and second die 122 illustrated in FIG. 41, the descriptions are omitted.

Figure 44:
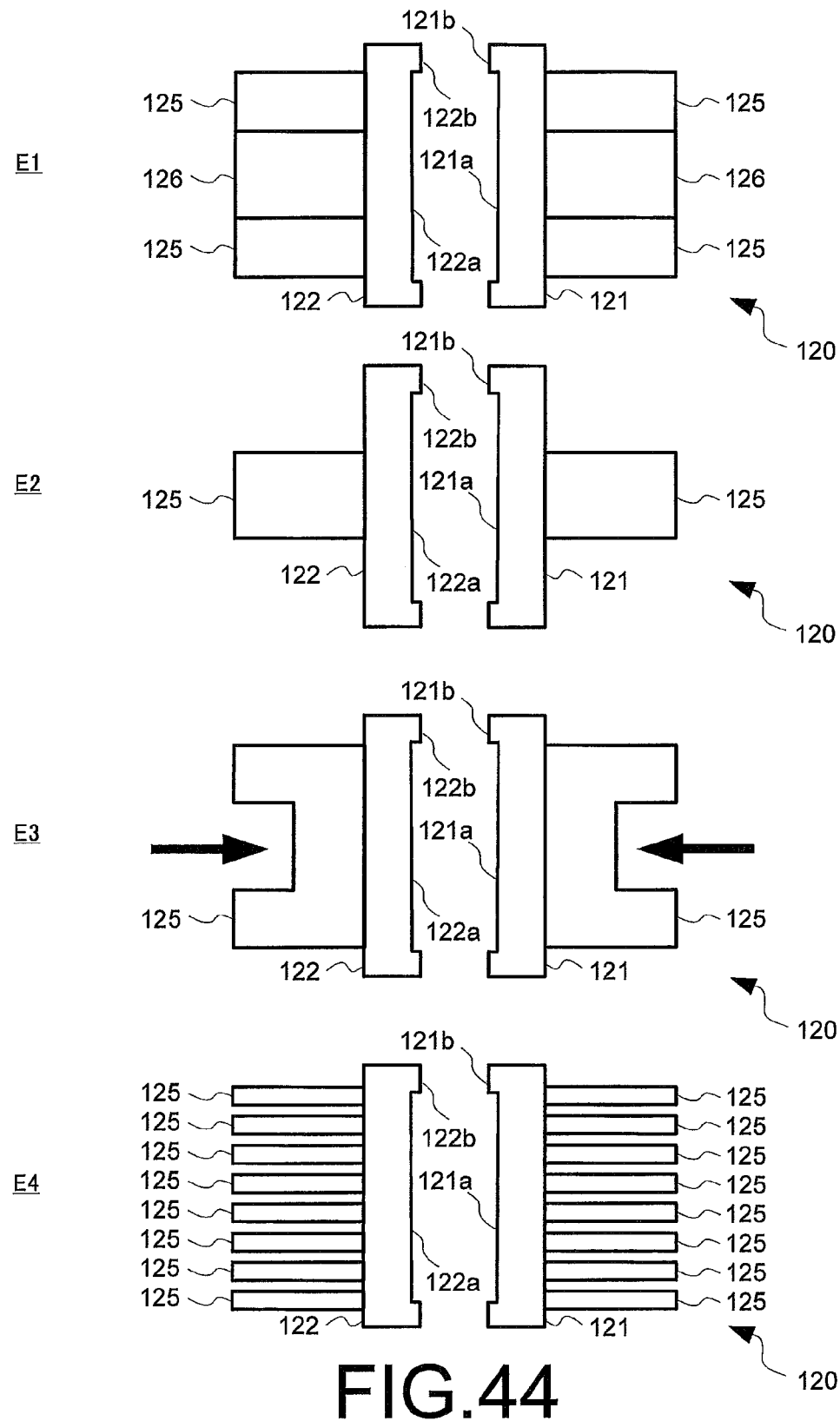
FIG. 44 is a view illustrating a modification of heat exhausting means used in press forming of the embodiment.

E1 of FIG. 44 to E4 of FIG. 44 are views illustrating a modification of the embodiment of FIG. 40. In this modification, various forms of temperature controlling units 125 are used. E1 of FIG. 44 is a view illustrating a state in which second temperature controlling units 126 each having a thermal expansion coefficient higher than that of the temperature controlling unit 125 is provided between temperature controlling units 125 provided at the circumferential edge portions of rear faces of the inner circumferential surface 121a of the first die 121 and the inner circumferential surface 122a of the second die 122, respectively. E2 of FIG. 44 is a view illustrating a state in which temperature controlling units 125 are provided only at the central portions of the rear faces of the inner circumferential surface 121a of the first die 121 and the inner circumferential surface 122a of the second die 122, E3 of FIG. 44 is a view illustrating a state in which recessed portions extending toward the central portions of the rear faces of the inner circumferential surface 121a of the first die 121 and the inner circumferential surface 122a of the second die 122 are provided in temperature controlling unit 125. E4 of FIG. 44 is a view illustrating a state in which a plurality of temperature controlling units 125 are provided on surfaces opposite to the inner circumferential surface 121a of the first die 121 and the inner circumferential surface 122a of the second die 122.

As illustrated in E1 of FIG. 44, the second temperature controlling unit 126 is provided at the central portion of each of the rear faces of the circumferential surface 121a of the first die 121 and the inner circumferential surface 122a of the second die 122. For example, when the temperature controlling unit 125 is made of aluminum or an aluminum alloy, copper, a copper alloy or the like is used as a material of the second temperature controlling unit 126. By using the second temperature controlling unit 126, heat confined in the central portions of inner circumferential surfaces 121a and 122a during press forming is discharged to outside through the second temperature controlling unit 126 having heat conduction efficiency higher than that of the temperature controlling unit 125. Heat transferred to the circumferential edge portions of inner circumferential surfaces 121a and 122a from the gob $G_G$ is discharged to outside through the temperature controlling unit 125. In this way, a difference in temperature of the interior of each of inner circumferential surfaces 121a and 122a during press forming can be reduced.

When temperature controlling units 125 are provided only at the central portions of the rear faces of inner circumferential surfaces 121a and 122a as illustrated in E2 of FIG. 44, heat confined in the central portions of inner circumferential surfaces 121a and 122a during press forming is discharged to outside through the temperature controlling unit 125. In this way, a difference in temperature of the interior of each of inner circumferential surfaces 121a and 122a during press forming can be reduced. The second temperature controlling unit 126 may be provided in place of the temperature controlling unit 125.

Further, when a recessed portion extending toward the central portion of the rear face of each of inner circumferential surfaces 121a and 122a is provided in the temperature controlling unit 125 as illustrated in E3 of FIG. 44, the recessed portion may be cooled using, for example, a liquid, a gas or the like having a cooling effect. In this case, the central portions of inner circumferential surfaces 121a and 122a are rapidly cooled, whereby a difference in temperature of the interior of each of inner circumferential surfaces 121a and 122a during press forming can be reduced. The temperature controlling unit 125 may be formed so that the central portion of the rear face of each of inner circumferential surfaces 121a and 122a can be directly cooled using, for example, a liquid, a gas or the like having a cooling effect.

As illustrated in E4 of FIG. 44, a plurality of temperature controlling units 125 may be provided on the rear face of each of first and second dies 121 and 122. In this case, as compared to the case where one temperature controlling unit 125 is provided, the contact area of the temperature controlling unit to outside can be increased, and therefore heat transferred to inner circumferential surfaces 121a and 122a from the gob $G_G$ can be efficiently discharged to outside.

(b) Process of Removing Residual Stress Layer (Step S20)

Figure 45:
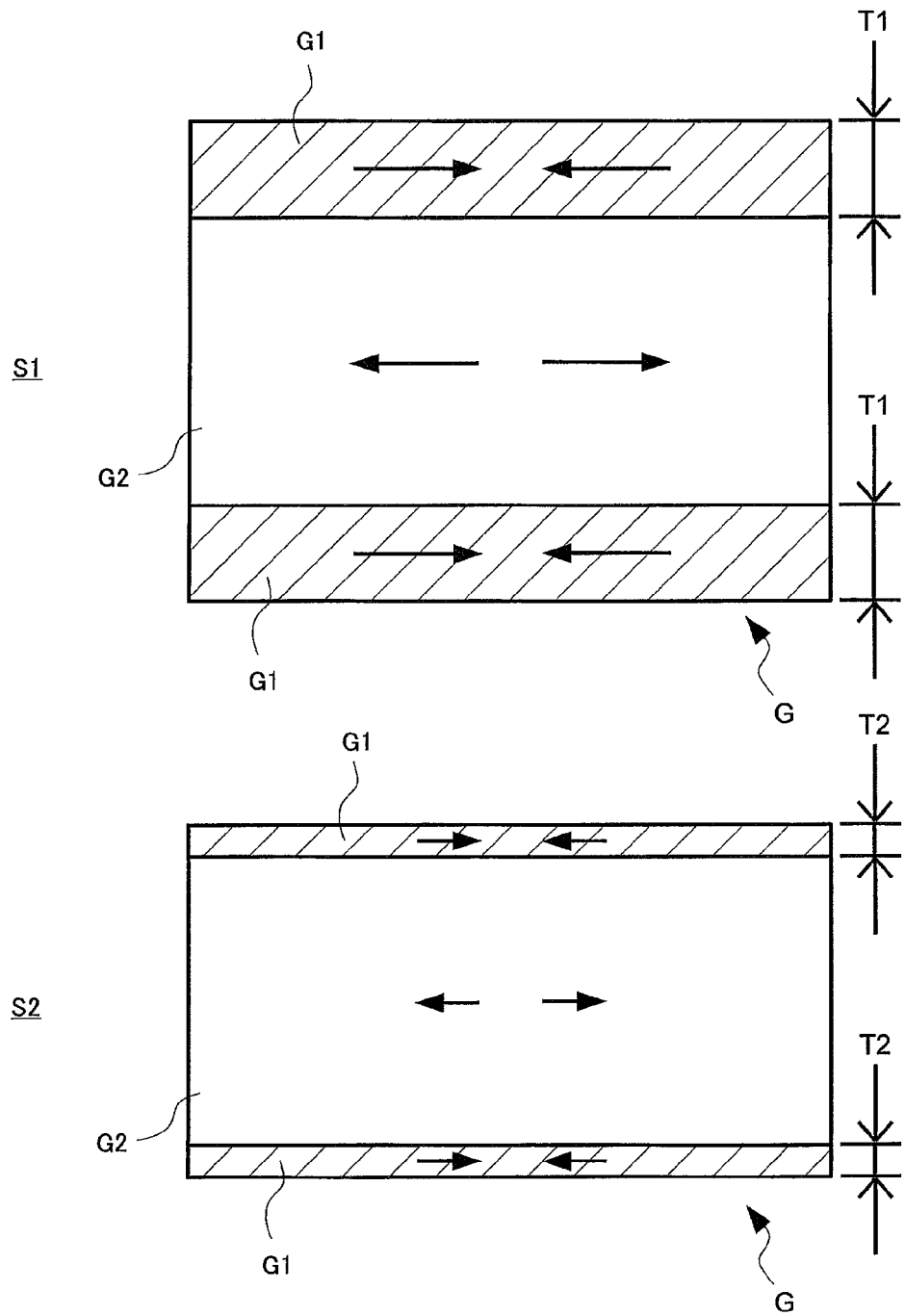
FIG. 45 is a view illustrating the states of stress before and after a process of removing a residual stress layer in the embodiment.

Next, the process of removing a residual stress layer will be described with reference to FIG. 45. S1 of FIG. 4 is a view illustrating a state of stress generated in the glass blank G before the removing process. S2 of FIG. 45 is a view illustrating a state of stress generated in the glass blank G after the removing process.

When the gob $G_G$ sandwiched between the inner circumferential surface 121a of the first die 121 and the inner circumferential surface 122a of the second die 122 is rapidly cooled in the press forming process, a difference in temperature is generated between the surface portion (both end portions in the thickness direction) and the central portion (central portion in the thickness direction) of the gob $G_G$. At this time, shrinkage of the gob $G_G$ associated with cooling of the gob $G_G$ precedes at the surface portion, and therefore residual stress layers G1 having a thickness T1 are formed on both sides of a pair of principal faces (surfaces on the both end sides in the thickness direction) of the glass blank after the press forming process as illustrated in S1 of FIG. 45. On the other hand, in the glass blank G, shrinkage is suppressed by the residual stress layer G1 that has been previously formed. Consequently, a tensile stress layer G2 having a predetermined thickness is formed in the glass blank G. That is, in the glass blank G, a residual stress in the residual stress layer G1 and a tensile stress in the tensile stress layer G2 are generated across the thickness direction of the glass blank G as illustrated by the arrow in the figure. Here, the size of the residual stress generated in the residual stress layer G1 varies depending on the magnitude of the thickness of the residual stress layer G1. That is, the residual stress increases as the thickness of the residual stress layer G1 becomes larger. The tensile stress generated in the tensile stress layer G2 increases as the residual stress increases. The thickness T1 of the residual stress layer G1 formed by the press forming process of this embodiment is 100 μm to 300 μm.

Accordingly, in the process of removing the residual stress layer G1, the principal face of the glass blank G after the press forming process is subjected to grinding processing using a grinding apparatus including a planet gear mechanism. Consequently, at least a part of the residual stress layer G1 is removed to decrease the thickness T1 of the residual stress layer G1, so that the residual stress generated in the residual stress layer G1 can be decreased. The tensile stress generated in the tensile stress layer G2 can also be decreased as the residual stress decreases. Consequently, the internal strain by the stress generated in the glass blank G can be reduced without performing annealing treatment.

For example, the grinding has the machining allowance of several micrometers to about 300 micrometers. The grinding apparatus includes a pair of upper and lower surface plates (upper surface plate and lower surface plate), and a glass substrate is held between the upper surface plate and the lower surface plate. By moving one or both of the upper surface plate and the lower surface plate, the glass blank G and each surface plate are relatively moved, whereby both sides of a pair of principal faces of the glass plank can be ground.

The thickness of the residual stress layer G1 after the removing, process is preferably identical between a pair of principal faces. This is because if there is a difference in thickness of the residual stress layer G1 between a pair of principal faces, the glass blank G after the removing process may be warped due to a difference in residual stress between a pair of principal faces.

(c) Scribing Process (Step S30)

Next, the scribing process will be described. After the process of removing the residual stress layer, a donut-shaped glass substrate is formed by subjecting the glass blank G to scribing processing (machining) in the scribing process.

As used herein, the scribing processing means that two concentric (inside concentric and outside concentric) cutting lines (linear scratches or cutting lines) are provided in the surface of the glass blank G with a scriber made of a super alloy or diamond particles in order to obtain the donut-shape (ring-shape) of the formed glass blank G having a predetermined size. It is preferred that two concentric cutting lines are provided at the same time. The glass blank G scribed into two-concentric-circle shape is partially heated, and a portion outside the outside concentric circle and a portion inside the inside concentric circle are removed by a difference in thermal expansion of the glass blank G. In this way, a donut-shaped glass substrate is obtained.

As another example of forming a donut-shaped glass substrate, core drill processing (machining) may be performed using a core drill or the like. A donut-shaped glass substrate can be formed by forming a circular hole and an outer diameter in the glass blank using a core drill or the like.

(d) Shape Processing Process (Step S40)

Next, the shape processing process will be described. The shape processing process includes chamfering processing of the end portion of the glass substrate (chamfering of outer circumferential end portion and inner circumferential end portion) after the scribing process. Chamfering processing is shape processing in which the outer circumferential end portion and inner circumferential end portion of the glass substrate after the scribing process is chamfered between a principal face and a side wall portion perpendicular to the principal face using a diamond abrasive grain. The chamfering angle is, for example, 40 to 50 degrees with respect to the principal face.

(e) Grinding Process using Fixed Abrasive Grain (Step S50)

In the grinding process using a fixed abrasive grain, the principal face of the glass substrate after the shape processing process is subjected to grinding processing using a grinding apparatus in the same manner as in the removing process of the step S20. For example, the grinding has the machining allowance of several micrometers to about 100 micrometers.

In the press forming process of this embodiment, a glass blank having extremely high flatness can be prepared, and therefore the grinding process may be omitted. Before the grinding process, a lapping process may be performed using a grinding apparatus similar to the apparatus used in the grinding process and an alumina loose abrasive grain.

(f) Edge Polishing Process (Step S60)

Next, edge polishing of the glass substrate after the grinding process is performed.

In edge polishing, the inner circumferential end face and outer circumferential end face of the glass substrate are subjected to mirror surface finishing by brush polishing. At this point, slurry that includes fine particles such as cerium oxide as the loose abrasive grain is used. By performing edge polishing, an impairment such as contamination by deposition of dust or the like, damage or a flaw is eliminated, whereby occurrence of a thermal asperity and deposition of ions of sodium, potassium and the like which may cause corrosion can be prevented.

(g) First Polishing Process (Step S70)

Next, the principal face of the glass substrate after the edge polishing process is subjected to first polishing. For example, first polishing has the machining allowance of several micrometers to about 50 micrometers. First polishing is intended to remove the flaw left on the principal face after the grinding using the fixed abrasive grain, the strain and the micro-surface irregularity (micro-waviness and roughness). In the first polishing process, polishing is performed while a polishing solution is fed using a double polishing apparatus having a structure similar to that of the apparatus used in the grinding process. A polishing agent contained in the polishing solution is, for example, a cerium oxide abrasive grain or a zirconia abrasive grain.

In the first polishing process, polishing is performed so as to have surface roughness (Ra) of 0.5 nm or less and micro-waviness (MV-Rq) of 0.5 nm or less for the principal face of the glass substrate.

The micro-waviness may be represented by a RMS (Rq) value calculated as roughness at a wavelength bandwidth of 100 to 500 μm in a region of 14.0 to 31.5 mm radius in the whole of the principal face, and can be measured using, for example, Model-4224 manufactured by Polytec Inc.

The surface roughness is represented by an arithmetic mean roughness Ra defined in JIS B0601:2001 and, for example, can be measured with roughness measuring machine SV-3100 manufactured by Mitutoyo Corporation and calculated by a method defined in JIS B0633:2001 when the roughness is no less than 0.006 μm and no more than 200 μm. When as a result, the roughness is 0.03 μm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 512×512 pixels in a measurement area of 1 μm×1 μm square can be used.

(h) Chemically Strengthening Process (Step S80)

Next, the donut-shaped glass substrate after the first polishing process is chemically strengthened.

For example, a mixed solution of potassium nitride (60% by weight) and sodium sulfate (40% by weight) can be used as a chemically strengthening solution. In the chemically strengthening process, a chemically strengthening solution is heated to, for example, 300° C. to 400° C., a washed glass substrate is preheated to, for example, 200° C. to 300° C., and the glass substrate is then dipped in the chemically strengthening solution for, for example, 3 to 4 hours.

When the glass substrate is dipped in the chemically strengthening solution, the lithium ion and the sodium ion in the surface layer of the glass substrate are replaced, respectively, by the sodium ion and the potassium ion which have relatively large ion radiuses in the chemically strengthening solution, so that a residual stress layer is formed on the surface layer portion, thereby strengthening the glass substrate. The glass substrate subjected to the chemically strengthening treatment is washed. For example, the glass substrate is washed with sulfuric acid, and then washed with pure water or the like.

(i) Second Polishing Process (Step S90)

Next, the glass substrate after chemically strengthening process is subjected to second polishing. Second polishing has the machining allowance of about 1 μm. Second polishing is intended at the mirror surface polishing of the principal face. In second polishing, for example, the polishing apparatus used in first polishing is used. At this point, the second polishing differs from the first polishing in the following points: the kind and particle size of the loose abrasive grain, and hardness of the resin polisher.

For example, the slurry of the turbid fine particles such as colloidal silica (particle size: diameter of about 10 to 50 nm) is used as the loose abrasive grain used in the second polishing.

The polished glass substrate is washed with a neutral detergent, pure water, IPA or the like to obtain a glass substrate for magnetic disk.

It is not necessarily essential to perform the second polishing process, but it is preferable to perform the second polishing process because the level of the surface irregularity of the principal face of the glass substrate can be further improved. By performing the second polishing process, the principal face can be made to have roughness (Ra) of 0.1 nm or less and micro-waviness (MW-Rq) of 0.1 nm or less.

As described above, the method for manufacturing a glass blank for magnetic disk in this embodiment includes a press forming process of press-forming a lump of molten glass using a pair of dies. Therefore, when the surface roughness of the inner circumferential surfaces of a pair of dies is set at a good level (e.g. surface roughness required for the glass substrate for magnetic disk), the surface roughness of the glass blank can be kept at a good level because the surface roughness of the inner circumferential surface of the die is shape-transferred as the surface roughness of the glass blank. At least a part of the residual stress layer formed on the principal face of the glass blank press-formed in the press forming process may be removed. Therefore, the glass blank obtained in the press forming process of this embodiment does not require a process of machining the principal face because the surface roughness and flatness of the principal face of the glass blank can be kept at a level required for the glass substrate for magnetic disk. The glass substrate shape-processed into a predetermined shape based on the glass blank is subjected to chemically strengthening, but the flatness of the glass substrate is not deteriorated by chemically strengthening in this embodiment. Therefore, the glass substrate for magnetic disk which is finally obtained is thin, and has a high mechanical strength, and flatness higher than was previously possible.

In this embodiment, at least a part of the residual stress layer G1 is removed, so that the residual stress and the tensile stress generated in the glass blank G during press forming can be decreased. Consequently, the internal strain by the stress generated in the glass blank G can be reduced. Accordingly, in this embodiment, a glass substrate for magnetic disk, the internal strain of which is reduced, can be manufactured without performing annealing treatment.

[Magnetic Disk]

The glass substrate for magnetic disk is prepared through the processes described above. A magnetic disk is obtained in the following manner using the above-described glass substrate for magnetic disk.

The magnetic disk has, for example, a configuration in which on the principal face of the glass substrate, at least an adhesive layer, an underlying layer, a magnetic layer (magnetic recording layer), a protective layer and a lubricant layer are stacked in this order from the side closest to the principal face.

For example, the substrate is introduced into an evacuated deposition apparatus, and the adhesive layer, the underlying layer and the magnetic layer are sequentially deposited in an Ar atmosphere by a DC magnetron sputtering method. For example CrTi may be used as the adhesive layer, and for example CrRu may be used as the underlying layer. For example a CoPt-based alloy may be used as the magnetic layer. Also, a CoPt-based alloy or FePt-based alloy having a $L_{10}$ ordered structure may be deposited to form a magnetic layer for heat assisted magnetic recording. After the deposition described above, the protective layer is deposited using $C_2H_4$ by, for example, a CVD method, and subsequently nitriding treatment is performed to introduce nitrogen to the surface, whereby a magnetic recording medium can be formed. Thereafter, the lubricant layer can be formed by applying, for example, PFPE (perfluoropolyether) onto the protective layer by a dip coating method.

Examples

The present invention will be further described below by way of Examples. However, the present invention is not limited to aspects described in Examples.

(1) Preparation of Molten Glass

Raw materials were weighed so as to obtain a glass having the following composition, and mixed to obtain a mixed raw material. This raw material was put in a melting vessel, heated, melted, clarified and stirred to prepare a homogeneous molten glass free from foam and an unmelted substance. Foam and an unmelted substance, deposition of crystals, and contaminants such as a refractory material and platinum forming the melting vessel were not observed in the glass obtained.

[Composition of Glass]

Aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol %.

The glass was prepared so as to have a glass transition point (Tg) of 630° C. and a strain point of 620° C.

The above-described molten glass was provided, and a glass blank having a diameter of 75 mm and a thickness of 0.9 mm was prepared using a press forming method of the present invention (method using the apparatus in FIGS. 39 and 40). The temperature of a molten glass material $L_G$ discharged from a molten glass outflow port 111 was 1300° C., and the viscosity of the molten glass material $L_G$ at this time was 700 poise. The surface roughness (arithmetic mean roughness Ra) of the inner circumferential surfaces of a first die and a second die was 0.1 μm to 1 μm. Further, the first die and the second die were formed of an ultrahard alloy (e.g. VM40) having a thickness of 35 mm. Copper was used as a temperature controlling unit.

The molten glass material $L_G$ discharged from a molten glass outflow port 111 was cut by a cutting unit 160, so that a gob $G_G$ having a thickness of about 20 mm was formed. The gob $G_G$ was pressed under a load of 3000 kgf by a press unit until the gob $G_G$ had a temperature equal to or lower than the strain point of the molten glass material (about 10 seconds), so that a glass blank having a diameter of 75 mm and a thickness of 0.9 mm was formed.

In this Example, the temperature of the first die was set at 470° C., and the temperature of the second die was set at 450 to 490° C. The reason why the minimum temperature of the die was set to 450° C. is that when the minimum temperature of the die is lower than 450° C., the glass may be broken during pressing.

Examples and Comparative Examples

Comparative Example

In Comparative Example illustrated in Table 6, a glass blank was scribed so as to have an outer diameter of 65 mm, a central hole diameter of 20 mm and a thickness of 0.6 to 1.0 mm without subjecting the principal face of the glass blank after the press forming process to the removing process.

Example

In Example illustrated in Table 6, a donut-shaped glass substrate was formed by scribing a glass blank so as to have an outer diameter of 65 mm, a central hole diameter of 20 mm and a thickness of 0.6 to 1.0 mm after both sides of the principal face of the glass blank after the press forming process is removed by 105 μm each.

In Comparative Example and Example, the thickness of a residual stress layer formed on each of both sides of the principal face of the glass blank after the press forming process was 100 μm.

[Evaluation of Glass Blank and Glass Substrate Prepared in Example]

First, whether or not the glass blank was ruptured when scribing was performed was checked. Next, the flatness of the prepared glass substrate, having a diameter of 65 mm was measured. Next, the glass substrate was subjected to heating treatment intended for an ordering treatment for forming a magnetic layer of a L10-ordered alloy in a medium for a heat-assisted magnetic recording system, and thereafter the flatness and surface roughness (arithmetic mean roughness Ra) of the glass substrate were measured. This heating treatment was performed by keeping the glass blank at 600° C. for 1 minute.

The flatness can be defined as a difference on the normal axis between the lowest position (trough) and the highest position (crest) on the principal plane of the glass blank when viewed from a fixed height on the normal axis from the horizontal plane with the glass blank placed on the horizontal plane. The flatness was measured using, for example, Flatness Tester FT-900 manufactured by NIDEK CO., LTD. Evaluation criteria for the flatness illustrated in Table 6 are as follows. It is preferred that the flatness of the glass blank is 8.0 μm or less in the following criteria because the flatness can be improved to a level of 4 μm or less, which is target flatness of the glass substrate for magnetic disk. It is preferred that the flatness of the glass blank is 4.0 μm or less because the target flatness of the glass substrate for magnetic disk can be achieved even if the grinding process is omitted, thereby leading to cost reduction.

Good: The flatness is 4.0 μm or less.

Fair: The flatness is more than 4.0 μm and no more than 8.0 μm.

Poor: The flatness is more than 8.0 μm.

The surface roughness is represented by an arithmetic mean roughness Ra defined in JIS B0601:2001 and, for example, can be measured with roughness measuring machine SV-3100 manufactured by Mitutoyo Corporation and calculated by a method defined in JIS B0633:2001 when the roughness is no less than 0.006 μm and no more than 200 μm. When as a result, the roughness is, 0.03 μm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 256×256 pixels in a measurement area of 10 μm×10 μm square was used. As a result, the surface roughness of the glass blank was 0.5 μm or less in all examples. This is because regardless of the temperature of the die, the inner circumferential surfaces of the first die and the second die are shape-transferred, to the glass blank, so that the surface roughness of the glass blank is comparable to the surface roughness of the inner circumferential surfaces of the first die and the second die. When the arithmetical mean roughness Ra is 0.1 µm or less, target surface properties of the glass substrate for magnetic disk can be obtained by omitting the grinding process to the principal face and performing the polishing process directly.

TABLE 6

|  | Removed surface | Presence/ absence of rupture | Flatness before heating | Flatness after heating | Evaluation of flatness |
|---|---|---|---|---|---|
| Comparative Example | Not removed | Present | — | — | — |
| Example | Both surfaces | Absent | 2.3 µm | 2.3 µm | Good |

From Table 6, it has become apparent that by removing at least a part of the residual stress layer formed on the principal face of the press-formed glass blank, the glass blank is not ruptured when formed into a donut shape. This indicates that since the residual stress layer formed on the principal face of the glass blank is removed, the internal strain of the glass blank after removal of the residual stress layer is reduced. When at least a part of each of the residual stress layers on both principal faces of the glass blank was removed, a glass blank having the best flatness was obtained.

<Fifth Additional Disclosure>

Recently, a hard disk drive device (HDD) is incorporated in a personal computer or a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for magnetic disk because the glass substrate hardly plastically deformed as compared to a metallic substrate (aluminum substrate) and the like.

The magnetic head includes, for example, a magnetic resistance effect element, but such a magnetic held may cause a thermal asperity trouble as its specific trouble. The thermal asperity trouble is a trouble in which when a magnetic head passes over a micro-irregularly-shaped surface of a magnetic disk while floating and flying, a magnetic resistance effect element is heated by adiabatic compression or contact of air, causing a read error. Thus, for avoiding the thermal asperity trouble, the glass substrate for magnetic disk is prepared such that surface properties, such as the surface roughness and flatness, of the principal face of the glass substrate are at a satisfactory level.

As a conventional method for manufacturing a sheet glass (glass blank), a vertical direct press method is known. This press method is a method in which a lump of molten glass is fed onto a lower die, and the lump of molten glass (molten glass lump) is press-formed using an upper die. In the vertical direct press method, a period of time until the lump of molten glass (molten glass lump) is pressed after being supplied to the lower die is long, and therefore when the surface roughness of the lower die is improved, the molten glass lump is fused to the lower die (i.e. a state in which the lower die is in contact with the molten glass lump at a high temperature for a long time in a cumulative manner occurs, and the surface thereof is oxidized, so that the glass is seized). Accordingly, in the vertical direct press method, generally it is necessary that a mold release material such as, for example, BN (boron nitride) be attached to the lower die beforehand for preventing a situation in which the molten glass lump is fused to the lower die and cannot be removed. In this way, the mold release characteristic of the glass blank is secured. However, the surface of the glass blank obtained by press forming is projected because particles of the mold release material are attached thereto. Thus, even though the surface roughness of the forming surface of the die is improved, the surface roughness of the glass blank obtained is large owing to the attached particles of the mold release material.

After press forming, a shape processing process of cutting a glass blank along two concentric circles is performed for forming the glass blank obtained by press forming into a disk-shaped glass substrate. For shape processing, a method using a core drill or a method by scribing is employed. Generally, the method by scribing is better in terms of circularity and/or concentricity, but in the case where the surface roughness of the glass blank is large, the blade may be bounded, and the glass blank may be broken when cutting is performed because a cutting line may not be formed as a continuous circular line. That is, in the case where the surface roughness of the glass blank is large, the yield of scribing is reduced, and therefore the method by scribing cannot be employed in a mass production process. Therefore, in the case where the surface roughness of the glass blank is large, the method using a core drill is employed; however, a circularity and/or concentricity which is as high as that of scribing cannot be achieved due to fluctuations in circularity and rotation axis of the drill. Accordingly, the vertical direct press method, in which a glass blank having a large surface roughness is formed owing to attached particles of the mold release material, has a limitation in enhancing outer shape accuracy such as circularity while securing a high yield. In the vertical direct press method, pressing can be performed without attaching the mold release material to the upper die, and it is conceivable that a cutting line for scribing is formed in a surface formed in the upper die, but since particles of the mold release material are attached on a surface formed in the lower die, circularity and/or concentricity is deteriorated as well when the glass blank is completely cut.

From the viewpoint described above, Japanese Patent Laid-open Publication No. 2009-269762 discloses that a die in vertical direct press is formed so that a glass blank after pressing includes first and second cutting regions (regions to be cut by scribing) having a center line average roughness Ra of 0.1 to 50 nm in a concentric-circle shape, and other regions having a center line average roughness Ra of 100 nm or more. Consequently, cutting lines for shape processing in first and second regions can be stably formed, so that a cut surface having defects such as chipping reduced can be formed, and the mold release characteristic of the glass blank during press forming is secured by means of regions having a center line average roughness Ra of 100 nm or more (relatively rough regions). Generally, for performing shape processing, a method using a core drill in place of a scribe cutter is also employed, but use of the scribe cutter allows shape processing of a circular shape having a higher circularity.

A die used in vertical direct press method does not control a contour of a molten glass drawn by pressing, and therefore a glass blank obtained by pressing has a low circularity. Thus, the central position of the cutting lime of a scribe cutter cannot be determined based on the outer shape of the glass blank. Accordingly, in the press forming method described in Patent Document 1, a mechanism is required for determining the central position of the cutting line of the scribe cutter from first and second cutting regions (two concentric-circle-shaped regions) formed on the glass blank. When controlling a contour of a molten glass drawn by pressing in the die used in vertical direct press, there is the problem that the molten glass easily causes the die to be seized.

In the press forming method described in Patent Document 1, regions of the forming surface other than those corresponding to first and second regions must be increased for easiness in releasing the mold, and the most part of the principal face of the press-formed glass blank has a large surface roughness. Therefore, the machining allowance in subsequent grinding and polishing processes is increased, leading to not only an increase in tact time but also occurrence of cracking.

Accordingly, an object of the invention of the fifth additional disclosure is to provide a method for manufacturing a glass substrate for magnetic disc, which is capable of shape-processing a press-formed glass blank into a disc shape with good accuracy while securing a high yield without grinding or polishing the principal face of the glass blank.

In view of the above-described problems, the present inventors have intensively conducted studies, and resultantly devised a novel press forming method. That is, in a method for manufacturing a glass blank according to this embodiment, a horizontal direct press method is employed in which a falling molten glass lump is press-formed using a pair of dies (press forming dies) arranged so as to face each other in a direction orthogonal to the falling direction of the molten glass lump. In the horizontal direct press method, unlike the conventional vertical direct press method, the molten glass lump is not temporarily retained in contact with a member having a temperature lower than that of the molten glass lump over a period of time until it is press-formed. Thus, at the time point immediately before press forming is started, the viscosity distribution of the interior of the molten glass lump becomes very wide during press forming in the vertical direct press method, whereas the viscosity distribution of the molten glass lump is kept even in the horizontal direct press of this embodiment. Accordingly, in the horizontal direct press method, it is extremely easy to uniformly thinly draw the molten glass lump to be press-formed as compared to the vertical direct press method. Consequently, as compared to the case where a glass blank is prepared using the vertical direct press method, it is extremely easy to drastically suppress deterioration of the flatness when a glass blank is prepared using the horizontal direct press method.

Further the present inventors have conceived that in the novel press forming method described above, the molten glass lump is prevented from being fused to the die by performing press forming while controlling the temperature of the die so that the temperature of the die, over a period of time until the molten glass lump is separated from the die after coming into contact with the die, is equal to or lower than a glass transition point (Tg). That is, it has been found that in the novel press forming method described above, the molten glass lump can be prevented from being fused to the die by performing the above-described temperature control, owing also to the molten glass being not in contact with at least one of the dies for a long time.

From the viewpoint described above, the present invention may be a method for manufacturing a glass substrate for magnetic disk, which includes: a forming process of forming a disk-shaped glass blank by direct-pressing a molten glass by a pair of dies; and a shape processing process of performing at least one of inner hole formation and outer shape formation for forming a disk-shaped glass substrate by forming a cutting line on the principal face of the glass blank, followed by growing the cutting line to perform cutting, wherein in the forming process, press forming is performed while the temperature of the pair of dies, over a period of time until a molten glass is separated from the die after coming into contact with the die, is set at a temperature lower than a glass transition point (Tg) and a mold release material is not attached to the surfaces of the pair of dies.

In the method for manufacturing a glass substrate for magnetic disk, preferably the arithmetic mean roughness (Ra) of the contact surface that is in contact with the molten glass in the pair of dies may be 0.5 µm or less.

In the forming process, the falling lump of molten glass may be press-formed in a direction orthogonal to the falling direction using a pair of dies.

In the forming process, press forming may be performed so that the temperature of a portion of the die, which contacts the molten glass, is identical between the pair of dies.

In the shape processing process, an inner hole formation and an outer shape formation may be performed at the same time.

According to the present invention, a press-formed glass blank can be shape-processed into a disc shape with good accuracy while securing a high yield without grinding or polishing the principal face of the glass blank.

[Explanation of Embodiment in Fifth Additional Disclosure]

A method for manufacturing a glass blank for magnetic disk and a method for manufacturing a glass substrate for magnetic disk in this embodiment will be described in detail below.

[Glass Substrate for Magnetic Disk]

Figure 46:
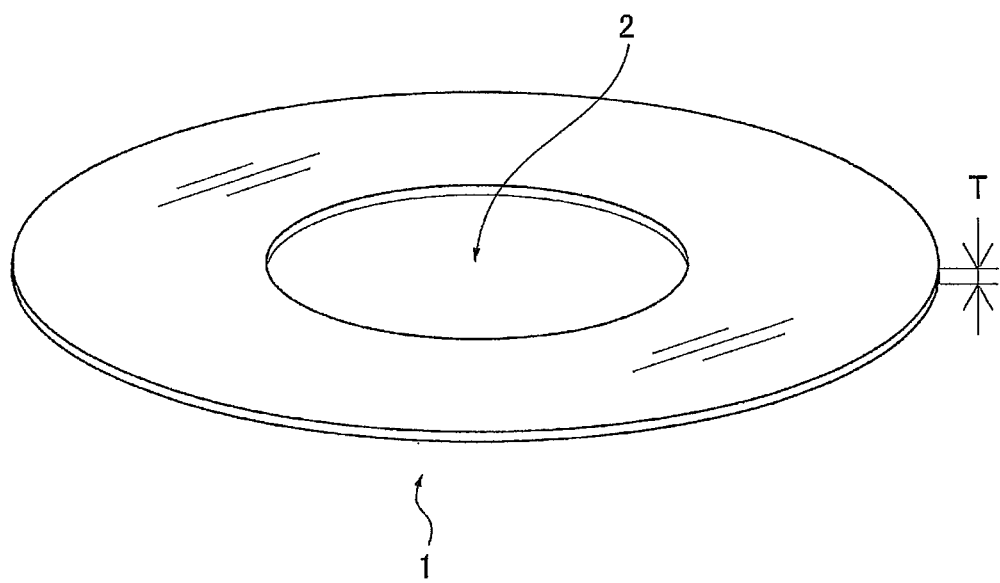
FIG. 46 is a perspective view illustrating an external shape of a glass substrate for magnetic disk of an embodiment.

As illustrated in FIG. 46, a glass substrate for magnetic disk 1 in this embodiment is a disk-shaped thin glass substrate. The size of the glass substrate for magnetic disk is not limited but for example, a glass substrate for magnetic disk having a nominal diameter of 2.5 inches is suitable. In the case of the glass substrate for magnetic disk having a nominal diameter of 2.5 inches, for example, the outer diameter is 65 mm, the diameter of a central hole (inner hole) 2 is 20 mm, and the thickness T is 0.6 to 1.0 mm. The flatness of the principal face of the glass substrate for magnetic disk of the embodiment is, for example, 4 µm or less, and the surface roughness (arithmetic mean roughness Ra) of the principal face is, for example, 0.2 nm or less. It is to be noted that the flatness required for a substrate for magnetic disk as a final product is, for example, 4 µm or less.

Aluminosilicate glass, soda-lime glass, borosilicate glass or the like can be used as a material of the glass substrate for magnetic disk in this embodiment. Particularly, the aluminosilicate glass can be suitably used in that chemically strengthening can be performed, and a glass substrate for magnetic disk excellent in flatness of the principal face and strength of the substrate can be prepared.

The composition of the glass substrate for magnetic disk of this embodiment is not limited, but the glass substrate of this embodiment is preferably made of aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol %.

[Method for Manufacturing Glass Substrate for Magnetic Disk of Embodiment]

Figure 47:
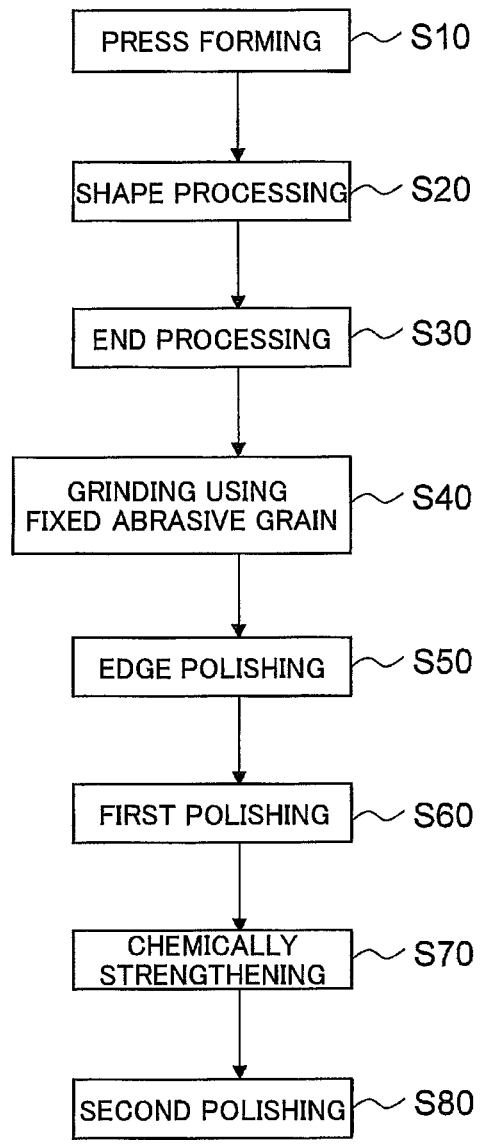
FIG. 47 is a view illustrating a flow of one embodiment of a method for manufacturing the glass substrate for magnetic disk of the embodiment.

Next, a flow of a method for manufacturing a glass substrate for magnetic disk will be described with reference to FIG. 47. FIG. 47 is a view illustrating a flow of one embodiment of a method for manufacturing a glass substrate for magnetic disk.

As illustrated in FIG. 47, in the method for manufacturing a glass substrate for magnetic disk in this embodiment, first a disk-shaped glass blank is prepared by press forming (Step S10). Next, the formed glass blank is scribed to prepare a disk-shaped glass substrate (Step S20). Next, the scribed glass substrate is subjected to shape processing (chamfering processing) (Step S30). Next, the glass substrate is subjected to grinding using a fixed abrasive grain (Step S40). Next, edge polishing of the glass substrate is performed (Step S50). Next, the principal face of the glass substrate is subjected to first polishing (Step S60). Next, the glass substrate, after first polishing, is subjected to chemically strengthening (Step S70). Next, the chemically strengthened glass substrate is subjected to second polishing (Step S80). The glass substrate for magnetic disk is obtained through the above processes.

Each process will be described in detail below.

(a) Press Forming Process (Step S10)

Figure 48:
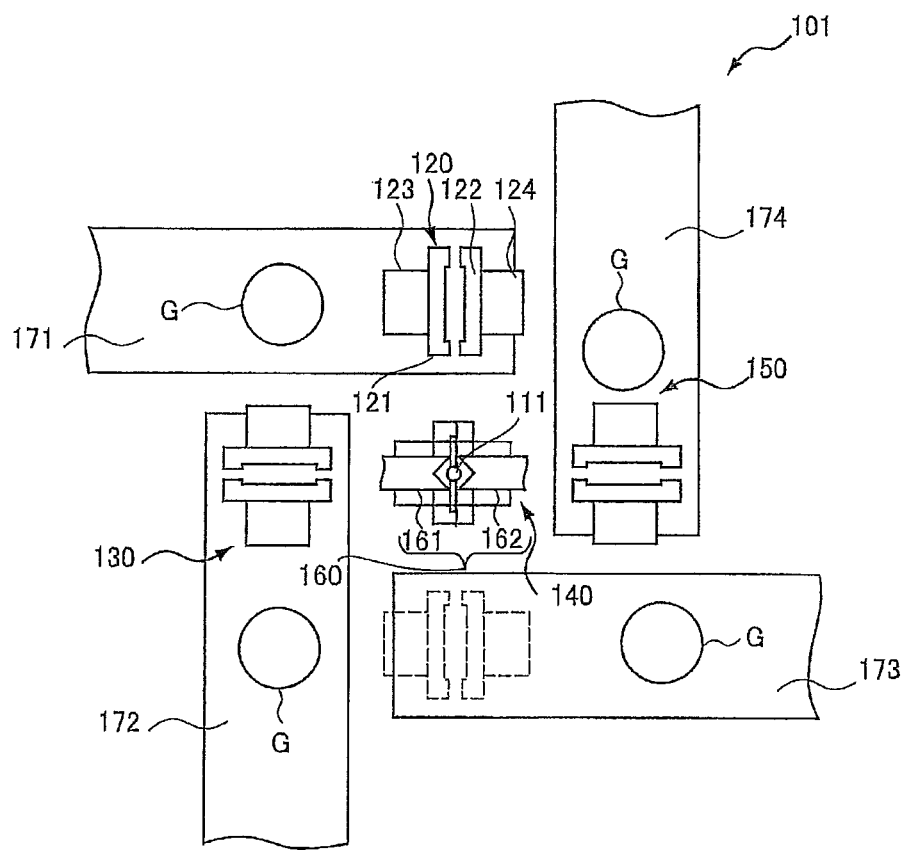
FIG. 48 is a plan view of an apparatus used in press forming of the embodiment.

First, the press forming process will be described with reference to FIG. 48. FIG. 48 is a plan view of an apparatus used in press forming. As illustrated in FIG. 48, an apparatus 101 includes four sets of press units 120, 130, 140 and 150, a cutting unit 160 and a cutting blade 165 (not illustrated in FIG. 47). The cutting unit 160 is provided on a path of a molten glass that flows out from a molten glass outflow port 111. In the apparatus, 101, a lump of molten glass (hereinafter, also referred to as a gob) cut by the cutting unit 160 is caused to fall down, and the lump is pressed from both sides of the falling path of the lump while the lump is sandwiched between surfaces of a pair of dies facing each other, thereby forming the glass blank.

Figure 49:
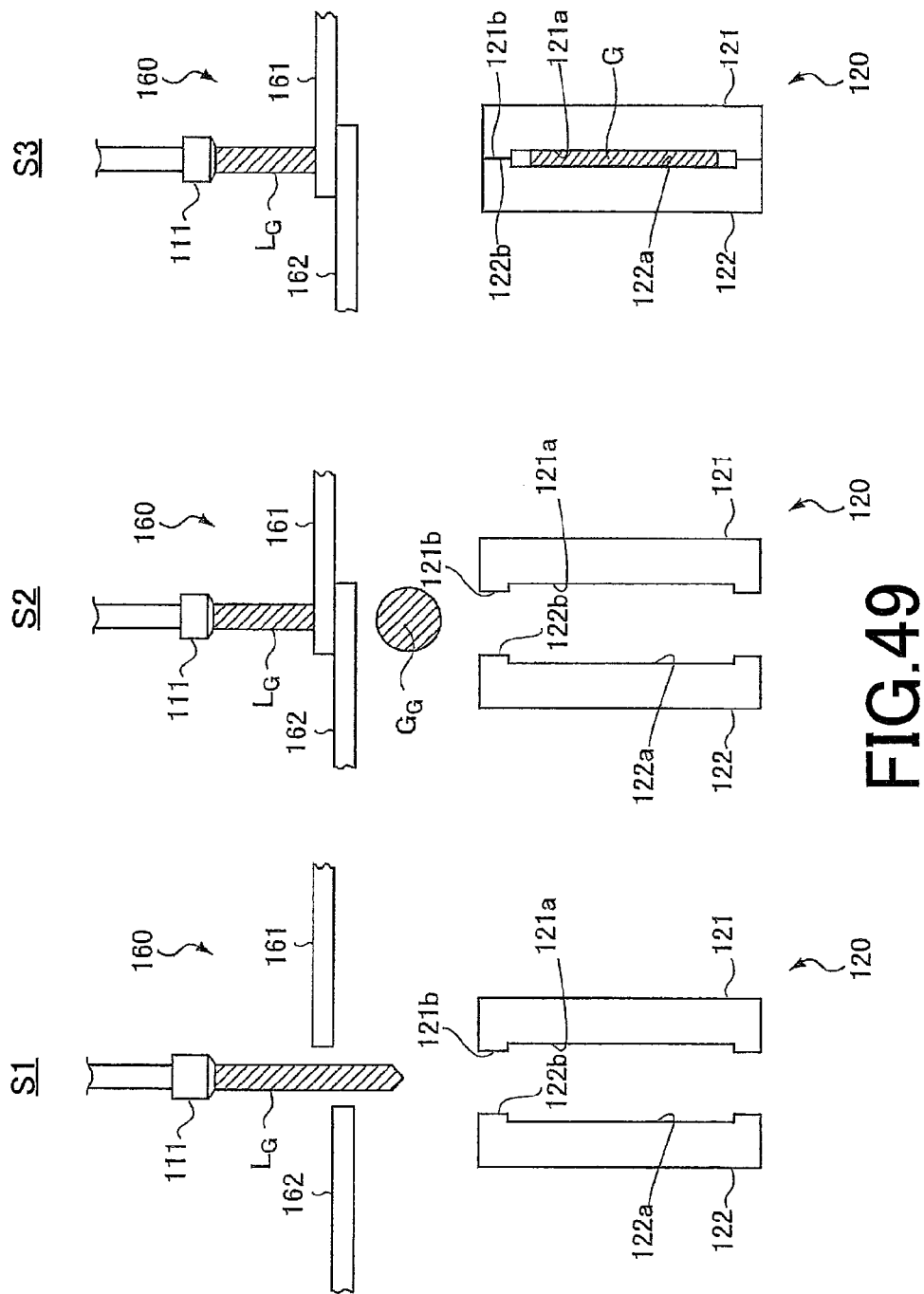
FIG. 49 is a view illustrating an example of press forming of the embodiment.

Specifically, as illustrated in FIG. 49, in the apparatus 101, the four sets of press units 120, 130, 140, and 150 are provided at intervals of 90 degrees around the molten glass outflow port 111.

Each of the press units 120, 130, 140, and 150 is driven by a moving mechanism (not illustrated) so as to be able to proceed and retreat with respect to the molten glass outflow port 111. That is, each of the press units 120, 130, 140, and 150 can be moved between a catch position and a retreat position. The catch position (position in which the press unit 140 is drawn by a solid line in FIG. 48) is located immediately below the molten glass outflow port 111. The retreat position (positions in which the press units 120, 130, and 150 are drawn by solid lines and a position in which the press unit 140 is drawn by a broken line in FIG. 48) is located away from the molten glass outflow port 111.

The cutting unit 160 is provided on a path of the molten glass between the catch position (position in which the gob is captured by the press unit) and the molten glass outflow port 111. The cutting unit 160 forms the lump of molten glass by cutting a proper quantity of the molten glass flowing out from the molten glass outflow port 111. The cutting unit 160 includes a pair of cutting blades 161 and 162. The cutting blades 161 and 162 are driven so as to intersect each other on the path of the molten glass at constant timing. When the cutting blades 161 and 162 intersect each other, the molten glass is cut to obtain the gob. The obtained gob falls down toward the catch position.

The press unit 120 includes a first die 121, a second die 122, a first driving unit 123 and a second driving unit 124. Each of the first die 121 and the second die 122 is a plate-shaped member including a surface used to perform the press forming for the gob. The first die 121 and the second die 122 are disposed such that normal directions of the surfaces become substantially horizontal, and such that the surfaces become parallel to each other. The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other, for example, a mechanism in which an air cylinder or a solenoid and a coil spring are combined.

Because the structures of the press units 130, 140, and 150 are similar to that of the press unit 120, the descriptions of the press units 130, 140, and 150 are omitted.

After each press unit moves to the catch position, the falling gob is sandwiched between the first die and the second die by driving the first driving unit and the second driving unit, and the gob is formed into a predetermined thickness while rapidly cooled; thereby preparing a circular glass blank G. Next, after the press unit moves to the retreat position, the first die and the second die are separated to cause the formed glass blank G to fall down. A first conveyer 171, a second conveyer 172, a third conveyer 173, and a fourth conveyer 174 are provided below the retreat positions of the press units 120, 130, 140, and 150, respectively. Each of the first to fourth conveyers 171 to 174 receive the glass blank G falling down from the corresponding press unit, and the conveyer conveys the glass blank G to an apparatus (not illustrated) of the next process.

The apparatus 101 is configured such that the press units 120, 130, 140, and 150 sequentially move to the catch position and move to the retreat position while the gob is sandwiched, so that the glass blank G can continuously be formed without waiting for the cooling of the glass blank G in each press unit.

S1 of FIG. 49 to S3 of FIG. 49 more specifically illustrates press forming performed by the apparatus 101. S1 of FIG. 49 is a view illustrating the state before the gob is made, S2 of FIG. 49 is a view illustrating the state in which the gob is made by the cutting unit 160, and S3 of FIG. 49 is a view illustrating the state in which the glass blank G is formed by pressing the gob.

As illustrated in S1 of FIG. 49, a molten glass material L continuously flows out from the molten glass outflow port 111. At this point, the cutting unit 160 is driven at predetermined timing to cut the molten glass material $L_G$ using the cutting blades 161 and 162 (S2 of FIG. 49). Therefore, the cut molten glass becomes a substantially spherical gob $G_G$ due to a surface tension thereof. Adjustment of the outflow quantity per time of the molten glass material $L_G$ and the driving interval of the cutting unit 160 may be appropriately performed according to a volume determined by the target size and thickness of the glass blank G.

The made gob $G_G$ falls down toward a gap between the first die 121 and second die 122 of the press unit 120. At this point, the first driving unit 123 and the second driving unit 124 (see FIG. 49) are driven such that the first die 121 and the second die 122 come close to each other at the timing the gob $G_G$ enters the gap between the first die 121 and the second die 122. Therefore, as illustrated in S3 of FIG. 49, the gob $G_G$ is captured (caught) between the first die 121 and the second die 122. An inner circumferential surface 121a of the first die 121 and an inner circumferential surface 122a of the second die 122 come close to each other with a micro gap, and the gob $G_G$ sandwiched between the inner circumferential surface 121a of the first die 121 and the inner circumferential surface 122a of the second die 122 is formed into a thin-plate shape.

A projection 121b and a projection 122b are provided in the first inner circumferential surface 121a of the first die 121 and the second inner circumferential surface 122a of the second die 122, respectively, in order to keep the gap between the inner circumferential surface 121a of the first die 121 and the inner circumferential surface 122a of the second die 122 constant. That is, the projection 121b and the projection 122b abut against each other, whereby the gap between the inner circumferential surface 121a of the first die 121 and the inner circumferential surface 122a of the second die 122 is kept constant, so that a plate-shaped space is generated.

Press forming is performed using a pair of dies 121 and 122 in the press forming process in press forming in this embodiment, and the outer shape of the glass blank is not restricted by the shape of the die. That is, as illustrated in S3 of FIG. 49, the gob stretched by closed dies does not reach projections 121b and 122b of the dies.

In the first die 121 and second die 122, the temperatures of the first die 121 and second die 122 are retained sufficiently lower than the glass transition temperature $T_G$ of the molten glass $L_G$. It is not necessary to attach a mold release material to the first die 121 and the second die 122 in the press forming process.

Since glass substrate for magnetic disk of this embodiment is incorporated while being pivotally supported by a metallic spindle having a high thermal expansion coefficient within a hard disk as a magnetic disk that is a final product, the thermal expansion coefficient of the glass substrate for magnetic disk is preferably as high as that of the spindle. Therefore, the composition of the glass substrate for magnetic disk is defined so that the glass substrate for magnetic disk has a high thermal coefficient. The thermal expansion coefficient of the glass substrate for magnetic disk is, for example, in a range of 30 to $100 \times 10^{-7}(K^{-1})$, preferably in a range of 50 to $100 \times 10^{-7}(K^{-1})$. The thermal expansion coefficient is a value calculated using the linear expansion coefficients of the glass substrate for magnetic disk at temperatures of 100° C. and 300° C. A thermal expansion coefficient of, for example, less than $30 \times 10^{-7}(K^{-1})$ or more than $100 \times 10^{-7}$ is not preferable because a difference in thermal expansion coefficient between the glass substrate and the spindle is increased. From the point of view, temperature conditions at the circumference of the principal face of the glass blank are made uniform in the press forming process when a glass substrate for magnetic disk having a high thermal expansion coefficient is prepared. As one example, it is preferable to perform temperature control so that the temperatures of the inner circumferential surface 1214 of the first dig 121 and the inner circumferential surface 122a of the second die 122 become substantially identical. When temperature control is performed so that the temperatures become identical, for example, a difference in temperature is preferably 5° C. or less. The difference in temperature is more preferably 3° C. or less, especially preferably 1° C. or less.

The difference in temperature between dies is a difference in temperature as measured using a thermocouple at a point which is located 1 mm from each of the front faces of the inner circumferential surface 121a of the first die 121 and the inner circumferential surface 122a of the second die 122 to the inside of the die and at which the inner circumferential surface 121a and the inner circumferential surface 122a face each other (e.g. a point corresponding to the central position of the glass blank and central points of the inner circumferential surface 121a and the inner circumferential surface 122).

A time until the gob $G_G$ is completely confined between the first die 121 and the second die 122 after the gob $G_G$ comes into contact with the inner circumferential surface 121a of the first die 121 or the inner circumferential surface 122a of the second die 122, is as extremely short as about 0.06 second in the apparatus 101.

Therefore, the gob $G_G$ is formed into the substantially disk shape by spreading along the inner circumferential surface 121a of the first die 121 and the inner circumferential surface 122a of the second die 122 within an extremely short time, and the gob $G_G$ is rapidly cooled and solidified in the form of amorphous glass. In this way, the glass blank G is prepared. The size of the glass blank G formed in this embodiment is, depending on the size of a desired glass substrate for magnetic disk, for example about 20 to 200 mm in diameter.

In the press forming method of this embodiment, the glass blank G is formed in a manner such that the inner circumferential surface 121a of the first die 121 and the inner circumferential surface 122a of the second die 122 are shape-transferred, and therefore preferably the flatness and the smoothness of each of the inner circumferential surfaces of a pair of dies are made comparable to those of a desired glass substrate for magnetic disk. In this case, necessity to subject the glass blank G to a surface processing process, i.e. a grinding and polishing process after press forming may be eliminated. That, is, the glass blank G formed in the press forming method of this embodiment may have a thickness identical to the target thickness of the glass substrate for magnetic disk that is finally obtained. For example, the glass blank G is a disk-shaped sheet having a thickness of 0.2 to 1.1 mm. The surface roughness (arithmetic mean roughness Ra) of the contact surface that is in contact with the gob $G_G$ in the inner circumferential surface 121a and the inner circumferential surface 122a is adjusted to be preferably 0.5 μm, further preferably 0.0005 to 0.05 μm.

After the first die 121 and the second die 122 are closed, the press unit 120 quickly moves to the retreat position, instead the press unit 130 moves to the catch position, and the press unit 130 performs the pressing to the gob $G_G$.

After the press unit 120 moves to the retreat position, the first die 121 and the second die 122 are kept closed until the glass blank G is sufficiently cooled (at least until the glass blank G has a temperature below a yield point). Then, the first driving unit 123 and the second driving unit 124 are driven to separate the first die 121 and the second die 122, the glass blank G falls down from the press unit 120, and the conveyer 171 located below the press unit 120 receives the glass blank G (see FIG. 48).

As described above, in the apparatus 101, the first die 121 and the second die 122 are closed within a time as extremely short as 0.1 second (about 0.06 second), and the molten glass substantially simultaneously comes into contact with the whole of the inner circumferential surface 121a of the first die 121 and the whole of the inner circumferential surface 122a of the second die 122. Therefore, the inner circumferential surface 121a of the first die 121 and the inner circumferential surface 122a of the second die 122 are not locally heated, and a strain is hardly generated in the inner circumferential surface 121a and the inner circumferential surface 122a. Because the molten glass is formed into the disk shape before the heat transfers from the molten glass to the first die 121 and the second die 122, a temperature distribution of the formed molten glass becomes substantially even. Therefore, in cooling the molten glass, variation of the shrinkage quantity of the glass material is small, and the large strain is not generated in the glass blank G. Accordingly, the flatness of the principal face of the prepared glass blank G is improved as compared to a glass blank prepared by conventional press forming with an upper die and a lower die.

In the example illustrated in FIG. 49, the substantially spherical gob $G_G$ is formed by cutting the flowing-out molten glass $L_G$ using the cutting blades 161 and 162. However, when viscosity of the molten glass material $L_G$ is small with respect to a volume of the gob $G_G$ to be cut, the glass does not become the substantially spherical shape only by cutting the molten glass $L_G$, and the gob is not formed. In such cases, a gob forming die is used to form the gob.

Figure 50:
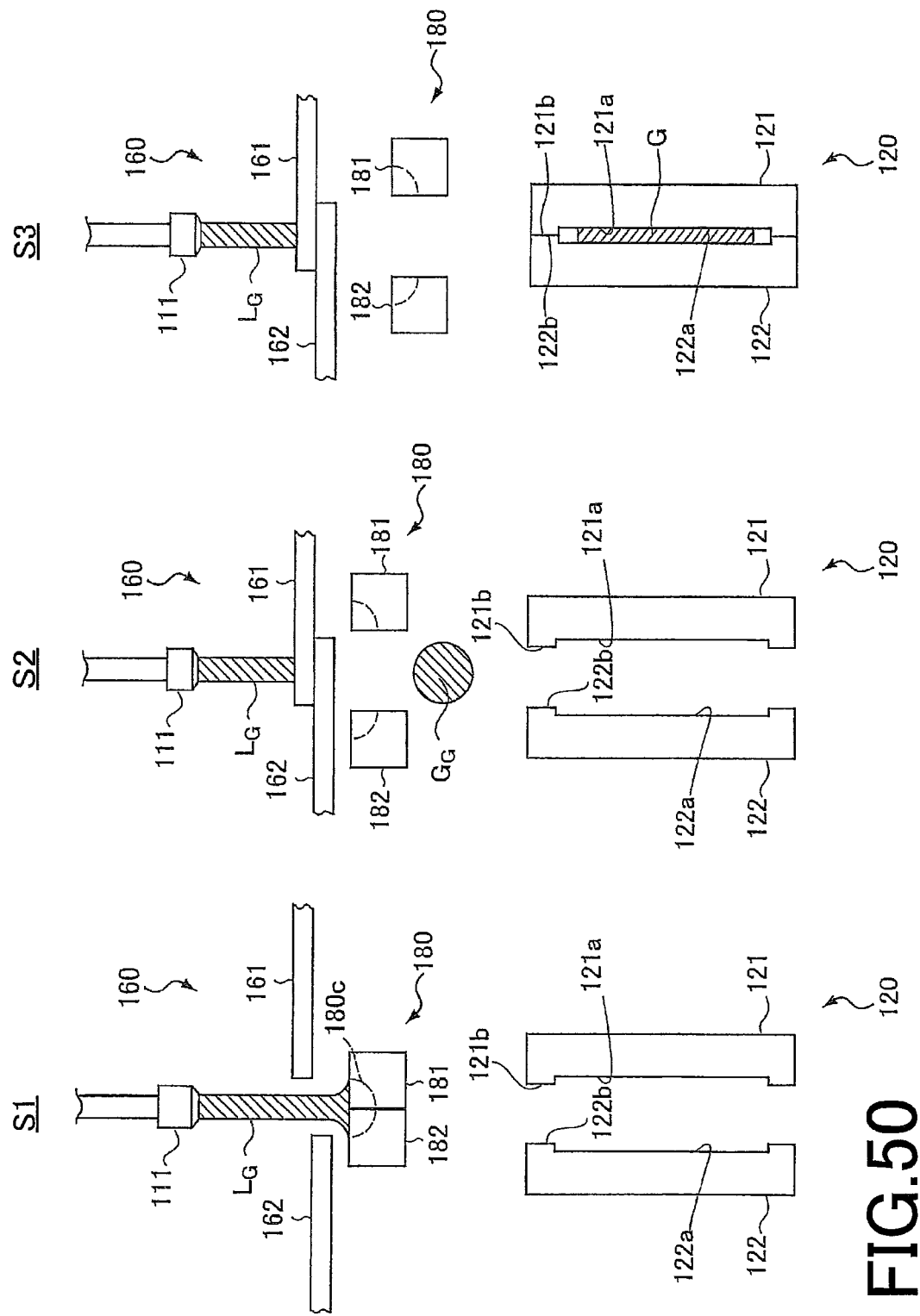
FIG. 50 is a view illustrating a modification of press forming of the embodiment using a gob forming die.

S1 of FIG. 50 to S3 of FIG. 50 are views illustrating a modification of the embodiment of FIG. 49. The gob forming die is used in the modification. S1 of FIG. 50 is a view illustrating the state before the gob is made, S2 of FIG. 50 is a view illustrating the state in which the gob $G_G$ is made by the cutting unit 160 and gob forming die 180, and S3 of FIG. 50 is a view illustrating the state in which the press forming is performed to the gob $G_G$ to make the glass blank G.

As illustrated in S1 of FIG. 50, the path of the molten glass $L_G$ to the press unit 120 is closed by closing the blocks 181 and 182, and the lump of the molten glass $L_G$ cut with the cutting unit 160 is received by a recess 180C formed by the block 181 and 182. Then, as illustrated in S2 of FIG. 50, the molten glass $L_G$ that becomes the spherical shape in the recess 180C falls down toward the press unit 120 at one time by opening the blocks 181 and 182. When falling down toward the press unit 120, the gob $G_G$ becomes the spherical shape by the surface tension of the molten glass $L_G$. As illustrated in S3 of FIG. 50, during the fall of the gob $G_G$, the spherical gob $G_G$ is sandwiched between the first die 121 and the second die 122 to perform the press forming, thereby preparing the disk-shaped glass blank G.

Figure 51:
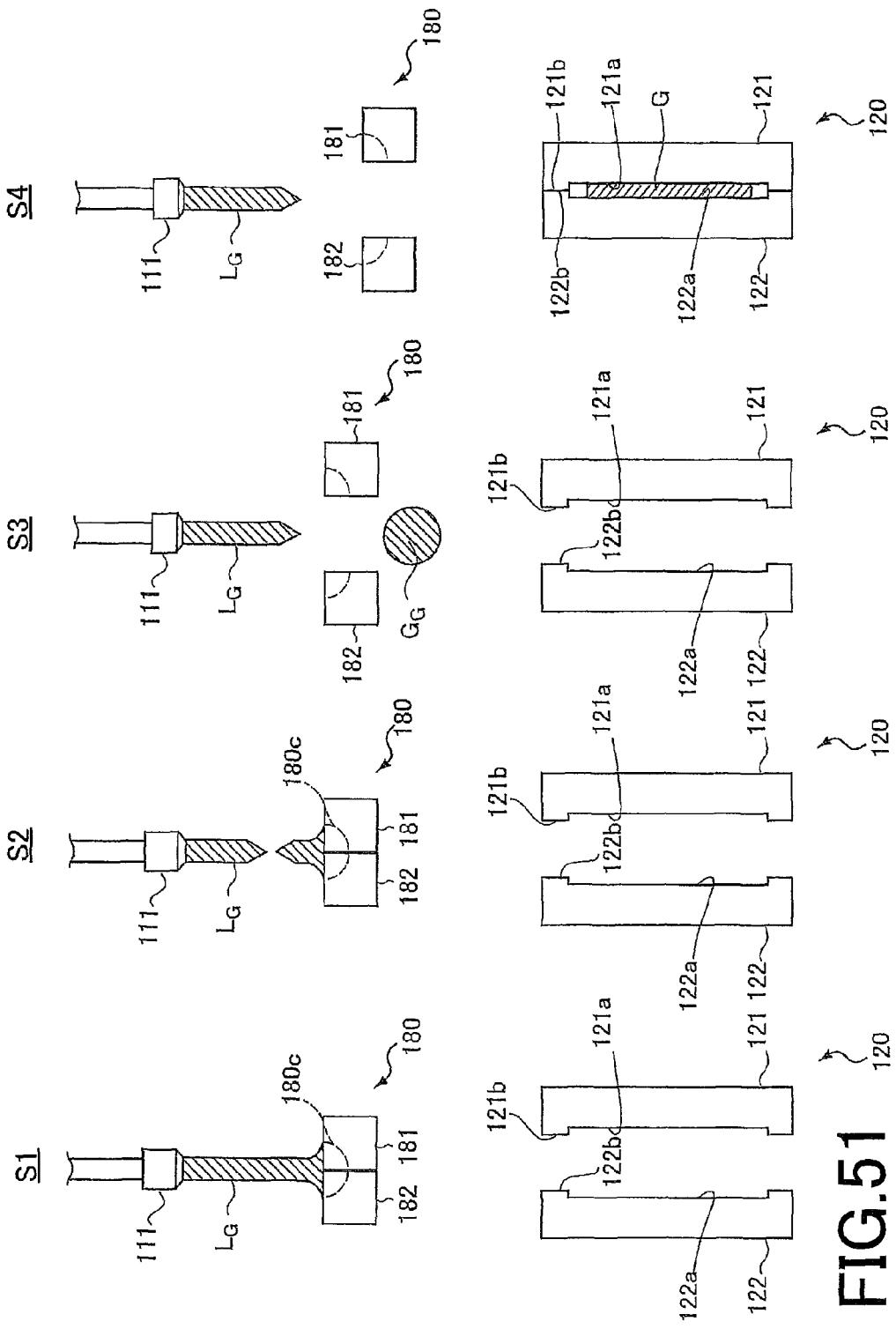
FIG. 51 is a view illustrating a modification of press forming of the embodiment in which a cutting unit is not used.

Alternatively, as illustrated in S1 of FIG. 51 to S4 of FIG. 51, in the apparatus 101, instead of using the cutting unit 160 illustrated in S1 of FIG. 50 to S3 of FIG. 50, a moving mechanism that moves the gob forming die 180 in an upstream direction or a downstream direction along the path of the molten glass $L_G$ may be used. S1 of FIG. 51 to S4 of FIG. 51 are views illustrating a modification in which the gob forming die 180 is used. S1 of FIG. 51 and S2 of FIG. 51 are views illustrating the state before the gob $G_G$ is made, S3 of FIG. 51 is a view illustrating the state in which the gob $G_G$ is made by the gob forming die 180, and S4 of FIG. 51 is a view illustrating the state in which the gob $G_G$ is subjected to press forming to make the glass blank G.

As illustrated in S1 of FIG. 51, the recess 180C formed by the block 181 and 182 receives the molten glass $L_G$ flowing out from the molten glass outflow port 111. As illustrated in S2 of FIG. 51, the blocks 181 and 182 are quickly moved onto the downstream side of the flow of the molten glass $L_G$ at predetermined timing. In this way, the molten glass $L_G$ is cut. Then, as illustrated in S3 of FIG. 51, the blocks 181 and 182 are separated at predetermined timing. Therefore, the molten glass $L_G$ retained by the blocks 181 and 182 falls down at one time, and the gob $G_G$ becomes the spherical shape by the surface tension of the molten glass $L_G$. As illustrated in S4 of FIG. 51, during the fall of the gob $G_G$, the spherical gob $G_G$ is sandwiched between the first die 121 and the second die 122 to perform the press forming, thereby preparing the disk-shaped glass blank G.

Figure 52:
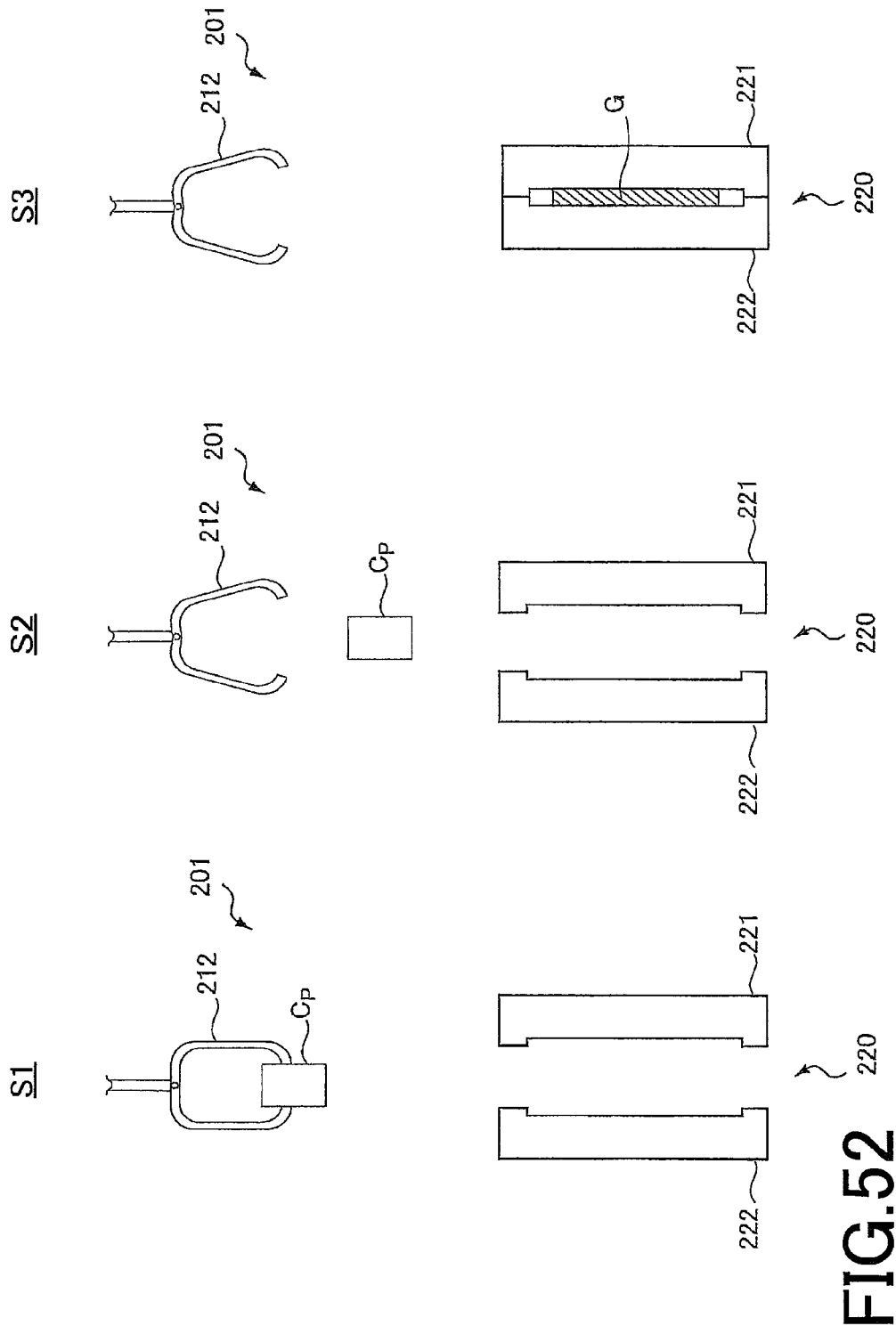
FIG. 52 is a view illustrating a modification of press forming of the embodiment using an optical glass heated by a softening furnace.

S1 of FIG. 52 to S3 of FIG. 52 are views illustrating another modification in which, instead of the gob $G_G$, a lump $C_P$ of the optical glass heated by a softening furnace (not illustrated) is caused to fall down and the press forming is performed to the lump $C_P$ while the lump $C_P$ is sandwiched from both sides between dies 221 and 222 during the fall of the lump $C_P$. S1 of FIG. 52 is a view illustrating the state before the lump of the heated optical glass is formed, S2 of FIG. 52 is a view illustrating the state in which the lump of the optical glass falls down, and S3 of FIG. 52 is a view illustrating the state in which the press forming is performed to the lump of the optical glass to make the glass blank G.

As illustrated in S1 of FIG. 52, in an apparatus 201, a glass material grasping mechanism 212 conveys the lump $C_P$ of the optical glass to a position above a press unit 220. As illustrated in S2 of FIG. 52, the glass material grasping mechanism 212 releases the lump $C_P$ of the optical glass to cause the lump $C_P$ of the optical glass to fall down. As illustrated in S3 of FIG. 52, during the fall of the lump $C_P$ of the optical glass, the lump $C_P$ is sandwiched between the first die 221 and the second die 222 to perform the press forming, thereby preparing the disk-shaped glass blank G. Because the first die 221 and the second die 222 have the same configuration and action as those of the first die 121 and second die 122 illustrated in FIG. 50, the descriptions are omitted.

[Temperature Control of Dies]

In the above-described press forming of this embodiment, the temperatures of the first die 121 and the second die 122 are retained sufficiently lower than the glass transition temperature (Tg) of the molten glass L before press forming as described previously. Further the temperatures of the first die 121 and the second die 122, over a period of time until the molten glass is separated from the first die 121 and the second die 122 after coming into contact therewith, may be controlled to be lower than the glass transition point (Tg) of the molten glass $L_G$. Here, the temperature of the die is, for example, a temperature as measured using a thermocouple at a point which is located 1 mm to the inside of the die corresponding to the central position of the glass blank in each of the inner circumferential surfaces 121a and 122a of the dies (e.g. the central point of each of the inner circumferential surfaces 121a and 122a).

The temperatures of the first die 121 and the second die 122, over a period of time until the molten glass is separated from the first, die 121 and the second die 122 after coming into contact therewith, may be kept lower than the glass transition point (Tg) of the molten glass $L_G$ while the form of the first die 121 and the second die 122 illustrated in FIG. 49 is maintained. Otherwise, a heat exhausting unit may be provided in the die to perform control so that the temperature of the die in the press forming process is lower than the glass transition point (Tg). Specific examples of the temperature control of the dies will be described below with reference of FIGS. 53 and 54.

E1 of FIG. 53 to E3 of FIG. 53 each illustrates a heat exhausting unit 125 for decreasing the temperature of each of the first and second dies 121 and 122. The heat exhausting unit 125 is coupled to the die by known fastening means so as to be in surface contact with the outer circumferential surface of each die. The heat exhausting unit 125 is provided for exhausting heat retained by the die to outside.

E1 of FIG. 53 illustrates an example where the heat exhausting unit 125 is provided so as to be in surface contact with almost the whole of the outer circumferential surface of each of the first and second dies 121 and 122. The heat exhausting unit 125 illustrated in E2 of FIG. 53 is formed in a concave shape, and is configured such that heat exchange is efficiently performed by supplying air to the recessed portion at the center thereof by an air supply mechanism (not illustrated). The heat exhausting unit 125 illustrated in E3 of FIG. 53 is in the form of a heat sink including a plurality of fins, and is intended to perform cooling efficiently by securing a large heat exhaust area to outside air. In the case of E3 of FIG. 53, heat exchange can also be efficiently performed by supplying air to an air supply mechanism (not illustrated).

Preferably the heat exhausting unit 125 is formed with material having heat conductivity higher than that of each of first and second dies 121 and 122. For example, when first and second dies 121 and 122 are formed of an ultrahard alloy (e.g. VM40), the heat exhausting unit 125 may be formed of copper, a copper alloy, aluminum, an aluminum alloy or the like. Since the heat exhausting unit 125 has heat conductivity higher than that of each of first and second dies 121 and 122, heat from first and second dies 121 and 122 can be efficiently discharged to outside. The heat conductivity of the ultrahard alloy (VM40) is 71 (W/m·K), and the heat conductivity of copper is 400 (W/m·K). The member that forms the heat exhausting unit 125 may be appropriately selected according to the heat conductivity, hardness, thickness and dimension, etc. of the metal forming first and second dies 121 and 122. First and second dies 121 and 122 are required to have strength capable of sustaining press, and therefore preferably they are not integrated with the heat exhausting unit 125.

Figure 54:
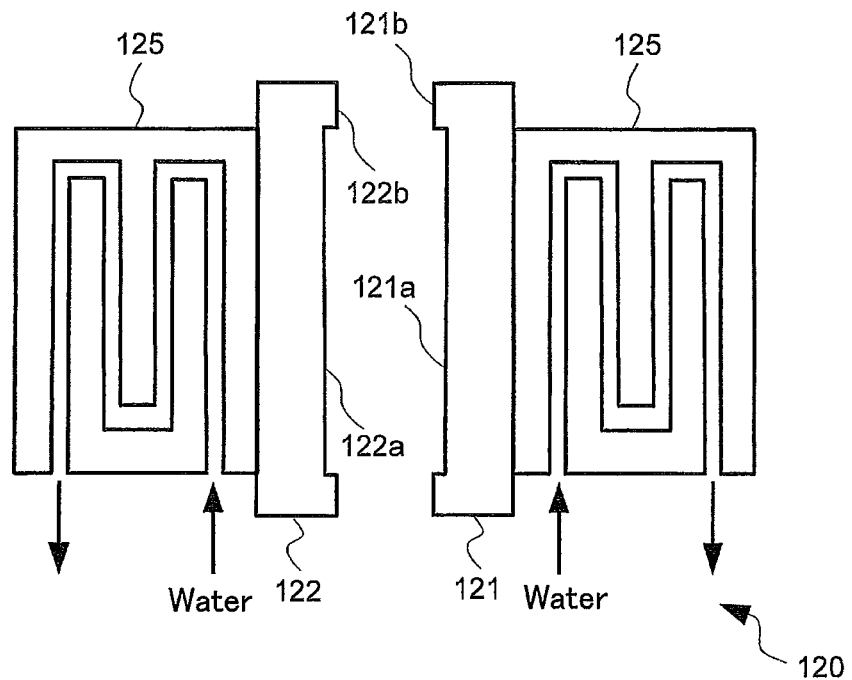
FIG. 54 is a view illustrating an example of a heat exhausting unit (water-cooling) used in press forming of the embodiment.

The heat exhausting unit 125 illustrated in FIG. 54 is one example in which a water-cooling mechanism (not illustrated) is provided. In this case, cooling water is supplied into the heat exhausting unit 125 by, for example, a water-cooling mechanism which may be provided with a cooling water storage tank, a water pump and a pipeline. A passage for cooling water is provided in the heat exhausting unit 125. Cooling water supplied from the water-cooling mechanism passes through the passage for cooling water, and is warmed by absorbing heat transferred to the heat exhausting unit 125 from the die, and discharged from the heat exhausting unit 125 to a tank of the water-cooling mechanism. The temperatures of the first and second dies 121 and 122 can also be decreased with the above-described water-cooling system.

In press forming of this embodiment, the temperatures of the first die 121 and the second die 122, over a period of time until the molten glass is separated from the first die 121 and the second die 122 after coming into contact therewith, are controlled to be lower than the glass transition point (Tg) of the molten glass L using means as illustrated in FIGS. 53 and 54. Therefore, in the press forming method of this embodiment, unlike the conventional vertical direct press method, it is not necessary to attach a release material to the surface of the die because the molten glass $L_G$ can be prevented from being fused to the die, even if a die having an inner circumferential surface having an extremely low surface roughness is used, by performing the above-described temperature control of the die, owing also to the molten glass being not in contact with only one of the dies for a long time.

(b) Scribing Process (Step S20; Shape Processing Process)

Next, the scribing process will be described. After the press forming process, the formed glass blank G is subjected to scribing in the scribing process.

As used herein, the scribing means that two concentric (inside concentric and outside concentric) cutting lines are provided in the surface of the glass blank G with a scriber made of a super alloy or diamond particles in order to obtain the disk-shape (ring-shape) of the formed glass blank having a predetermined size. The glass blank scribed into two concentric-circle-shape is partially heated, and a portion outside the outside concentric circle and a portion inside the inside concentric circle are removed (cut) as the cutting line grows by a difference in thermal expansion of the glass blank. In this scribing, preferably inner hole formation and outer shape formation are performed at the same time by forming two concentric-circle-shaped cutting lines at the same time in that a high circularity is achieved. A disk-shaped glass substrate can also be obtained by forming a circular hole in the glass blank using a core drill or the like.

In this embodiment, since the arithmetic average roughness Ra of the principal face of the glass blank obtained in the press forming process as a preliminary process is as small as 0.001 to 0.1 μn, and a mold release material is not attached, the glass blank is not broken during or after scribing, and a high yield can be secured in a mass production process. The circularity of the outer shape and/or the central hole of the glass substrate after scribing, or the concentricity thereof is not deteriorated.

(c) End Processing Process (Step S30)

Next, the end portion processing process will be described. The end portion processing process includes chamfering processing of the end portion of the glass substrate (chamfering of outer circumferential end portion and inner circumferential end portion) after the scribing process. Chamfering processing is shape processing in which the outer circumferential end portion and inner circumferential end portion of the glass substrate after the scribing process is chamfered between a principal face and a side wall portion perpendicular to the principal face using a diamond abrasive grain. The chamfering angle is, for example, 40 to 50 degrees with respect to the principal face.

(d) Grinding Process using Fixed Abrasive Grain (Step S40)

In the grinding process using a fixed abrasive grain, the principal face of the glass substrate after the end portion processing process is subjected to grinding processing (machining) using a double faces grinding apparatus including a planet gear mechanism. For example, the grinding has the machining allowance of several micrometers to about 100 micrometers. The double faces grinding apparatus includes a pair of upper and lower surface plates (upper surface plate and lower surface plate), and a glass substrate is held between the upper surface plate and the lower surface plate. By moving one or both of the upper surface plate and the lower surface plate, the glass substrate and each surface plate are relatively moved, whereby both principal faces of the glass substrate can be ground.

In the press forming process of this embodiment, a glass blank having extremely high flatness can be prepared, and therefore the grinding process may be omitted. Before the grinding process, a lapping process may be performed using a double faces grinding apparatus similar to the apparatus used in the grinding process and an alumina loose abrasive grain.

When the arithmetical mean roughness Ra of the principal face of the glass blank immediately after press forming is 0.1 μm, or less, target surface properties of the glass substrate for magnetic disk can be obtained even if the grinding process is omitted.

(e) Edge Polishing Process (Step S50)

Next, edge polishing of the glass substrate after the grinding process is performed.

In edge polishing, the inner circumferential end face and outer circumferential end face of the glass substrate are subjected to mirror surface finishing by brush polishing. At this point, slurry that includes fine particles such as cerium oxide as the loose abrasive grain is used. By performing edge polishing, an impairment such as contamination by deposition of dust or the like, damage or a flaw is eliminated, whereby occurrence of a thermal asperity and deposition of ions of sodium, potassium and the like which may cause corrosion can be prevented.

(f) First Polishing Process (Step S60)

Next, the principal face of the glass substrate after the edge polishing process is subjected to first polishing. For example, first polishing has the machining allowance of several micrometers to about 50 micrometers. First polishing is intended to remove the flaw left on the principal face after the grinding using the fixed abrasive grain, the strain and the micro-surface irregularity (micro-waviness and roughens). In the first polishing process, polishing is performed while a polishing solution is fed using a double polishing apparatus having a structure similar to that of the apparatus used in the grinding process. A polishing agent contained in the polishing solution is, for example, a cerium oxide abrasive grain or a zirconia abrasive grain.

In the first polishing process, polishing is performed so as to have a surface roughness (Ra) of 0.5 nm or less and micro-waviness (MW-Rq) of 0.5 nm or less for the principal face of the glass substrate.

The micro-waviness may be represented by a RMS (Rq) value calculated as a roughness at a wavelength bandwidth of 100 to 500 µm in a region of 14.0 to 31.5 mm radius in the whole of the principal face, and can be measured using, for example, Model-4224 manufactured by Polytec Inc.

The surface roughness is represented by an arithmetic mean roughness Ra defined in JIS B0601:2001 and, for example, can be measured with roughness measuring machine SV-3100 manufactured by Mitutoyo Corporation and calculated by a method defined in JIS B0633:2001 when the roughness is no less than 0.006 µm and no more than 200 µm. When as a result, the roughness is 0.03 µm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 512×512 pixels in a measurement area of 1 µm×1 µm square can be used.

(g) Chemically Strengthening Process (Step S70)

Next, the glass substrate after the first polishing process is chemically strengthened.

For example, a mixed solution of potassium nitride (60% by weight) and sodium sulfate (40% by weight) can be used as a chemically strengthening solution. In the chemically strengthening process, a chemically strengthening solution is heated to, for example, 300° C. to 400° C., a washed glass substrate is preheated to, for example, 200° C. to 300° C., and the glass substrate is then dipped in the chemically strengthening solution for, for example, 3 to 4 hours.

When the glass substrate is dipped in the chemically strengthening solution, the lithium ion and the sodium ion in the surface layer of the glass substrate are replaced, respectively, by the sodium ion and the potassium ion which have relatively large ion radiuses in the chemically strengthening solution, so that a compressive stress layer is formed on the surface layer portion, thereby strengthening the glass substrate. The glass substrate subjected to the chemically strengthening treatment is washed. For example, the glass substrate is washed with sulfuric acid, and then washed with pure water or the like.

(h) Second Polishing Process (Step S80)

Next, the glass substrate after chemically strengthening process is subjected to second polishing. Second polishing has the machining allowance of about 1 µm. Second polishing is intended at the mirror surface polishing of the principal face. In second polishing, for example, the polishing apparatus used in first polishing is used. At this point, the second polishing differs from the first polishing in the following points: the kind and particle size of the loose abrasive grain, and hardness of the resin polisher.

For example, the slurry of the turbid fine particles such as colloidal silica (particle size: diameter of about 10 to 50 nm) is used as the loose abrasive grain used in the second polishing.

The polished glass substrate is washed with a neutral detergent, pore water, IPA or the like to obtain a glass substrate for magnetic disk.

It is not necessarily essential to perform the second polishing process, but it is preferable to perform the second polishing process because the level of the surface irregularity of the principal face of the glass substrate can be further improved. By performing the second polishing process, the principal face can be made to have a roughness (Ra) of 0.1 nm or less and micro-waviness (MW-Rq) of 0.1 nm or less.

As described above, the method for manufacturing a glass blank for magnetic disk in this embodiment includes a press forming process of direct press-forming a lump of molten glass using a pair of dies. In this forming process, since the molten glass is not in contact with only one of the dies for a long time, and the temperature of the die, over a period of time until the molten glass is separated from a pair of dies after coming in contact therewith is controlled to be lower than the glass transition point (Tg) of the molten glass, it is not required to attach to the surface of the die a mold release material for preventing the molten glass from being fused to the die. Since the molten glass is not fused to the mold, the surface roughness of the press forming surface can be made extremely small, and the press forming surface is shape-transferred, so that the surface roughness of the glass blank obtained by press forming is extremely small. Therefore, in the scribing process as a subsequent process, a scribe cutter is applied to a smooth principal face having an extremely small surface roughness, and the circularity and concentricity of two concentric-circle-shaped plane-cutting lines formed by the scribe cutter are at an extremely high level. As a result, the circularity and concentricity of the outer shape and the central hole of the glass substrate obtained by scribing become extremely high.

[Magnetic Disk]

The glass substrate for magnetic disk is prepared through the processes described above. A magnetic disk is obtained in the following manner using the above-described glass substrate for magnetic disk.

The magnetic disk has, for example, a configuration in which on the principal face of the glass substrate, at least an adhesive layer, an underlying layer, a magnetic layer (magnetic recording layer), a protective layer and a lubricant layer are stacked in this order from the side closest to the principal face.

For example, the substrate is introduced into an evacuated deposition apparatus, and the adhesive layer, the underlying layer and the magnetic layer are sequentially deposited in an Ar atmosphere by a DC magnetron sputtering method. For example CrTi may be used as the adhesive layer, and for example CrRu may be used as the underlying layer. For example a CoPt-based alloy may be used as the magnetic layer. Also, a CoPt-based alloy or FePt-based alloy having a $L_{10}$ ordered structure may be deposited to form a magnetic layer for heat assisted magnetic recording. After the deposition described above, the protective layer is deposited using $C_2H_4$ by, for example, a CVD method, and subsequently nitriding treatment is performed to introduce nitrogen to the surface, whereby a magnetic recording medium can be formed. Thereafter, the lubricant layer can be formed by applying, for example, PFPE (perfluoropolyether) onto the protective layer by a dip coating method.

Examples

The present invention will be further described below by way of Examples. However, the present invention is not limited to aspects described in Examples.

(1) Preparation of Molten Glass

Raw materials were weighed so as to obtain a glass having the following composition, and mixed to obtain a mixed raw material. This raw material was put in a melting vessel, heated, melted, clarified and stirred to prepare a homogeneous molten glass free from a foam and an unmelted substance. A foam and an unmelted substance, deposition of crystals, and contaminants such as a refractory material and platinum forming the melting vessel were not observed in the glass obtained. The glass transition point (Tg) of the resulting molten glass was 150° C.

[Composition of Glass]

Aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol %.

The above-described molten glass was provided, and a glass blank having a diameter of 75 mm and a thickness of 0.9 mm was prepared using the press forming method described above (method using the apparatus in FIGS. 48 and 49). The temperature of a molten glass material $L_G$ discharged from a molten glass outflow port 111 was 1300° C., and the viscosity of the molten glass material $L_G$ at this time was 700 poise.

The molten glass material $L_G$ discharged from a molten glass outflow port 111 was cut by a cutting unit 160, so that a gob $G_G$ having a thickness of about 20 mm is formed. The gob $G_G$ was pressed under a load of 3000 kgf by a press unit until the gob $G_G$ had a temperature equal to or lower than the glass transition temperature (Tg) of the molten glass material, so that a glass blank having a diameter of 75 mm was formed.

Example 1

In Example 1 illustrated in Table 7, a heat exhausting unit illustrated in E1 of FIG. 53 was provided over the whole area of the forming surface of a die, and press forming was performed. The heat exhausting unit was formed of copper and had a thickness of 30 mm. A die, the forming surface (particularly contact surface that is in contact with a molten glass) of which had a surface roughness (arithmetic surface roughness Ra) of no less than 0.01 μm and less than 0.1 μm, was used. At this time, the maximum temperature of the die, over a period of time until the molten glass was separated from the die after coming into contact with the die, was measured and found to be 495° C. A glass blank obtained after press forming was subjected to scribing to obtain a glass substrate having an outer diameter of 65 mm and a central hole diameter of 20 mm.

Example 2

In Example 2 illustrated in Table 7, press forming was performed using a heat exhausting unit similar to that in Example 1. A die, the forming surface of which had a surface roughness of no less than 0.1 μm and less than 0.5 μm, was used. The maximum temperature of the die was measured in the same manner as in Example 1 and found to be 495° C. A glass blank obtained after press forming was subjected to scribing in the same manner as in Example 1 to obtain a glass substrate having an outer diameter of 65 mm and a central hole diameter of 20 mm.

Example 3

In Example 3 illustrated in Table 7, press forming was performed using a heat exhausting unit similar to that in Example 1. A die, the forming surface of which had surface roughness of no less than 0.5 μm and less than 2.0 μm, was used. The maximum temperature of the die was measured in the same manner as in Example 1 and found to be 495° C. A glass blank obtained after press forming was subjected to scribing in the same manner as in Example 1 to obtain a glass substrate having an outer diameter of 65 mm and a central hole diameter of 20 mm.

The surface roughness of the forming surface of the die is represented by an arithmetic mean roughness Ra defined in JIS B0601:2001 and, for example, can be measured with roughness measuring machine SV-3100 manufactured by Mitutoyo Corporation and calculated by a method defined in JIS B0633:2001 when the roughness is no less than 0.006 μm and no more than 200 μm. When as a result, the roughness is 0.03 μm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 256×256 pixels in a measurement area of 10 μm×10 μm square was used.

TABLE 7

| | Maximum temperature of die | Presence/absence of mold release material | Surface roughness of forming surface of die (Ra) | Yield of scribing (%) | Evaluation |
|---|---|---|---|---|---|
| Example 1 | 495° C. | Absent | 0.01 μm or more Less than 0.1 μm | 100 | Very good |
| Example 2 | 495° C. | Absent | 0.1 μm or more Less than 0.5 μm | 99 | Very good |
| Example 3 | 495° C. | Absent | 0.5 μm or more Less than 2.0 μm | 95 | Good |

[Evaluation of Examples]

The evaluation in Table 7 was performed by scribing 100 glass blanks for each Example, and by determining a rate of the number of glass blanks that could be cut into a disk shape without being broken (yield of scribing). Evaluation criteria were as follows.

Very good: The yield (%) of scribing is 98% or more.

Good: The yield (%) of scribing is no less than 95% and less than 98%.

In Examples 1 to 3, the surface roughness of the principal face of the glass blank obtained after forming was almost identical to the surface roughness of the forming surface of the mold because a mold release material was not used. It was confirmed that particularly when the surface roughness (Ra) of the forming surface of the mold is 0.5 μm or less, the yield of scribing becomes especially high.

<Sixth Additional Disclosure>

Recently, a hard disk drive device (HDD) is incorporated in a personal computer or a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for magnetic disk because the glass substrate hardly plastically deformed as compared to a metallic substrate (aluminum substrate) and the like.

The magnetic head includes, for example, a magnetic resistance effect element, but such a magnetic head may cause a thermal asperity trouble as its specific trouble. The thermal asperity trouble is a trouble in which when a magnetic head passes over a micro-irregularly-shaped surface of a magnetic disk while floating and flying, a magnetic resistance effect element is heated by adiabatic compression or contact of air, causing a read error. Thus, for avoiding the thermal asperity trouble, the glass substrate for magnetic disk is prepared such that surface properties, such as the surface roughness and flatness, of the principal face of the glass substrate are at a satisfactory level.

As a conventional method for manufacturing a sheet glass (glass blank), a vertical direct press method is known. This press method is a method in which a lump of molten glass is fed onto a lower die, and the lump of molten glass (molten glass lump) is press-formed using an upper die (Japanese Patent Laid-open Publication No. 1999-255521)

A glass substrate has a property of being a fragile material. Thus, as a method for strengthening the principal face of the glass substrate, a chemically strengthening method has been known in which a glass substrate is dipped in a heated chemically strengthening liquid to ion-exchange lithium ions and sodium ions on the principal face of the glass substrate with sodium ions and potassium ions, respectively, in the chemically strengthening liquid, thereby forming a compressive stress layer on the principal face of the glass substrate (Japanese Patent Laid-open Publication No. 2002-121051).

In conventional glass substrate, for magnetic disk, the strength of the principal face is enhanced by using a chemically strengthening method, but it is considered that a further high strength will be demanded in the future.

An object of the invention of the sixth additional disclosure is to provide a method for manufacturing a glass substrate for magnetic disk having a principal face, the strength of which is further enhanced as compared to a case where only a chemically strengthening method is used.

In view of the above-described problems, the present inventors have intensively conducted studies, and resultantly found a press forming method for forming a compressive stress layer on the principal face of a glass substrate. Specifically, in this press forming method, a press stress layer can be formed on each of a pair of principal faces of a glass blank that is press formed, by controlling the cooling rate of a molten glass being pressed when a lump of molten glass is press-formed using a pair of dies. Further, the present inventors have found that by performing both the press forming method and a chemically strengthening method, a compressive stress layer having a large thickness and a high compressive stress can be formed on each of the principal faces of a glass substrate, and resultantly a glass substrate having principal faces, the strength of which is further enhanced, can be obtained.

Here, in the chemically strengthening method, the thickness of the compressive stress layer formed may be smaller than the compressive stress layer formed by the press forming method. For example, the thickness of the compressive stress layer formed by the press forming method may be about 100 to 300 μm, although it may vary depending on the thickness and thermal expansion coefficient of the glass substrate, while the thickness of the compressive stress layer formed by the chemically strengthening method may be about 10 to 100 μm.

The compressive stress generated in the compressive stress layer formed by the chemically strengthening method is almost equal to the compressive stress generated in the compressive stress layer formed by the press forming method. For example, the magnitude of the compressive stress generated in the compressive stress layer formed by the chemically strengthening method is about 10 to 50 $Kg/mm^2$, while the magnitude of the compressive stress generated in the compressive stress layer formed by the press forming method is about 10 to 50 $Kg/mm^2$.

Therefore, by combining the chemically strengthening method and the press forming method, a glass substrate having on the principal face a compressive stress layer having a large thickness and a high compressive stress can be formed as compared to a case where only the chemically strengthening method is used.

From the viewpoint described above, the present invention may be a method for manufacturing a glass substrate for magnetic disk, which includes a forming process of press-forming a lump of molten glass using a pair of dies, during which the cooling rate of the molten glass during pressing is controlled so that a first compressive stress layer is formed on each of a pair of principal faces of a glass blank that is press formed; and a chemically strengthening process for forming a second compressive stress layer on each of a pair of principal faces of a glass substrate formed using the glass blank after the forming process.

In the method for manufacturing a glass substrate for magnetic disk, preferably, in the forming process, the falling lump of molten glass may be press-formed using the pair of dies from a direction orthogonal to the falling direction.

In the method for manufacturing a glass substrate for magnetic disk, in the forming process, press forming may be performed so that the temperature of the press forming surface of the pair of dies is substantially identical.

In the method for manufacturing a glass substrate for magnetic disk, the temperature of the pair of dies may be kept lower than the glass transition point (Tg) of the molten glass over a period of time until the glass blank is separated from the die after contacting the die.

In the method for manufacturing a glass substrate for magnetic disk, wherein the method may include a polishing process for partially removing the first compressive stress layer and the second compressive stress layer formed on a pair of principal faces of the glass substrate after the chemically strengthening process.

According to the present invention, a glass substrate for magnetic disk having a principal face, the strength of which is further enhanced, can be manufactured as compared to a case where only a chemically strengthening method is used.

[Explanation of Embodiment in Sixth Additional Disclosure]

A method for manufacturing a glass substrate for magnetic disk in this embodiment will be described in detail below.

[Glass Substrate for Magnetic Disk]

Figure 55:
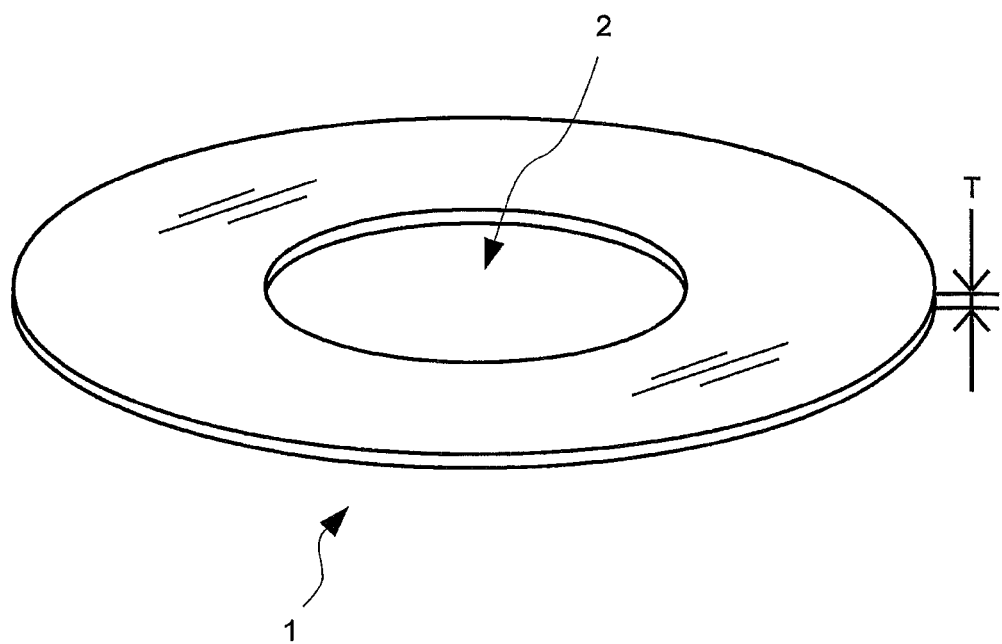
FIG. 55 is a perspective view illustrating an external shape of a glass substrate for magnetic disk of an embodiment.

As illustrated in FIG. 55, a glass substrate for magnetic disk 1 in this embodiment is a donut-shaped thin glass substrate. The size of the glass substrate for magnetic disk is not limited but for example, a glass substrate for magnetic disk having a nominal diameter of 2.5 inches is suitable. In the case of the glass substrate for magnetic disk having a nominal diameter of 2.5 inches, for example, the outer diameter is 65 mm, the diameter of a central hole 2 is 20 mm, and the thickness T is 0.6 to 1.0 mm. The flatness of the principal face of the glass substrate for magnetic disk of the embodiment is, for example, 4 μm or less, and the surface roughness (arithmetic mean roughness Ra) of the principal face is, for example, 0.2 nm or less. It is to be noted that the flatness required for a substrate for magnetic disk as a final product is, for example, 4 μm or less.

Aluminosilicate glass, soda-lime glass, borosilicate glass or the like can be used as a material of the glass substrate for magnetic disk in this embodiment. Particularly, the aluminosilicate glass can be suitably used in that chemically strengthening can be performed, and a glass substrate for magnetic disk excellent in flatness of the principal face and strength of the substrate can be prepared.

The composition of the glass substrate for magnetic disk of this embodiment is not limited, but the glass substrate of this embodiment is preferably made of aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol %.

[Method for Manufacturing Glass Substrate for Magnetic Disk of Embodiment]

Figure 56:
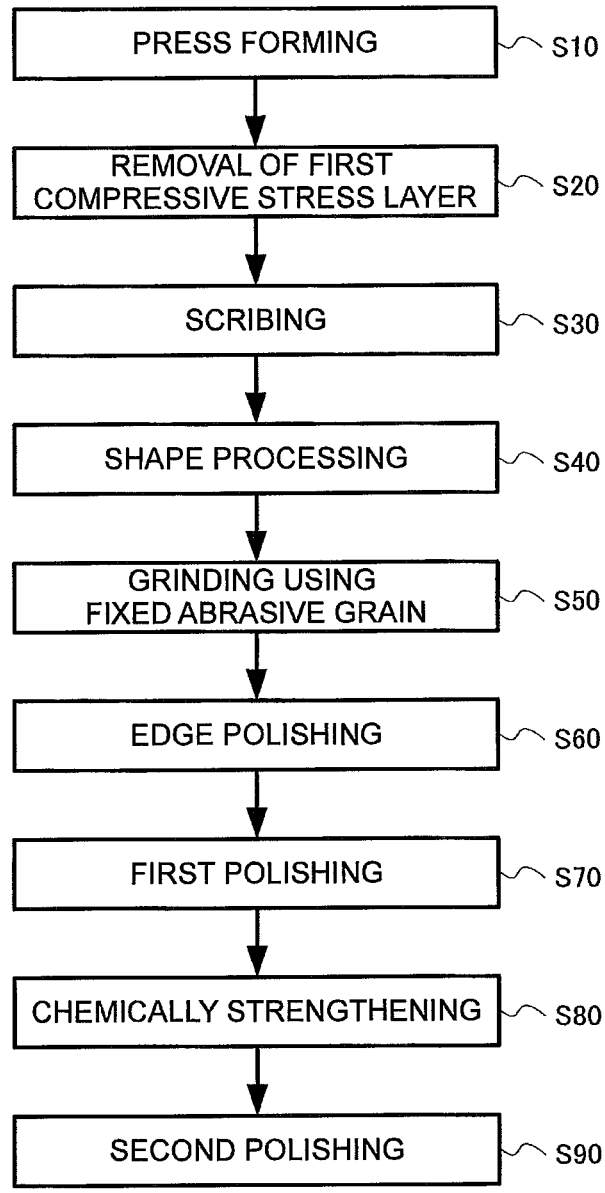
FIG. 56 is a view illustrating a flow of one embodiment of a method for manufacturing the glass substrate for magnetic disk of the embodiment.

Next, a flow of a method for manufacturing a glass substrate for magnetic disk will be described with reference to FIG. 56. FIG. 56 is a view illustrating a flow of one embodiment of a method for manufacturing a glass substrate for magnetic disk.

As illustrated in FIG. 56, in the method for manufacturing a glass substrate for magnetic disk in this embodiment, first a disk-shaped glass blank is prepared by press forming (Step S10). Next, the compressive stress layer formed on the principal face of the prepared glass blank is removed in such a manner as to leave a part of the compressive stress layer (Step S20). Next, the glass blank is scribed to prepare a donut-shaped glass substrate (Step S30). Next, the scribed glass substrate is subjected to shape processing (chamfering processing) (Step S40). Next, the glass substrate is subjected to grinding using a fixed abrasive grain (Step S50). Next, edge polishing of the glass substrate is performed (Step S60). Next, the principal face of the glass substrate is subjected to first polishing (Step S70). Next, the glass substrate, after first polishing, is subjected to chemically strengthening (Step S80). Next, the chemically strengthened glass substrate is subjected to second polishing (Step S90). The glass substrate for magnetic disk is obtained through the above processes.

Each process will be described in detail below.

(a) Press Forming Process (Step S10)

Figure 57:
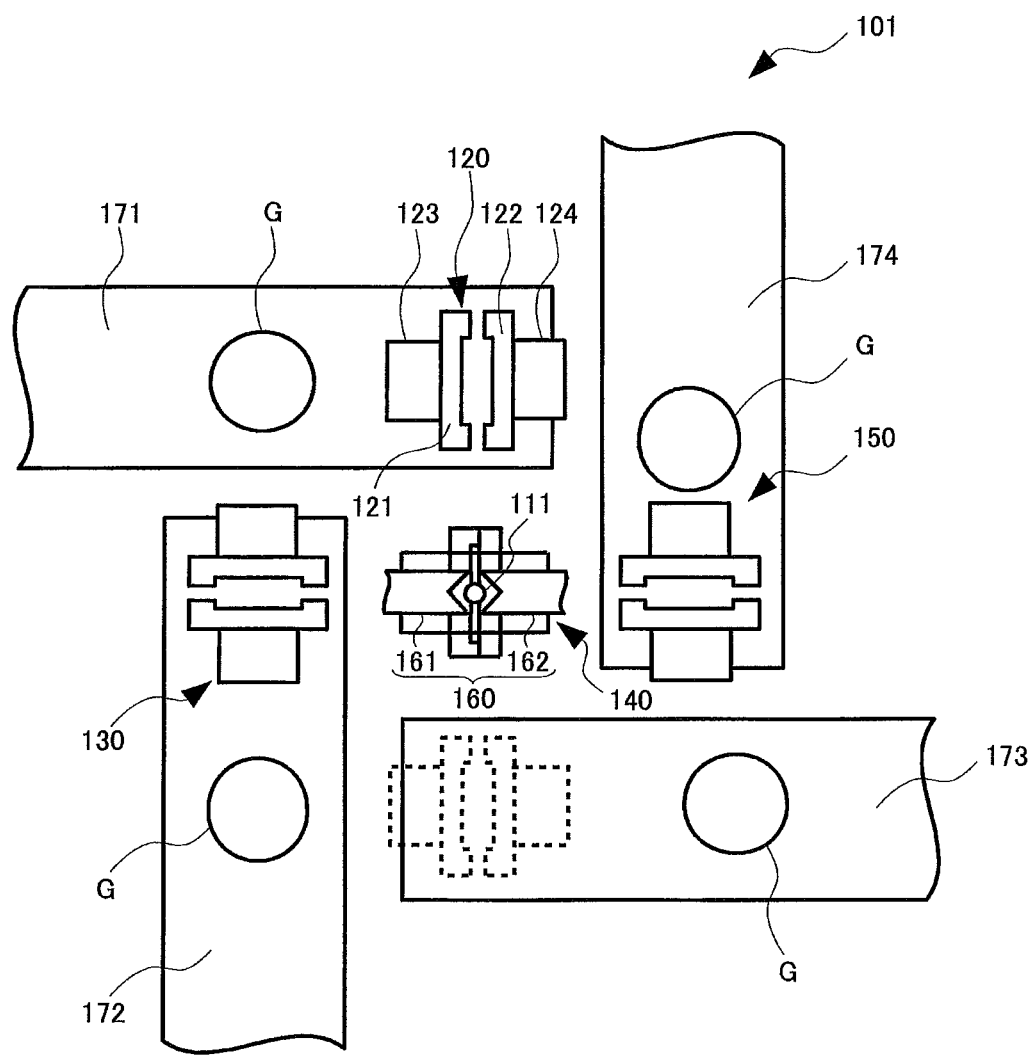
FIG. 57 is a plan view of an apparatus used in press forming of the embodiment.

First, the press forming process will be described with reference to FIG. 57. FIG. 57 is a plan view of an apparatus used in press forming. As illustrated in FIG. 57, an apparatus 101 includes four sets of press units 120, 130, 140 and 150, a cutting unit 160 and a cutting blade 165 (not illustrated in FIG. 56). The cutting unit 160 is provided on a path of a molten glass that flows out from a molten glass outflow port 111. In the apparatus 101, a lump of molten glass (hereinafter, also referred to as a gob) cut by the cutting unit 160 is caused to fall down, and the lump is pressed from both sides of the falling path of the lump while the lump is sandwiched between surfaces of a pair of dies facing each other, thereby forming the glass blank.

Specifically, as illustrated in FIG. 57, in the apparatus 101, the four sets of press units 120, 130, 140, and 150 are provided at intervals of 90 degrees around the molten glass outflow port 111.

Each of the press units 120, 130, 140, and 150 is driven by a moving mechanism (not illustrated) so as to be able to proceed and retreat with respect to the molten glass outflow port 111. That is, each of the press units 120, 130, 140, and 150 can be moved between a catch position and a retreat position. The catch position (position in which the press unit 140 is drawn by a solid line in FIG. 57) is located immediately below the molten glass outflow port 111. The retreat position (positions in which the press units 120, 130, and 150 are drawn by solid lines and a position in which the press units 140 is drawn by a broken line in FIG. 57) is located away from the molten glass outflow port 111.

The cutting unit 160 is provided on a path of the molten glass between the catch position (position in which the gob is captured by the press unit) and the molten glass outflow port 111. The cutting unit 160 forms the lump of molten glass by cutting a proper quantity of the molten glass flowing out from the molten glass outflow port 111. The cutting unit 160 includes a pair of cutting blades 161 and 162. The cutting blades 161 and 162 are driven so as to intersect each other on the path of the molten glass at constant timing. When the cutting blades 161 and 162 intersect each other, the molten glass is cut to obtain the gob. The obtained gob falls down toward the catch position.

The press unit 120 includes a first die 121, a second die 122, a first driving unit 123, a second driving unit 124 and a cooling control unit 125. Each of the first die 121 and the second die 122 is a plate-shaped member including a surface (press forming surface) used to perform the press forming for the gob. The first die 121 and the second die 122 are disposed such that normal directions of the surfaces become substantially horizontal, and such that the surfaces become parallel to each other. The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other, for example, a mechanism in which an air cylinder or a solenoid and a coil spring are combined.

The cooling control unit 125 is a heat sink, and is one example of cooling control means for controlling the cooling rate of a gob during press-forming of the gob. The cooling control unit 125 controls the cooling rate of the gob so that a compressive stress layer (first compressive stress layer) is formed on a pair of principal faces of a glass blank formed after the process of press-forming the gob. The cooling control unit 125 is provided so as to contact entire surfaces opposite to the press forming surfaces of first and second dies 121 and 122. Preferably the cooling control unit 125 is formed of a material having heat conductivity higher than that of each of first and second dies 121 and 122. For example, when first and second dies 121 and 122 are formed of an ultrahard alloy (e.g. VM40), the cooling control unit 125 may be formed of copper, a copper alloy, aluminum, an aluminum alloy or the like. Since the cooling control unit 125 has heat conductivity higher than that of each of first and second dies 121 and 122, heat transferred to first and second dies 121 and 122 from the gob can be efficiently discharged to outside. The heat conductivity of the ultrahard alloy (VM40) is 71 (W/m·K); and the heat conductivity of copper is 400

(W/m·K). The member that forms the cooling control unit 125 may be appropriately selected according to the heat conductivity, hardness, thickness and dimension, etc. of the metal forming first and second dies 121 and 122. First and second dies 121 and 122 are required to have strength capable of sustaining press, and therefore preferably they are not integrated with the cooling control unit 125.

Because the structures of the press units 130, 140, and 150 are similar to that of the press unit 120, the descriptions of the press units 130, 140, and 150 are omitted. Control of the cooling rate of the gob $G_G$ will be described later.

After each press unit moves to the catch position, the falling gob is sandwiched between the first die and the second die by driving the first driving unit and the second driving unit, and the gob is formed into a predetermined thickness while cooled, thereby preparing a circular glass blank G. Next, after the press unit moves to the retreat position, the first die and the second die are separated to cause the formed glass blank G to fall down. A first conveyer 171, a second conveyer 172, a third conveyer 173, and a fourth conveyer 174 are provided below the retreat positions of the press units 120, 130, 140, and 150, respectively. Each of the first to fourth conveyers 171 to 174 receive the glass blank G falling down from the corresponding press unit, and the conveyer conveys the glass blank G to an apparatus (not illustrated) of the next process.

The apparatus 101 is configured such that the press units 120, 130, 140, and 150 sequentially move to the hatch position and move to the retreat position while the gob is sandwiched, so that the glass blank G can continuously be formed without waiting for the cooling of the glass blank G in each press unit.

Figure 58:
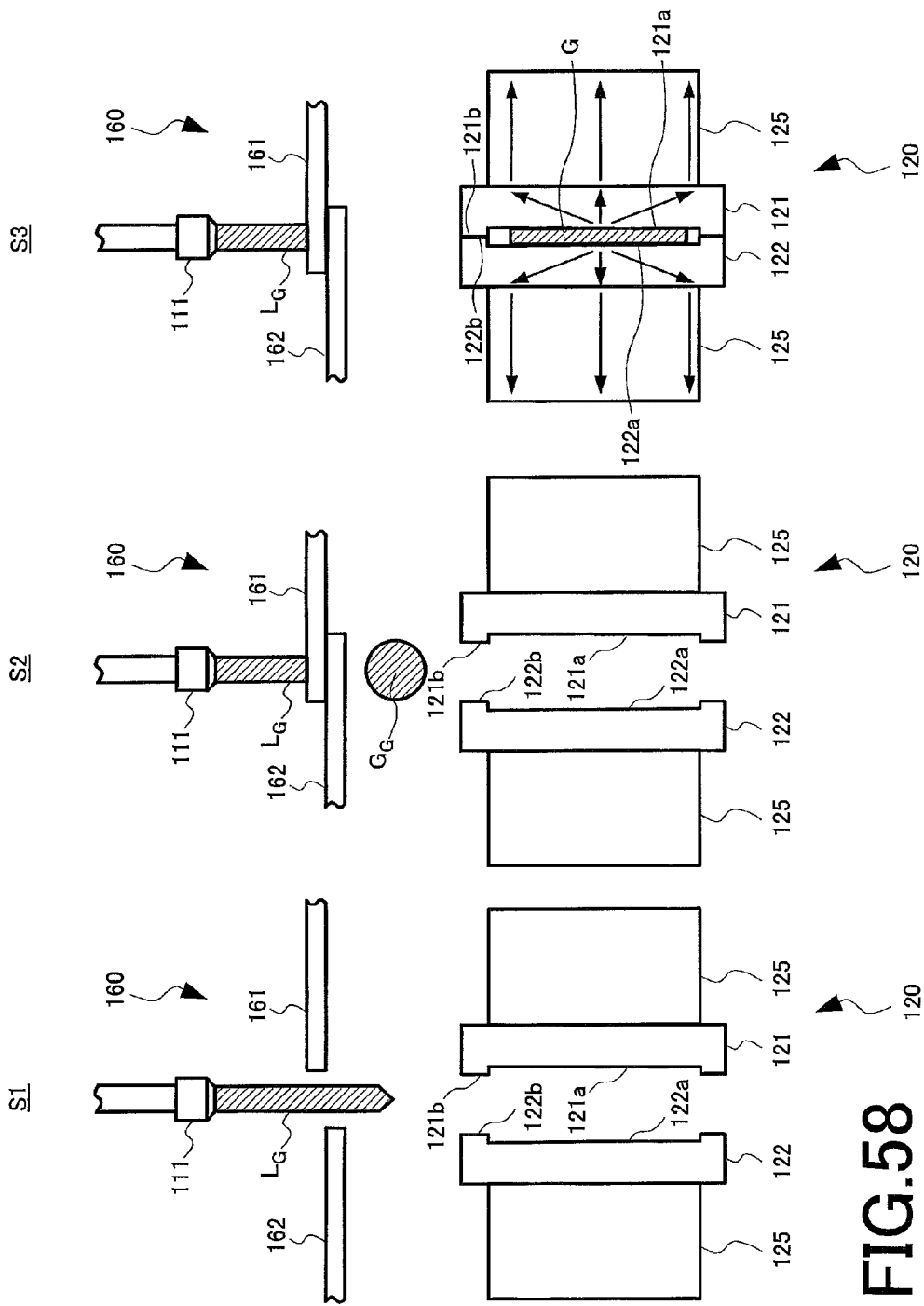
FIG. 58 is a view explaining press forming of the embodiment.

S1 of FIG. 58 to S3 of FIG. 58 more specifically illustrates press forming performed by the apparatus 101. S1 of FIG. 58 is a view illustrating the state before the gob is made, S2 of FIG. 58 is a view illustrating the state in which the gob is made by the cutting unit 160, and S3 of FIG. 58 is a view illustrating the state in which the glass blank G is formed by pressing the gob.

As illustrated in S1 of FIG. 58, a molten glass material $L_G$ continuously flows out from the molten glass outflow port 111. At this point, the cutting unit 160 is driven at predetermined timing to cut the molten glass material $L_G$ using the cutting blades 161 and 162 (S2 of FIG. 58). Therefore, the cut molten glass becomes a substantially spherical gob $G_G$ due to a surface tension thereof. Adjustment of the outflow quantity per time of the molten glass material $L_G$ and the driving interval of the cutting unit 160 may be appropriately performed according to a volume determined by the target size and thickness of the glass blank G.

The made gob $G_G$ falls down toward a gap between the first die 121 and second die 122 of the press unit 120. At this point, the first driving unit 123 and the second driving unit 124 (see FIG. 58) are driven such that the first die 121 and the second die 122 come close to each other at the timing the gob $G_G$ enters the gap between the first die 121 and the second die 122. Therefore, as illustrated in S3 of FIG. 58, the gob $G_G$ is captured (caught) between the first die 121 and the second die 122. An inner circumferential surface 121a (press forming surface) of the first die 121 and an inner circumferential surface 122a (press forming surface) of the second die 122 come close to each other with a micro gap, and the gob $G_G$ sandwiched between the inner circumferential surface 121a of the first die 121 and the inner circumferential surface 122a of the second die 122 is formed into a thin-plate shape. A projection 121b and a projection 122b are provided in the first inner circumferential surface 121a of the first die 121 and the second inner circumferential surface 122a of the second die 122, respectively, in order to keep the gap between the inner circumferential surface 121a of the first die 121 and the inner circumferential surface 122a of the second die 122 constant. That is, the projection 121b and the projection 122b abut against each other, whereby the gap between the inner circumferential surface 121a of the first die 121 and the inner circumferential surface 122a of the second die 122 is kept constant, so that a plate-shaped space is generated.

Press forming is performed using a pair of dies 121 and 122 in the press forming process in press forming in this embodiment, and the outer shape of the glass blank is not restricted by the shape of the die. That is, as illustrated in S3 of FIG. 58, the gob stretched by closed dies does not reach projections 121b and 122b.

As illustrated in S3 of FIG. 58, heat transferred to central portions of inner circumferential surfaces 121a and 122a from the gob $G_G$ is discharged to outside through the cooling control unit 125 in accordance with a flow of heat illustrated by the arrow in the figure.

A temperature control mechanism (not illustrated) is provided in each of the first die 121 and second die 122, and temperatures at the first die 121 and second die 122 is retained lower than the glass transition point $T_G$ of the molten glass $L_G$. That is, the temperature control mechanism can increase or reduce the cooling rate of the gob $G_G$ sandwiched between the inner circumferential surface 121a of the first die 121 and the inner circumferential surface 122a of the second die 122. Therefore, the temperature control mechanism may have a cooling mechanism including, for example, a path of a liquid, a gas or the like having a cooling effect, or a heating mechanism such as a heater.

It is not necessary to attach a mold release material to the first die 121 and the second die 122 in the press forming process.

The flatness of the glass blank obtained after press forming becomes better as a difference in temperature of the inner circumferential surface of the die at the time of press-forming the gob $G_G$ decreases. Particularly, it is preferable to decrease the difference in temperature by efficiently discharging heat from the gob $G_G$ which is easily confined in the central portion of each of inner circumferential surfaces 121a and 122a, to outside. This is because when a difference in temperature of the inner circumferential surface of the die during press forming is decreased, the temperature of the central portion and the temperature of the circumferential edge portion of the inner circumferential surface are almost identical, so that the central portion and the circumferential edge portion of the gob $G_G$ can be solidified almost at the same time.

Since the temperature of the central portion and the temperature of the circumferential edge portion of the inner circumferential surface are almost identical, an internal strain (in-plane strain) by a compressive stress directing from the circumferential edge portion to the central portion of the press forming surface can be prevented from being generated in the press-formed glass blank.

Thus, by reducing a difference in temperature of the inner circumferential surface of the die during pressing of the glass blank using the cooling control unit 125, flatness required for the glass substrate for magnetic disk can be achieved, and the central portion and the circumferential edge portion of the gob $G_G$ can be solidified at the same time. For example, if the flatness required for the glass substrate for magnetic disk is 4 μm, press forming is performed while the difference in temperature between the central portion and the circumferential edge portion of the inner circumferential surface is kept at 10° C. or less. Generation of the in-plane strain of the glass blank is best prevented when a difference in temperature between the central portion and the circumferential edge portion is 0° C., but the difference in temperature may be appropriately determined according to the size of the glass blank G formed, the composition of the glass, and so on.

Here, the difference in temperature of the interior of the inner circumferential surface is a difference in temperature which is the largest of differences in temperature between the central portion and each circumferential edge portion as measured using a thermocouple at a point which is located 1 mm from the front face of inner circumferential surface of the die to the inside of the die and corresponds to each of the central portion and a plurality of circumferential edge portions of the inner circumferential surface (e.g. a point corresponding to the central position of a glass blank having a diameter of 75 mm and upper and lower and left and right four positions on the circumference of a circle centered on the aforementioned point and having a radius of about 30 mm).

A difference in temperature between the first die 121 and the second die 122 may be determined from the following viewpoint according to flatness required for the glass substrate for magnetic disk.

Since glass substrate for magnetic disk of this embodiment is incorporated while being pivotally supported by a metallic spindle having a high thermal expansion coefficient within a hard disk as a magnetic disk that is a final product, the thermal expansion coefficient of the glass substrate for magnetic disk is preferably as high as that of the spindle. Therefore, the composition of the glass substrate for magnetic disk is defined so that the glass substrate for magnetic disk has a high thermal coefficient. The thermal expansion coefficient of the glass substrate for magnetic disk is, for example, in a range of 30 to $100 \times 10^{-7} (K^{-1})$, preferably in a range of 50 to $100 \times 10^{-7} (K^{-1})$. The thermal expansion coefficient is a value calculated using the linear expansion coefficients of the glass substrate for magnetic disk at temperatures of 100° C. and 300° C. A thermal expansion coefficient of, for example, less than $30 \times 10^{-7} (K^{-1})$ or more than $100 \times 10^{-7}$ is not preferable because a difference in thermal expansion coefficient between the glass substrate and the spindle is increased. From the point of view, temperature conditions at the circumference of the principal face of the glass blank are made uniform in the press forming process when a glass substrate for magnetic disk having a high thermal expansion coefficient is prepared. As one example, it is preferable to perform temperature control so that the temperatures of the inner circumferential surface 121a of the first die 121 and the inner circumferential surface 122a of the second die 122 become substantially identical. When temperature control is performed so that the temperatures become identical, for example, a difference in temperature is preferably 5° C. or less. The difference in temperature is more preferably 3° C. or less, especially preferably 1° C. or less.

The difference in temperature between dies is a difference in temperature as measured using a thermocouple at a point which is located 1 mm from each of the front faces of the inner circumferential surface 121a of the first die 121 and the inner circumferential surface 122a of the second die 122 to the inside of the die and at which the inner circumferential surface 121a and the inner circumferential surface 122a face each other (e.g. a point corresponding to the central position of the glass blank and central points of the inner circumferential surface 121a and the inner circumferential surface 122a).

A time until the gob $G_G$ is completely confined between the first die 121 and the second die 122 after the gob $G_G$ comes into contact with the inner circumferential surface 121a of the first die 121 or the inner circumferential surface 122a of the second die 122, is as extremely short as about 0.06 second in the apparatus 101. Therefore, the gob $G_G$ is formed into the substantially disk shape by spreading along the inner circumferential surface 121a of the first die 121 and the inner circumferential surface 122a of the second die 122 within an extremely short time, and the gob $G_G$ is cooled and solidified in the form of amorphous glass. In this way, the glass blank G is prepared. The size of the glass blank G formed in this embodiment is, depending on the size of a desired glass substrate for magnetic disk, for example about 20 to 200 mm in diameter.

In the press forming method of this embodiment, the glass blank G is formed in a manner such that the inner circumferential surface 121a of the first die 121 and the inner circumferential surface 122a of the second die 122 are shape-transferred, and therefore preferably the flatness and the smoothness of each of the inner circumferential surfaces of a pair of dies are made comparable to those of a desired glass substrate for magnetic disk. In this case, necessity to subject the glass blank G to a surface processing process, i.e. a grinding and polishing process after press forming may be eliminated. That is, the thickness of the glass blank G formed in the press forming method of this embodiment may be the sum of the target thickness of the glass substrate for magnetic disk that is finally obtained and the thickness of the compressive stress layer that is removed in the removing process described later. For example, the glass blank G is preferably a disk-shaped sheet having a thickness of 0.2 to 1.1 mm. The surface roughness of each of the inner circumferential surface 121a and the inner circumferential surface 122a is preferably adjusted to 0.0005 to 0.05 μm so that the arithmetic mean roughness Ra of the glass blank G is 0.001 to 0.1 μm.

After the first die 121 and the second die 122 are closed, the press unit 120 quickly moves to the retreat position, instead the press unit 130 moves to the catch position, and the press unit 130 performs the pressing to the gob $G_G$.

After the press unit 120 moves to the retreat position, the first die 121 and the second die 122 are kept closed until the glass blank G is sufficiently cooled (at least until the glass blank G has a temperature below a yield point). Then, the first driving unit 123 and the second driving unit 124 are driven to separate the first die 121 and the second die 122, the glass blank G falls down from the press unit 120, and the conveyer 171 located below the press unit 120 receives the glass blank G (see FIG. 57).

As described above, in the apparatus 101, the first die 121 and the second die 122 are closed within a time as extremely short as 0.1 second (about 0.06 second), and the molten glass substantially simultaneously comes into contact with the whole of the inner circumferential surface 121a of the first die 121 and the whole of the inner circumferential surface 122a of the second die 122. Therefore, the inner circumferential surface 121a of the first die 121 and the inner circumferential surface 122a of the second die 122 are not locally heated, and a strain is hardly generated in the inner circumferential surface 121a and the inner circumferential surface 122a. Because the molten glass is formed into the disk shape before the heat transfers from the molten glass to the first die 121 and the second die 122, a temperature distribution of the formed molten glass becomes substantially even. Therefore, in cooling the molten glass, variation of the shrinkage quantity of the glass material is small and the large strain is not generated in the principal face of the glass blank G. Accordingly, the flatness of the principal face of the prepared glass blank G is improved as compared to a glass blank prepared by conventional press forming with an upper die and a lower die.

In the example illustrated in FIG. 58, the substantially spherical gob $G_G$ is formed by cutting the flowing-out molten glass $L_G$ using the cutting blades 161 and 162. However, when viscosity of the molten glass material $L_G$ is small with respect to a volume of the gob $G_G$ to be cut, the glass does not become the substantially spherical shape only by cutting the molten glass $L_G$, and the gob is not formed. In such cases, a gob forming die is used to form the gob.

Figure 59:
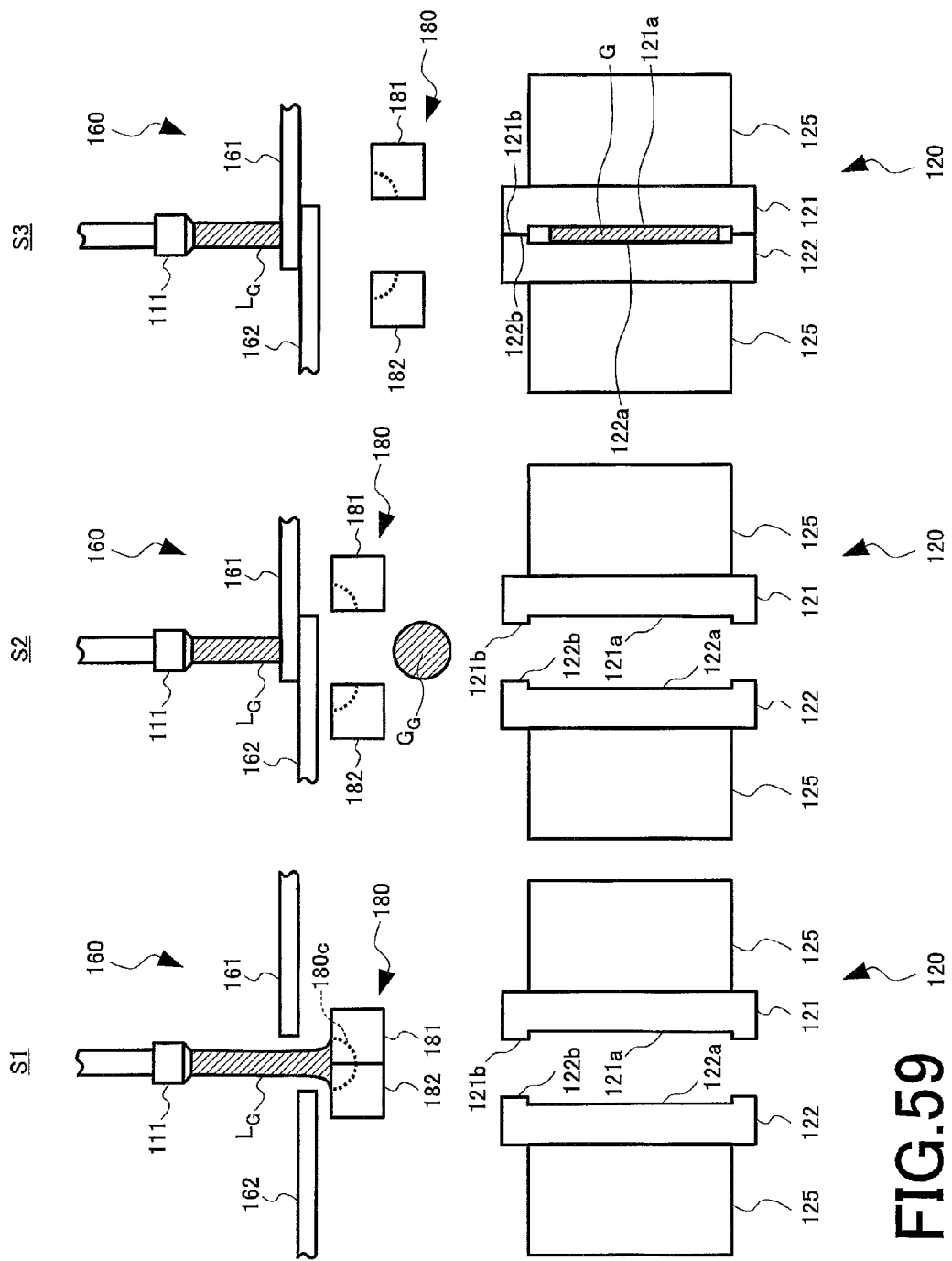
FIG. 59 is a view illustrating a modification of press forming of the embodiment using a gob forming die.

S1 of FIG. 59 to S3 of FIG. 59 are views illustrating a modification of the embodiment of FIG. 58. The gob forming die is used in the modification. S1 of FIG. 59 is a view illustrating the state before the gob is made, S2 of FIG. 59 is a view illustrating the state in which the gob $G_G$ is made by the cutting unit 160 and a gob forming die 180, and S3 of FIG. 59 is a view illustrating the state in which the press forming is performed to the gob $G_G$ to make the glass blank G.

As illustrated in S1 of FIG. 59, the path of the molten glass $L_G$ to the press unit 120 is closed by closing the blocks 181 and 182, and the lump of the molten glass $L_G$ cut with the cutting unit 160 is received by a recess 180C formed by the block 181 and 182. Then, as illustrated in S2 of FIG. 59, the molten glass $L_G$ that becomes the spherical shape in the recess 180C falls down toward the press unit 120 at one time by opening the blocks 181 and 182. When falling down toward the press unit 120, the gob $G_G$ becomes the spherical shape by the surface tension of the molten glass $L_G$. As illustrated in S3 of FIG. 59, during the fall of the gob $G_G$, the spherical gob $G_G$ is sandwiched between the first die 121 and the second die 122 to perform the press forming, thereby preparing the disk-shaped glass blank G.

Figure 60:
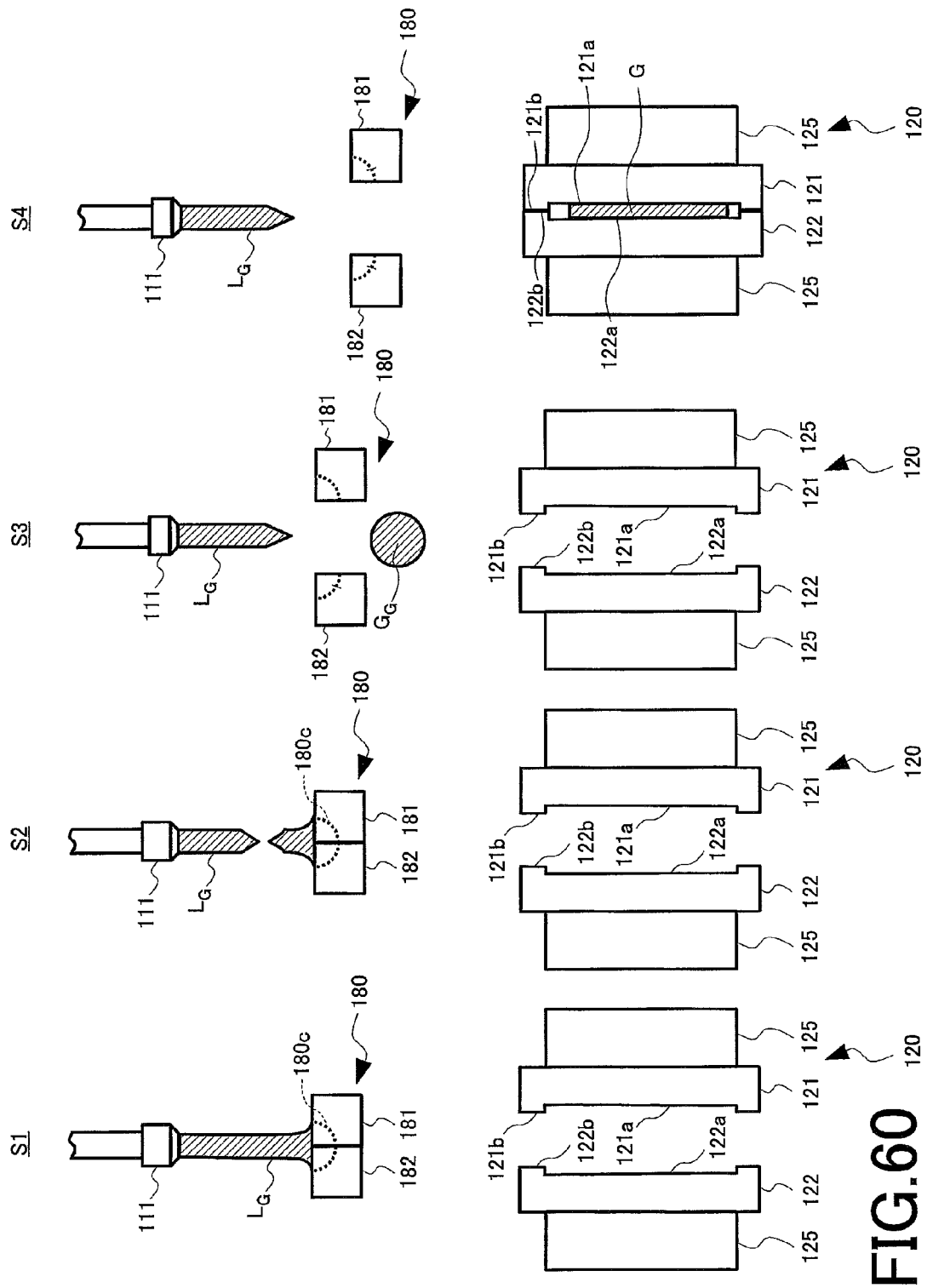
FIG. 60 is a view illustrating a modification of press forming of the embodiment in which a cutting unit is not used.

Alternatively, as illustrated in S1 of FIG. 60 to S4 of FIG. 60, in the apparatus 101, instead of using the cutting unit 160 illustrated in S1 of FIG. 59 to S3 of FIG. 59, a moving mechanism that moves the gob forming die 180 in an upstream direction or a downstream direction along the path of the molten glass $L_G$ may be used. S1 of FIG. 60 to S4 of FIG. 60 are views illustrating a modification in which the gob forming die 180 is used. S1 of FIG. 60 and S2 of FIG. 60 are views illustrating the state before the gob $G_G$ is made, S3 of FIG. 60 is a view illustrating the state in which the gob $G_G$ is made by the gob forming die 180, and S4 of FIG. 60 is a view illustrating the state in which the gob $G_G$ is subjected to press forming to make the glass blank G.

As illustrated in S1 of FIG. 60, the recess 180C formed by the block 181 and 182 receives the molten glass $L_G$ flowing out from the molten glass outflow port 111. As illustrated in S2 of FIG. 60, the blocks 181 and 182 are quickly moved onto the downstream side of the flow of the molten glass $L_G$ at predetermined timing. In this way, the molten glass $L_G$ is cut. Then, as illustrated in S3 of FIG. 60, the blocks 181 and 182 are separated at predetermined timing. Therefore, the molten glass $L_G$ retained by the blocks 181 and 182 falls down at one time, and the gob $G_G$ becomes the spherical shape by the surface tension of the molten glass $L_G$. As illustrated in S4 of FIG. 60, during the fall of the gob $G_G$, the spherical gob $G_G$ is sandwiched between the first die 121 and the second die 122 to perform the press forming, thereby preparing the disk-shaped glass blank G.

Figure 61:
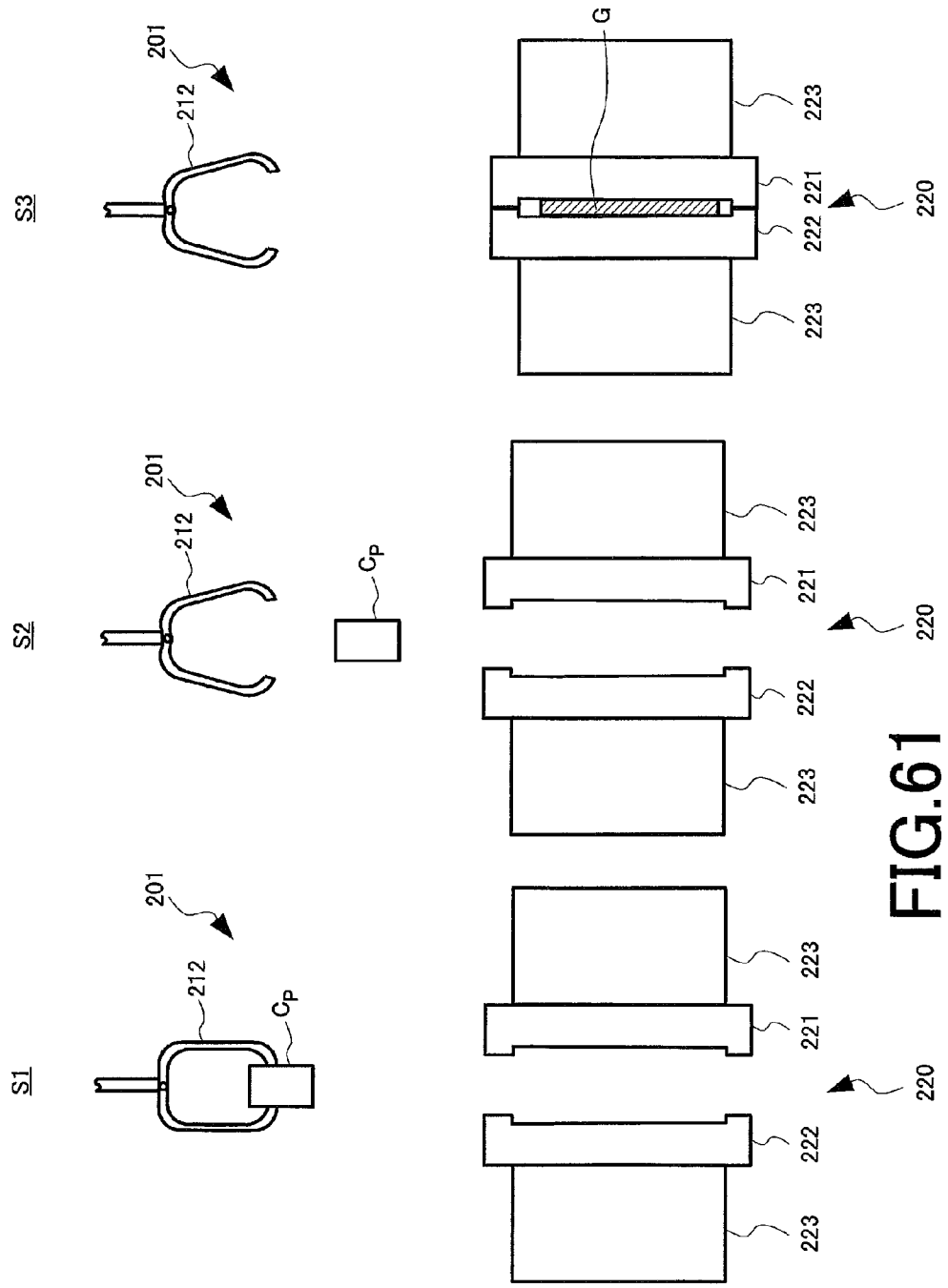
FIG. 61 is a view illustrating a modification of press forming of the embodiment using an optical glass heated by a softening furnace.

S1 of FIG. 61 to S3 of FIG. 61 are views illustrating another modification in which, instead of the gob $G_G$, a lump $C_P$ of the optical glass heated by a softening furnace (not illustrated) is caused to fall down and the press forming is performed to the lump $C_P$ while the lump $C_P$ is sandwiched from both sides between dies 221 and 222 during the fall of the lump $C_P$. S1 of FIG. 61 is a view illustrating the state before the lump of the heated optical glass is formed, S2 of FIG. 61 is a view illustrating the state in which the lump of the optical glass falls down, and S3 of FIG. 61 is a view illustrating the state in which the press forming is performed to the lump of the optical glass to make the glass blank G.

As illustrated in S1 of FIG. 61, in an apparatus 201, a glass material grasping mechanism 212 conveys the lump $C_P$ of the optical glass to a position above a press unit 220. As illustrated in S2 of FIG. 61, the glass material grasping mechanism 212 releases the lump $C_P$ of the optical glass to cause the lump $C_P$ of the optical glass to fall down. As illustrated in S3 of FIG. 61, during the fall of the lump $C_P$ of the optical glass, the lump $C_P$ is sandwiched between the first die 221 and the second die 222 to perform the press forming, thereby preparing the disk-shaped glass blank G. Because the first die 221 and the second die 222 have the same configuration and action as those of the first die 121 and second die 122 illustrated in FIG. 59, the descriptions are omitted.

Figure 62:
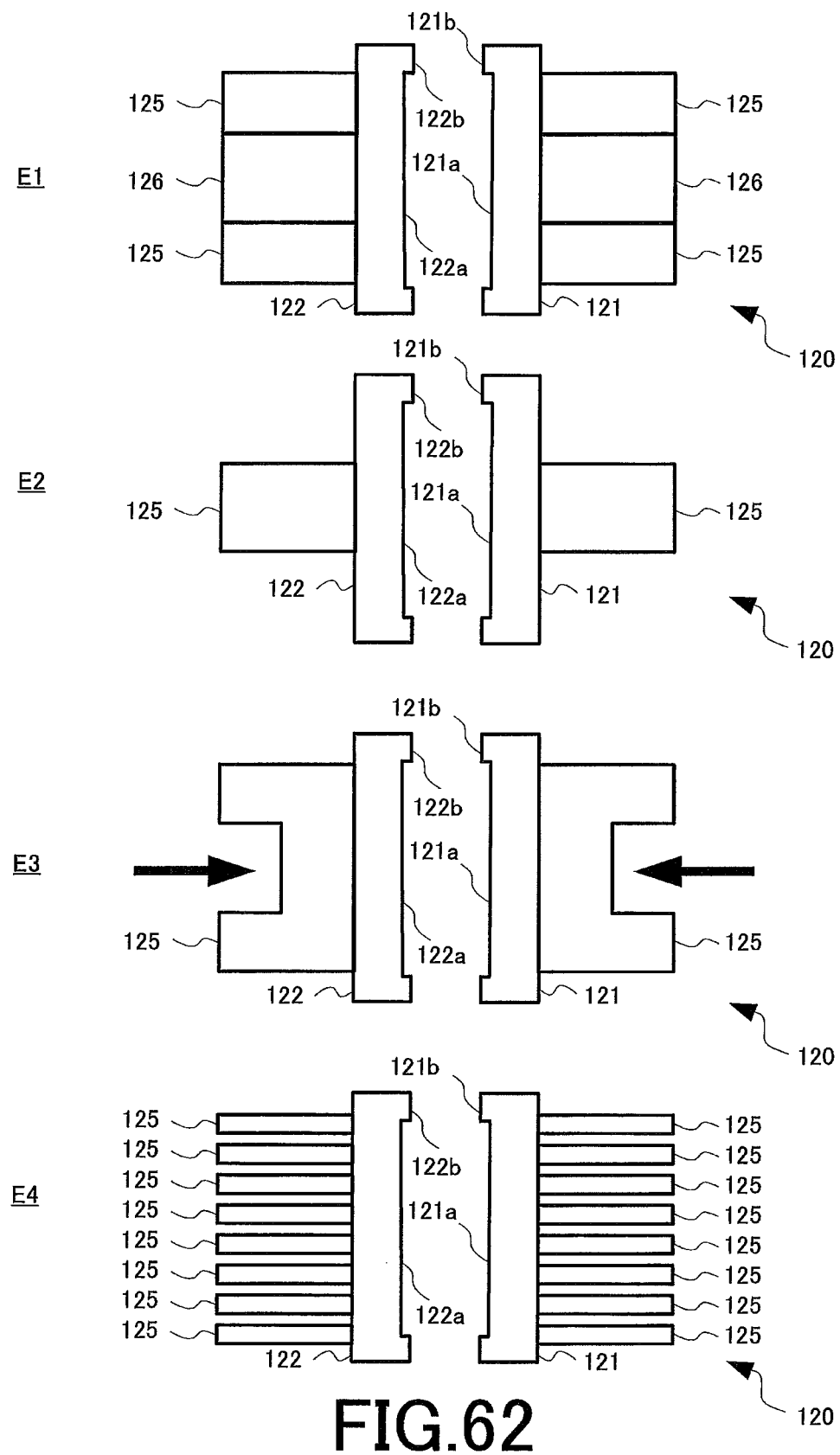
FIG. 62 is a view illustrating a modification of cooling control means used in press forming of the embodiment.

E1 of FIG. 62 to E4 of FIG. 62 pre views illustrating a modification of the embodiment of FIG. 58. In this modification, various forms of cooling control units 125 are used. E1 of FIG. 62 is a view illustrating a state in which a second cooling control unit 126 having a thermal expansion coefficient higher than that of the cooling control unit 125 is provided between cooling control units 125 provided at the circumferential edge portions of surfaces opposite to the inner circumferential surface 121a of the first die 121 and the inner circumferential surface 122a of the second die 122, respectively. E2 of FIG. 62 is a view illustrating a state in which cooling control units 125 are provided only at the central portions of the surfaces opposite to the inner circumferential surface 121a of the first die 121 and the inner circumferential surface 122a of the second die 122. E3 of FIG. 62 is a view illustrating a state in which recessed portions extending toward the central portions of the surfaces opposite to the inner circumferential surface 121a of the first die 121 and the inner circumferential surface 122a of the second die 122 are provided in cooling control units 125. E4 of FIG. 62 is a view illustrating a state in which a plurality of cooling control units 125 are provided on surfaces opposite to the inner circumferential surface 121a of the first die 121 and the inner circumferential surface 122a of the second die 122.

As illustrated in E1 of FIG. 62, the second cooling control unit 126 is provided at the central portion of each of the surfaces opposite to the circumferential surface 121a of the first die 121 and the inner circumferential surface 122a of the second die 122. Here, for example, when the cooling control unit 125 is made of aluminum or an aluminum alloy, copper, a copper alloy or the like is used as a material of the second cooling control unit 126. By using the second cooling control unit 126, heat confined in the central portions of inner circumferential surfaces 121a and 122a during press forming is discharged to outside through the second cooling control unit 126 having heat conduction efficiency higher than that of the cooling control unit 125. Heat transferred to the circumferential edge portions of inner circumferential surfaces 121a and 122a from the gob $G_G$ is discharged to outside through the cooling control unit 125. In this way, a difference in temperature of the interior of each of inner circumferential surfaces 121a and 122a during press forming can be reduced.

When the cooling control units 125 are provided only at the central portions of the surfaces opposite to inner circumferential surfaces 121a and 122a as illustrated in E2 of FIG. 62, heat confined in the central portions of inner circumferential surfaces 121a and 122a during press forming is discharged to outside through the cooling control unit 125. In this way, a difference in temperature of the interior of each of liner circumferential surfaces 121a and 122a during press forming can be reduced. The second cooling control unit 126 may be provided in place of the cooling control unit 125.

Further, when a recessed portion extending toward the central portion of the surface opposite to each of inner circumferential surfaces 121a and 122a is provided in the cooling control unit 125 as illustrated in E3 of FIG. 62, the recessed portion may be cooled using, for example, a liquid, a gas or the like having a cooling effect. In this case, the central portions of inner circumferential surfaces 121a and 122a are rapidly cooled, whereby a difference in temperature of the interior of each of inner circumferential surfaces 121a and 122a during press forming can be reduced. The cooling control unit 125 may be formed so that the central portion of the surface opposite to each of inner circumferential surfaces 121a and 122a can be directly cooled using, for example, a liquid, a gas or the like having a cooling effect.

As illustrated in E4 of FIG. 62, a plurality of cooling control units 125 may be provided on the rear surface of each of first and second dies 121 and 122. In this case, as compared to the case where one cooling control unit 125 is provided, the contact area of the cooling control unit to outside can be increased, and therefore heat transferred to inner circumferential surfaces 121a and 122a from the gob $G_G$ can be efficiently discharged to outside.

Next, control of the cooling rate of the gob $G_G$ will be described. When the cooling rate of the gob $G_G$ is controlled by the cooling control unit 125 and/or temperature control mechanism over a period of time until the temperature of the gob $G_G$ during press forming falls to a glass transition point (Tg) from a temperature at the start of pressing, a difference in temperature is generated between the surface portion (both end portions in the thickness direction) and the central portion (central portion in the thickness direction) of the gob $G_G$. At this time, shrinkage of the gob $G_G$ associated with cooling of the gob $G_G$ precedes at the surface portion, and therefore first compressive stress layers having a predetermined thickness are formed on both sides of a pair of principal faces (surfaces on the both end sides in the thickness direction) of the glass blank after the press forming process.

For example, when a glass blank having a diameter of 75 mm and a thickness of 0.9 mm is manufactured, the cooling rate of the gob $G_G$ is controlled to about −266° C./second over a period of time until the temperature of the gob $G_G$ falls to a glass transition point (Tg: for example, 500° C.) from a temperature (=1300° C.) at the start of pressing. In this case, first compressive stress layers having a thickness of 100 μm to 300 μm are formed on both sides of a pair of principal faces of the glass blank after the press forming process. Here, the thickness of the first compressive stress layer formed varies depending on the thickness and thermal expansion coefficient of the glass substrate, and when a glass substrate having a high thermal expansion coefficient is formed, the thickness of the first compressive stress layer is increased. As described previously, in this embodiment, a glass substrate having a thermal expansion coefficient, which is as high as that of a metallic spindle having a high thermal expansion coefficient, is formed, so that the thickness of the first compressive stress layer can be increased.

The temperature of the gob $G_G$ may be measured using a thermocouple at a point which is located 1 mm from each of the front faces of the inner circumferential surface 121a of the first die 121 and the inner circumferential surface 122a of the second die 122 to the inside of the die and at which the inner circumferential surface 121a and the inner circumferential surface 122a face each other (e.g. a point corresponding to the central position of the glass blank and central points of the inner circumferential surface 121a and the inner circumferential surface 122a).

The cooling rate of the gob $G_G$ may be appropriately controlled according to the composition of the glass and the size of the glass blank that is formed.

(b) Process of Removing First Compressive Stress Layer (Step S20)

Figure 63:
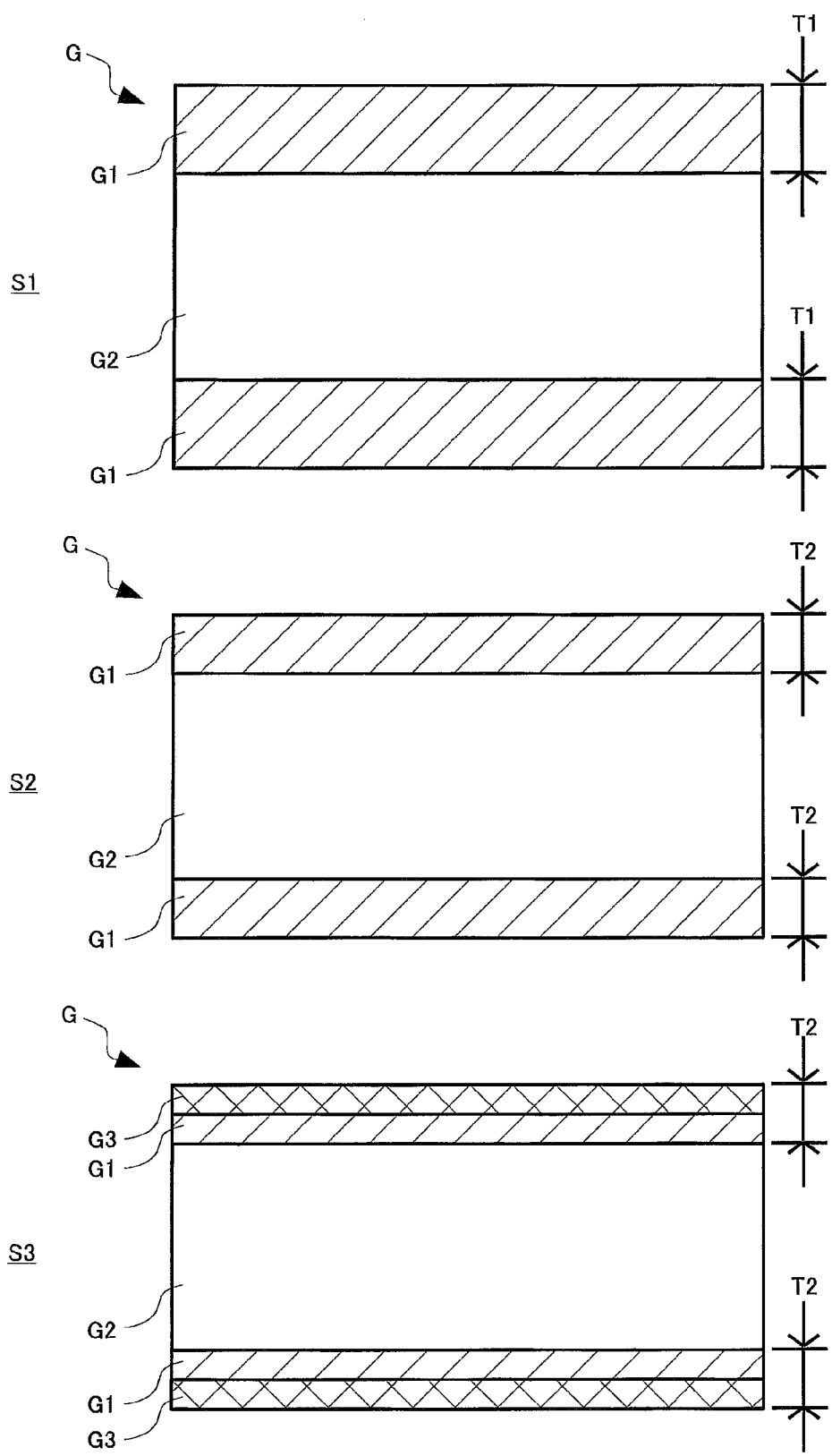
FIG. 63 is a view illustrating a state of a compressive stress layer of the embodiment.

Next, a removing process may be performed for partially removing the first compressive stress layer formed on the glass blank after the press forming process. The process of removing the first compressive stress layer will be described with reference to FIG. 63. S1 of FIG. 63 is a view illustrating a state of the compressive stress layer in the glass blank G before the removing process. S2 of FIG. 63 is a view illustrating a state of the compressive stress layer in the glass blank G after the removing process. Regarding S3 of FIG. 63, an explanation will be provided in the chemically strengthening process described later.

As illustrated in S1 of FIG. 63, first compressive stress layers G1 having a thickness T1 are formed on both sides of a pair of principal faces of the glass blank G after the press forming process. On the other hand, in the glass blank G shrinkage is suppressed by the first compressive stress layer G1 that has been previously formed. Consequently, a tensile stress layer G2 having a predetermined thickness is formed in the glass blank G. That is, in the glass blank G, a compressive stress in the first compressive stress layer G1 and a tensile stress in the tensile stress layer G2 are generated across the thickness direction of the glass blank G. The magnitude of the compressive stress generated in the first compressive stress layer G1 varies with the magnitude of the thickness of the first compressive stress layer G1. That is, the compressive stress increases as the thickness of the compressive stress layer G1 increases. The tensile stress generated in the tensile stress layer G2 increases as the compressive stress increases. In this case, the glass blank may be ruptured due to an internal strain by a stress when the glass blank is formed into a donut shape in the scribing process described later.

Accordingly, in the process of removing the first compressive stress layer G1, the principal face of the glass blank G after the press forming process is subjected to grinding processing (machining) using a grinding apparatus including a planet gear mechanism. Consequently, the first compressive stress layer G1 is removed in such a manner as to leave at least a part thereof, so that the thickness of the first compressive stress layer G1 decreases, and therefore the compressive stress generated in the first compressive stress layer G1 can be decreased. The tensile stress generated in the tensile stress layer G2 can also be decreased as the compressive stress decreases. Consequently, the internal strain by the stress generated in the glass blank G can be reduced without performing annealing treatment.

For example, the grinding has the machining allowance of several micrometers to about 100 micrometers. The grinding apparatus includes a pair of upper and lower surface plates (upper surface plate and lower surface plate), and a glass substrate is held between the upper surface plate and the lower surface plate. By moving one or both of the upper surface plate and the lower surface plate, the glass blank G and each surface plate are relatively moved, whereby both sides of a pair of principal faces of the glass blank can be ground.

When the first compressive stress layer G1 is removed until its thickness becomes T2 (T2<T1), as illustrated in S2 of FIG. 63, in the removing process, the compressive stress and tensile stress generated in the glass blank G decrease.

Preferably the thickness of the first compressive stress layer G1 after the removing process is identical between a pair of principal faces.

(c) Scribing Process (Step S30)

Next, the scribing process will be described. In the scribing process, the glass blank G is subjected to scribing.

As used herein, the scribing means that two concentric (inside concentric and outside concentric) cutting lines (linear scratches, or cutting lines) are provided in the surface of the glass blank G with a scriber made of a super alloy or diamond particles in order to obtain the donut-shape (ring-shape) of the formed glass blank G having a predetermined size. It is preferred that two concentric cutting lines are provided at the same time. The glass blank G scribed into two-concentric-circle shape is partially heated, and a portion outside the outside concentric circle and a portion inside the inside concentric circle are removed by a difference in thermal expansion of the glass blank G. In this way, a donut-shaped glass substrate is obtained.

A donut-shaped glass substrate can also be obtained by forming a circular hole in the glass blank using a core drill or the like.

(d) Shape Processing Process (Step S40)

Next, the shape processing process will be described. The shape processing process includes chamfering processing of the end portion of the glass substrate (chamfering of outer circumferential end portion and inner circumferential end portion) after the scribing process. Chamfering processing is shape processing in which the outer circumferential end portion and inner circumferential end portion of the glass substrate after the scribing process is chamfered between a principal face and a side wall portion perpendicular to the principal face using a diamond abrasive grain. The chamfering angle is, for example, 40 to 50 degrees with respect to the principal face.

Here, the first compressive stress layer is formed on the principal face of the glass substrate in the press forming process of the step S10, while the compressive stress layer is not formed on the side wall portion. Therefore, since the strength of the side wall portion is lower than the strength of the principal face, the outer circumferential end portion and the inner circumferential end portion of the glass substrate can be easily chamfered by performing cutting from the side wall portion toward the principal face at the outer circumferential end portion and the inner circumferential end portion of the glass substrate.

(e) Grinding Process Using Fixed Abrasive Grain (Step S50)

Next, the glass substrate after the shape processing process may be subjected to a grinding process using a fixed abrasive grain. In the grinding process, the principal face of the glass substrate after the shape processing process is subjected to grinding processing (machining) using a grinding apparatus in the same manner as in the removing process of the step S20. Preferably the grinding has the machining allowance of, for example, several micrometers to about 100 micrometers so that the first compressive stress layer formed in the press forming process of the step S10 is left.

In the press forming process of this embodiment, a glass blank having extremely high flatness can be prepared, and therefore the grinding process may be omitted. Before the grinding process, a lapping process may be performed using a grinding apparatus similar to the apparatus used in the grinding process and an alumina loose abrasive grain.

(f) Edge Polishing Process (Step S60)

Next, edge polishing of the glass substrate after the grinding process is performed.

In edge polishing, the inner circumferential end face and outer circumferential end face of the glass substrate are subjected to mirror surface finishing by brush polishing. At this point, slurry that includes fine particles such as cerium oxide as the loose abrasive grain is used. By performing edge polishing, an impairment such as contamination by deposition of dust or the like, damage or a flaw is eliminated, whereby occurrence of a thermal asperity and deposition of ions of sodium, potassium and the like which may cause corrosion can be prevented.

(g) First Polishing Process (Step S70)

Next, the principal face of the glass substrate after the edge polishing process is subjected to first polishing. For example, first polishing has the machining allowance of about 1 µm to 50 µm. First polishing is intended to remove the flaw left on the principal face after the grinding using the fixed abrasive grain, the strain and the micro-surface irregularity (micro-waviness and roughness). In the first polishing process, polishing is performed while a polishing solution is fed using a double polishing apparatus having a structure similar to that of the apparatus used in the grinding process. A polishing agent contained in the polishing solution is, for example, a cerium oxide abrasive grain or a zirconia abrasive grain.

In the first polishing process, preferably polishing is performed so as to have a surface roughness (Ra) of 0.5 nm or less and a micro-waviness (MW-Rq) of 0.5 nm or less for the principal face of the glass substrate. When Ra and/or MW-Rq is 1.0 nm or less, the surface roughness and the micro-waviness can be sufficiently reduced by adjusting processing conditions in the second polishing process described later, and therefore the first polishing process can be omitted. The micro-waviness may be represented by a RMS (Rq) value calculated as a roughness at a wavelength bandwidth of 100 to 500 µm in a region of 14.0 to 31.5 mm radius in the whole of the principal face, and can be measured using, for example, Model-4224 manufactured by Polytec Inc.

The surface roughness is represented by an arithmetic mean roughness Ra defined in JIS B0601:2001 and, for example, can be measured with roughness measuring machine SV-3100 manufactured by Mitutoyo Corporation and calculated by a method defined in JIS B0633:2001, when the roughness is no less than 0.006 µm and no more than 200 µm. When as a result, the roughness is 0.03 µm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 512×512 pixels in a measurement area of 1 µm×1 µm square can be used.

(h) Chemically Strengthening Process (Step S80)

Next, the donut-shaped glass substrate after the first polishing process is chemically strengthened.

For example, a mixed solution of potassium nitride (60% by weight) and sodium nitrate (40% by weight), or the like can be used as a chemically strengthening solution. In the chemically strengthening process, a chemically strengthening solution is heated to, for example, 300° C. to 400° C., a washed glass substrate is preheated to, for example, 200° C. to 300° C., and the glass substrate is then dipped in the chemically strengthening solution for, for example, 1 to 4 hours. That is, in this embodiment, the chemically strengthening process is performed using a low temperature-type ion exchange method.

When the glass substrate is dipped in the chemically strengthening solution, the lithium ion and the sodium ion in the surface layer of the glass substrate are replaced, respectively, by the sodium ion and the potassium ion which have relatively large ion radiuses in the chemically strengthening solution, so that a compressive stress layer (second compressive stress layer G3) is formed on the surface layer portion, thereby strengthening the glass substrate. The magnitude of a compressive stress generated in the second compressive stress layer G3 is, for example, 10 to 50 Kg/mm². The glass substrate subjected to the chemically strengthening treatment is washed. For example, the glass substrate is washed with sulfuric acid, and then washed with pure water or the like.

The second compressive stress layer G3 will be described with reference to S3 of FIG. 63. S3 of FIG. 63 is a view illustrating a state of a pressure stress layer of the glass substrate after the chemically strengthening process. As illustrated in S3 of FIG. 63, on the glass substrate (illustrated by symbol G) after the chemically strengthening process, the second compressive stress layer G3 having a predetermined thickness (e.g. 10 to 100 μm) is formed on the principal face side of the first compressive stress layer G1 having a thickness T2. The thickness of the second compressive stress layer G3 is smaller than that of the first compressive stress layer G1 formed in the press forming process of the step S10. The magnitude of a compressive stress generated in the second compressive stress layer G3 is almost equal to the magnitude of a compressive stress (10 to 50 Kg/mm²) generated in the first compressive stress layer G1. In this case, the thickness of the compressive stress layer including the first compressive stress layer G1 and the second compressive stress layer G3 is T2, and the magnitude of a compressive stress generated in the compressive stress layer is 10 to 100 Kg/mm². That is, a compressive stress layer having a large thickness and a high compressive stress can be formed on the glass substrate as compared to a case where only one of the first compressive stress layer G1 and the second compressive stress layer G3 is formed.

In the chemically strengthening process, chemically strengthening may be performed using a high temperature-type ion exchange method, a dealkalization method, a surface crystallization method or the like in place of the low temperature-type ion exchange method.

(i) Second Polishing Process (Step S90)

Next, the glass substrate after chemically strengthening process is subjected to second polishing. Second polishing has the machining allowance of about 0.5 to 3 μm. Second polishing is intended at the mirror surface polishing of the principal face. In second polishing, for example, the polishing apparatus used in first polishing is used. At this point, the second polishing differs from the first polishing in the following points: the kind and particle size of the loose abrasive grain, and hardness of the resin polisher.

For example, the slurry of the turbid fine particles such as colloidal silica (particle size: diameter of about 10 to 50 nm) is used as the loose abrasive grain used in the second polishing.

The polished glass substrate is washed with a neutral detergent, pore water, IPA or the like to obtain a glass substrate for magnetic disk.

In the second polishing process, compressive stress layers (first compressive stress layer G1 and second compressive stress layer G3) formed on a pair of principal faces of the glass substrate after the chemically strengthening process are partially removed. Consequently, the level of a surface irregularity of the principal face of the glass substrate can be further improved, and therefore it is preferred to perform the second polishing process. By performing the second polishing process, the principal face can be made to have roughness (Ra) of 0.1 nm or less and a micro-waviness (MW-Rq) of 0.1 nm or less.

As described above, the method for manufacturing a glass blank for magnetic disk in this embodiment includes a press forming process of press-forming a lump of molten glass using a pair of dies. Therefore, when the surface roughness of the inner circumferential surfaces of a pair of dies is set at a good level (e.g. surface roughness required for the glass substrate for magnetic disk), the surface roughness of the glass blank can be kept at a good level because the surface roughness of the inner circumferential surface of the die is shape-transferred as the surface roughness of the glass blank. In the press forming process, the cooling rate of the molten glass being pressed may be controlled so that the first compressive stress layer is formed on each of a pair of principal faces of a glass blank that is press formed. Further, the chemically strengthening process may be performed for forming the second compressive stress layer is formed or each of a pair of principal faces of a glass substrate formed using the glass blank after the press forming process. The glass substrate thus obtained has on the principal faces a compressive stress layer having a large thickness and a high compressive stress. Accordingly, in this embodiment, a glass substrate for magnetic disk having a principal face, the strength of which is further enhanced, is obtained as compared to a case where only a chemically strengthening method is used.

[Magnetic Disk]

The glass substrate for magnetic disk is prepared through the processes described above. A magnetic disk is obtained in the following manner using the above-described glass substrate for magnetic disk.

The magnetic disk has, for example, a configuration in which on the principal face of the glass substrate, at least an adhesive layer, an underlying layer, a magnetic layer (magnetic recording layer), a protective layer and a lubricant layer are stacked in this order from the side closest to the principal face.

For example, the substrate is introduced into an evacuated deposition apparatus, and the adhesive layer, the underlying layer and the magnetic layer are sequentially deposited in an Ar atmosphere by a DC magnetron sputtering method. For example CrTi may be used as the adhesive layer, and for example CrRu may be used as the underlying layer. For example a CoPt-based alloy may be used as the magnetic layer. Also, a CoPt-based alloy or FePt-based alloy having a $L_{10}$ ordered structure may be deposited to form a magnetic layer for heat assisted magnetic recording. After the deposition described above, the protective layer is deposited using $C_2H_4$ by, for example, a CVD method, and subsequently nitriding treatment is performed to introduce nitrogen to the surface, whereby a magnetic recording medium can be formed. Thereafter, the lubricant layer can be formed by applying, for example, PFPE (perfluoropolyether) onto the protective layer by a dip coating method.

Examples

The present invention will be further described below by way of Examples. However, the present invention is not limited to aspects described in Examples.

(1) Preparation of Molten Glass

Raw materials were weighed so as to obtain a glass having the following composition, and mixed to obtain a mixed raw material. This raw material was put in a melting vessel, heated, melted, clarified and stirred to prepare a homogeneous molten glass free from a foam and an unmelted substance. A foam and an unmelted substance, deposition of crystals, and contaminants such as a refractory material and platinum forming the melting vessel were not observed in the glass obtained.

[Composition of Glass]

Aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol %.

The above-described molten glass was provided, and a glass blank having a diameter of 75 mm and a thickness of 0.9 mm was prepared using a press forming method of the present invention (method using the apparatus in FIGS. 57 and 58). The temperature of a molten glass material $L_G$ discharged from a molten glass outflow port 111 was 1300° C., and the viscosity of the molten glass material $L_G$ at this time was 700 poise. The surface roughness (arithmetic mean roughness Ra) of the inner circumferential surfaces of a first die and a second die was 0.1 µm to 1 µm. Further, the first die and the second die were formed of an ultrahard alloy (e.g. VM40) in a thickness of 10 mm. Copper in a thickness of 20 mm was used as a cooling control unit.

The molten glass material $L_G$ discharged from a molten glass outflow port 111 was cut by a cutting unit 160, so that a gob $G_G$ having a thickness of about 20 mm is formed. The gob $G_G$ was pressed under a load of 3000 kgf by a press unit until the gob $G_G$ had a temperature equal to or lower than the strain point (=490° C.) of the molten glass material, so that a glass blank having a diameter of 75 mm and a thickness of 0.9 mm was formed.

In this Example, the temperature of the first die was set to the strain point −20° C., and the temperature of the second die was set to the temperature of the first die ±10° C. (strain point: −20 to −30° C.). The reason why the minimum temperature of the die was set to the strain point −30° C. is that when pressing was performed at a too low temperature, the glass may have been broken during pressing.

In this Example, the cooling rate of the molten glass material during press forming was controlled at −266° C./second over a period of time until the temperature of the molten glass material changed to a glass transition point (Tg: 500° C.) from a temperature (1300° C.) at the start of pressing. This cooling rate is determined by measuring a temperature for 60 seconds at a point which is located 1 mm from the front face of the inner circumferential surface of the die to the inside of the die, and calculating a ratio of a temperature change to the measurement time.

Next, glass substrates for magnetic disks were prepared by sequentially performing the processes of steps S30, S40 and S60 to S90 in FIG. 56 (i.e. processes except the process of removing a first compressive stress layer and the grinding process using a fixed abrasive grain) using the glass blanks after the press forming process.

In preparation of the glass substrate for magnetic disk, the processes of first polishing, chemically strengthening and second polishing were performed under the following conditions.

First polishing process: polishing was performed using cerium oxide (average particle size: 1 to 2 µm in diameter) and a hard urethane pad. The machining allowance was 10 µm.

Chemically strengthening process: a mixed solution of potassium nitride (60% by weight) and sodium nitrate (40% by weight) was used as a chemically strengthening solution. The chemically strengthening solution was heated to about 380° C., a washed glass substrate was preheated to 200° C. to 300° C., and the glass substrate was then dipped in the chemically strengthening solution for 2 hours.

Second polishing process: polishing was performed using colloidal silica (average particle size: 0.1 µm in diameter) and a soft urethane pad. The machining allowance was 1 µm.

Examples and Comparative Examples

Comparative Example 1

In Comparative Example 1 illustrated in Table 8, a glass substrate was manufactured without controlling the cooling rate of a molten glass material during a press forming process. At this time, the cooling rate of the molten glass material was −30° C./second over a period of time until the temperature of the molten glass material changed to a glass transition point (Tg: 500° C.) from a temperature (1300° C.) at the start of pressing.

Comparative Example 2

In Comparative Example 2 illustrated in Table 8, a glass blank was prepared while the cooling rate of a molten glass material was controlled to −266° C./second over a period of time until the temperature of the molten glass material changed to a glass transition point (Tg: 500° C.) from a temperature (1300° C.) at the start of pressing during the press forming process. A glass substrate was manufacture using the glass blank. The glass substrate was not subjected to a chemically strengthening process.

Example

In Example illustrated in Table 8, a glass blank was prepared while the cooling rate of a molten glass material was controlled to −266° C./second over a period of time until the temperature of the molten glass material changed to a glass transition point (Tg: 500° C.) from a temperature (1300° C.) at the start of pressing during the press forming process. A glass substrate was manufacture using the glass blank. The glass substrate was subjected to a chemically strengthening process.

Evaluation of Examples and Comparative Examples

First, the cross section of the glass substrate for magnetic disk was polished, and a thickness of the compressive stress layer was measure with a polarization microscope.

Further, transverse rupture strength of the glass substrate for magnetic disk was measured. The transverse rupture strength was measured using transverse rupture strength tester (Shimadzu Autograph DDS-2000). Specifically, ten glass substrates were prepared for each of Comparative example 1, Comparative Example 2 and Example 1, and placed under a load, and an average of loads when the glass substrates were ruptured was determined as transverse rupture strength.

TABLE 8

|  | Cooling rate | Chemically strengthening process | Maximum of thickness of compressive stress layer | Compressive stress value of compressive stress layer | Transverse rupture strength |
| --- | --- | --- | --- | --- | --- |
| Comparative Example 1 | −30° C./second | Performed | 70 μm | 25 kg/mm$^2$ | 230N |
| Comparative Example 2 | −266° C./second | Not performed | 150 μm | 20 kg/mm$^2$ | 120N |
| Example | −266° C./second | Performed | 150 μm | 45 kg/mm$^2$ | 400N |

As apparent from Table 8, a glass substrate, which had a compressive stress layer having a large thickness, a high compressive stress value, and the enhanced transverse rupture strength of which, was obtained by controlling the cooling rate of a molten glass material during a press forming process and performing a chemically strengthening process. This indicates that the strength of the glass substrate was enhanced by controlling the cooling rate of the molten glass material to form a first compressive stress layer on the principal face of the glass blank, and further performing the chemically strengthening process to a second compressive stress layer on the first compressive stress layer.

<Seventh Additional Disclosure>

Recently, a hard disk drive device (HDD) is incorporated in a personal computer or a DVD (Digital Versatile Disc) recording apparatus in order to record data. Particularly, in the hard disk device used in an apparatus such as the notebook personal computer based on portability, a magnetic disk in which a magnetic layer is provided on a glass substrate is used, and magnetic recording information is recorded in or read from a magnetic layer using a magnetic head (DFH (Dynamic Flying Height) head) that is slightly floated on a surface of the magnetic disk surface. A glass substrate is suitably used as the substrate for magnetic disk because the glass substrate hardly plastically deformed as compared to a metallic substrate (aluminum substrate) and the like.

The magnetic head includes, for example, a magnetic resistance effect element, but such a magnetic head may cause a thermal asperity trouble as its specific trouble. The thermal asperity trouble is a trouble in which when a magnetic head passes over a micro-irregularly-shaped surface of a magnetic disk while floating and flying, a magnetic resistance effect element is heated by adiabatic compression or contact of air, causing a read error. Thus, for avoiding the thermal asperity trouble, the glass substrate for magnetic disk is prepared such that surface properties, such as the surface roughness and flatness, of the principal face of the glass substrate are at a satisfactory level.

As a conventional method for manufacturing a sheet glass (glass blank), a vertical direct press method is known. This press method is a method in which a lump of molten glass is fed onto a lower die, and the lump of molten glass (molten glass lump) is press-formed using an upper die (Japanese Patent Laid-open Publication No. 2009-269762, FIG. 4, etc.).

However, the known vertical direct press method has the problem that the flatness (shape accuracy) of a glass blank prepared is poor. The reason for this is as follows.

In the vertical direct press method, immediately after a molten glass lump is placed on a lower die, only a contact surface with the lower die and a part close to the contact surface, of the molten glass lump, are rapidly cooled to be solidified. Since glass has low heat conductivity, an upper part of the molten glass lump (a part which comes into contact with an upper die) remains at a high temperature while the molten glass lump is in contact with the lower die. Thereafter, the upper part comes into contact with the upper die, and is thereby rapidly cooled to be solidified. Therefore, in the case of the vertical direct press method, there is a gap in timing at which the molten glass lump is cooled to be solidified between the lower side and the upper side of the molten glass lump during a process in which the molten glass lump is formed into a glass blank. As a result, the molten glass lump is warped in a concave way, so that the flatness of the glass blank is increased (deteriorated). The gap in timing cannot be drastically suppressed in light of the press system of the vertical direct press method.

Further, in the vertical direct press method, a mold release material ((mold) release agent) such as, for example, BN (boron nitride) should be attached to the die beforehand in order to prevent a situation in which the molten glass lump is stuck to the lower die and cannot be removed, but when such a mold release material remains attached on the glass blank, the surface roughness cannot be decreased. Preferably the temperatures of the upper die and the lower die are made identical wherever possible for preparing a glass blank having good flatness, but when the mold release material is attached on the lower die, the heat conductivity of the lower die is deteriorated, and therefore it is difficult to uniformly cool both surfaces of the glass blank in a press forming process. Therefore, the glass blank prepared by the vertical direct press method absolutely requires removal processes by grinding and so on in subsequent processes in order to improve the flatness and remove the mold release material sticking to the surface of the glass blank.

When the machining allowance (removal amount) in the grinding process is increased for improvement of the flatness, a deep crack may occur in the surface of the glass blank, and therefore the machining allowance (polishing amount) is necessarily increased in the polishing process as a subsequent process so that the deep crack does not remain. However, when the machining allowance is increased in a polishing process using a loose abrasive grain and a resin polisher, the outer circumferential end portion of the principal face of the glass blank is ground into a curved shape, and a shear drop (hereinafter, referred to as a "roll-off") is formed at the end portion. That is, if a value indicating the roll-off is a predetermined value or greater the outer circumferential end portion of the principal face of the glass blank is ground into a downwardly sloped shape, and therefore when a magnetic disk is prepared using this glass blank as a glass substrate, the distance between a magnetic layer near the outer circumferential end portion and a magnetic head is larger than the floating distance of the magnetic disk at a different portion (e.g. an inner or middle circumferential portion) of the glass substrate. As a result, writing and reading operations of the magnetic head become less accurate at the magnetic layer near the outer circumferential end portion. On the other hand, when the outer circumferential end portion has a ski-jump (elevated) shape, there arises such a problem that the distance between a magnetic disk and the magnetic head becomes so small that the magnetic disk and the magnetic head collide to be crushed.

From the viewpoint described above, an object of the invention of the seventh additional disclosure is to provide a method for manufacturing a glass substrate for magnetic disk in which occurrence of an extreme roll-off and ski-jump at the outer circumferential end portion is suppressed.

In view of the above-described problems, the present inventors have intensively conducted studies, and resultantly devised a novel press forming method. That is, in a method, for manufacturing a glass blank according to this embodiment, a horizontal direct press method is employed in which a falling molten glass lump is press-formed using a pair of dies (press forming dies) arranged so as to face each other in a direction (horizontal direction) orthogonal to the falling direction of the molten glass lump. In the horizontal direct press method, unlike the conventional vertical direct press method, the molten glass lump is not temporarily retained in contact with a member having a temperature lower than that of the molten glass lump over a period of time until it is press-formed. Thus, at the time point immediately before press forming is started, the viscosity distribution of the interior of the molten glass lump becomes very wide during press forming in the vertical direct press method, whereas the viscosity distribution of the molten glass lump is kept even in the horizontal direct press of this embodiment. Accordingly, in the horizontal direct press method, it is extremely easy to uniformly thinly draw the molten glass lump to be press-formed as compared to the vertical direct press method. Consequently, as compared to the case where a glass blank is prepared using the vertical direct press method, it is extremely easy to drastically suppress deterioration of the flatness when a glass blank is prepared using the horizontal direct press method.

In the horizontal direct press method, a glass blank having good flatness can be prepared, and therefore the machining allowance for improving the flatness can be reduced in a process of grinding the principal face, which is a subsequent process, as compared to the vertical direct press method. In the polishing process, however, particularly when a loose abrasive grain having a small size and/or a resin polisher having a relatively low hardness is used, the outer circumferential end portion of the principal face of the glass blank is ground into a curved shape, and roll-off shape is formed at the end portion as it did previously.

In view of the above, the inventors have further intensively conducted studies, and resultantly found that occurrence of roll-off at the outer circumferential end portion of a glass substrate for magnetic disk can be suppressed by forming a shape of the glass blank in anticipation of the roll-off, which occurs at the end portion in a polishing process, in order to suppress occurrence of the roll-off at the outer circumferential end portion. Such a glass blank has a shape in which a pair of principal faces are recessed at the central portion and the thickness increases as going toward the outer circumferential end portion from the center portion. According to the inventors, the principle of suppressing occurrence of roll-off at the outer circumferential end portion by the shape of the glass blank is as follows.

That is, the formed glass blank is shape-processed into a disk-shaped glass substrate, but this disk-shaped glass substrate also has a shape in which the central portion is recessed and the thickness increases as going toward the outer circumferential end portion from the center portion. Next, a chamfering surface is formed at the outer circumferential end portion of the disk-shaped glass substrate, but since the principal face of the glass substrate is sloped upward from the center to the outer circumferential end portion before the chamfering surface is formed, an elevated portion is formed between the principal face and the chamfering surface when the chamfering surface is formed at the outer circumferential end portion. When a glass substrate, in which an elevated portion is formed at the outer circumferential end portion, is subjected to polishing of the principal face, effect of the roll-off by polishing occurs at the elevated portion, and the elevated portion is then removed. As result, the principal face has high flatness up to the start point of the chamfering surface, and occurrence of roll-off at the outer circumferential end portion is suppressed.

From the viewpoint described above, the present invention may be a method for manufacturing a glass substrate for magnetic disk, which includes: a forming process of forming a glass blank by press-forming a lump of molten glass using a pair of dies; a shape processing process of shape-processing the formed glass blank into a disk-shaped glass substrate; a chamfering surface forming process of forming a chamfering surface at least at the outer circumferential end portion of the disk-shaped glass substrate; and a polishing process of polishing the principal face of the glass substrate on which the chamfering surface is formed, wherein the glass blank is formed in the forming process such that the glass blank has a pair of principal faces recessed at the central portion, and that the thickness of the glass blank increases as going toward the outer circumferential end portion from the center portion, a glass substrate is formed having an elevated portion interposed between the principal face and the chamfering surface in the chamfering surface forming process, and the glass substrate is polished such that the elevated portion is removed in the polishing process.

In the method for manufacturing a glass substrate for magnetic disk, preferably, in the forming process, the falling lump of molten glass may be press-formed using the pair of dies from a direction orthogonal to the falling direction.

In the method for manufacturing a glass substrate for magnetic disk, preferably, in the forming process, press forming may be performed so that the temperature of portions of the pair of dies, which contact the molten glass, is substantially identical.

In the method for manufacturing a glass substrate for magnetic disk, the glass blank for magnetic disk may be manufactured by subjecting the glass blank formed by the forming process to polishing processing having, a machining allowance of 50 µm or less in the polishing process.

According to a method for manufacturing a glass substrate for magnetic disk according to the present invention, occurrence of roll-off at the outer circumferential end portion can be suppressed.

[Explanation of Embodiment in Seventh Additional Disclosure]

A method for manufacturing a glass blank for magnetic disk and a method for manufacturing a glass substrate for magnetic disk in this embodiment will be described in detail below.

[Glass Substrate for Magnetic Disk]

Figure 64:
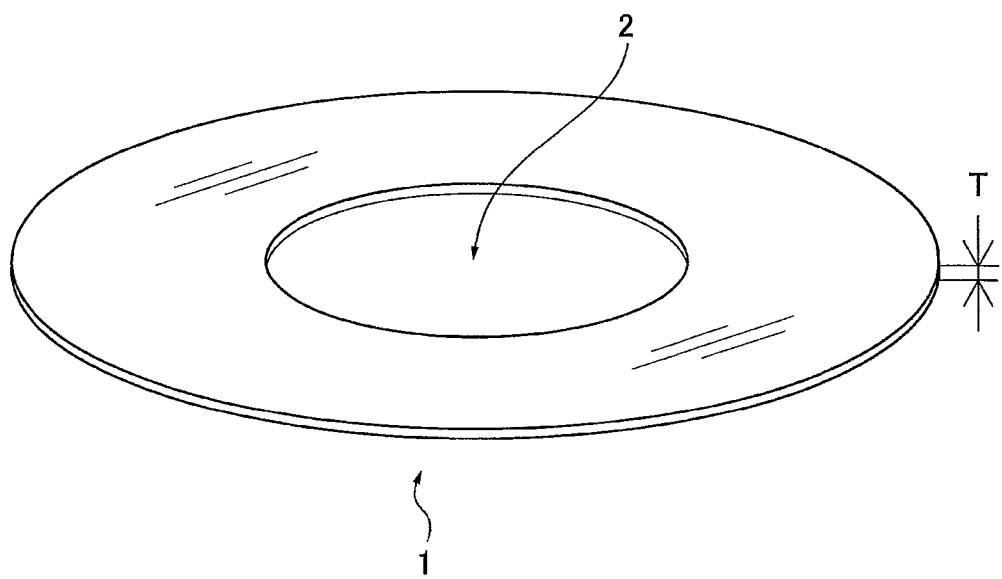
FIG. 64 is a perspective view illustrating an external shape of a glass substrate for magnetic disk of an embodiment.

As illustrated in FIG. 64, a glass substrate for magnetic disk 1 in this embodiment is a donut-shaped thin glass substrate. The size of the glass substrate for magnetic disk is not limited but for example, a glass substrate for magnetic disk having a nominal diameter of 2.5 inches is suitable. In the case of the glass substrate for magnetic disk having a nominal diameter of 2.5 inches, for example, the outer diameter is 65 mm, the diameter of a central hole 2 is 20 mm, and the thickness T is 0.6 to 1.0 mm. The flatness of the principal face of the glass substrate for magnetic disk of the embodiment is, for example, 4 μm or less, and the surface roughness (arithmetic mean roughness Ra) of the principal face is, for example, 0.2 nm or less. It is to be noted that the flatness required for a substrate for magnetic disk as a final product is, for example, 4 μm or less.

Aluminosilicate glass, soda-lime glass, borosilicate glass or the like can be used as a material of the glass substrate for magnetic disk in this embodiment. Particularly, the aluminosilicate glass can be suitably used in that chemically strengthening can be performed, and a glass substrate for magnetic disk excellent in flatness of the principal face and strength of the substrate can be prepared.

The composition of the glass substrate for magnetic disk of this embodiment is not limited, but the glass substrate of this embodiment is preferably made of aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol %.

[Method for Manufacturing Glass Substrate for Magnetic Disk of Embodiment]

Figure 65:
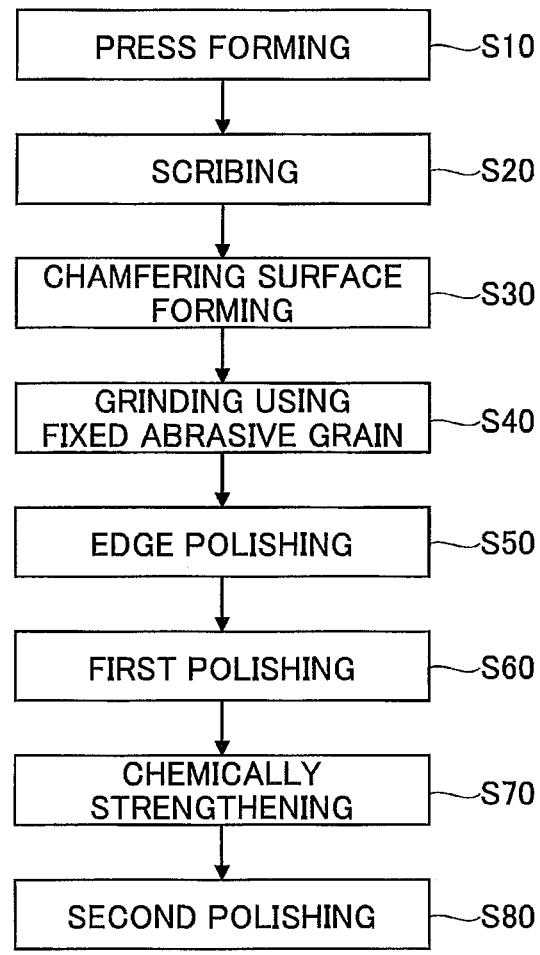
FIG. 65 is a view illustrating a flow of one embodiment of a method for manufacturing the glass substrate for magnetic disk of the embodiment.

Next, a flow of a method for manufacturing a glass substrate for magnetic disk will be described with reference to FIG. 65. FIG. 65 is a view illustrating a flow of one embodiment of a method for manufacturing a glass substrate for magnetic disk.

As illustrated in FIG. 65, in the method for manufacturing a glass substrate for magnetic disk in this embodiment, first a disk-shaped glass blank is prepared by press forming (Step S10). Next, the formed glass blank is scribed to prepare a donut-shaped glass substrate (Step S20). Next, the inner circumferential end portion and outer circumferential end portion of the scribed glass substrate are subjected to formation of a chamfering surface (chamfering processing) (Step S30). Next, the glass substrate is subjected to grinding using a fixed abrasive grain (Step S40). Next, edge polishing of the glass substrate is performed (Step S50). Next, the principal face of the glass substrate is subjected to first polishing (Step S60). Next, the glass substrate, after first polishing, is subjected to chemically strengthening (Step S70). Next, the chemically strengthened glass substrate is subjected to second polishing (Step S80). The glass substrate for magnetic disk is obtained through the above processes.

Each process will be described in detail below.

(a) Press Forming Process (Step S10)

Figure 66:
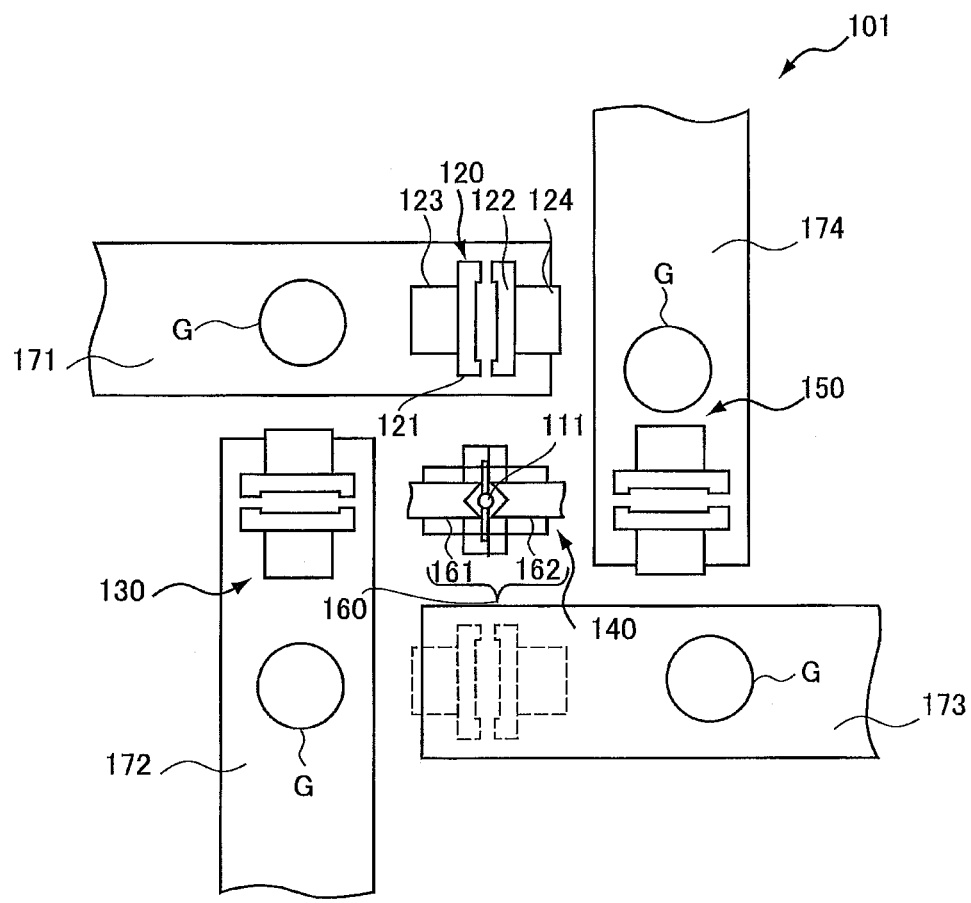
FIG. 66 is a plan view of an apparatus used in press forming of the embodiment.

First, the press forming process will be described with reference to FIG. 66. FIG. 66 is a plan view of an apparatus used in press forming. As illustrated in FIG. 66, an apparatus 101 includes four sets of press units 120, 130, 140 and 150, a cutting unit 160 and a cutting blade 165 (not illustrated in FIG. 65). The cutting unit 160 is provided on a path of a molten glass that flows out from a molten glass outflow port 111. In the apparatus 101, a lump of molten glass (hereinafter, also referred to as a gob) cut by the cutting unit 160 is caused to fall down, and the lump is pressed from both sides of the falling path of the lump while the lump is sandwiched between surfaces of a pair of dies facing each other, thereby forming the glass blank.

Figure 67:
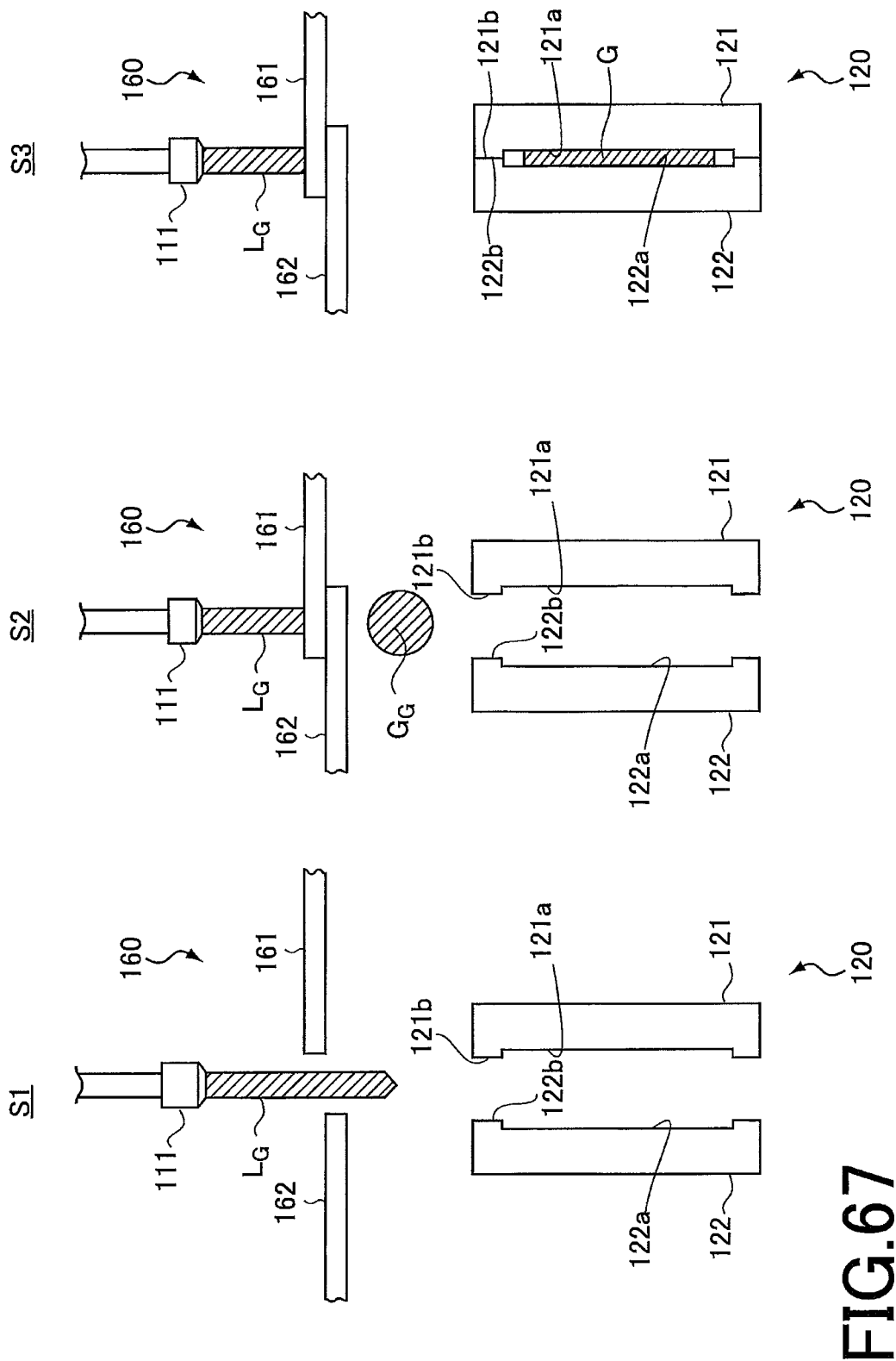
FIG. 67 is a view illustrating press forming of the embodiment.

Specifically, as illustrated in FIG. 67, in the apparatus 101, the four sets of press units 120, 130, 140, and 150 are provided at intervals of 90 degrees around the molten glass outflow port 111.

Each of the press units 120, 130, 140, and 150 is driven by a moving mechanism (not illustrated) so as to be able to proceed and retreat with respect to the molten glass outflow port 111. That is, each of the press units 120, 130, 140, and 150 can be moved between a catch position and a retreat position. The catch position (position in which the press unit 140 is drawn by a solid line in FIG. 66) is located immediately below the molten glass outflow port 111. The retreat position (positions in which the press units 120, 130, and 150 are drawn by solid lines and a position in which the press units 140 is drawn by a broken line in FIG. 66) is located away from the molten glass outflow port 111.

The cutting unit 160 is provided on a path of the molten glass between the catch position (position in which the gob is captured by the press unit) and the molten glass outflow port 111. The cutting unit 160 forms the lump of molten glass by cutting a proper quantity of the molten glass flowing out from the molten glass outflow port 111. The cutting unit 160 includes a pair of cutting blades 161 and 162. The cutting blades 161 and 162 are driven so as to intersect each other on the path of the molten glass at constant timing. When the cutting blades 161 and 162 intersect each other, the molten glass is cut to obtain the gob. The obtained gob falls down toward the catch position.

The press unit 120 includes a first die 121, a second die 122, a first driving unit 123 and a second driving unit 124. Each of the first die 121 and the second die 122 is a plate-shaped member including a surface used to perform the press forming for the gob. The first die 121 and the second die 122 are disposed such that normal directions of the surfaces become substantially horizontal, and such that the surfaces become parallel to each other. The first driving unit 123 causes the first die 121 to proceed and retreat with respect to the second die 122. On the other hand, the second driving unit 124 causes the second die 122 to proceed and retreat with respect to the first die 121. Each of the first driving unit 123 and the second driving unit 124 includes a mechanism for causing the surface of the first driving unit 123 and the surface of the second driving unit 124 to be rapidly brought close to each other, for example, a mechanism in which an air cylinder or a solenoid and a coil spring are combined.

Because the structures of the press units 130, 140, and 150 are similar to that of the press unit 120, the descriptions of the press units 130, 140, and 150 are omitted.

After each press unit moves to the catch position, the falling gob is sandwiched between the first die and the second die by driving the first driving unit and the second driving unit, and the gob is formed into a predetermined thickness while rapidly cooled, thereby preparing a circular glass blank G. Next, after the press unit moves to the retreat position, the first die and the second die are separated to cause the formed glass blank G to fall down. A first conveyer 171, a second conveyer 172, a third conveyer 173, and a fourth conveyer 174 are provided below the retreat positions of the press units 120, 130, 140, and 150, respectively. Each of the first to fourth conveyers 171 to 174 receive the glass blank G falling down from the corresponding press unit, and the conveyer conveys the glass blank G to an apparatus (not illustrated) of the next process.

The apparatus 101 is configured such that the press units 120, 130, 140, and 150 sequentially move to the catch position and move to the retreat position while the gob is sandwiched, so that the glass blank G can continuously be formed without waiting for the cooling of the glass blank G in each press unit.

S1 of FIG. 67 to S3 of FIG. 67 more specifically illustrates press forming performed by the apparatus 101. S1 of FIG. 67 is a view illustrating the state before the gob is made, S2 of FIG. 67 is a view illustrating the state in which the gob is made by the cutting unit 160, and S3 of FIG. 67 is a view illustrating the state in which the glass blank G is formed by pressing the gob.

As illustrated in S1 of FIG. 67, a molten glass material $L_G$ continuously flows out from the molten glass outflow port 111. At this point, the cutting unit 160 is driven at predetermined timing to cut the molten glass material $L_G$ using the cutting blades 161 and 162 (S2 of FIG. 67). Therefore, the cut molten glass becomes a substantially spherical gob $G_G$ due to a surface tension thereof. Adjustment of the outflow quantity per time of the molten glass material $L_G$ and the driving interval of the cutting unit 160 may be appropriately performed according to a volume determined by the target size and thickness of the glass blank G.

The made gob $G_G$ falls down toward a gap between the first die 121 and second die 122 of the press unit 120. At this point, the first driving unit 123 and the second driving unit 124 (see FIG. 67) are driven such that the first die 121 and the second die 122 come close to each other at the timing the gob $G_G$ enters the gap between the first die 121 and the second die 122. Therefore, as illustrated in S3 of FIG. 67, the gob $G_G$ is captured (caught) between the first die 121 and the second die 122. An inner circumferential surface 121a of the first die 121 and an inner circumferential surface 122a of the second die 122 come close to each other with a micro gap, and the gob $G_G$ sandwiched between the inner circumferential surface 121a of the first die 121 and the inner circumferential surface 122a of the second die 122 is formed into a thin-plate shape. A projection 121b and a projection 122b are provided in the first inner circumferential surface 121a of the first die 121 and the second inner circumferential surface 122a of the second die 122, respectively, in order to keep the gap between the inner circumferential surface 121a of the first die 121 and the inner circumferential surface 122a of the second die 122 constant. That is, the projection 121b and the projection 122b abut against each other, whereby the gap between the inner circumferential surface 121a of the first die 121 and the inner circumferential surface 122a of the second die 122 is kept constant, so that a plate-shaped space is generated.

Press forming is performed using a pair of dies 121 and 122 in the press forming process in press forming in this embodiment, and the outer shape of the glass blank is not restricted by the shape of the die. That is, as illustrated in S3 of FIG. 67, the gob stretched by closed dies does not reach projections 121b and 122b of the dies.

A temperature control mechanism (not illustrated) is provided in each of the first die 121 and second die 122, and temperatures at the first die 121 and second die 122 is retained sufficiently lower than the glass transition temperature $T_G$ of the molten glass $L_G$. It is not necessary to attach a mold release material to the first die 121 and the second die 122 in the press forming process.

There is a correlation between a difference in temperature, at a position where the inner circumferential surface 121a of the first die 121 and the inner circumferential surface 122a of the second die 122 face each other at the time of press-forming the gob $G_G$, and flatness of the glass blank obtained after press forming. That is, the flatness of the glass blank obtained after press forming becomes better as the difference in temperature at an opposed position between the inner circumferential surface 121a of the first die 121 and the inner circumferential surface 122a of the second die 122 decreases. This is because when the difference in temperature between a pair of dies is smaller, a thermal balance is achieved when the gob $G_G$ at a high temperature comes into contact the inner circumferential surface of the die and is thereby rapidly cooled, so that deterioration of the flatness of the glass blank that may be caused by a very small difference in degree of heat deformation between a pair of dies at the cooling stage can be further suppressed.

Thus, if this correlation is known, a maximum value of a difference in temperature (absolute value) between a pair of dies (between the inner circumferential surface 121a of the first die 121 and the inner circumferential surface 122a of the second die 122) for achieving flatness required for the glass substrate for magnetic disk can be determined. Thus, when a difference in temperature between a pair of dies is controlled so as not exceed its maximum value, flatness required for the glass substrate for magnetic disk can be achieved. For example, if the flatness required for the glass substrate for magnetic disk is 4 μm, press forming is performed while the difference in temperature between a pair of dies is kept at 10° C. or less.

The difference in temperature may be appropriately determined from the correlation according to the flatness required for the glass substrate for magnetic disk, but the difference in temperature may also be determined from the following standpoint.

Since glass substrate for magnetic disk of this embodiment is incorporated while being pivotally supported by a metallic spindle having a high thermal expansion coefficient within a hard disk as a magnetic disk that is a final product, the thermal expansion coefficient of the glass substrate for magnetic disk is preferably as high as that of the spindle. Therefore, the composition of the glass substrate for magnetic disk is defined so that the glass substrate for magnetic disk has a high thermal coefficient. The thermal expansion coefficient of the glass substrate for magnetic disk is, for example, in a range of 30 to $100 \times 10^7 (K^{-1})$, preferably in a range of 50 to $100 \times 10^7$ $(K^{-1})$. The thermal expansion coefficient is a value calculated using the linear expansion coefficients of the glass substrate for magnetic disk at temperatures of 100° C. and 300° C. A thermal expansion coefficient of, for example, less than $30 \times 10^{-7} (K^{-1})$ or more than $100 \times 10^{-7}$ is not preferable because a difference in thermal expansion coefficient between the glass substrate and the spindle is increased. From the point of view, temperature conditions at the circumference of the principal face of the glass blank are made uniform in the press forming process when a glass substrate for magnetic disk having a high thermal expansion coefficient is prepared. As one example, it is preferable to perform temperature control so that the temperatures of the inner circumferential surface 121a of the first die 121 and the inner circumferential surface 122a of the second die 122 become substantially identical. When temperature control is performed so that the temperatures become identical, for example, a difference in temperature is preferably 5° C. or less. The difference in temperature is more preferably 3° C. or less, especially preferably 1° C. or less.

The difference in temperature between dies is a difference in temperature as measured using a thermocouple at a point which is located 1 mm from each of the front faces of the inner circumferential surface 121a of the first die 121 and the inner circumferential surface 122a of the second die 122 to the inside of the die and at which the inner circumferential surface 121a and the inner circumferential surface 122a face each other (e.g. a point corresponding to the central position of the glass blank and central points of the inner circumferential surface 121a and the inner circumferential surface 122a).

A time until the gob $G_G$ is completely confined between the first die 121 and the second die 122 after the gob $G_G$ comes into contact with the inner circumferential surface 121a of the first die 121 or the inner circumferential surface 122a of the second die 122, is as extremely short as about 0.06 second in the apparatus 101. Therefore, the gob $G_G$ is formed into the substantially disk shape by, spreading along the inner circumferential surface 121a of the first die 121 and the inner circumferential surface 122a of the second die 122 within an extremely short time, and the gob $G_G$ is rapidly cooled and solidified in the form of amorphous glass. In this way, the glass blank G is prepared. The size of the glass blank G formed in this embodiment is, depending on the size of a desired glass substrate for magnetic disk, for example about 20 to 200 mm in diameter.

In the press forming method of this embodiment, the glass blank G is formed in a manner such that the inner circumferential surface 121a of the first die 121 and the inner circumferential surface 122a of the second die 122 are shape-transferred, and therefore preferably the flatness and the smoothness of each of the inner circumferential surfaces of a pair of dies are made comparable to those of a desired glass substrate for magnetic disk. In this case, necessity to subject the glass blank G to a surface processing process, i.e. a grinding and polishing process after press forming may be eliminated. That is, the glass blank G formed in the press forming method of this embodiment may have a thickness identical to the target thickness of the glass substrate for magnetic disk that is finally obtained. For example, the glass blank G is a disk-shaped sheet having a thickness of 0.2 to 1.1 mm. The surface roughness of each of the inner circumferential surface 121a and the inner circumferential surface 122a is preferably adjusted to 0.0005 to 0.05 μm so that the arithmetic mean roughness Ra of the glass blank G is 0.001 to 0.1 μm.

After the first die 121 and the second die 122 are closed, the press unit 120 quickly moves to the retreat position, instead the press unit 130 moves to the catch position, and the press unit 130 performs the pressing to the gob $G_G$.

After the press unit 120 moves to the retreat position, the first die 121 and the second die 122 are kept closed until the glass blank G is sufficiently cooled (at least until the glass blank G has a temperature below a yield point). Then, the first driving unit 123 and the second driving unit 124 are driven to separate the first die 121 and the second die 122, the glass blank G falls down from the press unit 120, and the conveyer 171 located below the press unit 120 receives the glass blank G (see FIG. 66).

As described above, in the apparatus 101, the first die 121 and the second die 122 are closed within a time as extremely short as 0.1 second (about 0.06 second), and the molten glass substantially simultaneously comes into contact with the whole of the inner circumferential surface 121a of the first die 121 and the whole of the inner circumferential surface 122a of the second die 122. Therefore, the inner circumferential surface 121a of the first die 121 and the inner circumferential surface 122a of the second die 122 are not locally heated, and a strain is hardly generated in the inner circumferential surface 121a and the inner circumferential surface 122a. Because the molten glass is, formed into the disk shape before the heat transfers from the molten glass to the first die 121 and the second die 122, a temperature distribution of the formed molten glass becomes substantially even. Therefore, in cooling the molten glass, variation of the shrinkage quantity of the glass material is small, and the large strain is not generated in the glass blank G. Accordingly, the flatness of the principal face of the prepared glass blank G is improved as compared to a glass blank prepared by conventional press forming with an upper die and a lower die.

In the example illustrated in FIG. 67, the substantially spherical gob $G_G$ is formed by cutting the flowing-out molten glass $L_G$ using the cutting blades 161 and 162. However, when viscosity of the molten glass material $L_G$ is small with respect to a volume of the gob $G_G$ to be cut, the glass does not become the substantially spherical shape only by cutting the molten glass $L_G$, and the gob is not formed. In such cases, a gob forming die is used to form the gob.

Figure 68:
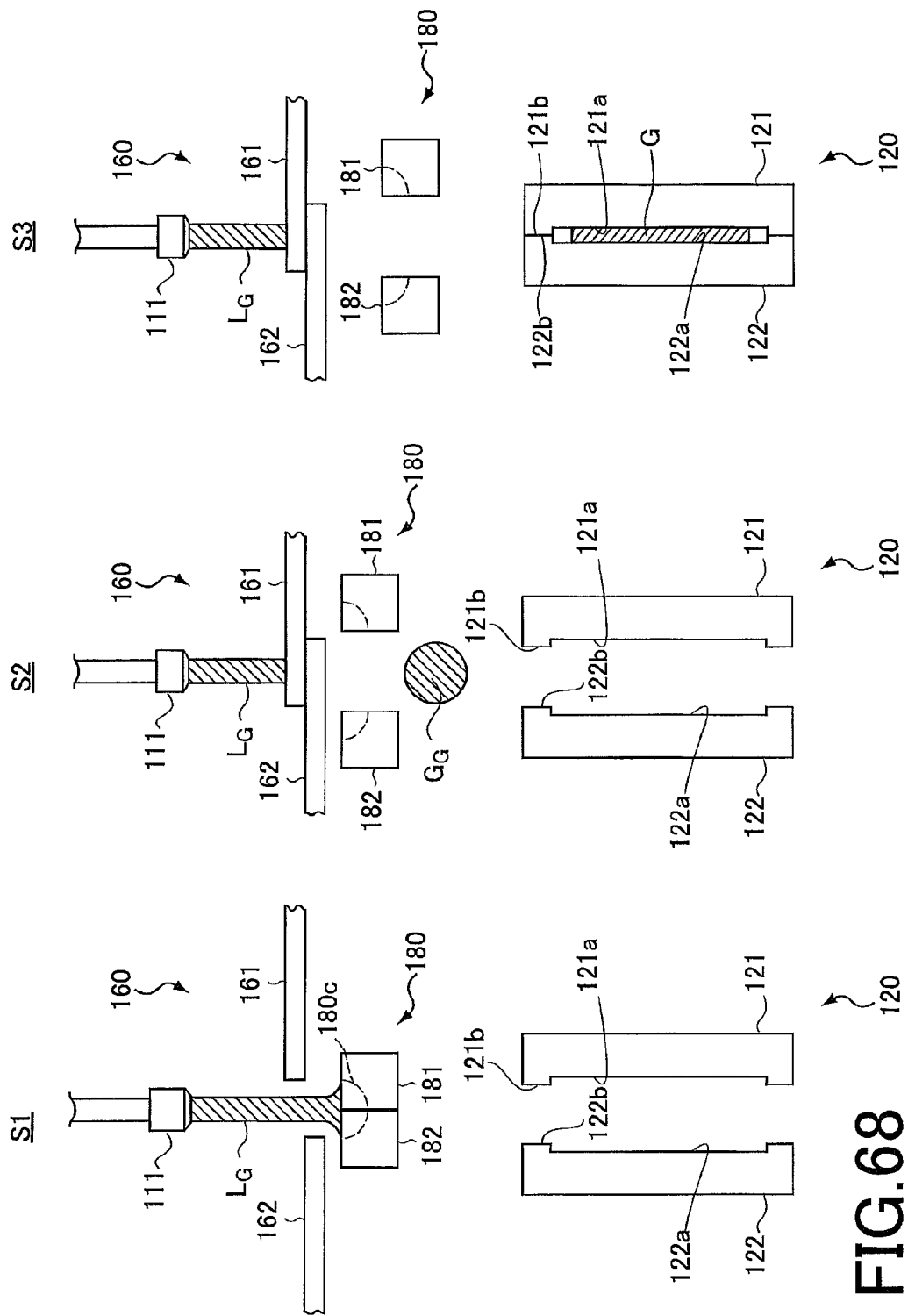
FIG. 68 is a view illustrating a modification of press forming of the embodiment using a gob forming die.

S1 of FIG. 68 to S3 of FIG. 68 are views illustrating a modification of the embodiment of FIG. 67. The gob forming die is used in the modification. S1 of FIG. 68 is a view illustrating the state before the gob is made, S2 of FIG. 68 is a view illustrating the state in which the gob $G_G$ is made by the cutting unit 160 and a gob forming die 180, and S3 of FIG. 68 is a view illustrating the state in which the press forming is performed to the gob $G_G$ to make the glass blank G.

As illustrated in S1 of FIG. 68, the path of the molten glass $L_G$ to the press unit 120 is closed by closing the blocks 181 and 182, and the lump of the molten glass $L_G$ cut with the cutting unit 160 is received by a recess 180C formed by the block 181 and 182. Then, as illustrated in S2 of FIG. 68, the molten glass $L_G$ that becomes the spherical shape in the recess 180C falls down toward the press unit 120 at one time by opening the blocks 181 and 182. When falling down toward the press unit 120, the gob $G_G$ becomes the spherical shape by the surface tension of the molten glass $L_G$. As illustrated in S3 of FIG. 68, during the fall of the gob $G_G$, the spherical gob $G_G$ is sandwiched between the first die 121 and the second die 122 to perform the press forming, thereby preparing the disk-shaped glass blank G.

Figure 69:
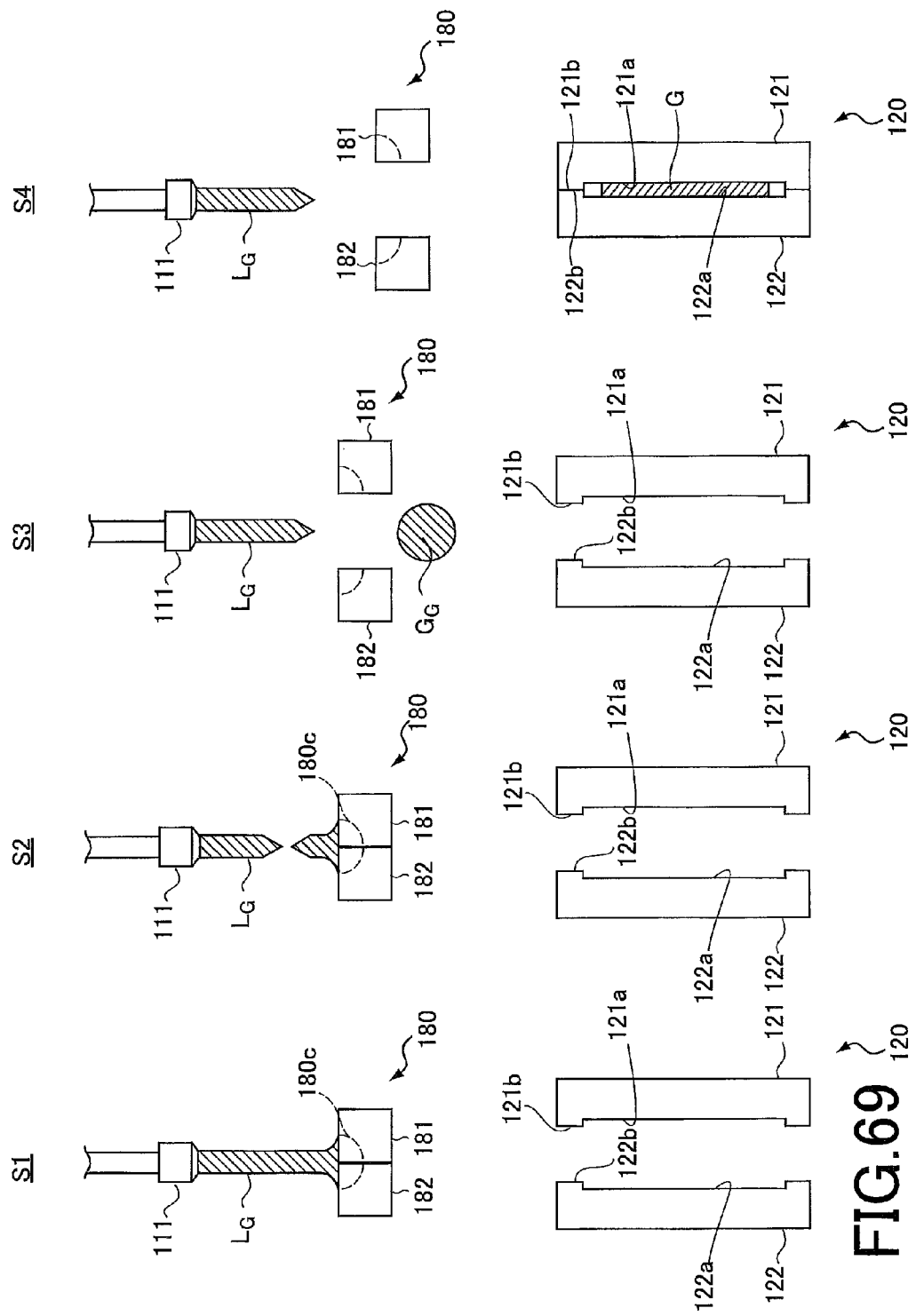
FIG. 69 is a view illustrating a modification of press forming of the embodiment in which a cutting unit is not used.

Alternatively, as illustrated in S1 of FIG. 69 to S4 of FIG. 69, in the apparatus 101, instead of using the cutting unit 160 illustrated in S1 of FIG. 68 to S3 of FIG. 68, a moving mechanism that moves the gob forming die 180 in an upstream direction or a downstream direction along the path of the molten glass $L_G$ may be used. S1 of FIG. 69 to S4 of FIG. 69 are views illustrating a modification in which the gob forming die 180 is used. S1 of FIG. 69 and S2 of FIG. 69 are views illustrating the state before the gob $G_G$ is made, S3 of FIG. 69 is a view illustrating the state in which the gob $G_G$ is made by the gob forming die 180, and S4 of FIG. 69 is a view illustrating the state in which the gob $G_G$ is subjected to press forming to make the glass blank G.

As illustrated in S1 of FIG. 69, the recess 180C formed by the block 181 and 182 receives the molten glass $L_G$ flowing out from the molten glass outflow port 111. As illustrated in S2 of FIG. 69, the blocks 181 and 182 are quickly moved onto the downstream side of the flow of the molten glass $L_G$ at predetermined timing. In this way, the molten glass $L_G$ is cut. Then, as illustrated in S3 of FIG. 69, the blocks 181 and 182 are separated at predetermined timing. Therefore, the molten glass $L_G$ retained by the blocks 181 and 182 fails down at one time, and the gob $G_G$ becomes the spherical shape by the surface tension of the molten glass $L_G$. As illustrated in S4 of FIG. 69, during the fall of the gob $G_G$, the spherical gob $G_G$ is sandwiched between the first die 121 and the second die 122 to perform the press forming, thereby preparing the disk-shaped glass blank G.

Figure 70:
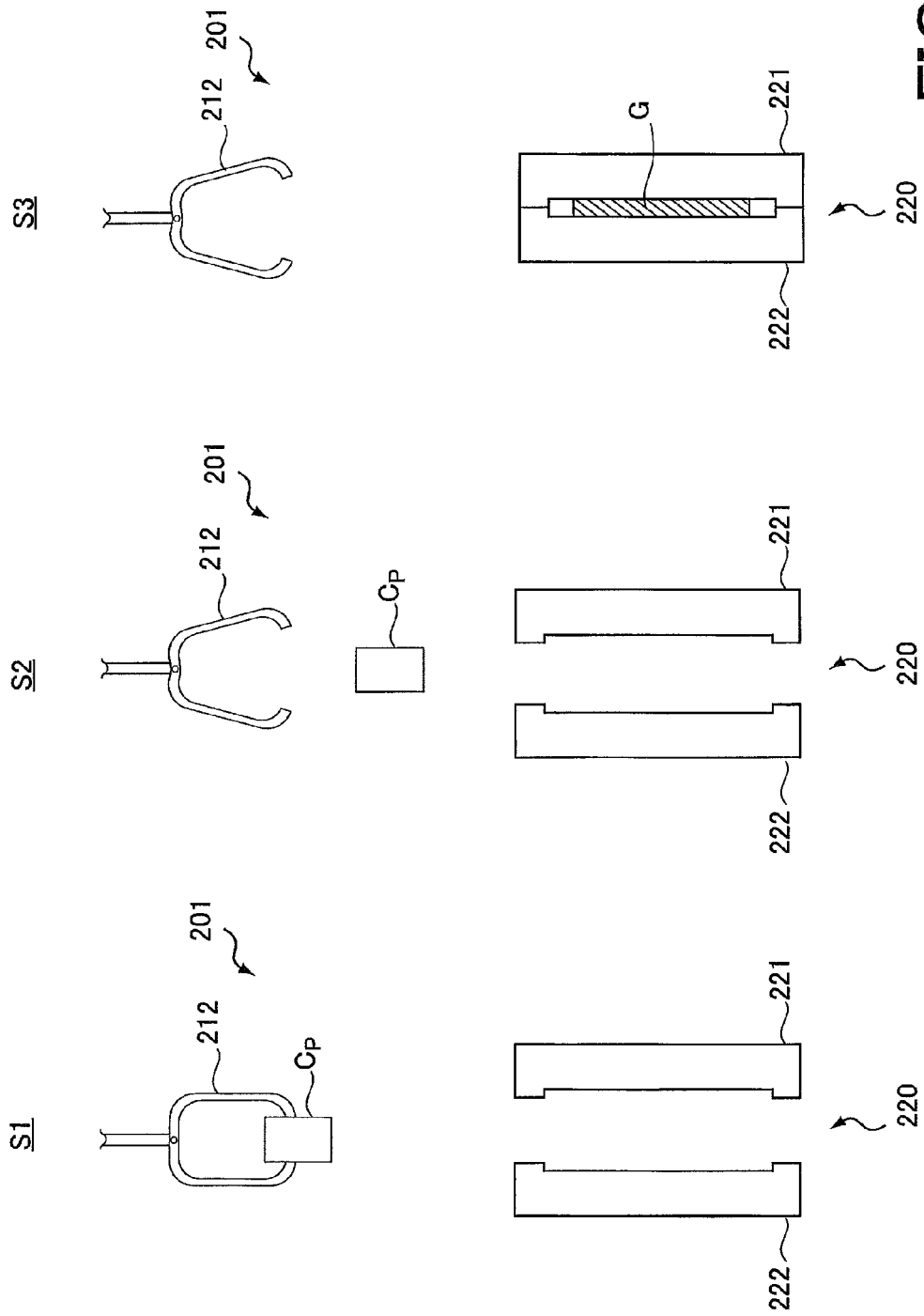
FIG. 70 is a view illustrating a modification of press forming of the embodiment using an optical glass heated by a softening furnace.

S1 of FIG. 70 to S3 of FIG. 70 are views illustrating another modification in which, instead of the gob $G_G$, a lump $C_P$ of the optical glass heated by a softening furnace (not illustrated) is caused to fall down and the press forming is performed to the lump $C_P$ while the lump $C_P$ is sandwiched from both sides between dies 221 and 222 during the fall of the lump $C_P$. S1 of FIG. 70 is a view illustrating the state before the lump of the heated optical glass is formed, S2 of FIG. 70 is a view illustrating the state in which the lump of the optical glass falls down, and S3 of FIG. 70 is a view illustrating the state in which the press forming is performed to the lump of the optical glass to make the glass blank G.

As illustrated in S1 of FIG. 70, in an apparatus 201, a glass material grasping mechanism 212 conveys the lump $C_P$ of the optical glass to a position above a press unit 220. As illustrated in S2 of FIG. 70, the glass material grasping mechanism 212 releases the lump $C_P$ of the optical glass to cause the lump $C_P$ of the optical glass to fall down. As illustrated in S3 of FIG. 70, during the fall of the lump $C_P$ of the optical glass, the lump $C_P$ is sandwiched between the first die 221 and the second die 222 to perform the press forming, thereby preparing the disk-shaped glass blank G. Because the first die 221 and the second die 222 have the same configuration and action as those of the first die 121 and second die 122 illustrated in FIG. 68, the descriptions are omitted.

[Modification of Press Forming Method]

Next, a preferred modification of the press forming method will be described.

In this press forming method, a glass blank is formed in which a pair of principal faces is recessed at the central portion and the thickness increases as going toward the outer circumferential end portion from the center portion (so called a concave lens-shaped glass blank) in order that a glass substrate capable of suppressing occurrence of roll-off at the outer circumferential end portion can be prepared in a subsequent process. A glass blank shaped as described above can be prepared by forming into a convex shape the inner circumferential surface 121a and the inner circumferential surface 122a illustrated in FIG. 67, but it may be difficult in machining to form an inner circumferential surface with very small amount of projection. Therefore, a heat sink may be provided on the outer circumferential surface of the die while the inner circumferential surface of the die is made flat, thereby forming the inner circumferential surface into a convex shape due to thermal deformation resulting from a difference in thermal expansion amount on the inner circumferential surface of the die.

A method for performing press forming with a heat sink provided on the outer circumferential surface of the die to prepare a glass blank shaped as described above will be further described with reference to FIG. 71.

Figure 71:
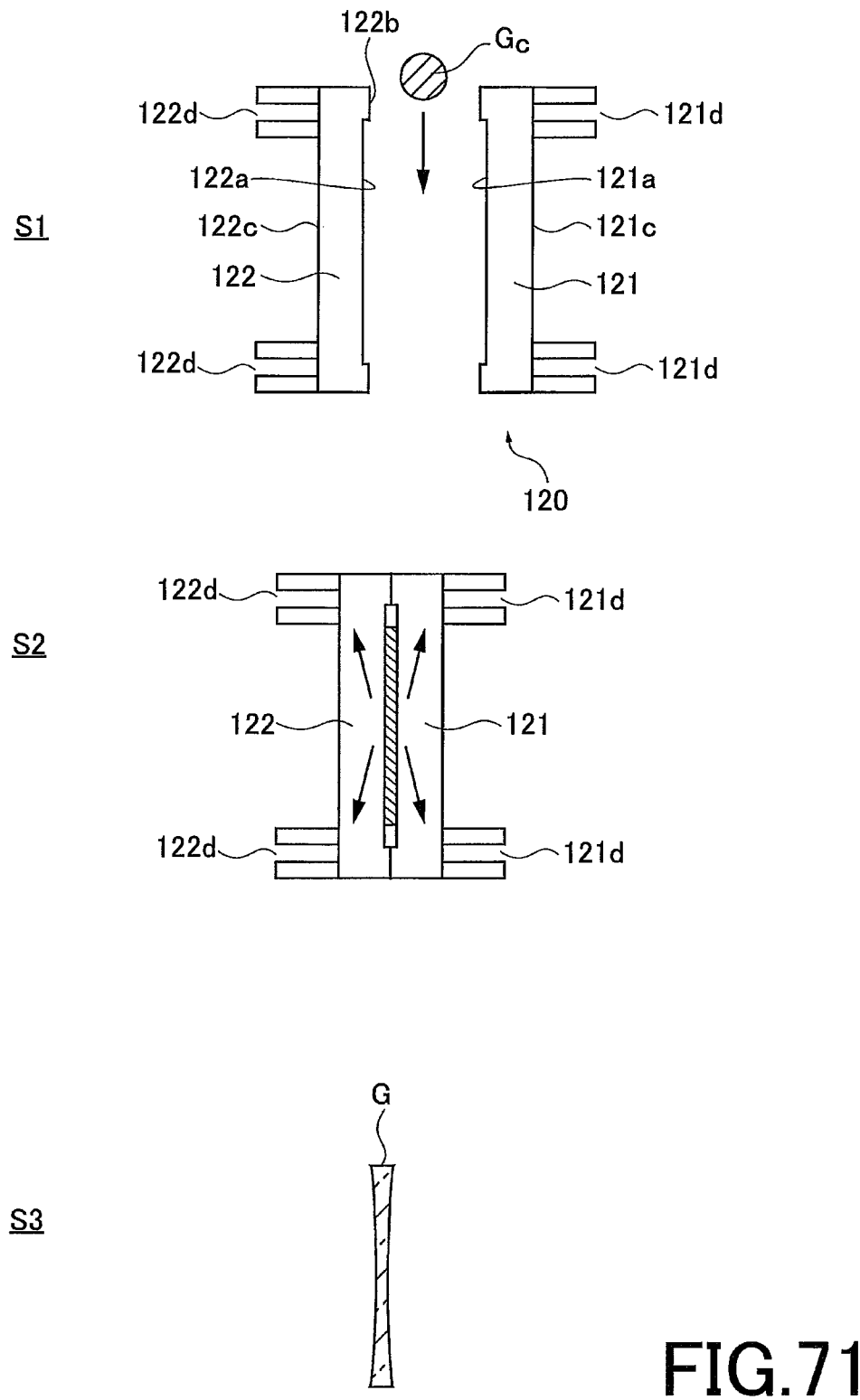
FIG. 71 is a view illustrating a modification of the press forming method of the embodiment.

In this modification, as illustrated in S1 of FIG. 71, heat sinks 121d and 122d are provided at the outer circumferential edges of outer circumferential surfaces 121c and 122c opposite, respectively, to the inner circumferential surface 121a and inner circumferential surface 122a as planar press forming surfaces, such that the heat sinks 121d and 122d surround the circumference of the disk-shaped glass blank, in the first die 121 and second die 122 illustrated in S1 of FIG. 67 to S3 of FIG. 67. Since the heat sinks 121d and 122d are provided in the first die 121 and the second die 122, a flow of heat as illustrated in S2 of FIG. 71 is generated in the first die 121 and the second die 122 during press forming, so that there is a difference in cooling between the portion of the outer circumference side and the central portion side of the glass blank during press forming. Consequently, the concave glass blank G is formed after press forming such that the cross-sectional shape of the formed glass blank G increases in thickness as going toward the outer circumferential end portion from the center portion as illustrated in S3 of FIG. 71.

Difference between the maximum thickness and the minimum thickness of the glass blank G having a concave cross section as illustrated in S3 of FIG. 71, is, for example, 8 μm or less.

In this form of press forming, it is preferred to form the glass blank by the press such that the temperatures of portions of press forming surfaces on both sides of the die, which are in contact with the glass blank, are substantially identical between press forming surfaces over a period of time until the temperature of the pressed glass blank falls to a strain point after pressing of the die is started. In this case, the cross-sectional shape of so called a concave lens-shaped glass blank is symmetric with respect to a vertical line provided that a pair of principal faces is arranged in a vertical direction, and the recess amount at each principal face is, for example, 4 μm or less. Therefore, if target flatness required for the glass substrate for magnetic disk is 4 μm or less, at least one of grinding processes for improving the flatness of the glass substrate can be omitted after the press forming, or the grinding process can be totally omitted. As illustrated in S3 of FIG. 71, a glass blank is formed so as to have the cross-sectional shape that increases in thickness as going toward the outer circumferential end portion from the center portion. Therefore, when the grinding process is performed, the outer circumferential edge at which the thickness of the glass blank is large easily serves as a start point of grinding processing, and resultantly efficient grinding can be performed.

In the form of dies illustrated in S1 of FIG. 71 and S2 of FIG. 71, heat sinks 121d and 122d are provided to create a flow of heat as illustrated in S2 of FIG. 71. In order to achieve such a flow of heat to prepare a concave glass blank G as illustrated in S3 of FIG. 71, a form can be alternatively employed in which heat sources are provided at portions of the outer circumferential surfaces 121c and 122c of the first die 121 and the second die 122, which correspond to the center portion of the glass blank during press forming.

The reason why a glass blank is prepared to have a pair of principal faces recessed at the central portion and to have thickness increasing as going toward the outer circumferential end portion from the center portion as illustrated in FIG. 71 is to prepare a glass substrate capable of suppressing occurrence of roll-off at the outer circumferential end portion.

Figure 72:
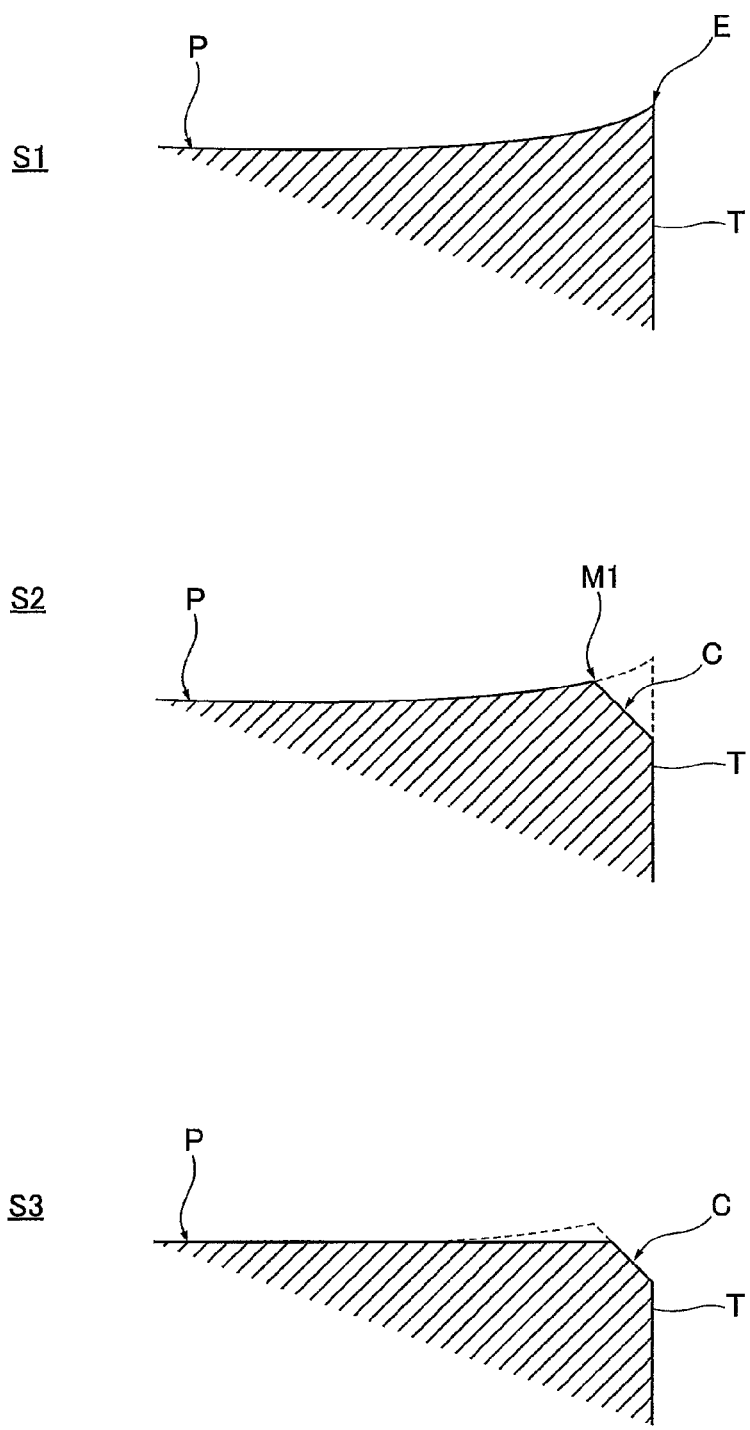
FIG. 72 is a view sequentially illustrating a method for processing the outer circumferential end portion of the glass substrate.

Hereinafter, explanations will be provided with reference to FIG. 72 as appropriate for the treatment in each process when a glass substrate for magnetic disk is prepared based on the glass blank G obtained by press forming illustrated in FIG. 71. FIG. 72 is a view sequentially illustrating a method for processing the outer circumferential end portion of the glass substrate, with only the outer circumferential end portion illustrated in an enlarged form in S1 of FIG. 72 to S3 of FIG. 72.

(b) Scribing Process (Step S20; Shape Processing Process)

A scribing process is performed after the press forming process. In the scribing process, the formed glass blank G is subjected to scribing.

As used herein, the scribing means that two concentric (inside concentric and outside concentric) cutting lines (linear scratches) are provided in the surface of the glass blank G with a scriber made of a super alloy or diamond particles in order to obtain the donut-shape (ring-shape) of the formed glass blank G having a predetermined size. The glass blank G scribed into two-concentric-circle shape is partially heated, and a portion outside the outside concentric circle and a portion inside the inside concentric circle are removed by a difference in thermal expansion of the glass blank G. In this way, a donut-shaped glass substrate is obtained. The glass substrate obtained in the scribing process has such a shape that the thickness increases as going toward the outer circumferential end portion from the center portion as in the case of the glass blank as a base. That is, the outer circumferential end portion of the glass substrate obtained in the scribing process has the shape illustrated in S1 of FIG. 72.

A donut-shaped glass substrate can also be obtained by forming a circular hole in the glass blank using a core drill or the like.

(c) Chamfering Surface Forming Process (Step S30)

Next, a chamfering surface forming process will be described. The chamfering surface forming process includes chamfering processing of the end portion of the glass substrate (chamfering of outer circumferential end portion and inner circumferential end portion) after the scribing process. Chamfering processing is shape processing in which the outer circumferential end portion and inner circumferential end portion of the glass substrate after the scribing process is chamfered between a principal face and a side wall portion perpendicular to the principal face using a diamond abrasive grain. The chamfering angle is, for example, 40 to 50 degrees with respect to the principal face.

Here, the principal face of the glass substrate after the scribing process is sloped upward from the center to the outer circumferential end portion as illustrated in S1 of FIG. 72. Therefore, when a chamfering surface is formed on the outer circumferential end portion of the principal face P of the glass substrate after the scribing process, the glass substrate is formed as illustrated in S2 of FIG. 72 after the chamfering surface is formed. That is, an edge portion E interposed between the principal face P and the end surface T is ground, thereby forming an elevated portion M1 between the principal face P and the chamfering surface T.

(d) Grinding Process using Fixed Abrasive Grain (Step S40)

In the grinding process using a fixed abrasive grain, the principal face of the glass substrate after the shape processing process is subjected to grinding processing (machining) using a double faces grinding apparatus including a planetary gear mechanism. For example, the grinding has the machining allowance of several micrometers to about 100 micrometers. The double faces grinding apparatus includes a pair of upper and lower surface plates (upper surface plate and lower surface plate), and a glass substrate is held between the upper surface plate and the lower surface plate. By moving one or both of the upper surface plate and the lower surface plate, the glass substrate and each surface plate are relatively moved, whereby both principal faces of the glass substrate can be ground. For an example of the double faces grinding apparatus including a planetary gear mechanism, see Japanese Patent Laid-open Publication No. 2008-254166.

Because a glass blank having extremely high flatness can be prepared in the press forming process of this embodiment, the grinding process may be omitted. Before the grinding process, a lapping process may be performed using a double faces grinding apparatus similar to the apparatus used in the grinding process and an alumina loose abrasive grain.

(e) Edge Polishing Process (Step S50)

Next, edge polishing of the glass substrate after the grinding process is performed.

In edge polishing, the inner circumferential end face and outer circumferential end face of the glass substrate are subjected to mirror surface finishing by brush polishing. At this point, slurry that includes fine particles such as cerium oxide as the loose abrasive grain is used. By performing edge polishing, an impairment such as contamination by deposition of dust or the like, damage or a flaw is eliminated, whereby occurrence of a thermal asperity and deposition of ions of sodium, potassium and the like which may cause corrosion can be prevented.

(f) First Polishing Process (Step S60)

Next, the principal face of the glass substrate after the edge polishing process is subjected to first polishing. For example, first polishing has the machining allowance of several micrometers to about 50 micrometers. First polishing is intended to remove the flaw left on the principal face after the grinding using the fixed abrasive grain, the strain and the micro-surface irregularity (micro-waviness and roughness). In the first polishing process, polishing is performed while a polishing solution is fed using a double polishing apparatus having a structure similar to that of the apparatus used in the grinding process. A polishing agent contained in the polishing solution is, for example, a cerium oxide abrasive grain or a zirconia abrasive grain.

In the first polishing process, polishing is performed so as to have a surface roughness (Ra) of 0.5 nm or less and a micro-waviness (MW-Rq) of 0.5 nm or less for the principal face of the glass substrate.

The micro-waviness may be represented by a RMS (Rq) value calculated as a roughness at a wavelength bandwidth of 100 to 500 μm in a region of 14.0 to 31.5 mm radius in the whole of the principal face, and can be measured using, for example, Model-4224 manufactured by Polytec Inc.

The surface roughness is represented by an arithmetic mean roughness Ra defined in JIS B0601:2001 and, for example, can be measured with roughness measuring machine SV-3100 manufactured by Mitutoyo Corporation and calculated by a method defined in JIS B0633:2001 when the roughness is no less than 0.006 μm and no more than 200 μm. When as a result, the roughness is 0.03 μm or less, for example, the roughness can be measured with a scanning probe microscope (atomic force microscope) nanoscope manufactured by Veeco Instruments Inc. and can be calculated by a method defined in JIS R1683:2007. In the present application, an arithmetic mean roughness Ra as measured in a resolution of 512×512 pixels in a measurement area of 1 μm×1 μm square can be used.

(g) Chemically Strengthening Process (Step S70)

Next, the glass substrate after the first polishing process is chemically strengthened.

For example, a mixed solution of potassium nitride (60% by weight) and sodium sulfate (40% by, weight) can be used as a chemically strengthening solution. In the chemically strengthening process, a chemically strengthening solution is heated to, for example, 300° C. to 400° C., a washed glass substrate is preheated to, for example, 200° C. to 300° C., and the glass substrate is then dipped in the chemically strengthening solution for, for example, 3 to 4 hours.

When the glass substrate is dipped in the chemically strengthening solution, the lithium ion and the sodium ion in the surface layer of the glass substrate are replaced, respectively, by the sodium ion and the potassium ion which have relatively large ion radiuses in the chemically strengthening solution, so that a compressive stress layer is formed on the surface layer portion, thereby strengthening the glass substrate. The glass substrate subjected to the chemically strengthening treatment is washed. For example, the glass substrate is washed with sulfuric acid, and then washed with pure water or the like.

(h) Second Polishing Process (Step S80)

Next, the glass substrate after chemically strengthening process is subjected to second polishing. Second polishing has the machining allowance of about 1 μm. Second polishing is intended at the mirror surface polishing of the principal face. In second polishing, for example, the polishing apparatus used in first polishing is used. At this point, the second polishing differs from the first polishing in the following points: the kind and particle size of the loose abrasive grain, and hardness of the resin polisher.

For example, the slurry of the turbid fine particles such as colloidal silica (particle size: diameter of about 10 to 50 nm) is used as the loose abrasive grain used in the second polishing.

The polished glass substrate is washed with a neutral detergent, pore water, IPA or the like to obtain a glass substrate for magnetic disk.

It is not necessarily essential to perform the second polishing process, but it is preferable to perform the second polishing process because the level of the surface irregularity of the principal face of the glass substrate can be further improved. By performing the second polishing process, the principal face can be made to have a roughness (Ra) of 0.1 nm or less and a micro-waviness (MW-Rq) of 0.1 nm or less.

A resin polisher having a relatively low hardness is used in the second polishing process. Therefore, when the polishing surface of the resin polisher is placed under a predetermined load to polish the principal face of the glass substrate, the stress by the resin polisher of the outer circumferential end portion receiving a load with linear contact is larger than that of the principal face receiving a load with planar contact. As a result, in the second polishing process, the outer circumferential end portion is more significantly polished than the principal face. Here, as illustrated in S2 of FIG. 72, the glass substrate after the chamfering surface forming process has a shape of the elevated portion M1 formed at the outer circumferential end portion. Then, by polishing in the second polishing process, the elevated portion M1 is ground and removed as illustrated in S3 of FIG. 72. As result, the principal face has good flatness up to the start point of the chamfering surface, and occurrence of roll-off at the outer circumferential end portion is suppressed.

[Magnetic Disk]

The glass substrate for magnetic disk is prepared through the processes described above. A magnetic disk is obtained in the following manner using the above-described glass substrate for magnetic disk.

The magnetic disk has, for example, a configuration in which on the principal face of the glass substrate, at least an adhesive layer, an underlying layer, a magnetic layer (magnetic recording layer), a protective layer and a lubricant layer are stacked in this order from the side closest to the principal face.

For example, the substrate is introduced into an evacuated deposition apparatus, and the adhesive layer, the underlying layer and the magnetic layer are sequentially deposited in an Ar atmosphere by a DC magnetron sputtering method. For example CrTi may be used as the adhesive layer, and for example, CrRu may be used as the underlying layer. For example a CoPt-based alloy may be used as the magnetic layer. Also, a CoPt-based alloy or FePt-based alloy having a $L_{10}$ ordered structure may be deposited to form a magnetic layer for heat assisted magnetic recording. After the deposition described above, the protective layer is deposited using $C_2H_4$ by, for example, a CVD method, and subsequently nitriding treatment is performed to introduce nitrogen to the surface, whereby a magnetic recording medium can be formed. Thereafter, the lubricant layer can be formed by applying, for example, PFPE (perfluoropolyether) onto the protective layer by a dip coating method.

Examples

The present invention will be further described below by way of Examples. However, the present invention is not limited to aspects described in Examples.

(1) Preparation of Molten Glass

Raw materials were weighed so as to obtain a glass having the following composition, and mixed to obtain a mixed raw material. This raw material was put in a melting vessel, heated, melted, clarified and stirred to prepare a homogeneous molten glass free from a foam and an unmelted substance. A foam and an unmelted substance, deposition of crystals, and contaminants such as a refractory material and platinum forming the melting vessel were not observed in the glass obtained.

[Composition of Glass]

Aluminosilicate glass having a composition including 50 to 75% of $SiO_2$, 1 to 15% of $Al_2O_3$, 5 to 35% in total of at least one component selected from $Li_2O$, $Na_2O$ and $K_2O$, 0 to 20% in total of at least one component selected from MgO, CaO, SrO, BaO and ZnO and 0 to 10% in total of at least one component selected from $ZrO_2$, $TiO_2$, $La_2O_3$, $Y_2O_3$, $Ta_2O_5$, $Nb_2O_5$ and $HfO_2$ in an oxide-based conversion indicated in mol %.

The above-described molten glass was provided, and a glass blank having a diameter of 75 mm and a thickness of 0.9 mm was prepared using a press forming method of the present invention (method using the apparatus in FIGS. 66 and 67). The temperature of a molten glass material $L_G$ discharged from a molten glass outflow port 111 was 1300° C., and the viscosity of the molten glass material $L_G$ at this time was 700 poise. The surface roughness (arithmetic mean roughness Ra) of the inner circumferential surfaces of a first die and a second die was 0.01 μm to 0.1 μm.

The molten glass material $L_G$ discharged from a molten glass outflow port 111 was cut by a cutting unit 160, so that a gob $G_G$ having a thickness of about 20 mm was formed. The gob $G_G$ was pressed under a load of 3000 kgf by a press unit until the gob $G_G$ had a temperature equal to or lower than the glass transition temperature (Tg) of the molten glass material (about 3 seconds), so that a glass blank having a diameter of 75 mm was formed. At this timer, the temperatures of the first die and the second die at the central position were both 470° C.

When a heat sink made of copper as illustrated in FIG. 71 was provided on the outer circumferential surface of the die, and pressing was performed, the glass blank had a shape with a pair of principal faces recessed at the central portion and had thickness increased as going toward the outer circumferential end portion from the center portion. Testing was conducted for two types of shapes of heat sinks with different cooling effect at the portion on the outer circumference side and the central portion side.

Next, glass substrates for magnetic disks were prepared by sequentially performing the processes of steps S20, S30 and S50 to S80 in FIG. 65 (i.e. processes except the grinding process using a fixed abrasive grain) using the glass blanks of Examples. That is, the glass substrate for magnetic disk was prepared without performing the process of grinding the principal face for improving the flatness.

In preparation of the glass substrate for magnetic disk, the processes of first polishing and second polishing were performed under the following conditions.

First polishing process: polishing was performed using cerium oxide (average particle size: 1 to 2 Ξm in diameter) and a hard urethane pad (JIS-A hardness: 80 to 100). Machining allowance: 10 to 40 Ξm.

Second polishing process: polishing was performed using colloidal silica (average particle size: 20 to 40 nm in diameter) and a soft urethane pad (Asker C hardness: 50 to 80). Machining allowance: 1 to 5 μm.

[Evaluation of Glass Substrate for Magnetic Disk of Examples]

All the glass blanks of Examples were recessed at the central portion. Next, the flatness and the dub-off value were measured for glass substrates for which steps up to the step S30 were completed. Further, the dub-off value was measured for glass substrates for magnetic disk for which all the processes were completed. Evaluation results are illustrated in Table 9.

The flatness can be defined as a difference on the normal axis between the lowest position (trough) and the highest position (crest) on the principal plane of the glass substrate when viewed from a fixed height on the normal axis from the horizontal plane with the glass substrate placed on the horizontal plane. The flatness was measured using, for example, Flatness Tester FT-900 manufactured by NIDEK CO., LTD. Evaluation criteria for the flatness illustrated in Table 9 are as follows. It is preferred that the flatness of the glass substrate is 8.0 μm or less in the following criteria because the flatness can be improved to a level of 4 μm or less, which is target flatness of the glass substrate for magnetic disk. It is preferred that the flatness of the glass substrate is 4.0 μm or less because the target flatness of the glass substrate for magnetic disk can be achieved even if the grinding process is omitted.

Very good: The flatness is 2.0 μm or less.
Good: The flatness is more than 2.0 μm and no more than 4.0 μm.
Fair: The flatness is more than 4.0 μm and no more than 8.0 μm.
Poor: The flatness is more than 8.0 μm.

The dub-off value was evaluated as evaluation of the shape of the end portion. FIG. 73 is a view showing the cross section of the end portion of the glass substrate in an enlarged form for conceptually explaining a method for calculating a dub-off value. For calculating a dub-off value, a center point of a glass substrate, a point (denoted as X1) on the principal face, which is located 30 mm from the center point toward the outer edge, and a position (denoted as X2) on the principal face, which is located 31.5 mm from the center point toward the outer edge, are defined as illustrated in FIG. 73 (in the case of a glass substrate having an outer diameter of 65 mm). The center point of the glass substrate, X1 and X2 are on the same line when the glass substrate is viewed from above. At this time, when the principal face is projected with respect to a reference line L linking X1 and X2, the end portion of the glass substrate has roll-off shape (see FIG. 73), and the maximum projection amount thereof is defined as a dub-off value (positive value). Conversely, when the principal face is recessed with respect to the reference line L linking X1 and X2, the end portion of the glass substrate has a ski-jump shape (see FIG. 73), and the maximum recess amount thereof is defined as a dub-off value (negative value). For measurement of a dub-off value, a surface shape measurement device (MicroXAM manufactured by Phase Shift, Inc.) was used.

Calculation of a dub-off value for one donut-shaped glass substrate was performed in the following manner. Dub-off values were calculated for four points (four combinations for X1 and X2) at intervals of 90 degrees for one surface, and of the obtained four dub-off values, a value having the largest absolute value is defined as a dub-off value (positive or negative value) of the surface. Similarly, a dub-off value was calculated for the other surface. An average of the dub-off values of both the surfaces was defined as a dub-off value (positive or negative value) of the glass substrate. The dub-off value was preferably 10 nm or less as an absolute value, further preferably 5 nm or less as an absolute value.

TABLE 9

| | Flatness immediately after S30 | Dub-off value immediately after S30 [nm] | Dub-off value after second polishing process [nm] |
|---|---|---|---|
| Example 1 | Very good | −10 | 8 |
| Example 2 | Fair | −30 | 4 |

As is shown by the evaluation results in Table 9, in Examples 1 and 2, the shape of the end portion immediately after the step S30 (chamfering surface forming) was a ski-jump shape, but effect of roll-off by the subsequent polishing process occurred at an elevated portion of the ski-jump shape, and finally roll-off shape having a minor dub-off value was formed.

Next, recording layers were deposited on the glass substrates for magnetic disk, which had been prepared based on the glass blanks of Examples 1 and 2, to prepare magnetic disks (Example 1A and Example 2A, respectively, in Table 10). The prepared magnetic disk has a nominal 2.5 inch size (an inner diameter of 20 mm, an outer diameter of 65 mm and a thickness of 0.8 mm).

Deposition of recording layer on the glass substrate for magnetic disk was performed in the following manner. First, an adhesive layer, a soft magnetic layer, a pre-underlying layer, an underlying layer, a principal recording layer, and an auxiliary recording layer, a protective layer and a lubricant layer were sequentially deposited in an Ar atmosphere by a DC magnetron sputtering method using an evacuated deposition apparatus. The Ar gas pressure at the time of deposition was 0.6 Pa unless otherwise specified. As the adhesive layer, Cr-50Ti was deposited in a thickness of 10 nm. As the soft magnetic layer, layers of 92Co-3Ta-5Zr were each deposited in a thickness of 20 nm with a Ru layer of 0.7 nm interposed therebetween. As the pre-underlying layer, Ni-5W was deposited in a thickness of 8 nm. As the underlying layer, Ru was deposited in a thickness of 10 nm at 0.6 Pa, and Ru was deposited thereon in a thickness of 10 nm at 5 Pa. As the principal recording layer, 90(72Co-10Cr-18Pt)-5($SiO_2$)-5($TiO_2$) was deposited in a thickness of 15 nm at 3 Pa. As the auxiliary recording layer, 62Co-18Cr-15Pt-5B was deposited in a thickness of 6 nm. As the protective layer, a layer was deposited in a thickness of 4 nm using $C_2H_4$ by a CVD method, and the surface layer was subjected to nitriding treatment. As the lubricant layer, a layer was formed in a thickness of 1 nm using PFPE by a dip coating method.

[Evaluation of Magnetic Disk of Examples]

For the magnetic disks of Examples, a touch-down test (DFH touch-down test) of a DFH (Dynamic Fly height) head element portion was conducted using a HDF tester (Head/Disk Flyability Tester) manufactured by Kubota Comps Corporation. In this test, the element portion is gradually protruded by a DFH mechanism, and contact thereof with the surface of magnetic disk is detected with an AE (Acoustic Emission) sensor to thereby evaluate a protrusion amount when the head element portion comes into contact with the surface of the magnetic disk. As the head, a DFH head for 320 GB/P magnetic disks (2.5 inch size) was used. A flying height is 10 nm when the element portion was not protruded. That is, for example, the bead flying height was 2 nm when the protrusion amount was 8 nm. Other conditions were set as described below.

Evaluation radius: 30.5 mm
Rotation number of magnetic disk: 5400 rpm
Temperature: 25° C.
Humidity: 60%

Results of the DFH touch-down test are illustrated in Table 10. In Table 10, evaluations were made as described below according to the protrusion amount of the head element portion.

Good: Protrusion amount≥8 nm
Poor: Protrusion amount<8 nm

TABLE 10

|  | Evaluation of protrusion amount |
|---|---|
| Example 1A | Good |
| Example 2A | Good |

It could be confirmed that a glass substrate for magnetic disk, which has good flatness and with which a good DFH touch down test result was obtained when the glass substrate was formed into a medium, could be manufactured for the magnetic disk of any of Examples prepared with the grinding process omitted, regardless of the recess amount at the central portion of the glass blank as a base.

What is claimed is:

1. A method for manufacturing a glass blank for a magnetic disk, the method comprising:
    cutting a lump of molten glass from flowing molten glass to cause the lump of molten glass to fall; and
    a forming process of press-forming the lump of molten glass using first and second dies each having a plate shape, such that during the forming process, the falling lump of molten glass is press-formed using the first and second dies from a direction orthogonal to a falling direction of the lump of molten glass so that respective press forming inner circumferential surfaces of the first and second dies contact the lump of molten glass at substantially the same time to spread the lump of molten glass along the inner circumferential surfaces of the first and second dies to produce the glass blank having a plate shape, a time from when the lump of molten glass comes into contact with the press forming inner circumferential surface of the first die or the press forming inner circumferential surface of the second die to a time when the lump of molten glass is completely confined between the first and second dies is 0.1 second or less, and a temperature difference along each of the press forming surfaces of the pair of dies is maintained at 10° C. or less so that a surface waviness of the glass blank is equal to 30 nm or less and is measured as a maximum elevation difference in wavelength component of 5 mm or less with respect to a principal surface of the glass blank.

2. The method for manufacturing a glass blank for a magnetic disk according to claim 1, further comprising a thermal equalizer configured to reduce the temperature difference along each of the press forming surfaces by heat-exhausting from the press forming surfaces and/or heating the press forming surfaces.

3. The method for manufacturing a glass blank for a magnetic disk according to claim 2, wherein the thermal equalizer comprises a heat sink.

4. The method for manufacturing a glass blank for a magnetic disk according to claim 3, wherein the heat sink is provided on at least a part of a respective surface opposite to a respective one of the press forming surfaces.

5. The method for manufacturing a glass blank for a magnetic disk according to claim 4, wherein the heat sink is provided so that amount of heat exhausted from a central portion of the molten glass is larger than that from a circumferential edge portion of the molten glass during the press forming.

6. The method for manufacturing a glass blank for a magnetic disk according to claim 1, wherein in the forming process, press forming is performed so that the temperature of the press forming surface of the pair of dies is substantially the same.

7. The method for manufacturing a glass blank for a magnetic disk according to claim 1, wherein a thermal expansion coefficient at 100° C. to 300° C. of a glass blank obtained after press forming is in a range of 30 to $100 \times 10^{-7} (K^{-1})$.

8. The method for manufacturing a glass blank for a magnetic disk according to claim 1, surface roughness of the press forming surface of the die is substantially uniform throughout the surface.

9. A method for manufacturing a glass substrate for a magnetic disk, wherein a glass blank for magnetic disk is subjected to polishing processing having machining allowance of 50 μm or less to manufacture a glass substrate for magnetic disk, the glass blank being manufactured with the method for manufacturing a glass blank for magnetic disk according to claim 1.

10. A method for manufacturing a magnetic disk, the method comprising depositing at least a magnetic layer on a principle surface of the glass substrate for a magnetic disk obtained with the method for manufacturing a glass substrate for a magnetic disk according to claim 9.

11. A method for manufacturing a glass blank for magnetic disk according to claim 1, wherein during the forming process, the difference in temperature along the press forming surface of the die is controlled based on a relation between differences in temperature in the press forming surface of the die during the forming process and corresponding sets of surface waviness of the glass blank.

12. A method for manufacturing a glass blank for a magnetic disk, the method comprising:
    cutting a lump of molten glass from flowing molten glass to cause the lump of molten glass to fall; and
    a forming process of press-forming the lump of molten glass using first and second dies each having a plate shape, such that during the forming process, the falling lump of molten glass is press-formed using the first and second dies from a direction orthogonal to a falling direction of the lump of molten glass so that respective press forming inner circumferential surfaces of the first and second dies contact the lump of molten glass at substantially the same time to spread the lump of molten glass along the inner circumferential surfaces of the first and second dies to produce the glass blank having a plate shape while a temperature difference between the press forming surfaces of the pair of dies is maintained at 5° C. or less and a temperature of the molten glass is controlled so that a cooling rate of the molten glass is −10° C./second or less in a period during a period of time in which the molten glass is cooled from a glass transition point (Tg) to a strain point, and a time from when the lump of molten glass comes into contact with the press forming inner circumferential surface of the first die or the press forming inner circumferential surface of the second die to a time when the lump of molten glass is completely confined between the first and second dies is 0.1 second or less.

13. The method for manufacturing a glass blank for a magnetic disk according to claim 12, wherein press forming is performed while the cooling rate of the molten glass is controlled so that a difference in temperature on a surface of the molten glass is reduced during the period of time in which the pair of dies close and separate.

14. The method for manufacturing a glass blank for a magnetic disk according to claim 12, wherein in the forming process, press forming is performed while the cooling rate of the molten glass is controlled so that a difference in temperature on a surface of the molten glass is reduced during the period of time in which the temperature of the molten glass moves changes from the glass transition point (Tg) to the strain point during pressing of the molten glass.

15. The method for manufacturing a glass blank for a magnetic disk according to claim 12, wherein in the forming process, press forming is performed while temperature of a press forming surface of the die during pressing of the molten glass is kept substantially uniform.

16. The method for manufacturing a glass blank for a magnetic disk according to claim 12, wherein in the forming process, press forming is performed so that temperature of a press forming surface of the die is substantially identical between the pair of dies.

17. The method for manufacturing a glass blank for a magnetic disk according to claim 12, wherein the temperature of the pair of dies is kept lower than the glass transition point (Tg) of the molten glass during a period of time beginning when the glass blank starts to contact at least one of the press forming surfaces and ending when the glass blank is separated from the at least one of the press forming surfaces.

18. The method for manufacturing a glass blank for a magnetic disk according to claim 12, wherein the forming process is performed using a molten glass having a glass transition point (Tg) of 600° C. or higher.

19. A method for manufacturing a glass substrate for a magnetic disk, wherein a glass substrate for magnetic disk is manufactured without performing annealing treatment using a glass blank for magnetic disk, the glass blank being obtained with the method for manufacturing a glass blank for magnetic disk according to claim 12.

20. The method for manufacturing a glass blank for a magnetic disk according to claim 19, wherein the glass transition point (Tg) is 600° C. or higher.

21. A method for manufacturing a glass blank for a magnetic disk, the method comprising:
cutting a lump of molten glass from flowing molten glass to cause the lump of molten glass to fall; and
a forming process of press-forming the lump of molten glass using first and second dies each having a plate shape, such that during the forming process, the falling lump of molten glass is press-formed using the first and second dies from a direction orthogonal to a falling direction of the lump of molten glass so that respective press forming inner circumferential surfaces of the first and second dies contact the lump of molten glass at substantially the same time to spread the lump of molten glass along the inner circumferential surfaces of the first and second dies to produce the glass blank having a plate shape while a temperature difference between the press forming surfaces of the pair of dies is maintained at 5° C. or less and a cooling rate of the molten glass is controlled during a period of time in which the molten glass is cooled from a glass transition point to a strain point so as to reduce in-plane strain generated when the molten glass lump is solidified into the glass blank, and a time from when the lump of molten glass comes into contact with the press forming inner circumferential surface of the first die or the press forming inner circumferential surface of the second die to a time when the lump of molten glass is completely confined between the first and second dies is 0.1 second or less.

22. A method for manufacturing a glass blank for a magnetic disk, the method comprising:
cutting a lump of molten glass from flowing molten glass to cause the lump of molten glass to fall; and
a forming process of press-forming the lump of molten glass using first and second dies, such that during the forming process, press forming is performed using the first and second dies from a direction orthogonal to a falling direction of the lump of molten glass so that respective press forming inner circumferential surfaces of the first and second dies contact the lump of molten glass at substantially the same time to spread the lump of molten glass along the inner circumferential surface's of the first and second dies to produce the glass blank having a plate shape while a temperature difference between the press forming surfaces of the pair of dies is maintained at 5° C. or less and a cooling rate of the molten glass is controlled so that a difference in temperature on a surface of the molten glass during pressing of the molten glass is reduced, and a time from when the lump of molten glass comes into contact with the press forming inner circumferential surface of the first die or the press forming inner circumferential surface of the second die to a time when the lump of molten glass is completely confined between the first and second dies is 0.1 second or less.

\* \* \* \* \*